United States Patent
Farb et al.

(10) Patent No.: US 12,180,934 B2
(45) Date of Patent: Dec. 31, 2024

(54) FLAT-PACKABLE KIT FOR A TURBINE

(71) Applicant: Flower Turbines, Inc., Lawrence, NY (US)

(72) Inventors: Mark Daniel Farb, Lawrence, NY (US); Irakli Baitish, Haifa (IL)

(73) Assignee: FLOWER TURBINES, INC., Lawrence, NY (US)

( * ) Notice: Subject to any disclaimer, the term of this patent is extended or adjusted under 35 U.S.C. 154(b) by 0 days.

(21) Appl. No.: 18/429,577

(22) Filed: Feb. 1, 2024

(65) Prior Publication Data

US 2024/0254970 A1 Aug. 1, 2024

Related U.S. Application Data

(63) Continuation of application No. PCT/US2024/011337, filed on Jan. 12, 2024.
(Continued)

(51) Int. Cl.
*F03D 3/00* (2006.01)
*F03B 15/00* (2006.01)
(Continued)

(52) U.S. Cl.
CPC ............ *F03D 7/00* (2013.01); *F03B 15/00* (2013.01); *F03D 3/00* (2013.01); *F03D 7/049* (2023.08);
(Continued)

(58) Field of Classification Search
CPC ........ F03D 13/401; F03D 3/009; F03D 3/061; F03D 3/005; F05B 2230/60; F05B 2260/02
See application file for complete search history.

(56) References Cited

U.S. PATENT DOCUMENTS 1,352,952 A 9/1920 Gracey
1,581,537 A 4/1926 Hennigh
(Continued)

FOREIGN PATENT DOCUMENTS

CA 2800765 A1 12/2010
CN 2409347 Y 12/2000
(Continued)

OTHER PUBLICATIONS

International Search Report and Written Opinion for International Application No. PCT/US2022/082035 dated Mar. 28, 2023 (8 pages).
(Continued)

*Primary Examiner* — Aaron R Eastman
(74) *Attorney, Agent, or Firm* — Finnegan, Henderson, Farabow, Garrett & Dunner LLP

(57) ABSTRACT

A flat-packable wind turbine assembly kit, includes a flat-packed bendable airfoil having an upper edge and a lower edge. The flat-packed bendable airfoil is capable of assuming a predefined curvature upon assembly. The flat-packed bendable airfoil includes upper connecting elements distributed along the upper edge and lower connecting elements distributed along the lower edge of the flat-packed bendable airfoil. The flat-packed bendable airfoil also includes a flat-packed upper plate including an upper mating orifices distributed in a contour corresponding to the predefined curvature. Further, the flat-packed bendable airfoil includes a flat-packed lower plate including lower mating orifices distributed in the contour corresponding to the predefined curvature. Thus, upon assembly when the upper connecting elements are connected to the upper mating orifices and when the lower connecting elements are connected to the lower mating orifices, the flat-packed bendable airfoil assumes the predefined curvature.

18 Claims, 35 Drawing Sheets

Related U.S. Application Data

(60) Provisional application No. 63/491,747, filed on Mar. 23, 2023, provisional application No. 63/439,869, filed on Jan. 19, 2023, provisional application No. 63/439,135, filed on Jan. 15, 2023.

(51) Int. Cl.

| | |
|---|---|
| *F03D 7/00* | (2006.01) |
| *F03D 7/04* | (2006.01) |
| *F03D 7/06* | (2006.01) |
| *F03D 9/32* | (2016.01) |
| *F03D 13/40* | (2016.01) |

(52) U.S. Cl.
CPC ............... *F03D 7/06* (2013.01); *F03D 9/32* (2016.05); *F03D 13/401* (2023.08); *F05B 2230/60* (2013.01); *F05B 2240/94* (2013.01); *F05B 2260/02* (2013.01); *F05B 2270/101* (2013.01); *F05B 2270/204* (2020.08)

(56) References Cited

U.S. PATENT DOCUMENTS

| | | | |
|---|---|---|---|
| 4,036,360 A | 7/1977 | Deffeyes | |
| 4,714,225 A | 12/1987 | Skinner | |
| 4,973,219 A | 11/1990 | Brickner et al. | |
| 5,044,878 A * | 9/1991 | Wilhelm | F03D 3/061 415/4.2 |
| 5,143,170 A | 9/1992 | Hunt et al. | |
| 5,624,006 A | 4/1997 | Richardson, Jr. | |
| 5,798,631 A | 8/1998 | Spee | |
| 6,784,566 B2 | 8/2004 | Thomas | |
| 6,824,073 B1 | 11/2004 | Haney | |
| 7,592,537 B1 | 9/2009 | West | |
| 7,679,207 B2 | 3/2010 | Cory | |
| 7,891,573 B2 | 2/2011 | Finkam | |
| 7,902,688 B2 | 3/2011 | Krivcov | |
| 7,944,067 B2 | 5/2011 | Kammer | |
| 7,988,413 B2 | 6/2011 | Haar | |
| 8,207,623 B2 | 6/2012 | Rivas | |
| 8,333,564 B2 | 12/2012 | Krivcov | |
| 8,364,323 B2 | 1/2013 | Arinaga | |
| 8,491,262 B2 | 7/2013 | McGrath | |
| 8,648,483 B2 | 2/2014 | Haar | |
| 8,696,313 B2 | 4/2014 | Deeley | |
| 9,051,918 B1 * | 6/2015 | Hench | F03D 3/06 |
| 9,127,646 B2 | 9/2015 | Cory | |
| 9,157,664 B2 | 10/2015 | Place | |
| 9,328,717 B1 | 5/2016 | Walker | |
| 9,689,372 B2 | 6/2017 | Gonzalez | |
| 9,835,138 B2 | 12/2017 | Westergaard | |
| 10,330,086 B2 | 6/2019 | Farb | |
| 10,400,746 B1 * | 9/2019 | Shoffler | F03D 3/061 |
| 10,400,747 B2 | 9/2019 | D'Aix-Marseille et al. | |
| 10,605,229 B2 | 3/2020 | Zhang | |
| 10,612,519 B2 | 4/2020 | Franke et al. | |
| 10,767,630 B1 | 9/2020 | Venkitanarayanan | |
| 11,060,502 B2 | 7/2021 | Wang | |
| 11,143,164 B1 * | 10/2021 | Landis | F03D 3/005 |
| 11,208,982 B2 | 12/2021 | Palamara | |
| 11,831,164 B2 | 11/2023 | Farb | |
| 11,891,980 B2 | 2/2024 | Farb | |
| 11,905,929 B2 | 2/2024 | Farb | |
| 2002/0105190 A1 | 8/2002 | Thomas | |
| 2002/0125880 A1 | 9/2002 | Murai | |
| 2004/0164561 A1 | 8/2004 | Nagawa | |
| 2005/0034937 A1 | 2/2005 | Agardy | |
| 2005/0143221 A1 | 6/2005 | Kuwahara | |
| 2006/0131889 A1 | 6/2006 | Corten | |
| 2006/0153682 A1 * | 7/2006 | Vanderhye | F03D 3/062 416/197 A |
| 2008/0083689 A1 | 4/2008 | Schroeder | |
| 2008/0223982 A1 | 9/2008 | Pri-Paz | |
| 2008/0284170 A1 | 11/2008 | Cory | |
| 2008/0284171 A1 | 11/2008 | Cory | |
| 2009/0040750 A1 | 2/2009 | Myer | |
| 2009/0097981 A1 * | 4/2009 | Gabrys | F03D 3/005 416/223 R |
| 2009/0186745 A1 | 7/2009 | Lewiston | |
| 2009/0220342 A1 | 9/2009 | Wu et al. | |
| 2009/0224556 A1 | 9/2009 | Berenda et al. | |
| 2009/0243295 A1 | 10/2009 | Kammer | |
| 2009/0267351 A1 | 10/2009 | Buns | |
| 2009/0269209 A1 * | 10/2009 | Urban | F03D 3/005 416/243 |
| 2009/0278352 A1 | 11/2009 | Rivas | |
| 2010/0140939 A1 | 6/2010 | Scholte-Wassink | |
| 2010/0252706 A1 | 10/2010 | Hargis | |
| 2011/0037269 A1 | 2/2011 | Poon et al. | |
| 2011/0089701 A1 | 4/2011 | Blake | |
| 2011/0111700 A1 | 5/2011 | Hacket | |
| 2011/0164977 A1 | 7/2011 | Vallejo | |
| 2011/0215640 A1 | 9/2011 | Donnelly | |
| 2011/0302864 A1 | 12/2011 | Ramsay | |
| 2011/0304150 A1 | 12/2011 | Hara | |
| 2011/0311364 A1 | 12/2011 | Conner | |
| 2012/0056424 A1 | 3/2012 | Holstein | |
| 2012/0169052 A1 | 7/2012 | Leipold-Buettner | |
| 2012/0175879 A1 | 7/2012 | Keech | |
| 2012/0187695 A1 | 7/2012 | Desplats | |
| 2012/0189448 A1 * | 7/2012 | Jaquier | F03B 17/062 29/426.3 |
| 2012/0217824 A1 | 8/2012 | Gupta | |
| 2012/0265356 A1 | 10/2012 | Yasugi | |
| 2013/0008242 A1 | 1/2013 | Sakaguchi | |
| 2013/0114312 A1 | 5/2013 | Reichard | |
| 2013/0197704 A1 | 8/2013 | Pan | |
| 2013/0207624 A1 | 8/2013 | Aaltonen | |
| 2013/0219812 A1 | 8/2013 | Goodman et al. | |
| 2013/0313827 A1 | 11/2013 | Lovmand et al. | |
| 2013/0333689 A1 | 12/2013 | Umemoto | |
| 2014/0010656 A1 | 1/2014 | Nies | |
| 2014/0145550 A1 | 5/2014 | Hitchcock | |
| 2014/0150774 A1 | 6/2014 | Chang | |
| 2014/0150843 A1 | 6/2014 | Pearce | |
| 2014/0150845 A1 | 6/2014 | Chang | |
| 2014/0234103 A1 | 8/2014 | Obrecht | |
| 2015/0076828 A1 | 3/2015 | Palethorpe | |
| 2015/0123401 A1 | 5/2015 | Vigars | |
| 2015/0137519 A1 | 5/2015 | Tarnowski | |
| 2015/0377213 A1 | 12/2015 | Deshpande | |
| 2016/0222946 A1 | 8/2016 | Krings | |
| 2016/0312768 A1 * | 10/2016 | Takakura | F03D 80/70 |
| 2016/0378085 A1 | 12/2016 | Guo | |
| 2017/0054301 A1 | 2/2017 | Fintzos | |
| 2017/0058899 A1 | 3/2017 | Ichihara | |
| 2017/0074249 A1 | 3/2017 | Smook | |
| 2017/0114778 A1 | 4/2017 | Madson | |
| 2017/0214249 A1 | 7/2017 | Seeley | |
| 2017/0298902 A1 * | 10/2017 | Gdovic | F03D 3/062 |
| 2017/0324367 A1 | 11/2017 | Collins | |
| 2018/0010576 A1 | 1/2018 | Brake et al. | |
| 2018/0097360 A1 | 4/2018 | Batten | |
| 2018/0110328 A1 | 4/2018 | Mayer | |
| 2018/0142669 A1 | 5/2018 | Cho et al. | |
| 2018/0171972 A1 | 6/2018 | As | |
| 2018/0175661 A1 | 6/2018 | Tuerk | |
| 2018/0238305 A1 | 8/2018 | McMahon | |
| 2018/0301906 A1 | 10/2018 | Qureshi | |
| 2018/0306169 A1 | 10/2018 | Dharmadhikari et al. | |
| 2018/0340515 A1 | 11/2018 | Hitachi | |
| 2019/0052206 A1 | 2/2019 | Noderer | |
| 2019/0093628 A1 | 3/2019 | Lin | |
| 2019/0186145 A1 | 6/2019 | Farb | |
| 2019/0360469 A1 | 11/2019 | De Boer | |
| 2020/0106295 A1 | 4/2020 | Trzemzalski | |
| 2020/0232446 A1 | 7/2020 | Hawkins | |
| 2020/0280281 A1 | 9/2020 | Vaidyanathan | |
| 2021/0033062 A1 | 2/2021 | Mishra | |
| 2021/0075252 A1 | 3/2021 | Caamano et al. | |
| 2021/0098994 A1 | 4/2021 | White | |
| 2021/0126541 A1 | 4/2021 | Zhang | |
| 2021/0148330 A1 * | 5/2021 | Kukkonen | F03D 13/20 |

(56) References Cited

U.S. PATENT DOCUMENTS

| | | | |
|---|---|---|---|
| 2021/0164442 A1 | 6/2021 | Bonfiglio | |
| 2021/0262441 A1 | 8/2021 | Jacobsen | |
| 2021/0262443 A1* | 8/2021 | Goldblatt | F03D 9/11 |
| 2021/0301784 A1 | 9/2021 | Cory | |
| 2022/0060016 A1 | 2/2022 | Mitsunaga | |
| 2022/0077686 A1 | 3/2022 | Ma | |
| 2022/0263457 A1 | 8/2022 | Akhavan-Tafti | |
| 2022/0299959 A1 | 9/2022 | Schirmer | |
| 2022/0321052 A1 | 10/2022 | Sassi | |
| 2022/0407349 A1 | 12/2022 | Owens | |
| 2023/0092176 A1 | 3/2023 | Ricketts | |
| 2023/0141320 A1 | 5/2023 | Sepulveda Gonzalez | |
| 2023/0184218 A1 | 6/2023 | Lund | |
| 2023/0250793 A1 | 8/2023 | Farb et al. | |
| 2023/0250801 A1 | 8/2023 | Farb | |
| 2023/0250804 A1 | 8/2023 | Farb | |
| 2023/0283079 A1 | 9/2023 | Weaver | |
| 2023/0323858 A1 | 10/2023 | Farb | |
| 2023/0324866 A1 | 10/2023 | Farb | |
| 2023/0327455 A1 | 10/2023 | Farb | |
| 2023/0327456 A1 | 10/2023 | Farb | |
| 2023/0340936 A1* | 10/2023 | Gaber | F03D 1/04 |
| 2023/0402739 A1 | 12/2023 | Hoganson | |
| 2024/0060468 A1* | 2/2024 | Abdallah | F03D 3/009 |

FOREIGN PATENT DOCUMENTS

| | | |
|---|---|---|
| CN | 103683622 A | 3/2014 |
| CN | 109630360 A | 4/2019 |
| CN | 107131099 B | 11/2019 |
| CN | 113272545 A | 8/2021 |
| EP | 3096004 A1 | 11/2016 |
| EP | 3023636 B1 | 4/2021 |
| EP | 3885574 B1 | 2/2024 |
| GB | 2440264 A | 1/2008 |
| JP | 2007107496 A | 4/2007 |
| KR | 20100039917 A | 4/2010 |
| KR | 20110008951 U | 9/2011 |
| KR | 101476673 B1 | 12/2014 |
| KR | 102060281 B1 | 12/2019 |
| RU | 2588914 C2 | 7/2016 |
| WO | 2013073930 A1 | 5/2013 |
| WO | 2013174090 A1 | 11/2013 |
| WO | 2013175035 A1 | 11/2013 |
| WO | 2018029401 A1 | 2/2019 |
| WO | 2020254161 A1 | 6/2020 |
| WO | 20200150108 A1 | 7/2020 |
| WO | 2021231485 A1 | 11/2021 |

OTHER PUBLICATIONS

"Outer Rotor Permanent Magnet Direct Drive Wind Turbin" dated XX, https://www.pengky.cn/zz-direct-drive-turbine/external-rotor-generator/external-rotor-generator.html (Last accessed May 4, 2023).
PCT International Search Report and Written Opinion mailed Jul. 28, 2023, issued in corresponding International Application No. PCT/US23/62170 (6 pgs.).
Blum, Franz, et al. "Device for providing a platform on the roof of a building", May 14, 2020, EPO, DE 102018128308-A1 (Year: 2020).
Arias, Vega Fernando et al., "Mounting for Instruments on Buildings and Method for Installing Same", Oct. 15, 2012, ES-2388388-A1 (Year: 2012).
Guetty, Richard Jean Claude, "Covering Element for Houses, Motor-Vehicles or the Like", Mar. 30, 2015, Romanian Patent Office, RO 130984A2 (Year: 2016).
Berhanu et al., "Numerical and experimental investigation of an exhaust air energy recovery Savonius wind turbine for power production," Science Direct, (2021), https://doi.org/10.1016/j.matpr.2021.02.675.
Chong et al., "Design of an exhaust air energy recovery wind turbine generator for energy conservation in commercial buildings," Science Direct, vol. 67, pp. 252-256, (2014). https://doi.org/10.1016/j.renene.2013.11.028.
Singh et al., "Recovery of Energy From Exhaust Air of Textile Industry With the Help of VAWT," International Research Journal of Engineering and Technology (IRJET), 7(3), 4820-4828, (2020).
Ismail et al., "Study On the Potentiality of Power Generations from Exhaust Air Energy Recovery Wind Turbine: A Review," Journal of Advanced Research in Fluid Mechanics and Thermal Sciences, 87(3), 148-171, (2021), https://doi.org/10.37934/arfmts.87.3.148171.
Shahid, Rehan, "Generating Electricity From Exhaust Air Using Wind Turbine", Aug. 5, 2015, Retrieved from: https://www.linkedin.com/pulse/generating-electricity-using-exhaust-air-rehan-shahid. (Year: 2015).
Daniel, Mark Farb. 2023. Leaves on a Pole. U.S. Appl. No. 29/883,242, filed Jan. 26, 2023.
International Search Report and Written Opinion, dated Mar. 28, 2024, issued in International Patent Application No. PCT/US2023/074425 (8 pages).
Francisco Haces-Fernandez, Hua Li, David Ramirez, "Improving wind farm power output through deactivating selected wind turbines, Energy Conversion and Management", vol. 187, 2019, pp. 407-422, ISSN 0196-8904.
Howland, M.F., Quesada, J.B., Martinez, J.J.P. et al. "Collective wind farm operation based on a predictive model increases utility-scale energy production." Nat Energy 7, 818-827 (2022).
Howland MF, Lele SK, Dabiri JO. "Wind farm power optimization through wake steering." Proc Natl Acad Sci U S A. Jul. 16, 2019;116(29):14495-14500. doi: 10.1073/pnas.1903680116. Epub Jul. 1, 2019. PMID: 31262816; PMCID: PMC6642370.
M. Pape and M. Kazerani, "Turbine Startup and Shutdown in Wind Farms Featuring Partial Power Processing Converters," in IEEE Open Access Journal of Power and Energy, vol. 7, pp. 254-264, 2020, doi: 10.1109/OAJPE.2020.3006352.
PCT International Search Report and Written Opinion mailed Nov. 23, 2023, issued in corresponding International Application No. PCT/US2023/065609 (17 pgs.).
Syahputra et al. "Performance Improvement for Small-Scale Wind Turbine System Based on Maximum Power Point Tracking Control." in: Energies 2019, 12(20), Oct. 17, 2019, [online] [retrieved on Dec. 27, 2023 (Dec. 27, 2023)] Retrieved from the Internet < URL: https://www.mdpi.com/1996-1073/12/20/3938 >, entire document.
International Search Report and Written Opinion for PCT/US2023/073016 dated Feb. 8, 2024, 9 pages.
"Each Wind Harvester Project in 2023 and 2024 will advance our commercialization objectives" Wind Harvest International, 2023, Inc. https://windharvest.com/about/projects/ (Last accessed on Feb. 17, 2023).
Chandler D.L., "A new method boosts wind farms' energy output, without new equipment," MIT News, Aug. 22, 2022.
International Search Report and Written Opinion, dated Sep. 13, 2023, issued in International Patent Application No. PCT/US2023/65612 (10 pages).
International Search Report and Written Opinion, dated Jun. 21, 2024, issued in International Patent Application No. PCT/US2024/011337 (11 pages).
International Search Report and Written Opinion, dated Aug. 14, 2024, issued in International Patent Application No. PCT/US24/23527.
Chandler, David L. (2024). "MIT engineers' new theory could improve the design and operation of wind farms," MIT News on Campus and Around the World. Retrieved from https://news.mit.edu/2024/new-theory-could-improve-design-and-operation-wind-farms-0821.

* cited by examiner

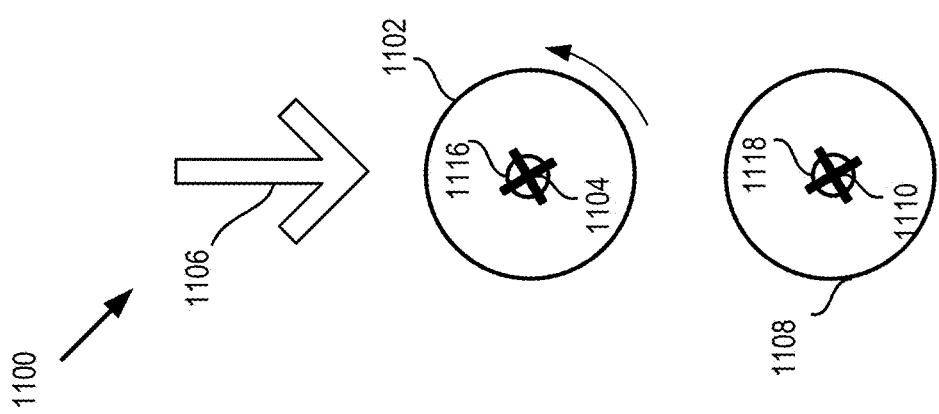

FLAT-PACKABLE KIT FOR A TURBINE

CROSS REFERENCES TO RELATED APPLICATIONS

This application is a continuation of PCT International Application No. PCT/US2024/011337, filed Jan. 12, 2024, which claims the benefit of priority of U.S. Provisional Patent Application No. 63/439,135, filed on Jan. 15, 2023, U.S. Provisional Patent Application No. 63/439,869, filed on Jan. 19, 2023, and U.S. Provisional Patent Application No. 63/491,747, filed on Mar. 23, 2023, the entire contents of all of which are incorporated herein by reference.

TECHNICAL FIELD

The present disclosure generally relates to the field of fluid turbines. More specifically, the present disclosure relates to systems, methods, and devices for operating fluid turbines.

BACKGROUND

As challenges posed by climate change continue to increase, more attention is being devoted to green energy alternatives to fossil fuels. Some attractive alternatives to fossil fuels include turbines that harness power from a fluid flow, such as wind, ocean currents, a steam flow, or a gas flow. In some cases, due to physical constraints limiting how much energy may be generated by any single turbine, clusters of turbines may be constructed, allowing for aggregation of energy generated by multiple individual turbines. For example, aggregating energy produced by a cluster of turbines may allow scaling up green energy production sufficiently to provide a reliable supply of green energy to an electrical grid, as a replacement for fossil fuels. However, clusters of fluid turbines may require coordinated maintenance, repairs, and safety checks. In addition, in some cases, coordinating the operations of clustered turbines may improve performance, allowing them to increase green energy production with improved efficiency. Systems and methods for coordinating operations of clustered turbines may therefore be beneficial.

SUMMARY

Embodiments consistent with the present disclosure provide systems and methods generally relating to operating one or more fluid turbines. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems, methods, and computer readable media are disclosed for altering orientation of fluid turbines within a cluster. The embodiments may include: a first fluid turbine for assuming a first orientation relative to a direction of fluid flow; a second fluid turbine in proximity to the first fluid turbine, the second fluid turbine for assuming a second orientation relative to the first orientation of the first fluid turbine, wherein at least one of the first orientation of the first fluid turbine and the second orientation of the second fluid turbine is selectively adjustable to mitigate interference with downstream turbine operation; and at least one processor configured to: receive an indication that the first fluid turbine imposes the interference on the downstream operation of the second fluid turbine; based on the indication, determine a third orientation for one of the first fluid turbine and the second fluid turbine, the third orientation enabling the first fluid turbine and the second fluid turbine to produce a greater aggregate level of electrical energy than would be produced with the first fluid turbine in the first orientation and the second fluid turbine in the second orientation; and transmit a signal for changing one of the first orientation of the first fluid turbine and the second orientation of the second fluid turbine to the third orientation, thereby mitigating the interference on the downstream operation of the second fluid turbine.

Consistent with disclosed embodiments, systems, methods, and computer readable media are disclosed for coordinating rotation of adjacent turbines. The embodiments may include at least one processor configured to: receiving first rotational orientation information from a first fluid turbine having a least one first open concave surface with at least one corresponding first convex surface; receiving second rotational orientation information from a second fluid turbine having a least one second open concave surface with at least one corresponding second convex surface; receiving fluid flow direction information indicating a direction of fluid flow relative to the first fluid turbine and the second fluid turbine; calculating at least one rotational speed adjustment for at least one of the first fluid turbine and the second fluid turbine, to cause, at instantaneous times, the first open concave surface, the first convex surface, the second open concave surface, and the second convex surface to be simultaneously transverse to the direction of fluid flow; and outputting at least one control signal embodying the rotational speed adjustment to thereby regulate rotation of at least one of the first fluid turbine and the second fluid turbine such that at the instantaneous times, the first open concave surface, the first convex surface, the second open concave surface, and the second convex surface are transverse to the direction of fluid flow.

Consistent with disclosed embodiments, systems and methods are disclosed for a flat-packable wind turbine assembly kit. The embodiments may include at least one flat-packed bendable airfoil having an upper edge and a lower edge, and being configured to assume a predefined curvature upon assembly; a plurality of upper connecting elements distributed along the upper edge of the at least one flat packed bendable airfoil; a plurality of lower connecting elements distributed along the lower edge of the at least one flat-packed bendable airfoil; a flat-packed upper plate including an upper plurality of mating orifices distributed in a contour corresponding to the predefined curvature; and a flat-packed lower plate including a lower plurality of mating orifices distributed in the contour corresponding to the predefined curvature, such that upon assembly when the plurality of upper connecting elements are connected to the upper plurality of mating orifices and when the plurality of lower connecting elements are connected to the lower plurality of mating orifices, the at least one flat-packed bendable airfoil assumes the predefined curvature.

BRIEF DESCRIPTION OF THE DRAWINGS

FIG. 11A is an exemplary top view of a system for altering orientation of fluid turbines within a cluster, consistent with some embodiments of the present disclosure.

DETAILED DESCRIPTION

Figure 1:
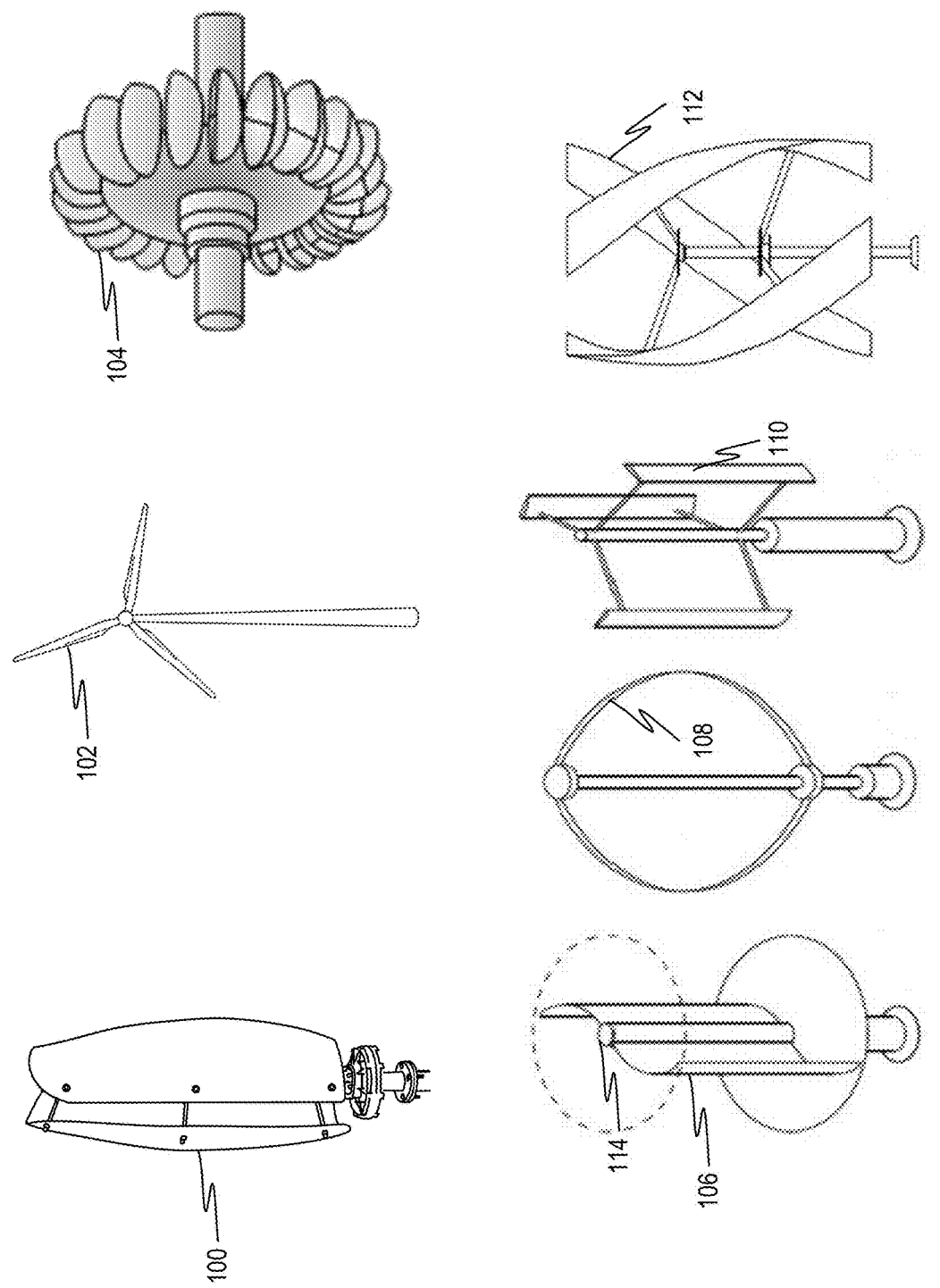
FIG. 1 illustrates an exemplary variety of fluid turbines, each of which is consistent with some embodiments of the present disclosure.

Disclosed herein are systems, methods, and non-transitory computer readable media for controlling and/or coordinating operations of one or more fluid turbines (e.g., a cluster of geographically-associated fluid turbines). The fluid turbines referred to herein may be configured to harness energy from wind, water, steam, and/or gas flow. Although some non-limiting examples are given relating to wind turbines (specifically vertical wind turbines), these examples are intended for illustrative purposes only, and do not limit this disclosure. Furthermore, in some cases the term "fluid turbine" may be understood to include an electric energy generator in an integral fluid energy conversion system.

Various terms used in this detailed description and in the claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The terms, generally, substantially, or approximately as used in this disclosure should be interpreted to encompass commonly understood design, machining, and/or manufacturing tolerances. For example, equidistant may refer to the same distance within +/−1%, +/−2%, or within +/−5%. Substantially and/or approximately transverse may refer to transverse within +/−1%, +/−2%, +/−5%, +/−10%, or +/−15%.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

Aspects of the present disclosure is directed to systems, devices, methods, and non-transitory computer readable media for operating one or more fluid turbines (e.g., a cluster of fluid turbines) under variable fluid conditions. In some cases, each fluid turbine in a cluster may be exposed to substantially the same environmental factors (e.g., the same or similar wind conditions, water current, and temperature). Under low fluid conditions, energy produced by one or more fluid turbines may fail to meet one or more threshold requirements associated with supplying generated electrical energy to an electrical grid. For instance, AC voltage generated under low fluid conditions may fail to meet a threshold for an inverter and/or an electrical grid requirement. Low fluid conditions may refer to a fluid having a fluid velocity below a minimal fluid flow threshold. For example, a fluid velocity above the minimal power threshold may be necessary for a fluid turbine to generate power. Disclosed embodiments may allow harnessing energy generated under low fluid conditions to increase operational efficiency of one or more fluid turbines and facilitate compliance with one or more standards and/or regulations for supplying AC power to an electrical grid.

A flow (e.g., a fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine. A wind flow may refer to a fluid flow consisting of air. A water flow may refer to a fluid flow consisting of water, e.g., as an ocean or river current.

A fluid turbine may include a mechanical device configured to capture energy from a fluid flow (e.g., a flow of water, steam, gas, or wind) and convert the captured energy to a form of work (e.g., a rotary motion). A fluid turbine may include at least one moving part coupled to a plurality of blades connected to a shaft. A fluid turbine may rotate, for example, in response to an air flow incident on a plurality of blades or in response to water flow on an impeller (e.g., paddle wheel, a water wheel), or in response to steam or gas flow. The plurality of blades and shaft may be connected to a rotor of an electric energy generator for converting the mechanical rotational motion of the plurality of blades and shaft to electrical energy, as described in greater detail below. A fluid turbine may have a horizontal axis of rotation (e.g., the axis around which the fluid turbine rotates is substantially parallel to the ground or flow), or a vertical axis of rotation (e.g., the axis around which the fluid turbine rotates is at a right angle to the ground or flow). In some embodiments the axis of rotation may be neither horizontal or vertical, and in other embodiments, the axis of rotation may be variable. A fluid turbine may begin generating power when a fluid flow exceeds a lower threshold (e.g., a cut-in value). In some embodiments, a fluid turbine may be associated with at least one processor configured to control the operation of the fluid turbine, as described in greater detail herein below.

A shaft of a fluid turbine may include a pole, a rod, a post, a support, a pylon, or any other axle or axis. In some embodiments, a shaft may be used to support one or more objects. For example, blades of a vertical fluid turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy. As another example, blades of an impeller may be connected to a horizontally oriented shaft that may rotate with the blades, A blade (e.g., as part of a plurality of blades) of a turbine may refer to an object having a cross-sectional shape having a curved surface (e.g., an airfoil shape or a cupped shape typical of drag-type turbines) configured to cause a motion (e.g., a rotational motion) consistent with the fluid motion incident on the blades. A fluid turbine may include a plurality of blades mounted onto a rim of a disc. Movement of a fluid across the blades may produce a tangential force that may cause rotation of a rotor connected thereto. Moving fluid may act on the blades of a fluid turbine causing the blades to rotate and impart rotational energy to a rotor. The blades may extend from the rotor in that they protrude from the rotor or from a mounting plate mechanically connected to the rotor. Connecting a plurality of blades to a rotor (e.g., directly or indirectly) may cause the plurality of blades to extend outwards and/or upwards from the rotor.

A cluster of fluid turbines may refer to a plurality of fluid turbines positioned in relative proximity to each other, to form a group or collection of fluid turbines. A cluster of fluid turbines may include at least two fluid turbines at a location including a plurality of fluid turbines. In some embodiments, a cluster of fluid turbines may include all of the fluid turbines at a location. In some embodiments, a cluster of fluid turbines may include fewer than all of the fluid turbines at a location. Clustered fluid turbines may be positioned in an arrangement such that each fluid turbine may be exposed to substantially similar environmental conditions and fluid flow (e.g., wind conditions, temperature, precipitation, water current). In some embodiments, at least some of clustered fluid turbines may be fluidly coupled such that blade motion of a fluidly-coupled upstream fluid turbine may cause a fluid flow or turbulence that may affect or influence the blade motion of a fluidly-coupled downstream fluid turbine in the cluster. In some embodiments, each clustered fluid turbine may be fluidly coupled with at least one other fluid turbine. In some embodiments, at least one clustered fluid turbine may be independent such that blade motion of the independent clustered turbine may be indifferent to blade motion of any other clustered fluid turbine, and may not affect blade motion of any other clustered fluid turbine. In some embodiments, each fluid turbine in a cluster may be independent.

Electrical energy may refer to energy associated with electrically charged particles. Electrical energy may be supplied as current (e.g., an electron flow) through an electric potential (e.g., voltage). A fluid turbine coupled to an energy generator may convert mechanical energy (e.g., in a fluid flow) to electrical energy for supplying to an electrical energy sink, such as a capacitor, a battery, an electrical load, and/or an electrical grid.

A voltage may refer to an electrical potential difference between two points. A voltage may be associated with a tension between two points to reduce or eliminate an electrical potential difference therebetween. For example the tension may be reduced by a current flowing from one point to the other point, e.g., crossing the electrical potential difference.

Power (e.g., electric power) may refer to a rate at which electrical energy may be transferred by an electric circuit. Electric power may be measured in watts (e.g., Kilowatts, or Megawatts) and may refer to a rate of electrical energy transferred by an electric circuit. Power may be calculated from a known voltage and/or current level (e.g., watts=volts×amps). Electric power may be generated by an electric energy generator (e.g., connected to a fluid turbine). As used herein, the phrase "power generated by a fluid turbine" or "power output from a fluid turbine" may refer to power generated by an energy generator associated with the fluid turbine.

An energy generator (e.g., an alternator) may include a device configured to convert motive or mechanical power to electric power. An energy generator may include a rotor and a stator in which windings (e.g., copper wires) may be electromagnetically coupled to an alternating magnetic field for conversion of non-electrical energy (e.g. rotational or kinetic energy) to electrical energy. An energy generator may be associated with a fluid turbine (e.g., steam, water, air, and/or gas turbine). Mechanical energy as rotational motion of a fluid turbine may be transferred to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, a rotor may be configured to rotate within a stator (e.g., a stator may be formed as a ring or donut surrounding a rotor.) In some embodiments, a rotor may be configured to rotate about a stator (e.g., a rotor may be formed as a ring or donut surrounding a stator). In some embodiments, a rotor of an energy generator may be connected to rotatable blades and/or a rotatable shaft of a fluid turbine, allowing the rotor to rotate in response to a fluid flow.

A rotor may refer to a rotating component of an electromagnetic system (e.g., an electric motor, electric energy generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric energy generator). For example, energy may flow from a rotating component to a stator, as in an energy generator where a stator may convert a rotating magnetic field to an alternating electric current.

Electronic circuitry may include any combination of electronic components (e.g., one or more of memory units, switches, transistors, diodes, gates, capacitors, inductors, resistors, transformers, converters, inverters, rectifiers, DC-DC converters, more power supplies, voltage sensors, current sensors, a voltage booster, a voltage buck, a dump load, a regulator and/or other electronic componentry) connected via one or more connecting wires and/or contacts for performing one or more operations (e.g., logical operations) in response to receiving an electric signal as an input (e.g., from at least one processor operating as a controller). Circuitry may include one or more integrated circuits (ICs), including one or more processors. Circuitry may further include one or more communication channels and/or links. The communication links may couple the one or more ICs to the memory, thereby enabling the one or more ICs to receive a computing instruction and/or data stored thereon required to perform a corresponding logical operation. The communication channels coupling the one or more ICs to the memory may include wired channels, such as one or more cables, fibers, wires, buses, and any other mechanically coupled communication channel. The communication channels may include wireless channels such as short, medium, and long-wave radio communication channels (e.g., Wifi, BlueTooth, Zigbee, cellular, satellite), optical, and acoustic communication channels. The communications channels or links may include wires, cables, and/or fibers configured to transmit power (e.g., AC and/or DC power) generated by one or more fluid turbines. The communications channels or links may include communication links for transmitting electronic signals readable by at least one processor.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

In some embodiments, at least one processor may include a plurality of processors configured to control a plurality of geographically-associated fluid turbines (e.g., a cluster of fluid turbines). In some embodiments, one or more fluid turbines in a cluster of fluid turbines may be associated with one or more specific processors, e.g., dedicated to a specific fluid turbine or a subset of specific fluid turbines in a cluster. In some embodiments, one or more processors may be configured in a central control unit to collectively control the operations of each fluid turbine in a cluster of fluid turbines. In some embodiments, at least one processor may include one or more processors dedicated to a specific fluid turbine in a cluster of fluid turbines, and one or more processors in a central control unit configured to control operations of the entire cluster of fluid turbines. In some embodiments, at least one processor may control operations of a plurality of geographically-associated fluid turbines to allow the plurality of geographically-associated fluid turbines to operate collectively as a single fluid energy conversion system.

A non-transitory computer-readable storage medium (e.g., a memory) refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

In some embodiments, a memory may include a plurality of memory storage devices configured to store information for controlling a plurality of geographically-associated fluid turbines (e.g., a cluster of fluid turbines). In some embodiments, one or more fluid turbines in a cluster of fluid turbines may be associated with one or more specific memory devices, e.g., dedicated to a specific fluid turbine or a subset of specific fluid turbines in a cluster. In some embodiments, one or more memory devices may be configured with a central control unit to collectively store information for controlling each fluid turbine in a cluster of fluid turbines. In some embodiments, a memory may include one or more memory devices dedicated to a specific fluid turbine in a cluster of fluid turbines, and one or more memory devices in a central control unit configured to store information for controlling the entire cluster of fluid turbines. In some embodiments, a memory may store information for controlling operations of a plurality of geographically-associated fluid turbines to allow the plurality of geographically-associated fluid turbines to operate collectively as a single fluid energy conversion system.

Consistent with the present disclosure, disclosed embodiments may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Direct current (DC) (e.g., a DC power signal) may refer to a one-directional flow of electric charge. DC power may be used to operate a processor or controller. An example of DC power may include power produced by an electrochemical cell (e.g., a battery) or power stored in a capacitor. Electronic devices such as processors, controller, and memory devices may be operated using DC power.

Alternating current (AC) (e.g., an AC power signal) may refer to a bi-directional flow of electrical charge exhibiting a periodic change in direction. An AC current flow may change between positive and negative due to the positive or negative flow of electrons, producing a sinusoidal AC wave. An alternator may create AC power by positioning a conductive coil (e.g., copper windings) inside a fluctuating magnetic field. The fluctuating magnetic polarities may cause electric current in the conductive coil to change direction, producing an electrical waveform signal. AC power may travel farther than DC power without losing power, which may be advantageous for delivering power from power generating systems to consumers of electricity. An electric energy generator may generate AC power, and an electric power grid may supply AC power to consumers.

A three-phase voltage signal may refer to a voltage signal distributed as three voltage signals, each voltage signal at a phase shift of 120 degrees from the other voltage signals such that peaks and valleys of the three voltage signals do not align. The three voltage signals may be offset from each other by one-third of each cycle such that the waveform produced by each phase may be offset from one-third of a cycle produced by the other two phases. A three-phase voltage signal may allow for efficient stepping up and stepping down of high voltages for power transmission.

A load (e.g., an electrical load) may refer to an impedance or resistance. Such a load may be imposed on an electric energy generator (e.g., and a fluid turbine connected thereto) causing rotation of the electric energy generator and/or a fluid turbine connected thereto to slow. Generating a load may involve drawing away at least some electrical energy produced by an energy generator to an energy sink. Drawing away more electrical energy (e.g., increasing a load) may increase an impedance causing a rotational velocity of the fluid turbine to slow down. Drawing away less electrical energy (e.g., decreasing the load) may reduce an impedance cause a rotational velocity of the fluid turbine to increase.

A rectifier may refer to a device or circuitry that converts an alternating current (AC) to a direct current (DC) signal (e.g., an AC-to-DC converter). A rectifier may convert AC power (e.g., generated by an electric energy generator) to DC power (e.g., to power at least one processor). In some embodiments, each of the geographically-associated fluid turbines may be associated with a dedicated rectifier. The dedicated rectifiers for each fluid turbine may be housed in a separate housing (e.g., per fluid turbine), or in a common housing for multiple fluid turbines.

An inverter (e.g., a power inverter) may refer to a device or circuitry that converts a direct current (DC) signal to an AC signal (e.g., a DC-to-AC converter). An inverter may convert a DC signal to produce a square wave, a sine wave, a modified sine wave, a pulsed sine wave, a pulse width modulated wave (PWM) depending on the circuit design of the inverter. An inverter may convert DC power to AC power for transmitting to an electric power grid. In some embodiments, the plurality of geographically-associated fluid turbines may be associated with a single inverter for outputting collectively generated AC power to a power grid.

For instance, each AC power signal outputted by each geographically-associated fluid turbine may be converted to a DC power signal via each of the dedicated rectifiers. Circuitry (e.g., including at least one processor) may process the DC power signals to enable combining each of the DC power signals to form an aggregate DC power signal, such that converting the aggregate DC power signal via an inverter may produce an AC power signal that may be compatible for transmitting to an electric power grid.

A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. A capacitor may be manufacturable on a microelectronic scale for integration with other microelectronic components, e.g., in a photolithographic process.

A battery may refer to an electrical device configured to convert chemical energy into electrical energy or vice versa. A battery may include one or more cells, each cell containing electrodes and an electrolyte. When the electrodes are connected to an external circuit, a chemical reaction may occur in the electrolyte, creating a flow of electrons, which generates an electric current. The amount of electrical energy that can be stored in a battery may be determined by the capacity (e.g., measured in amp-hours, Ah, or milliampere-hours, mAh). Batteries may be rechargeable, or non-rechargeable.

A battery bank may include a plurality of batteries connected together in a series or parallel configuration to provide a larger capacity and/or higher voltage. A battery bank may be used to store electrical energy generated by a renewable energy source, such as a plurality of fluid turbines, e.g., for subsequent use by a consumer. In some embodiments, a battery bank may include multiple batteries connected in series to increase the voltage while maintaining a steady capacity. In some embodiments, a battery bank may include multiple batteries connected in parallel to increase capacity while maintaining a steady voltage. In some embodiments, a battery bank may include multiple batteries connected in series and in parallel to allow increasing voltage and capacity. A charge controller may be used to ensure that the batteries in a battery bank have a similar state of charge and similar electrical characteristics, e.g., to prevent overcharging, over-discharging, and/or uneven aging of one or more batteries included therein.

A DC-DC converter may include an electric power converter, for example, an electronic circuit and/or a device configured to convert a DC voltage signal from a first DC voltage level to a second voltage level. A DC-DC converter may reduce (e.g., buck) a DC voltage signal or increase (e.g., boost) a DC voltage signal. For instance, a DC-DC converter may store electrical energy temporarily and release the electrical energy at a different voltage. In some embodiments, a DC-DC converter may be designed to (e.g., substantially) maximize energy harvested from fluid turbines and/or photovoltaic cells (e.g., as a power optimizer). DC-DC converters may include electronic voltage converters (e.g., using one or more capacitors, inductors, and/or transformers), magnetic voltage converters (e.g., using an inductor and/or transformer to periodically release energy from a magnetic field stored therein), bi-directional DC-DC converters, and/or capacitive voltage converters.

A charge controller may refer to an electronic device configured to help ensure compliance of a fluid turbine with one or more regulations and/or specifications. For instance, a charge controller may prevent overcharging of a battery bank by a fluid turbine while limiting a rotational speed of the fluid turbine (e.g., when the battery bank is full and/or under high fluid speed conditions), and may allow aggregation of power from multiple fluid turbines without incurring loss due to interference. A charge controller may include an AC-to-DC converter (e.g., a rectifier), one or more of a voltage sensor switch, a voltage regulator (e.g., for regulating a DC voltage for supplying DC power to a battery bank), and/or a dump load (e.g., for diverting excess power to prevent overcharging). In some embodiments, a charge controller may include at least one processor configured to control one or more operational aspects of a fluid turbine and an associated generator. In some embodiments, a charge controller may include a user interface and/or features to protect against excessive voltage, current, and/or temperature. For example, the user interface may be associated one or more light emitting diodes or LEDs (e.g., to emit warning lights), speakers (e.g., to emit warning sounds), an electronic screen, and/or any other interface that may allow a user to interact with the charge controller.

A charge controller may be connected to an AC output of an electric energy generator connected to a fluid turbine. The AC-to-DC converter of the charge controller may convert the AC output to a DC signal (e.g., for aggregating with other DC signals produced by other charge controllers associated with other fluid turbines without incurring lossy interference). At least one voltage sensor switch of the charge controller (e.g., controlled by at least one processor) may transmit the DC signal to charge the battery bank when the DC voltage level is below an upper limit for the battery bank, and may divert the DC signal (e.g., excess DC power) to the dump load when the DC voltage level exceeds the upper limit. The voltage regulator may regulate the DC voltage transmitted to the battery bank to comply with one or more specifications, regulations, and/or recommendations associated with the battery bank.

An aggregate level of electrical energy refers to a level of electrical energy produced by combining and/or merging a plurality of signals conveying electrical energy generated by different energy sources (e.g., generators). Such signals conveying electrical energy may include a voltage signal (measured in volts), a current signal (measured in amps), and/or a power signal (measured in watts, as voltage multiplied by current). In some cases, producing an aggregate level of electrical energy may include synchronizing a plurality of AC signals, for example by synchronizing the frequency, the phase angle, and/or adjusting a voltage and/or current level to reach a matched voltage and/or current level. In some cases, producing an aggregate level of electrical energy may include storing electrical energy included in one or more energy signals temporarily (e.g., in one or more capacitors and/or batteries) and/or retrieving stored electrical energy. In some cases, there may be a need for producing more volts (e.g., more voltage) than amps (e.g., current), or more amps (e.g., current) than volts (e.g., voltage). For example, if the battery bank is 48 volts and/or the inverter operates on a minimum voltage of 48 volts, but the generator is a 24 volt generator, the charge controller may selectively increase the voltage and lower the amperage of the turbines.

A power signal refers to a rate at which electrical energy is transferred. An aggregate power signal refers to a rate at which a combined level of electrical energy may be transferred, e.g., to an electrical energy sink. Power signals from different energy generators may be synchronized and matched for combination using electrical devices such as power combiners and/or power distribution panels. The combined (e.g., aggregate) power signal may be transmitted to an electrical grid or to power a load.

An electrical grid (e.g., a power grid) may include an interconnected network delivering electric power (e.g., AC power) from a single or plurality of energy generators to a single or plurality of consumers. An electrical grid may be designed to supply electricity at a substantially steady voltage level under varying electrical power demand (e.g., by electrical energy sinks) and supply by (e.g., by energy generators). An electrical grid may use one or more tap changers or transformers to adjust a voltage and cause the voltage to remain within electrical grid specification. Attributes of power supplied to an electrical grid (e.g., frequency, phase, power level) by one or more energy generators may be required to comply with regulations or standards.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

A sensor may refer to a device that outputs an electronic signal in response to detecting, sensing, or measuring a physical phenomenon. A sensor may convert a measurement of a physical phenomenon to a medium (e.g., an electronic medium) for receiving by at least one processor. A sensor may include one or more of a mechanical sensor, an optical sensor, a resistive sensor, a capacitive sensor, a temperature sensor, a piezoelectric sensor, a Hall sensor, a thermocouple sensor, photoelectric sensor, a digital position sensor, a current sensor, a voltage sensor, a photoelectric encoder, a pressure sensor, a fluid (e.g., liquid) level sensors, a flow sensor, and/or any other type of sensor that may be used to detect position, linear displacement, pressure, temperature, flow, vibrations, rotational velocity, current, voltage, power, and/or any other parameter associated with, e.g., generation of electrical energy.

A controller (e.g., a charge controller) may enable maximum energy extraction by adjusting a shaft speed (e.g., corresponding to a rotational speed) of a fluid turbine in response to varying fluid speeds. The controller may adjust the shaft speed by sending an electrical signal to the copper windings of a generator rotor coupled thereto. The electrical signal may introduce an impedance (e.g., by shunting or shorting the copper windings) causing a rotational speed of the rotor to slow down, and causing a corresponding slowing of the fluid turbine coupled thereto for producing maximum power under varying fluid conditions. A charge controller may adjust a shaft speed by increasing or decreasing a load on an energy generator connected thereto. In some embodiments, the controller may include at least one processor.

Maximum Power Point Tracking (MPPT) refers to one or more techniques and/or protocols for using the maximum power available in a fluid flow to extract maximum power from a fluid energy conversion system (e.g., a fluid turbine mechanically coupled to an energy generator). Examples of MPPT protocols include Perturb and Observe (hill climbing method), Incremental Conductance, Fractional Short Circuit Current, Fractional Open Circuit Voltage, Fuzzy Control, Neural Network, Extremum Seeking Control, and Model Predictive Control, among others. Under a given fluid flow velocity, a fluid turbine may output differing levels of power, depending on a rotational velocity of the blades and/or rotor. One such rotational velocity may correspond to a maximum power output for a fluid turbine operating under a specific fluid flow velocity. Maintaining a rotational velocity of a fluid turbine to correspond to a peak power output when operating under a particular fluid flow velocity may improve efficiency of a fluid turbine system. However, under a varying fluid flow, a rotational velocity for a fluid turbine may vary accordingly. Thus, under varying fluid flow conditions, efficiency in energy production may be improved by a controller (e.g., a charge controller) dynamically adjusting a rotational velocity of a fluid turbine to achieve a rotational velocity corresponding to the maximum power output for a given fluid flow velocity at any given point in time. Such a technique may require a controller tracking a peak power output for a fluid turbine under varying fluid flow conditions, and continuously adjusting a rotational velocity to correspond to the peak power output at any particular point in time (e.g., using an MPPT protocol). Inaccuracy in tracking a peak power output for a fluid turbine may cause a controller to adjust a fluid turbine to rotate at a sub-optimal rotational velocity.

An MPPT protocol (e.g., for a single fluid turbine) may involve transmitting signals to adjust a rotational speed of a single fluid turbine by adjusting a load, adjusting a brake (e.g., a mechanical and/or electronic brake), and/or using any other method to adjust a rotational speed of a single fluid turbine. In some embodiments, an MPPT protocol for a single fluid turbine may involve increasing a load on an energy generator connected thereto and/or sending a signal to the energy generator to output a maximum (e.g., or near-maximum) energy at a point in time.

An MPPT protocol (e.g., for a cluster of fluid turbines) may involve at least one processor adjusting a rotational speed of at least some fluid turbines in a cluster of geographically-associated fluid turbines to cause the cluster to output a maximum (e.g., or near-maximum) aggregate power output at a point in time and/or under certain fluid conditions. In some embodiments, implementing an MPPT protocol for a cluster of fluid turbines may include at least one processor transmitting at least some signals associated with applying an MPPT protocol (e.g., for a single fluid turbine) to at least some individual fluid turbines in the cluster, and at least some signals unassociated with applying an MPPT protocol (e.g., for a single fluid turbine) to any individual fluid turbine in the cluster. In some instances, implementation of an MPPT protocol for a cluster of fluid turbines may override one or more signals associated with an MPPT protocol for a single fluid turbine in the cluster. In some embodiments, a charge controller may include at least one processor to implement an MPPT protocol on a fluid turbine connected thereto.

Some MPPT protocols may require one or more inputs, such as the fluid speed, a rotational speed of the fluid turbine (e.g., rotor speed), a maximum power curve for a fluid turbine, or a mechanical power equation for a fluid turbine (e.g., obtained experimentally or via a simulation).

MPPT protocols for fluid turbines may be based on direct and/or indirect power measurement, fluid speed measurement, and/or hybrid and/or smart algorithms (e.g., based on artificial intelligence techniques such as neural networks and fuzzy logic controllers) for tracking a maximum power point of a specific fluid turbine. Some MPPT protocols for fluid turbines may employ one or more fluid speed sensors (e.g., anemometers, ultrasonic fluid sensors), such as a Tip Speed Ratio (TSR) protocol, or a power signal feedback (PSF) protocol, described in greater detail below. Some MPPT protocols for fluid turbines may avoid using fluid speed sensors, such as a perturb and observe (P&O) protocol, an optimal relation based (ORB) protocol, or an incremental conductance (INC) protocol. Some MPPT techniques may combine one or more MPPT protocols (e.g., hybrid techniques) and/or additional techniques (e.g., statistical techniques and/or equations).

For example, a Tip Speed Ratio (TSR) Based MPPT protocol may use the ratio between a fluid speed and the rotational speed of the blade tips of a fluid turbine to regulate the rotational speed of an energy generator coupled thereto to maintain the TSR of the fluid turbine at an optimum value for extracting maximum power. In addition to the fluid speed and turbine rotational speed, a TSR protocol may require the optimum TSR of the fluid turbine as an input and/or a fluid parameter measurement.

As another example, a power signal feedback (PSF) protocol may be used to control a fluid turbine to extract maximum power from a fluid flow. A reference power level may be generated using a recorded maximum power curve or a mechanical power equation for the fluid turbine. The curve may be tracked for varying fluid speeds to control the fluid turbine to output maximum power.

As an additional example, a Perturb and Observe (e.g., hill-climb search, or HCS) control protocol may continuously track a power output of a fluid turbine to search for a peak power output. Applying a Perturb and Observe protocol may involve reading a power outputted by a fluid turbine under certain conditions, increasing a load causing a rotational velocity of a fluid turbine to slow, and reading power outputted by the fluid turbine while rotating at the slower rotational velocity at the same wind speed, to thereby determine if power outputted at the slower rotational velocity is greater or less than power outputted prior to increasing the load. An HCS tracking protocol may compute a desired optimum signal for operating a fluid turbine to generate a peak power output based on the location of the operating point and the relation between changes in power and speed.

A brake may refer to a device configured to adjust (e.g., slow) a rotational speed of a fluid turbine and/or an energy generator connected thereto. A brake may include a mechanical brake and/or an electronic brake. A mechanical brake may include one or more brake pads, disks, and/or drums, e.g., activated via a switch. In some embodiments, a mechanical brake may include a lock, such as a pin configured to engage and hold a brake. An electronic brake may include a switch configured to introduce and/or remove a load (e.g., a dump load) imposed on a fluid turbine.

Receiving may include retrieving, acquiring, or otherwise obtaining, e.g., data. Receiving may include reading data from memory and/or receiving data from a computing device via a (e.g., wired and/or wireless) communications channel. At least one processor may receive data via a synchronous and/or asynchronous communications protocol, for example by polling a memory buffer for data and/or by receiving data as an interrupt event.

Determining includes making at least one of a measurement, comparison, estimation, and/or calculation to arrive at a conclusive outcome. In some embodiments, determining may include employing one or more of machine learning, artificial intelligence, and/or deep learning algorithms or techniques.

Machine learning may refer to a branch of artificial intelligence utilizing algorithms to navigate through large collections of data in an iterative manner to converge to a solution. Machine learning may include supervised learning, unsupervised learning, and reinforcement learning. Supervised learning may use annotated (e.g., tagged) data sets, whereas unsupervised learning may use unclassified (e.g., non-annotated) data sets. Reinforcement learning may occur in an absence of data, and may use trial-and-error, and environmental feedback to reach a conclusion.

In some embodiments, machine learning algorithms (also referred to as machine learning models) may be trained using training examples. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Reference is made to FIG. 1 illustrating a variety of exemplary fluid turbines 100 to 112. Fluid turbine 100 may be an exemplary vertical wind turbine, fluid turbine 102 may be an exemplary horizontal wind turbine, fluid turbine 104 may be an exemplary water, gas, or steam turbine, fluid turbine 106 may be an exemplary Savonius (e.g., vertical) wind turbine, fluid turbine 108 may be an exemplary Darrieus-rotor (e.g., vertical) wind turbine, fluid turbine 110 may be an exemplary H-type lift vertical wind turbine, and fluid turbine 112 may be an exemplary Helix (e.g., vertical)

wind turbine. It is to be noted that exemplary fluid turbines 100 to 112 are shown for illustrative purposes and are not intended to limit the disclosure to any particular type or implementation of a fluid turbine because inventive principles described herein may be applied to any turbine or turbine cluster, regardless of structure or arrangement. Moreover, while some non-limiting examples may refer to any one of fluid turbines 100-112, these examples are provided for conceptual purposes only and do not limit the disclosure to any particular implementation or type of fluid turbine.

Figure 2A:
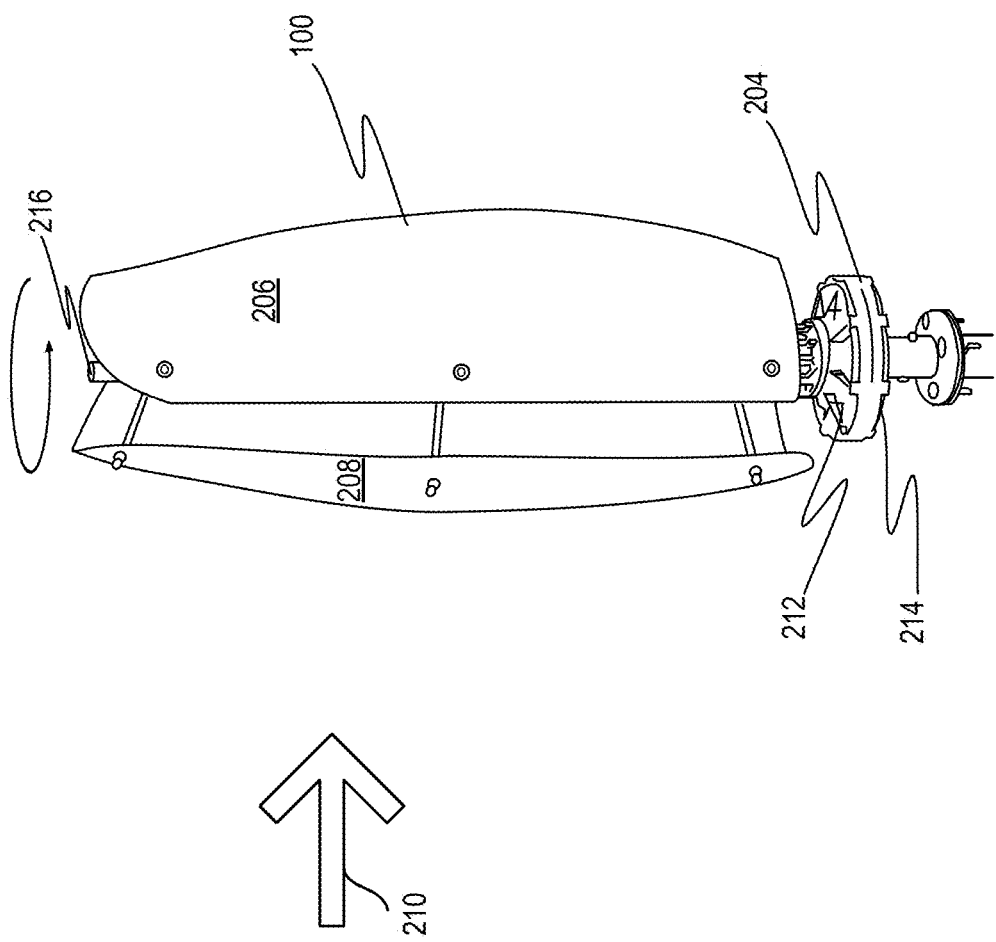
FIG. 2A is a view of a fluid energy conversion system including a fluid turbine coupled to an energy generator, consistent with some embodiments of the present disclosure.

FIG. 2A is a view of an exemplary fluid energy conversion system including a fluid turbine 100 coupled to an energy generator 204, consistent with some embodiments of the present disclosure. Fluid turbine 100 may include a plurality of blades 206 and 208 configured to spin about a shaft 216 in response to a fluid flow 210. Energy generator 204 may include a rotor 212 and a stator 214, together housing one or more permanent magnets and copper windings (e.g., the rotor may include the magnets and the stator may include the copper windings, or the reverse). Energy generator 204 may be configured to induce an alternating current (AC) when rotor 212 rotates relative to stator 214 (e.g., by generating a fluctuating magnetic field to surround the copper windings from the rotational motion). Kinetic energy contained in fluid flow 210 may exert a force on fluid turbine 100 causing blades 206 and 208 to rotate. The rotational motion of blades 206 and 208 may cause rotor 212 of energy generator 204 to spin relative to stator 214, generating an alternating current, thereby converting the kinetic energy of fluid flow 210 to electrical energy. Although fluid turbine 100 is illustrated as a vertical-axis wind turbine and fluid flow 210 is shown as air flow, this example is not intended to be limiting, and fluid turbine 100 may be a horizontal-axis wind turbine, a water turbine, a gas turbine, or a steam turbine. Similarly, fluid flow 210 may be water, gas, or steam, respectively.

Figure 2C:
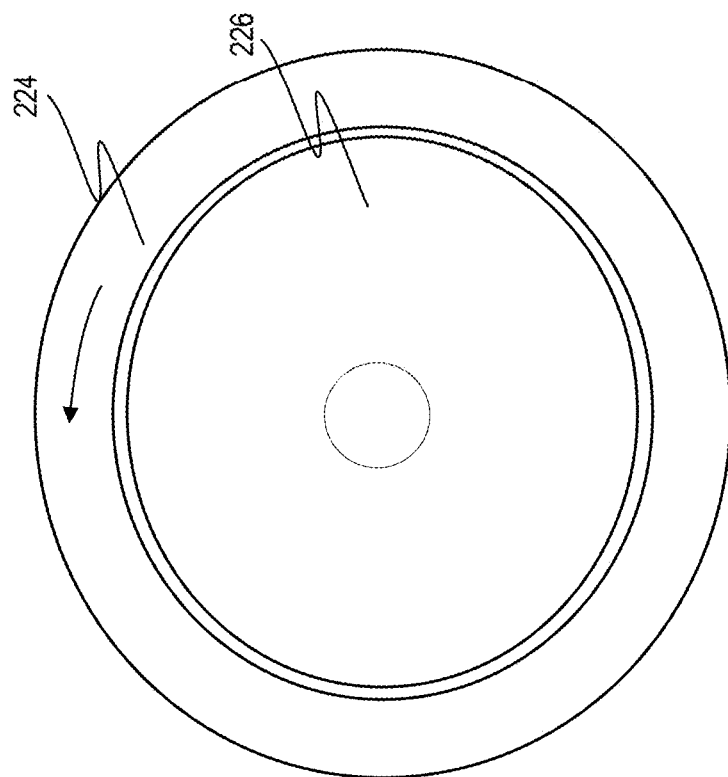
FIG. 2C exemplary top view of a fluid energy conversion system including an outer rotor and an inner stator, consistent with some embodiments of the present disclosure.
Figure 2B:
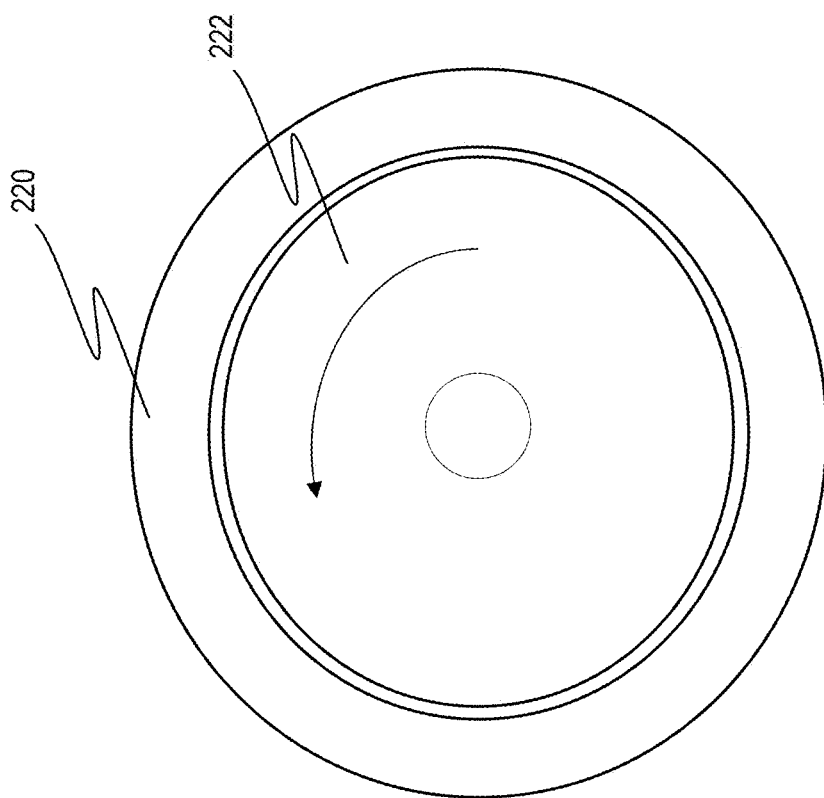
FIG. 2B is an exemplary top view of a fluid energy conversion system including an outer stator and an inner rotor, consistent with some embodiments of the present disclosure.

FIG. 2B illustrates an exemplary top view of a fluid energy conversion system including an outer stator 220 and an inner rotor 222, consistent with some embodiments of the present disclosure. Inner rotor 222 may be mechanically coupled to rotatable shaft 216 of fluid turbine 100. Inner rotor 222 may include one or more permanent magnets and outer stator 220 may include copper windings, such that when inner rotor 222 rotates due to a rotation of shaft 216 of fluid turbine 100 connected thereto, copper windings of outer stator 220 may be exposed to a fluctuating magnetic field, thereby inducing an AC signal.

FIG. 2C illustrates an exemplary top view of a fluid energy conversion system including an outer rotor 224 and an inner stator 226, consistent with some embodiments of the present disclosure. Outer rotor 224 may be mechanically coupled to rotatable shaft 216 of fluid turbine 100. Outer rotor 224 may include one or more permanent magnets and inner stator 226 may include copper windings, such that when outer rotor 224 rotates due to a rotation of shaft 216 of fluid turbine 100 connected thereto, copper windings of inner stator 226 may be exposed to a fluctuating magnetic field, thereby inducing an AC signal.

Figure 3:
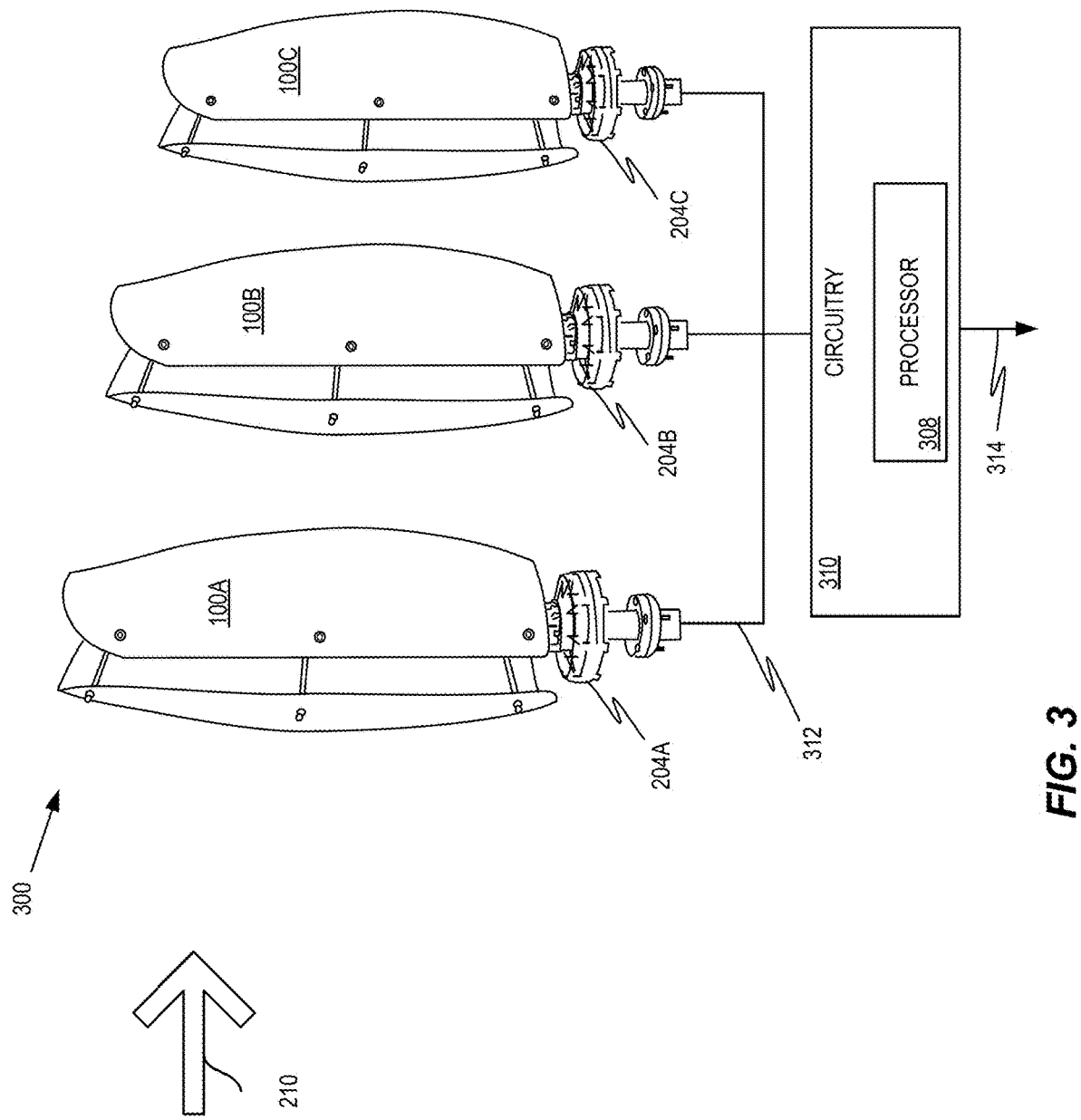
FIG. 3 is a view of an exemplary cluster of geographically associated fluid turbines, consistent with some embodiments of the present disclosure.

FIG. 3 illustrates a view of an exemplary cluster 300 of geographically associated fluid turbines 100A, 100B, and 100C, consistent with some embodiments of the present disclosure. Geographically associated fluid turbines 100A, 100B, and 100C may be connected to at least one processor 308 via circuitry 310 and one or more communication links 312. Communication links 312 may include differing types of wired communication links (e.g., wires, cables, fibers) and/or wireless communication links (e.g., WiFi, BlueTooth, Zigbee, AM, FM, PM radio transceivers, satellite or GPS transceivers, IR transceivers, ultrasound transceivers, and/or any other type of wireless communications links). Communications links may include high power communication links, e.g., for receiving electric power generated by fluid turbines 100A, 100B, and 100C, and/or for sending a load-bearing signal to fluid turbines 100A, 100B, and 100C, as well as lower power communication links, e.g., for sending and receiving data between a plurality of processors and/or sensors.

At least one processor 308 may be configured to control each of fluid turbines 100A, 100B, and 100C separately or coordinate operation of each of fluid turbines 100A, 100B, and 100. For example, at least one processor 308 may coordinate operations such as braking, slowing, stopping, locking, unlocking, and/or starting one or more of fluid turbines 100A, 100B, and 100C. As another example, at least one processor 308 may control a rotational direction and/or speed for any of fluid turbines 100A, 100B, and 100C, implement an MPPT algorithm for one or more of fluid turbines 100A, 100B, and 100C, control a relative rotational phase between any of fluid turbines 100A, 100B, and 100C, and/or perform any other procedure to coordinate operations for one or more of fluid turbines 100A, 100B, and 100C. At least one processor 308 may include one or more individual processors, each dedicated to control one of fluid turbines 100A, 100B, 100C, and/or one or more processors dedicated to control fluid turbines 100A, 100B, 100C collectively as cluster 300, operating as a single integral energy conversion system. In some embodiments, at least one processor 308 may be associated with a charge controller, as described and exemplified herein below. While cluster 300 is shown having three fluid turbines, this is for illustrative purposes only, and cluster 300 may include as few as two fluid turbines, or more than three fluid turbines. Moreover, FIG. 3 shows fluid turbines 100A, 100B, and 100C as vertical wind turbines (e.g., corresponding to fluid turbine 100 of FIG. 1). However, this is for illustrative purposes only and is not intended to limit this disclosure to any specific implementation. Cluster 300 may include different types of fluid turbines, e.g., other than fluid turbine 100, such as one or more horizontal wind turbines, as well as one or more water, steam, and/or gas turbines. It bears repeating that although the discussion of FIG. 3 occurs in connection with the example turbine structures illustrated, the principles described in FIG. 3 apply to all turbines, regardless of turbine structure.

Figure 4:
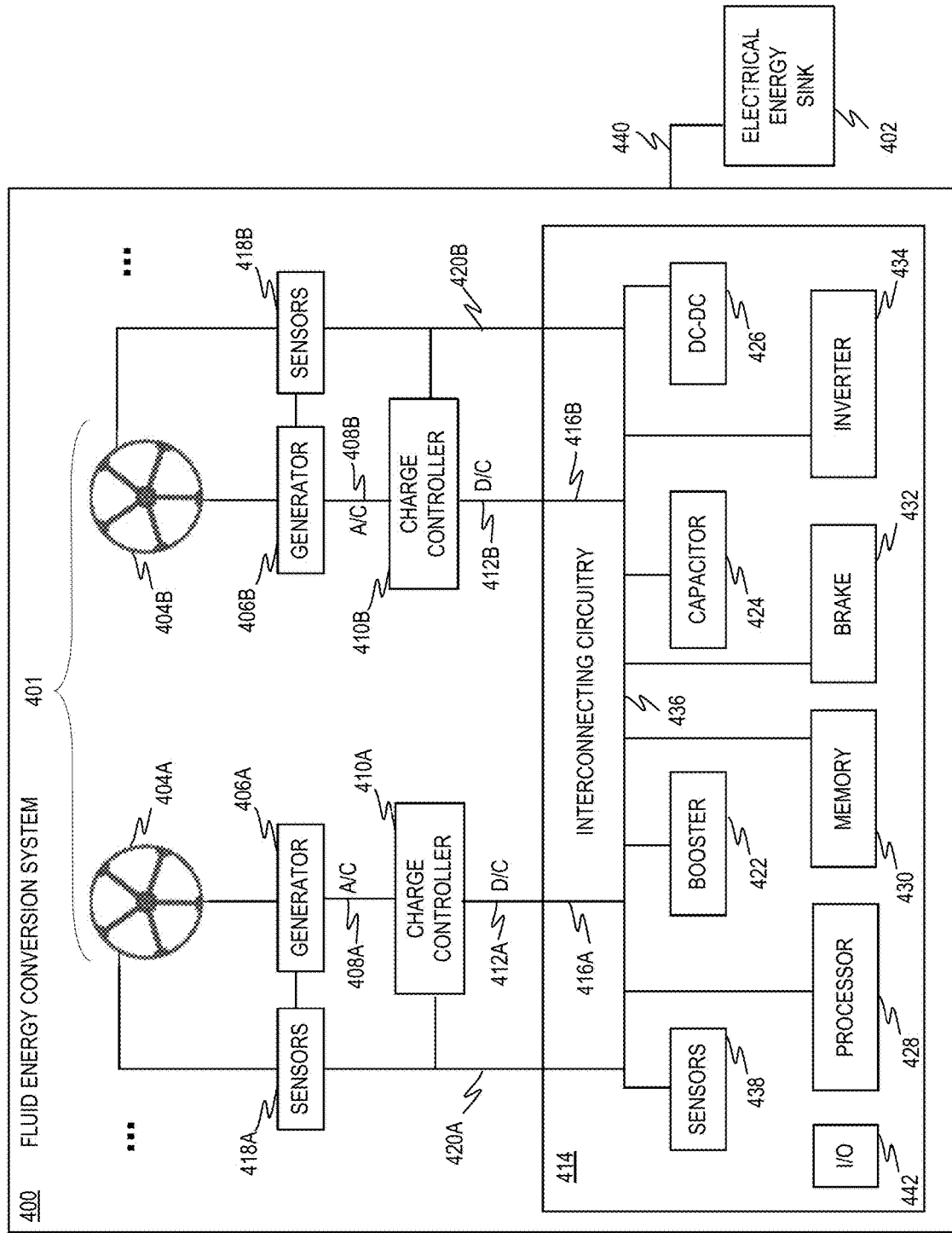
FIG. 4 is a schematic diagram of an exemplary fluid energy conversion system configured to generate electric power from a fluid flow and output the generated electric power to an energy sink, consistent with some embodiments of the present disclosure.

FIG. 4 illustrates a schematic diagram of an exemplary fluid energy conversion system 400 configured to generate electric power from a fluid flow and output the generated power to an energy sink 402, consistent with some embodiments of the present disclosure. Fluid energy conversion system 400 may include a plurality (e.g., a cluster) 401 of geographically-associated fluid turbines 404 (e.g., fluid turbines 404A and 404B). Each of fluid turbines 404A and 404B may be connected to energy generators 406 (e.g., electric energy generators 406A and 406B), respectively, for converting energy in a fluid flow (e.g., fluid flow 210 shown in FIG. 2) to electric power (e.g., a total electric power output 440) for at least one energy sink 402 (e.g., a load). Total electrical power output 440 may include a DC power output, e.g., for powering a battery bank, or an AC power output, e.g., for delivery to an electric grid. In some embodiments, a portion of total electrical power output 440 may be delivered as a DC signal to charge one or more batteries, and a portion of total electrical power output 440 may be delivered as an AC signal to an electrical grid. In some embodiments, a portion of total electrical power output 440 may be delivered as DC electrical energy to power circuitry for controlling one or more elements of fluid energy conversion system 400, such as control circuitry associated with fluid turbines 404 and/or energy generators 406. Fluid turbines 404A and 404B may be any fluid turbine, including but not limited to the various exemplary turbines illustrated in FIG. 1. Examples of an energy sink may include an electric power grid, one or more batteries, and/or any other sink for electric power. Energy generators 406A and 406B may convert mechanical rotational energy received from fluid turbines 404A and 404B to a plurality of AC power outputs 408 (e.g., AC power outputs 408A and 408B). Each of fluid turbines 404A and 404B and electric energy generators 406A and 406B may be associated with a charge controller 410 (e.g., charge controllers 410A and 410B), respectively. AC power outputs 408A and 408B may be converted to DC signals 412 (e.g., DC signals 412A and 412B) via charge controllers 410 (e.g., charge controllers 410A and 410B), respectively. Charge controller 410 may include electronic circuitry such as one or more of a rectifier (e.g., an AC-to-DC converter), a voltage sensor switch, a dump load, a braking circuit, a capacitor, and/or a voltage booster. DC signals 412A and 412B may be conveyed to interconnecting circuitry 414 via a plurality of links 416 (e.g., links 416A and 416B). Links 416A and 416B may include one or more of coaxial cables, fiber, and/or wires configured to transmit power signals.

Charge controllers 410A and 410B may transmit one or more electronic signals to interconnecting circuitry 414 via communications links 420 (e.g., communications links 420A and 420B). Communications links 420A and 420B may include one or more wired and/or wireless communication channels configured to transmit and receive electronic signals between at least one processor 428 and charge controllers 410A and 410B.

Each of fluid turbines 404A and 404B and electric energy generators 406A and 406B may be associated with at least one sensor 418 (e.g., at least one sensor 418A and 418B), described in greater detail below. Sensor 418 may connect to fluid turbine 404 and/or energy generator 406, e.g., to sense one or more operational parameters associated with fluid turbine 404 and/or energy generator 406 connected thereto. Sensor 418 may connect to charge controller 410. For example, at least one sensor 418A may connect to fluid turbine 404A and/or energy generator 406A and charge controller 410A, and at least one sensor 418B may connect to fluid turbine 404B and/or energy generator 406B and charge controller 410B.

Interconnecting circuitry 414 may include at least one sensor 438, at least one booster (e.g. voltage boosters) 422, at least one capacitor 424, at least one DC-DC converter 426, at least one processor 428, at least one memory 430, at least one brake circuit 432, an input output interface 442, and/or at least one inverter 434, interconnected via a communications link 436. In some embodiments, inverter 434 may be a single inverter configure to convert aggregated DC power produced by plurality of geographically-associated fluid turbine 404 to a grid-compatible AC signal (e.g., 110V, 120V, 220V, 240V, or any other voltage level compatible with a regional electric power grid). One non-limiting example of an inverter that may be employed is an IQ7 Plus manufactured by Enphase Energy, Inc. of Fremont California.

Figure 5:
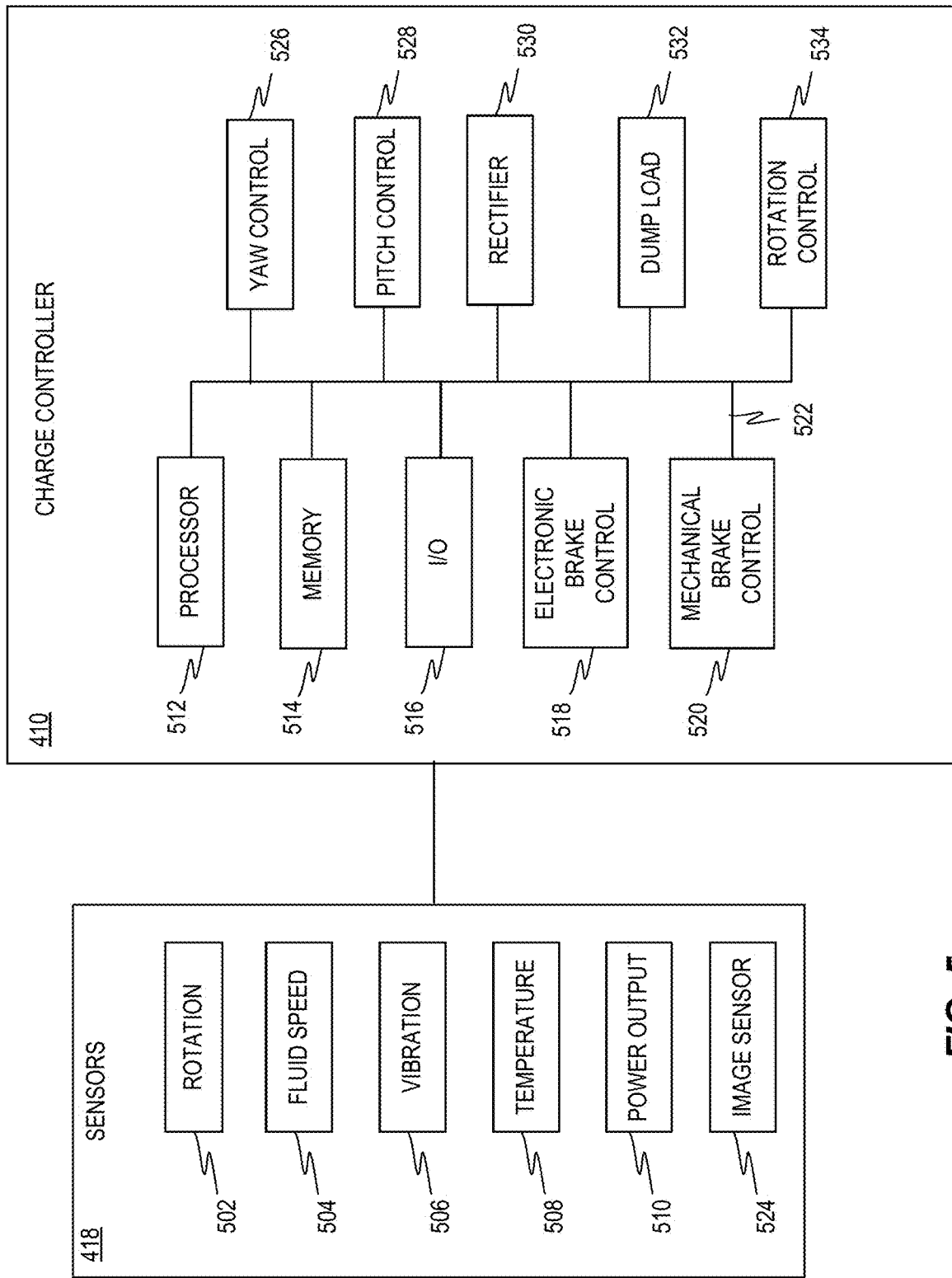
FIG. 5 is an exemplary schematic diagram of a charge controller connected to at least one sensor, consistent with some embodiments of the present disclosure.

FIG. 5 illustrates an exemplary schematic diagram of a charge controller 410 connected to at least one sensor 418, consistent with some embodiments of the present disclosure.

At least one sensor 418 may include one or more rotation sensors 502, fluid speed sensors 504, vibration sensors 506, temperature sensors 508, power output sensors 510, and/or image sensors 524. The one or more rotation sensors 502 may be associated with a rotating component of fluid turbine 404 and/or energy generator 406, such as with one or more blades and/or a shaft of fluid turbine 404, and/or a rotor of energy generator 406. Fluid speed sensor 504 may be configured to sense a speed of a fluid flow affecting fluid turbine 404. Examples of fluid speed sensor 504 may include one or more of an anemometer, a water current sensor, a gas flow meter, and/or a steam flow meter for sensing. Vibration sensor 506 may include as examples one or more accelerometers, piezoelectric, piezoresistive, and/or capacitive MEMS for sensing vibrations of one or more components of fluid turbine 404 and/or energy generator 406. Temperature sensor 508 may include, for example, a thermometer, a thermostat, a thermocouple, a thermopile, an infrared thermometer, a bimetallic strip thermometer, or any other type of temperature measurement device. Power output sensor 510 may include, for example, a volt meter (e.g., a voltage sensor) and/or a current meter (e.g., a current sensor) for measuring power generated by energy generator 406. One or more image sensors 524 may include one or more cameras (e.g., a charged coupled device or CCD camera, and/or a CMOS camera for detecting visible light and/or an IR camera).

Charge controller 410 may include one or more of at least one processor 512, a memory 514, a device for input/output (I/O) 516 (e.g., for communicating with at least one processor 428 via communications link 420), an electronic brake control 518, a mechanical brake control 520, a yaw control 526, a pitch control 528, a rectifier 530, a dump load 532, and/or a rotational control 534. At least one processor 512, memory 514, I/O 516, electronic brake control 518, mechanical brake control 520, yaw control 526, pitch control 528, rectifier 530, dump load 532, rotation control 534 may be interconnected via bus system 522. In some embodiments, dump load 532 may correspond to a battery bank.

In some embodiments, dump load 532 may include a plurality of dump loads of different resistances. At least one processor 512 may switch between each of the plurality of dump loads to cause a corresponding adjustment to a rotational velocity of an associated fluid turbine and generator (e.g., to cause a fluid turbine to comply with an MPPT protocol). Additionally or alternatively, dump load 532 may include a variable electronic load (e.g., an electromechanical potentiometer and/or using one or more solid state transistors as an electronic load) allowing at least one processor 512 to adjust a load applied to a fluid generator, e.g., to comply with an MPPT protocol. In some embodiments, dump load 532 may include a plurality of dump loads of different resistances and a variable electronic load, providing at least one processor 512 with flexibility to tune a load applied to a fluid turbine, e.g., to comply with an MPPT protocol.

In some embodiments, a clock (e.g., of at least one processor) may be used as a sensor, e.g., to schedule a maintenance or safety procedure, and/or to synchronize operation of fluid turbine 404. In some embodiments, a clock may be used in conjunction with scheduling software to issue alerts (e.g., signals) to invoke braking, slowing, stopping, locking, and/or unlocking of a fluid turbine by at least one processor. In some embodiments, at least one processor 512 associated with charge controller 410 may correspond to at least one processor 308 (see FIG. 3).

Electronic brake control 518 may include an inverter and a booster, e.g., to implement an electronic braking mechanism. For example, electronic braking of fluid turbine 404 may be implemented by imposing a load (e.g., impedance) on energy generator 406. In some embodiments, electronic braking may be implemented with an AC signal. At least one processor (e.g., at least one processor 428 and/or processor 512) may determine an AC signal configured to impose a specific load to achieve a desired level of braking, e.g., by causing interference with another AC signal. In some embodiments, electronic braking may be implemented with a DC signal, e.g., to cause a switch to divert a power output of a generator to a dump load. The at least one processor may transmit a DC signal to electronic brake control 518 of charge controller 410. Electronic brake control 518 may use the DC signal to produce an AC signal, and the booster of electronic brake control 518 may amplify the AC signal to a level corresponding to the AC signal suitable for imposing a specific load on energy generator 406. The amplified AC signal may be transmitted to a rotor of energy generator 406 to impose the load and thereby control (e.g., by slowing and/or stopping) fluid turbine 404. For example, the AC signal may be used to implement an MPPT protocol, engage an electronic brake, adjust a phase of fluid turbine 404 (e.g., by slowing one fluid turbine relative to another fluid turbine), adjust a rotational speed, adjust a rotational direction, and/or to perform any other controlling operation on fluid turbine 404.

Mechanical brake control 520 may include one or more electronic switches allowing at least one processor (e.g., at least one processor 428 and/or processor 512) to control one or more mechanical brakes (e.g. brake pads, disks, and/or drums) configured with one or more rotating components of fluid turbine 404 and/or energy generator 406.

In some embodiments, electronic braking of fluid turbines 404 may be implemented by charge controllers 410, e.g., by diverting power produced by energy generators 406 to a dump load.

In some embodiments, charge controller 410 may be associated with an isolated fluid turbine (e.g., fluid turbine 100). In some embodiments, a different one of charge controllers 410 may be associated with each fluid turbine (e.g., turbines 100A, 100B, and 100C) in a cluster 300 of fluid turbines.

Figure 6:
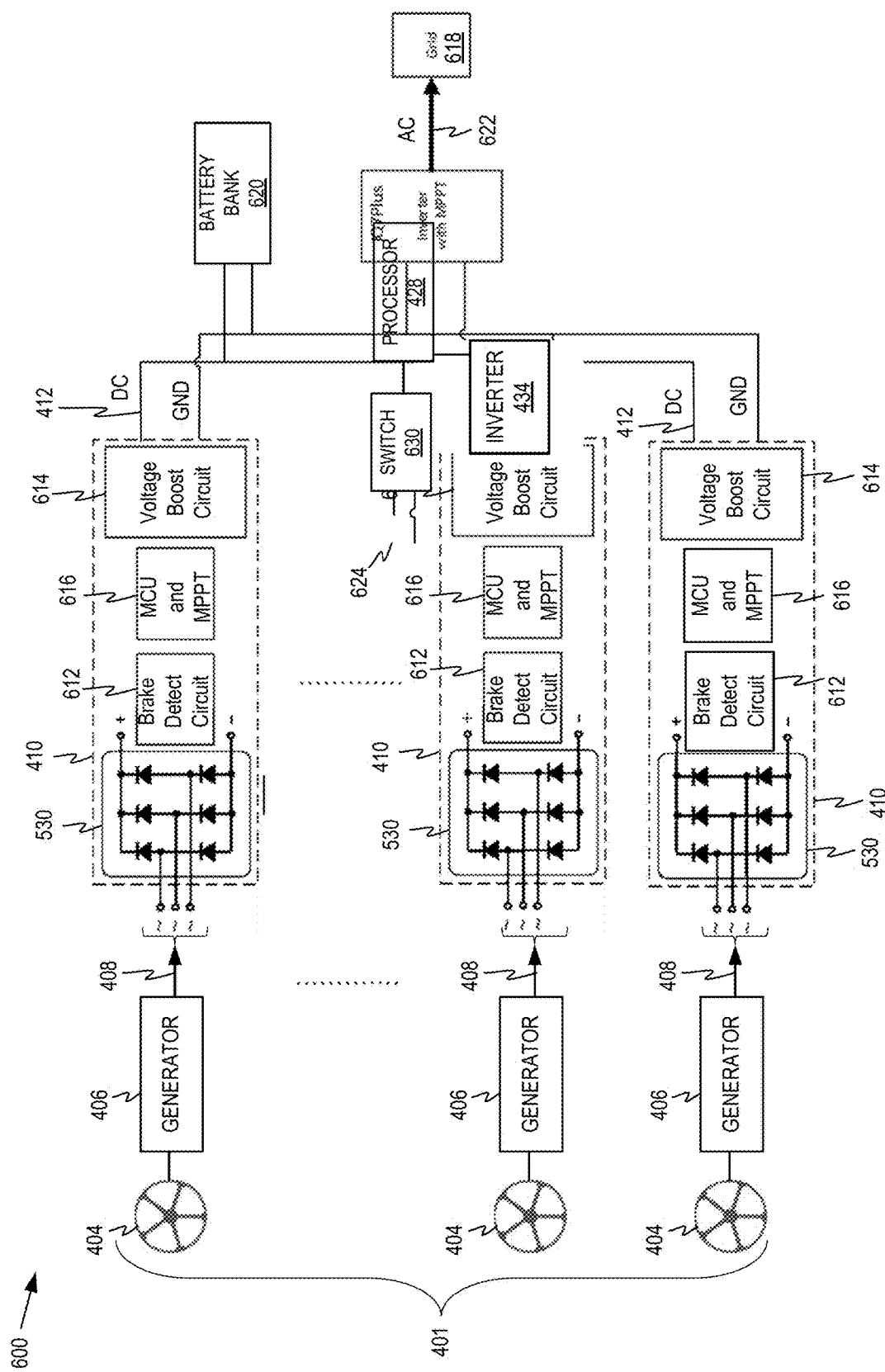
FIG. 6 is a schematic diagram of an exemplary circuit for controlling a plurality of geographically-associated fluid turbines, consistent with some embodiments of the present disclosure.

By way of a non-limiting example, FIG. 6 illustrates a schematic diagram of an exemplary circuit 600 for controlling a plurality 401 of geographically-associated fluid turbines 404, consistent with some embodiments of the present disclosure. Exemplary circuit 600 may be understood in conjunction with FIGS. 4 and 5. Fluid turbines 404 (throughout this disclosure including as described in connection with FIGS. 6-8) may be any fluid turbine, including but not limited to the various exemplary fluid turbines illustrated in FIG. 1. Fluid turbines 404 may be geographically-associated as cluster 401. Each of fluid turbines 404 may be connected to an energy generator 406 for converting energy in a fluid flow to an AC power output. Each of AC power outputs 408 may be connected to a charge controller 410. Each charge controller 410 may include one or more of rectifier 530, a brake circuit 612 (e.g., including a brake detection circuit), a voltage booster 614, and/or an MPPT control 616. Each rectifier 530 may convert an associated AC power output 408 to a DC signal, and may transmit the DC signals to brake circuit 612 and voltage booster 614 to produce a DC signal 412. Brake circuit 612 may be configured to perform electronic braking on fluid turbine 404 (e.g., based on information received from one or more of at least one sensor 418). In some embodiments, each charge controller 410 may be configured to implement an MPPT protocol on energy generator 406 connected thereto, e.g., using MPPT control 616.

Each charge controller 410 may receive a different AC power output 408 (e.g., an AC voltage) from an associated fluid turbine 404. Each charge controller 410 may convert each different AC power output 408 (e.g., AC voltage) to a different DC voltage 412 to produce a plurality of DC voltage. The plurality of DC signals 412 (e.g., DC voltages) may be combined in parallel to produce aggregated DC voltage 624. In some embodiments, generators 406 may be three-phase generators and AC power outputs 408 (e.g., AC voltages) may be three-phase AC voltages.

Each of charge controllers 410 may be connected (e.g., in parallel) to an inverter 434 and additionally to battery bank 620. Inverter 434 may be connected to an electrical grid 618. Battery bank 620 and/or electrical grid 618 may correspond to energy sink 402. Inverter 434 may be associated with at least one processor 428. In some embodiments, inverter 434 may be configured to operate in conjunction with at least one processor 428 to implement an MPPT protocol on fluid turbines 404, e.g., by manipulating a load associated with electrical grid 618. For example, increasing the load may cause rotational speeds of fluid turbines 404 to slow down, and decreasing the load may cause the rotational speeds of fluid turbines 404 to increase. Thus, in some embodiments, a single inverter 434 may be configured to implement an MPPT protocol on multiple fluid turbines 404 via multiple charge controllers 410.

Circuit 600 may include at least one switch 630. At least one processor 428 may operate at least one switch 630 to alternately direct aggregated DC voltage 624 to inverter 434 (e.g., when aggregate DC voltage 624 is compatible with inverter 434), and/or to battery bank 620 (e.g., when aggregate DC voltage 624 is incompatible with inverter 434), for instance, in response to an indication from at least one sensor (e.g., sensors 418 of FIG. 5). For example, during periods of low fluid speed conditions, at least one processor 428 may operate at least one switch 630 to direct aggregate DC voltage 624 to battery bank 620 for storage as DC energy. During periods of high fluid speed conditions, at least one processor 428 may operate at least one switch 630 to direct aggregate DC voltage 624 to inverter 434 for conversion to AC power signal 622 and for supplying AC power signal 622 to electrical grid 618. In some embodiments, during periods when DC voltage 624 is incompatible with inverter 434, at least one processor 428 may operate at least one switch 630 to draw electrical energy stored in battery bank 620 to supplement DC voltage 624 until DC voltage 624 achieves compatibility with inverter 434 for conversion to AC power signal 622, which may be supplied to electrical grid 618.

Figure 7:
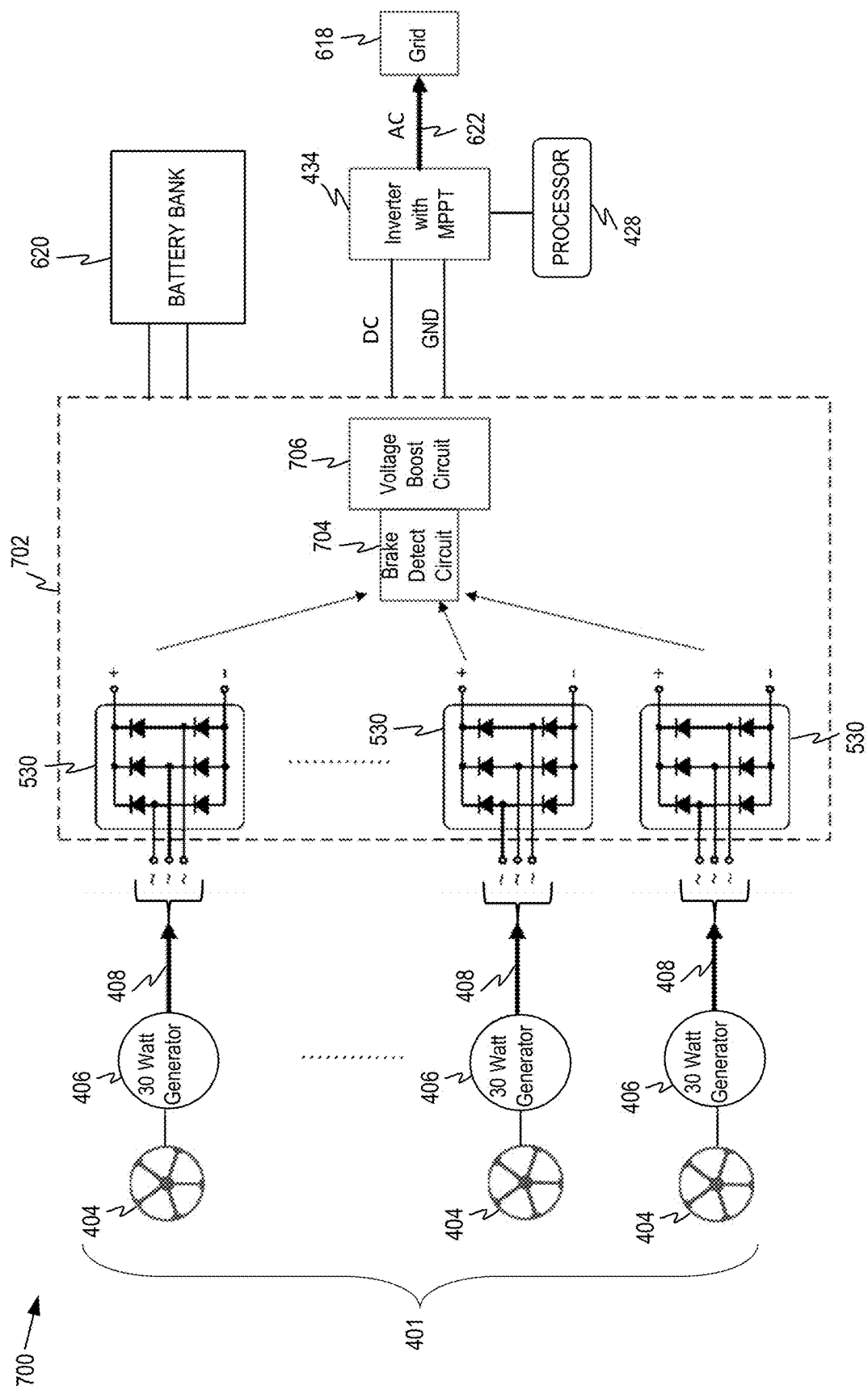
FIG. 7 is a schematic diagram of another exemplary circuit for controlling a plurality of geographically-associated fluid turbines, consistent with some embodiments of the present disclosure.

By way of another non-limiting example, FIG. 7 illustrates a schematic diagram of another exemplary circuit 700 for controlling a plurality of geographically-associated fluid turbines 404, consistent with some embodiments of the present disclosure. Circuit 700 may be substantially similar to circuit 600 (e.g., in conjunction with FIGS. 4 and 5) with the noted difference of a common (e.g., shared) charge controller 702 associated with multiple rectifiers 530 for each of energy generators 406. Each of energy generators 406 may be connected to common charge controller 702 via multiple wires (e.g. three wires for each of three phases of the output AC power signal). Each of rectifiers 530 may be connected (e.g., via two wires) to a common brake circuit 704 (e.g., including at least a braking sensor). Common brake circuit 704 may be connected to a common voltage booster 706 (e.g., a single voltage booster for all of fluid turbines 404). Charge controller 702 (e.g., common to all of fluid turbines 404) may be connected to inverter 434 for outputting AC power to electrical grid 618. Thus, a common or shared charge controller 702 may connect multiple fluid turbines 404 to a single inverter 434 via multiple rectifiers 530 (e.g., one rectifier per fluid turbine 404). In some embodiments, inverter 434 may be configured to implement an MPPT protocol on each of fluid turbines 404 via rectifiers 530. In some embodiments, a cable may connect each energy generator 406 to single charge controller 410, due to relatively low power loss of a three-phase AC output. This may be advantageous when fluid turbines 404 are spread out over a large region (e.g., when the distance between any two of fluid turbines 404 is at least greater than a blade diameter for each fluid turbine, and/or when the cluster of turbines includes many fluid turbines). Circuit 700 may lack an MPPT control, may include an individual MPPT control for each fluid turbine 404, or may include a centralized MPPT control for the plurality of geographically associated fluid turbines 404, e.g., operating as a single fluid energy conversion system.

Figure 8:
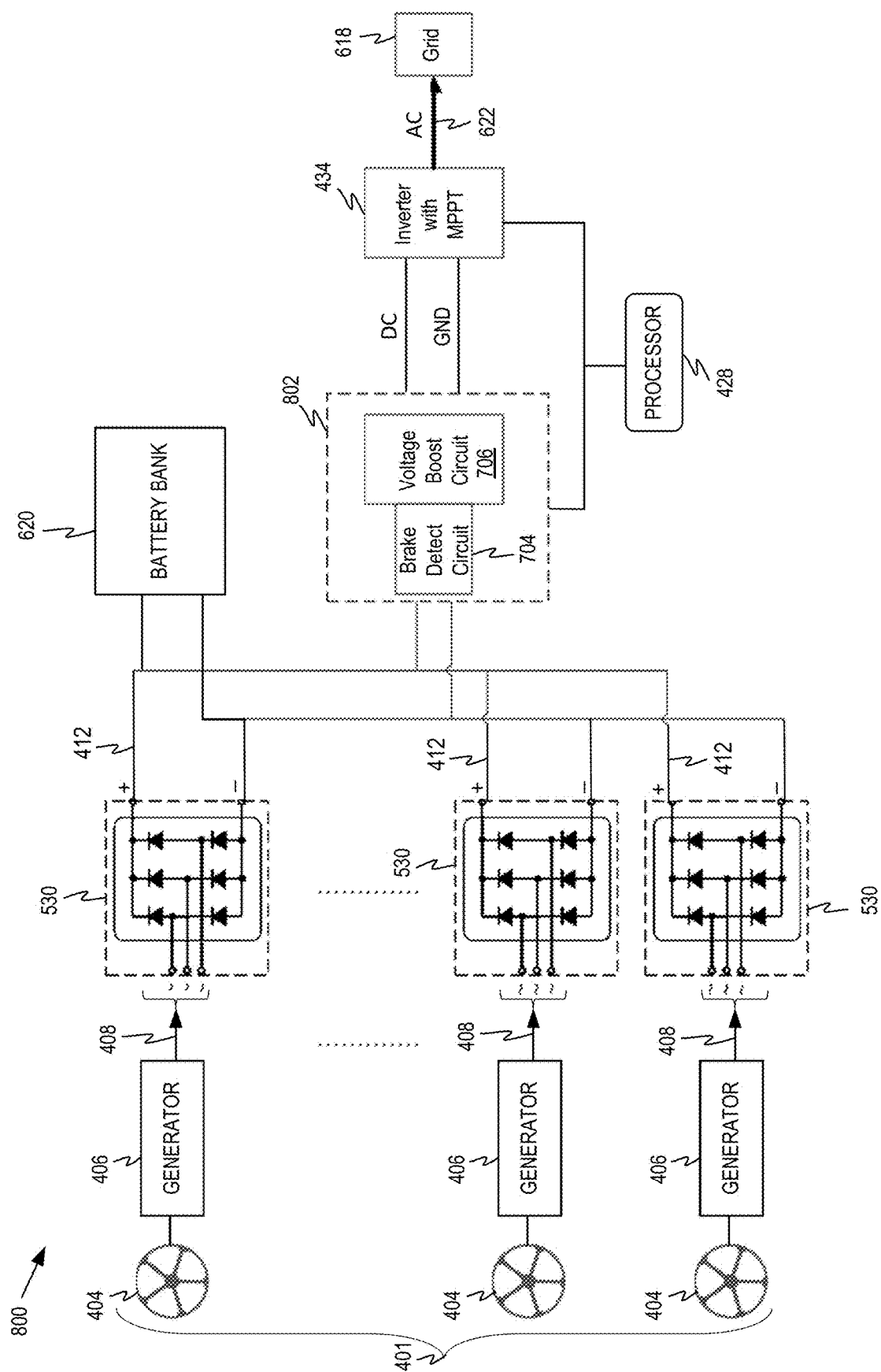
FIG. 8 is a schematic diagram of an additional exemplary circuit for controlling a plurality of geographically-associated fluid turbines, consistent with some embodiments of the present disclosure.

By way of another non-limiting example, FIG. 8 illustrates a schematic diagram of an additional exemplary circuit 800 for controlling a plurality of geographically-associated fluid turbines 404, consistent with some embodiments of the present disclosure. Circuit 800 may be substantially similar to circuits 600 and 700 (e.g., in conjunction with FIGS. 4 and 5) with the notable difference that each of energy generators 406 may be connected to a different rectifier 530 (e.g., via three inputs for a three-phase AC signal). Each of rectifiers 530 may output a DC signal (e.g., via two wires for positive and negative) to a single (e.g., common) charge controller 802, including a common brake circuit 704 and a common voltage booster 706 for the plurality of fluid turbines 404. Rectifiers 530 may be connected to charge controller 802 in parallel.

FIGS. 6-8 are intended to illustrate some exemplary implementations of circuits for controlling a cluster of fluid turbines, and are not intended to be exhaustive. Variations and modifications to one or more of the disclosed embodiments, and/or alternative combinations of two or more features disclosed, evident from the text, and/or drawings are within the scope of this disclosure. These different combinations may constitute various alternative aspects of this disclosure.

Figure 9:
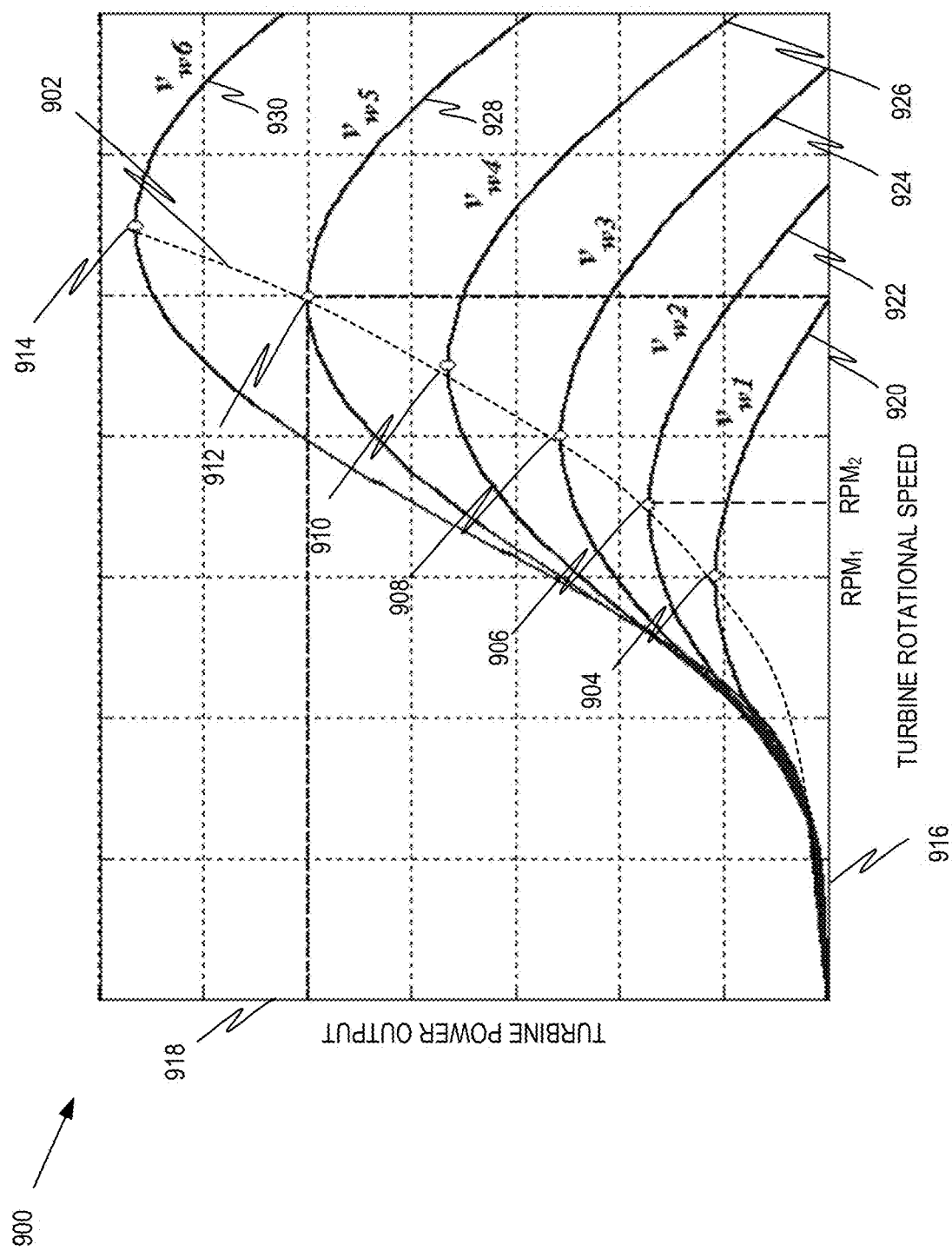
FIG. 9 is an exemplary chart showing a variation of power output versus rotational speed for a fluid turbine operating at various fluid speeds, consistent with some embodiments of the present disclosure.

FIG. 9 illustrates an exemplary chart 900 showing a variation of power output versus rotational speed for a fluid turbine operating at various fluid speeds, consistent with some embodiments of the present disclosure. Horizontal axis 916 (e.g., x-axis) of chart 900 corresponds to the rotational speed of a fluid turbine (e.g., measured as revolutions per minute RPM). Vertical axis 918 (e.g., y-axis) of chart 900 corresponds to the power outputted by a fluid turbine for each rotational speed. Chart 900 may include multiple curves (e.g., lines 920, 922, 924, 926, 928, and 930), each curve corresponding to a differing fluid speed (e.g., $v_{w1}$ to $v_{w6}$). Each of the curve of chart 900 may include a different peak (e.g., peaks 904, 906, 908, 910, 912, and 914) indicating a rotational speed at which a fluid turbine may produce a maximum (e.g., or near-maximum) level of power for the corresponding fluid speed. For instance, under fluid speed $v_{w1}$, causing a fluid turbine to rotate at a rotational speed of RPM1 (e.g., by controlling a load connected thereto) may cause the fluid turbine to produce maximally achievable power 904 of curve 920 for fluid speed $v_{w1}$. Similarly, under fluid speed $v_{w2}$, causing a fluid turbine to rotate at a rotational speed of RPM2 (e.g., by controlling a load connected thereto) may cause the fluid turbine to produce the maximally achievable power 906 of curve 922 for fluid speed $v_{w2}$, and so on.

Line 902 (e.g., tracing the peak power outputs 904 to 914 for each of fluid speeds $v_{w1}$ to $v_{w6}$) may be used to determine a target rotational speed for a fluid turbine to produce a maximum (e.g., or near-maximum) power output under each fluid speed. In some embodiments, chart 900 may be used to implement an MPPT protocol for a specific fluid turbine. In some embodiments, at least one processor (e.g., at least one processor 428 and/or 512) may use chart 900 to control a load on a fluid turbine via a charge controller (e.g., charge controllers 410, 702, and/or 802) to cause a fluid turbine to spin at a rotational speed corresponding to line 902 for a particular fluid speed. In some embodiments, each fluid turbine in a plurality of geographically-associated fluid turbines may be associated with a different version of chart 900 (e.g., depending on the design and operating parameters for each fluid turbine). In some embodiments, each fluid turbine in a plurality of geographically-associated fluid turbines may be associated with a substantially similar version of chart 900.

Figure 10:
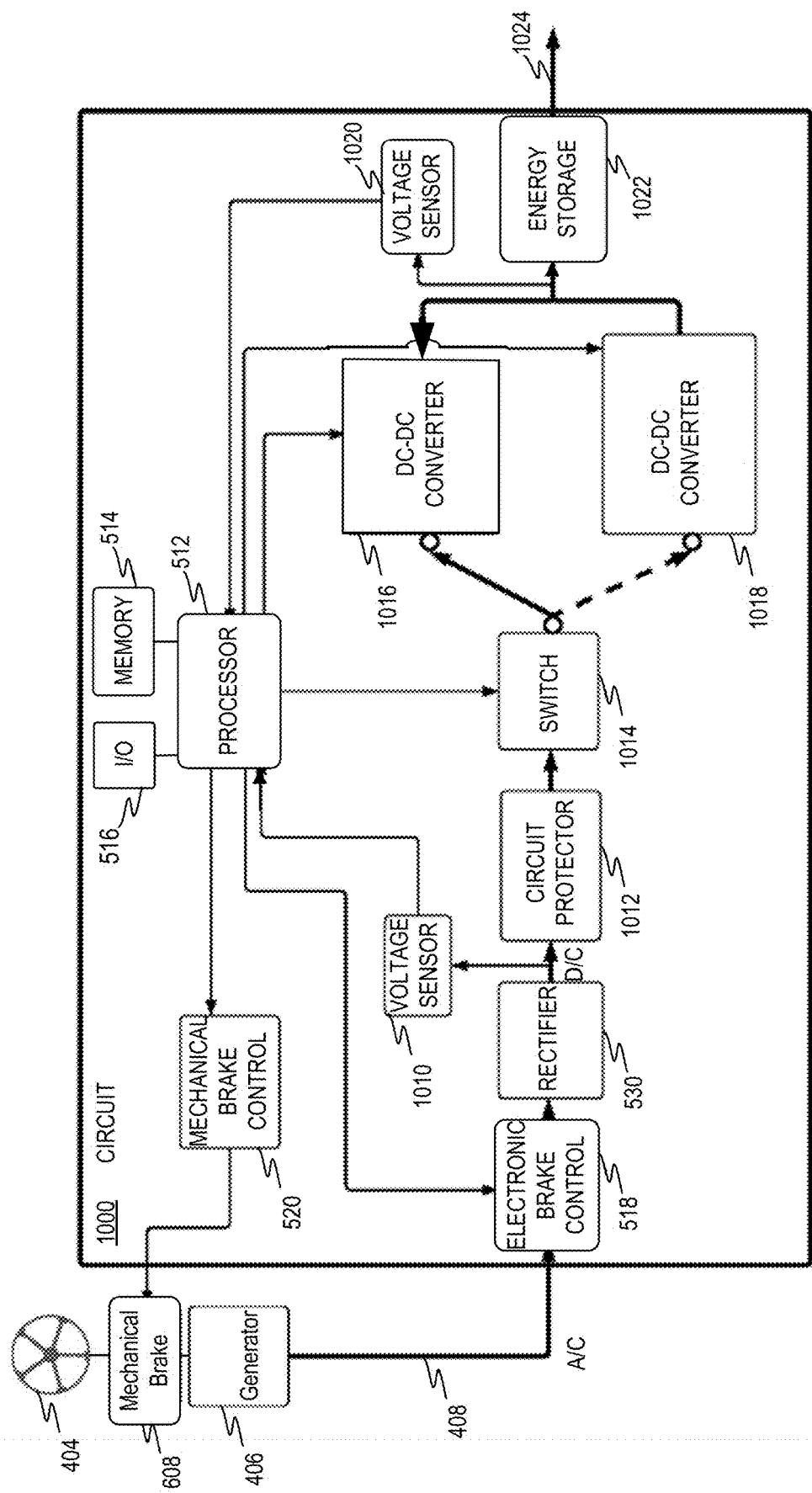
FIG. 10 is a schematic diagram of an exemplary braking circuit, consistent with some embodiments of the present disclosure.

FIG. 10 illustrates a schematic diagram of an exemplary circuit 1000, consistent with some embodiments of the present disclosure. In some embodiments, at least part of circuit 1000 may be associated with any of charge controllers 410, 702, and/or 802. In some embodiments, at least a portion of circuit 1000 may be associated with interconnecting circuitry 414. In some embodiments, a portion of circuit 1000 may be associated with any of charge controller 410, 702, and/or 802, and another portion of circuit 1300 may be associated with interconnecting circuitry 414.

Circuit 1000 may include at least one processor (e.g., at least one processor 512), memory (e.g., memory 514), mechanical brake control (e.g., mechanical brake control 520), electronic brake control (e.g., electronic brake control 518), a rectifier (e.g., rectifier 530), a first voltage sensor 1010, a circuit protector 1012 (e.g., including at least one of an electrostatic discharge, over-voltage, and/or over-current protection circuits), at least one switch 1014 (e.g., a single pole, double throw switch), a first DC/DC converter 1016 (e.g., configured to operate above a voltage threshold), a second DC/DC converter 1018 (e.g., configured to operate below the voltage threshold), a second voltage sensor 1020, an energy storage component 1022, and a DC power output 1024. Rectifier 530 may be a three-phase rectifier configured to produce a variable DC voltage output. In some embodiments, DC power output 1024 may be channeled to an inverter (e.g. inverter 434) for converting to an AC power output signal. In some embodiments, DC output 1024 may channel DC power output 1024 to a battery bank (e.g., see battery bank 620 in FIG. 6).

At least one processor 512 may control braking for fluid turbine 404 connected to energy generator 406 based on one or more signals, such as AC power output 408 (e.g., a three-phase AC power output signal) delivered to circuit 1300, and/or a signal received from one or more sensors (e.g., at least one sensor 418). Rectifier 530 may convert AC power output 408 to a DC power signal. At least one processor 512 may receive an indication of AC power output 408 as a DC power output measurement via first voltage sensor 1010. Fluid turbine 404 and energy generator 406 may be associated with mechanical brake 608. To control mechanical braking of fluid turbine 404 and/or energy generator 406, at least one processor 512 may send a control signal to mechanical brake control 520 for engaging mechanical brake 608. To control electronic braking of fluid turbine 404, at least one processor 512 may subject energy generator 406 to a load via electronic brake control 518. In some embodiments, power output sensor 510 may be associated with first voltage sensor 1010 and/or second voltage sensor 1020.

By way of a non-limiting example, first DC-DC converter 1016 may be configured to operate at 500 Watts, receive an input ranging between 18-60V and output a voltage ranging between 3.3-24V, switch on at 16.5V, and operate at an efficiency below 98.5%. Second DC-DC converter 1018 may be configured to operate at 300 Watts, receive an input ranging between 9-36V and output a voltage ranging between 8-24V, switch on at 9V, and operate at an efficiency below 97%. At least one switch 1014 may channel DC signals above or equal to 22V to first DC-DC converter 1016 and channel DC signals below 22V to second DC-DC converter 1018. In some embodiments, at least one processor 512 may subject fluid turbine 404 to an MPPT protocol by matching an electric load imposed on energy generator 406 to a rotational speed of fluid turbine 404 for a given fluid speed (e.g., based on a version of chart 900 stored in memory 514) to produce a peak (or near-peak) AC power output.

In some embodiments, at least one processor 512 may communicate with at least one processor 428, e.g., to transmit information associated with a load imposed on fluid turbine 404. For example, the information may be used by the at least one processor to implement one or more MPPT protocols (e.g., including an individual MPPT protocol or lower-level MPPT protocol for a single fluid turbines, and/or a cluster MPPT protocol or an upper-level MPPT protocol for a plurality of geographically-associated fluid turbines), to coordinate braking for a cluster of geographically-associated fluid turbines, and/or to coordinate blade orientation for a cluster of geographically-associated fluid turbines.

For example, FIG. 6 may be taken together with FIGS. 4, and 10 as a detailed schematic diagram of integral fluid energy conversion system 400. A version of circuit 1000 may be associated with each one of MPPT controls 616 of charge controllers 410, allowing each of at least one processors 512 (e.g., each dedicated to one of individual fluid turbines 404) to coordinate operations for each fluid turbine 404 (e.g., in isolation). In addition, interconnecting circuitry 414 may connect to each of MPPT controls 616, allowing at least one processor 428 to receive information from any of charge controllers 410 (e.g., each dedicated to one of individual fluid turbines 404) to coordinate operations for fluid turbines 404 operating in cluster 401 as integral fluid energy conversion system 400.

The position and orientation of individual fluid turbines in a cluster may affect energy production. For example, the capability of a fluid turbine to convert a fluid flow to electrical energy may be negatively impacted if fluid flow is blocked from reaching the fluid turbine by a different fluid turbine. To improve the energy production capability of a cluster, systems and methods are disclosed for dynamically repositioning individual fluid turbines in a cluster, for example, based on fluid flow direction.

Some disclosed embodiments involve a system for altering orientation of fluid turbines within a cluster. An orientation of a fluid turbine refers to a relative and/or absolute position, orientation, and/or spatial arrangement for a fluid turbine, as described elsewhere herein. For example, an orientation of a fluid turbine may include a location (e.g., a geographic position), a blade tilt, an axis and/or shaft tilt, and/or any other physical arrangement affecting an interaction between the fluid turbine and a fluid flow. A fluid turbine within a cluster refers to an individual fluid turbine belonging to a cluster of fluid turbines, as described elsewhere herein. A system for altering orientation of fluid turbines within a cluster refers to a plurality of elements that permits adjustment, adaptation, and/or modification of an orientation of one or more fluid turbines in a cluster. Such altering may cause a corresponding change in the interaction between a selected one of the one or more fluid turbines and a fluid flow, and/or an interaction of the fluid flow with one or more other fluid turbines in the cluster. For example, if an upstream fluid turbine obstructs a fluid flow from reaching one or more downstream fluid turbines in the cluster thus interfering with the downstream turbine operation, altering the orientation of the upstream and/or downstream fluid turbines may at least partially alleviate the obstruction and mitigate the interference.

Some disclosed embodiments involve a first fluid turbine for assuming a first orientation relative to a direction of fluid flow. A direction of fluid flow refers to a path and/or course along which a fluid flow may move. For example, a direction of fluid flow may be relative to a geographic coordinate system, e.g., including a geodetic, geographic north, and/or "True" north as fixed point compared to which fluid may move. In some instances, to account for fluctuations and/or variations, a direction of fluid flow may include an average direction of fluid flow over a time period (e.g., at least a minute, at least five minutes, or any other time period). In some instances, a direction of fluid flow may include a predicted direction of fluid flow, e.g., based on a weather forecast and/or historical data. A direction of fluid flow may be dynamic in that the direction changes over short, moderate, or long time frames. To assume refers to take on, adopt, and/or embody. A first orientation relative to a direction of fluid flow refers to a specific spatial positioning, angle, tilt, and/or pose of a fluid turbine in relation to, and/or compared to a direction of a fluid flow. A fluid turbine for assuming an orientation relative to a direction of fluid flow refers to a capability of a fluid turbine to adopt one or more spatial arrangements compared to a direction of fluid flow. Such assumption of orientation include a change in geographic position (e.g., movement in one, two or three dimensions) such was when a base on which a fluid turbine is mounted moves linearly, moves along two ground axes, moves along an arched path, or moves along three axes such as when the blade height also adjusts. Assumption of orientation may additionally or alternatively include a change in blade angle and/or tilt, axis angle and/or tilt, and/or any other spatial characteristic relative to a direction of fluid flow. Changing the spatial arrangement of the fluid turbine relative to the direction of fluid flow may influence how the fluid turbine blades interact with the fluid flow, and may affect a rotational speed and/or level of power generated by the fluid turbine. For example, different orientations may affect how the fluid turbine blades interact with a fluid flow, where some orientations may permit a fluid turbine to operate at higher efficiency than other orientations. In such circumstances, adjusting a fluid turbine to assume a new orientation may improve operational efficiency, e.g., by increasing the interaction between the turbine blades and the fluid flow, thereby permitting the fluid turbine to convert more kinetic energy available in the fluid flow to electrical energy than that possible with the fluid turbine in a previous orientation. In some embodiments, a first fluid turbine may be configured to assume a first orientation relative to a direction of fluid flow.

Some disclosed embodiments involve a second fluid turbine in proximity to the first fluid turbine. A second fluid turbine in proximity to a first fluid turbine refers to another fluid turbine, in the vicinity and/or near the first fluid turbine. For example, the proximity may refer to the first and second fluid turbines sufficiently close together such that the presence of the first turbine may affect the operation of the second turbine, and/or the presence of the second turbine may affect the operation of the first turbine. For example, when the first and second fluid turbines are in proximity to each other, one of the first or second turbines may obstruct a portion of a fluid flow from reaching the other one of the first or second turbines, and/or one or more higher or lower pressure zones generated by one of the fluid turbines may affect the operation of the other fluid turbine. In some cases, the proximity of two or more fluid turbines may be measured in terms of the dimensions of one or more of the fluid turbines. For example, if the first and second fluid turbines are vertical turbines of a particular diameter, the first and second fluid turbines may be separated by a distance measured as a number of turbine diameters (e.g., within one, two, three or any other number of turbine diameters). Similarly, if the first and second fluid turbines are horizontal turbines have a particular blade length, the first and second fluid turbines may be separated by a distance measured as a number of blade lengths (e.g., within one, two, three or any other number of blade lengths). In some embodiments, the second fluid turbine may be separated from the first fluid turbine by between one and two turbine diameters, e.g., to enable fluid dynamic coupling that may improve the operational efficiency of the first and/or second fluid turbines. For example, positioning two vertical fluid turbines within a distance of two turbine diameters may permit one of the turbines to obstruct a portion of a fluid flow from reaching the other fluid turbine, whereas separating two vertical fluid turbines by a distance of greater than four turbine diameters may prevent one of the turbines from obstructing a fluid flow from reaching the other fluid turbine.

Some disclosed embodiments involve the second fluid turbine for assuming a second orientation relative to the first orientation of the first fluid turbine. In some embodiments, the second fluid turbine may be configured to assume a second orientation relative to the first orientation of the first fluid turbine, e.g., the second fluid turbine has a capability for assuming the second orientation. A second orientation relative to the first orientation of the first fluid turbine refers to an orientation for a fluid turbine that differs to some extent from the orientation of the first turbine. When a second fluid turbine assumes a second orientation relative to a first orientation of a first fluid turbine, the second fluid turbine may adopt one or more spatial arrangements in relation and/or compared to the orientation of the first fluid turbine. Thus, the first orientation of the first fluid turbine may be quantified and/or evaluated relative to the direction of a fluid flow, and the second orientation of the second fluid turbine may be quantified and/or evaluated relative to the first orientation. For example, the first fluid turbine may be oriented towards a fluid flow, and the second fluid turbine may be positioned behind the first fluid turbine, such that the first fluid turbine obstructs some of the fluid flow from reaching the second fluid turbine. As another example, the first fluid turbine may be oriented towards a fluid flow, and the second fluid turbine may be positioned to the side of the first fluid turbine, such that the first and second fluid turbines are exposed to the fluid flow in a similar manner.

In some disclosed embodiments, at least one of the first orientation of the first fluid turbine and the second orientation of the second fluid turbine is selectively adjustable to mitigate an interference with downstream turbine operation. Selectively adjustable refers to a capability for positioning and/or orienting a turbine in one of a plurality of orientations. For example, at least one processor may select a first orientation from a plurality of orientations and cause an adjustment such that the first fluid turbine assumes the first orientation, and/or select a second orientation from a plurality of orientations and cause an adjustment such that the second fluid turbine assumes the second orientation. At least one of the first orientation of the first fluid turbine and the second orientation of the second fluid turbine is selectively adjustable refers to an availability of optional orientations, permitting alteration, modification, and/or variation of the first orientation of the first fluid turbine and/or the second orientation of the second fluid turbine. For example, the first fluid turbine may be capable of assuming a plurality of orientations relative to a direction of fluid flow, and the second fluid turbine may be capable of assuming a plurality of orientations relative to the orientation of the first fluid turbine. To mitigate refers to diminish, allay, and/or alleviate. Interference refers to a hindrance, impediment, and/or disruption. Some examples of interference may include obstruction of a fluid flow from reaching a fluid turbine, introduction of a higher or lower pressure zone hindering blade motion of a fluid turbine, introduction of a turbine-generated fluid flow countering a fluid flow and thereby hindering blade motion, and/or any other type of interference of one fluid turbine on another, adjacent fluid turbine. For example, introducing an interference to the operation of a fluid turbine may degrade the operational efficiency of the fluid turbine, whereas mitigating such interference may prevent at least some of the degradation. Examples of such mitigation may include removing an obstruction to a fluid flow, neutralizing an interfering high or low pressure zone, and/or diversion of an interfering turbine-generated fluid flow, e.g., by changing an orientation of one or more fluid turbines. Downstream turbine operation refers, in the case of a wind turbine, to operation of a turbine down wind from another turbine. For example, downstream turbine operation may involve the functioning and/or performance of a fluid turbine positioned to receive a fluid flow after the fluid flow is received by or passes an upstream object. For instance, an upstream fluid turbine (e.g., closer to a source of a fluid flow) and/or a downstream fluid turbine (e.g., further to the source of the fluid flow) may be capable of assuming a plurality of orientations such that changing the orientation of the upstream and/or downstream fluid turbine may remove and/or diminish interference with the functioning of the downstream fluid turbine. For example, moving the upstream fluid turbine and/or downstream fluid turbine may enable exposing the downstream fluid turbine to the fluid flow. Moving a fluid turbine may involve moving a moveable base supporting the fluid turbine, rotating a blade axis (e.g., of a horizontal fluid turbine), changing a tilt, yaw, and/or pitch of one or more turbine blades, and/or any other type of motion that may change an exposure of a fluid turbine to a fluid flow.

Figure 11C:
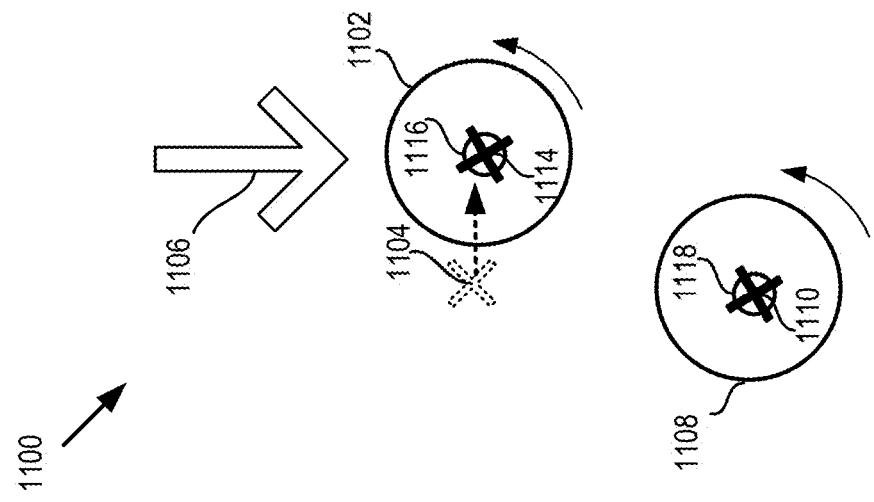
FIG. 11C is an additional exemplary top view of the system of FIGS. 11A-11B for altering orientation of fluid turbines within a cluster, consistent with some embodiments of the present disclosure.
Figure 11B:
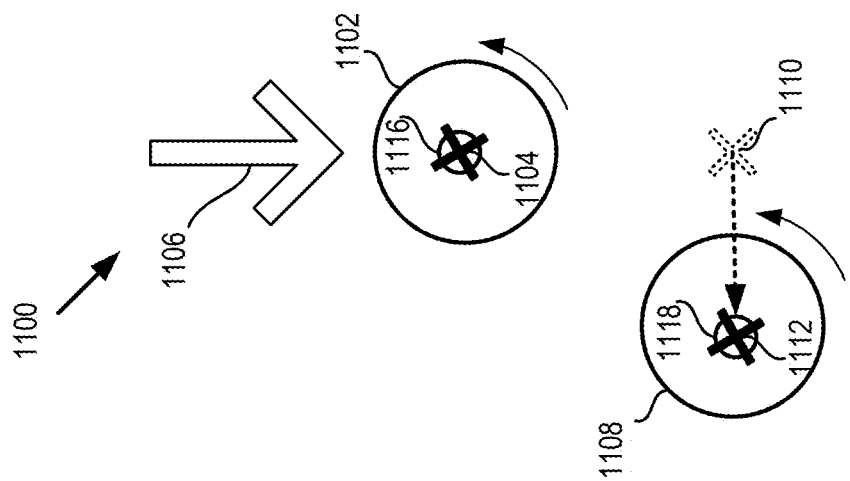
FIG. 11B is another exemplary top view of the system of FIG. 11A for altering orientation of fluid turbines within a cluster, consistent with some embodiments of the present disclosure.

By way of a non-limiting example, reference is made to FIGS. 11A-11C, which are exemplary top views of a system 1100 for altering orientation of fluid turbines within a cluster, consistent with some embodiments of the present disclosure. System 1100 includes at least a first fluid turbine 1102, and a second fluid turbine 1108, in proximity to first fluid turbine 1102. FIG. 11A illustrates first fluid turbine 1102 assuming a first orientation 1104 and second fluid turbine 1108 assuming a second orientation 1110. FIG. 11B illustrates first fluid turbine 1102 remaining fixed (e.g., still assuming first orientation 1104), however second fluid turbine 1108 has been moved from second orientation 1110 to a third orientation 1112, e.g., to the left of first fluid turbine 1102 assuming first orientation 1104. FIG. 11C illustrates second fluid turbine 1108 remaining fixed (e.g., still assuming second orientation 1110), however first fluid turbine 1102 has been moved from first orientation 1104 to another third orientation 1114, e.g., to the right of second fluid turbine 1108 assuming second orientation 1110. In some embodiments, first fluid turbine 1102 may be moved from first orientation 1104 to assume orientation 1114 and second fluid turbine 1108 may be moved from second orientation 1110 to assume orientation 1112.

In FIG. 11A, first fluid turbine 1102 may assume a first orientation 1104 (e.g., indicated by an "X" as a geographic position) relative to a direction of fluid flow 1106, and second fluid turbine 1108 may assume a second orientation 1110 (e.g., indicated by an "X" as a geographic position) relative to first orientation 1104 of first fluid turbine 1102. First fluid turbine 1102 and second fluid turbine 1108 may correspond to any of fluid turbines 100 to 112 of FIG. 1. Second orientation 1110 may be aligned with first orientation 1104 relative to fluid flow 1106, such that when first fluid turbine 1102 assumes first orientation 1104, at least some of fluid flow 1106 is blocked from reaching second fluid turbine 1108. At least one of first orientation 1104 of first fluid turbine 1102 and second orientation 1110 of second fluid turbine 1108 is selectively adjustable to mitigate interference with downstream turbine operation. For instance, changing first orientation 1104 of first fluid turbine 1102 or second orientation 1110 of second fluid turbine 1108 may increase the exposure of second fluid turbine 1108 to fluid flow 1106.

Some disclosed embodiments involve at least one processor. At least one processor, as described elsewhere herein, may be configured to regulate operations of one or more fluid turbines. For example, at least one processor may receive data from one or more sensors associated with one or more fluid turbines, read and/or write data to/from memory, communicate with other processors via a network, and perform operations associated with controlling the operation of the one or more fluid turbines. Such operations may be associated with, for example, braking, coordinating blade rotation, controlling an associated load, implementing one or more optimization techniques (e.g., in accordance with an MPPT protocol), controlling an orientation relative to a direction of fluid flow and/or relative to an orientation of another fluid turbine, and/or any other operation associated with regulating the operation of one or more fluid turbines.

Some disclosed embodiments involve receiving an indication that the first fluid turbine imposes the interference on the downstream operation of the second fluid turbine. An indication refers to data and/or information that allows inference and/or determination of one or more conditions. Receiving an indication refers to obtaining and/or acquiring an indication over a wired and/or wireless communications channel, and/or using the received data to make one or more inferences. For example, at least one processor may receive one or more indications from one or more sensors associated with a fluid turbine via a wired and/or wireless communications channel. The at least one processor may make one or more inferences and/or determinations from the data. An indication that a first fluid turbine imposes interference on the downstream operation of a second fluid turbine refers to a sign, a measurement, and/or any other evidence revealing that the performance of the second (e.g., downstream) fluid turbine may be negatively affected by the first (e.g., upstream) fluid turbine. For instance, at least one processor may determine from the indication that the second fluid turbine may rotate slower than the first fluid turbine, or that the second fluid turbine may generate a lower level of electrical energy than the first fluid turbine. Some examples of an indication that a first fluid turbine imposes interference on the downstream operation of a second turbine may include a measure of fluid flow (e.g., speed and/or direction) in proximity to the first and/or second fluid turbines, a level of electrical power generated by the first and/or second fluid turbines (e.g., measured as voltage, current, and/or power), blade and/or shaft rotation speed associated with the first and/or second fluid turbines, and/or any other measurement indicative of fluid turbine performance. At least one processor may receive one or more fluid flow measurements, rotational speed measurements, and/or voltage and/or current measurements associated with each of an upstream fluid turbine and a downstream fluid turbine and make a comparison therebetween. If the comparison indicates that the performance of the downstream fluid turbine is inferior to the performance of the upstream fluid turbine by more than a threshold value, the at least one processor may determine that the upstream fluid turbine may impose interference on the performance of the downstream fluid turbine. For example, if one or more of a rotational speed, power generated, and/or fluid velocity associated with the upstream fluid turbine exceeds one or more of a rotational speed, power generated, and/or fluid velocity associated with the downstream fluid turbine by at least a threshold value, the at least one processor may determine that the upstream fluid turbine may impose interference on the performance of the downstream fluid turbine.

Some disclosed embodiments involve at least one sensor, the at least one sensor including at least one of a blade rotation sensor, a fluid flow sensor, or an electrical energy output sensor. A sensor may be understood as described elsewhere herein. Blade rotation refers to motion of turbine blades about an axis, and may be measured as revolutions per second (Hz), revolutions per minute (RPM), meters per second (mps), and/or any other units for measuring rotational motion. A blade rotation sensor may be configured to measure rotational velocity of one or more fluid turbine blades. Some examples of a blade rotation sensor may include a tachometer, a magneto-resistive sensor, an inductive sensor, a Hall effect, an oscillatory sensor (e.g., measuring vibrations when the RPM exceeds a threshold), an optical sensor, an ultrasonic sensor, a digital positioning sensor (e.g., an accelerometer, magnetometer, and/or gyroscope), and/or a piezoelectric sensor. In some embodiments, the at least one sensor may include a turbine shaft rotation sensor. At least one processor may receive blade rotation data associated with the upstream and downstream fluid turbines from one or more associated blade rotation sensors. If the blade rotation of the upstream fluid turbine exceeds the blade rotation of the downstream fluid turbine by a threshold amount, the at least one processor may determine that the upstream fluid turbine imposes interference on the operation of the downstream fluid turbine. A fluid flow sensor may measure a rate of fluid flow (as described elsewhere herein), such as a rate of flow of air, water, and/or gas. The rate of flow may be determined in terms of fluid volume per unit time, e.g., as liters/minute, gallons/minute, cubic feet/minute, and/or as velocity, e.g., kilometers per hour (km/h), miles per hour (mph), meters/minute, centimeters per minute, inches per minute, or any other unit for measuring speed. Some examples of a fluid flow sensor may include an anemometer, an optical sensor, a magnetic flow meter, an ultrasonic flow sensor, a doppler flow sensor, a pressure-based flow sensor, a temperature sensor, and/or any other type of flow sensor. At least one processor may receive fluid flow data associated with the upstream and downstream fluid turbines from one or more associated fluid flow sensors. If the fluid flow associated with the upstream fluid turbine exceeds the fluid flow associated with the downstream fluid turbine by a threshold amount, the at least one processor may determine that the upstream fluid turbine imposes interference on the operation of the downstream fluid turbine. An electric energy output sensor may measure an amount of electrical energy produced by an electric power generation source. Some examples of an electric energy output sensor may include an AC and/or DC current meter, voltage meter, and/or power meter, an electromechanical induction meter, a resistive sensor, a capacitive sensor, and/or any other sensor for measuring electrical energy output. Fluid speed may translate to a rotational speed of a fluid turbine and/or an associated rotor, which may be converted to an electrical signal (e.g., an AC voltage, current, and/or power signal). At least one processor may receive electrical energy output data associated with the upstream and downstream fluid turbines from one or more electric energy output sensors. If the electrical energy output of the upstream fluid turbine exceeds the electrical energy output of the downstream fluid turbine by a threshold amount, the at least one processor may determine that the upstream fluid turbine imposes interference on the operation of the downstream fluid turbine.

An electric energy output sensor may include a transmitter for sending a sensed indication of electric energy output to at least one processor. The at least one processor may user the indication received from the at least one sensor to determine a third orientation for the first and/or second fluid turbines, as described herein.

In some embodiments, at least one processor may reference a clock and/or calendar in conjunction with a weather forecast. For example, fluid flow may change in a predictive manner at different times of the day, month (e.g., due to the lunar cycle), and/or year (e.g., due to seasonal changes). The at least one processor may use one or more time-based predictive models to determine the third orientation and transmit an associated signal based on the time of and/or year.

In some disclosed embodiments, the indication reflects a lesser amount of power output from one of the first fluid turbine and the second fluid turbine than another of the first fluid turbine and the second fluid turbine. An indication reflecting a lesser amount of power output refers to information demonstrating, signifying, and/or implying a lower level of electrical power generated. The indication may be in the form of a signal from a sensor, for example. A lesser amount of power output from one of the first fluid turbine and the second fluid turbine than another of the first fluid turbine and the second fluid turbine refers to one of the first and second fluid turbines producing less power that the other of the first and second fluid turbines. For example, due to interference with downstream turbine operation, the indication may show that the second fluid turbine produces less power output than the first fluid turbine. Since the first and second fluid turbines may be capable of outputting a similar amount of power, e.g., due to a similar design and/or proximity to the same fluid flow, a lesser amount of power outputted by the second fluid turbine may indicate that the first fluid turbine may be obstructing at least a portion of the fluid from reaching the second fluid turbine.

By way of a non-limiting example, in FIG. 11A, at least one processor (e.g., processor 428 of FIG. 4 and/or processor 512 of FIG. 5) may receive an indication that first fluid turbine 1102 imposes the interference on the downstream operation of second fluid turbine 1108. For example, in FIG. 4, the at least one processor may receive the indication from at least one of sensors 418A, 418B, and/or 438. Referring to FIG. 5, the at least one sensor may include, for example, rotation sensor 502, fluid speed sensor 504, and/or power output sensor 510. As an example, an indication from rotation sensors 502 associated with fluid turbines 1102 and 1108 may show that second fluid turbine 1108 is rotating slower than first fluid turbine 1102. As another example, an indication from fluid speed sensors 504 associated with fluid turbines 1102 and 1108 may show that the fluid flow near second fluid turbine 1108 is slower than the fluid flow near first fluid turbine 1102. As a further example, an indication from power output sensors 510 associated with fluid turbines 1102 and 1108 may show that the power outputted by second fluid turbine 1108 is less than the power outputted by first fluid turbine 1102. In some embodiments, the indication received by the at least one processor may reflect a lesser amount of power output from the second fluid turbine 1108 than the first fluid turbine 1102. For instance, the power output from second (e.g., downstream) fluid turbine 1108 may be less than the power output from first (e.g., upstream) fluid turbine 1102.

Some disclosed embodiments involve, based on the indication, determining a third orientation for one of the first fluid turbine and the second fluid turbine. Based on the indication refers to derived from the indication, in response to the indication, and/or established using the indication. Determining a third orientation for one of the first fluid turbine and the second fluid turbine refers to identifying, deducing, finding, and/or computing an orientation (as described elsewhere herein) for the first or second fluid turbine that may be different than the first and second orientations. At least one processor may determine a third orientation for the first fluid turbine or the second fluid turbine in a manner to mitigate the interference on downstream turbine operation. For example, moving the first or second fluid turbines to a third orientation may permit both the first and second fluid turbines to receive a fluid flow in a substantially equivalent manner. This may be achieved, for example, by moving the first fluid turbine relative to the second fluid turbine, and/or by moving the second fluid turbine relative to the first fluid turbine. In both situations, moving one of the first and/or second fluid turbines relative to the other fluid turbine may prevent the first fluid turbine from obstructing a fluid flow from reaching the second fluid turbine. For example, if the second fluid turbine is located directly south of the first fluid turbine, and a fluid flow is flowing from the north, the first fluid turbine may obstruct the northerly fluid flow from reaching the second fluid turbine. Moving the first and/or second fluid turbines eastwards or westwards may permit both of the first and second fluid turbines to receive the northerly fluid flow.

In some embodiments, the at least one processor may access information stored in memory to determine the third orientation. Some examples of such information may include historical data associated with regional fluid flows, a present fluid flow (e.g., direction and/or velocity), a predicted and/or forecasted fluid flow (e.g., direction and/or velocity). Some additional example of such information may include the first and/or second (e.g., present) orientations of the first and second fluid turbines, a regional topography, terrain, and/or landscape (e.g., including nearby rural and/or urban objects and/or geographical features that may affect a fluid flow), and/or historical levels of electrical energy generated by the first and second fluid turbines (e.g., in different orientations relative to a fluid flow and/or relative to each other), and/or any other information associated with a capability of the first and/or second fluid turbines to generate electrical energy from a fluid flow. For instance, certain times of the day may be associated with a particular fluid flow direction. The at least one processor may use a forecast to predict a direction of fluid flow and determine the third orientation based on the forecast. As another example, the at least one processor may use information associated with one or more objects (e.g., buildings, hills, parked vehicles) that may obstruct a fluid flow from reaching one or more fluid turbines to determine the third orientation.

Some disclosed embodiments involve the third orientation enabling the first fluid turbine and the second fluid turbine to produce a greater aggregate level of electrical energy than would be produced with the first fluid turbine in the first orientation and the second fluid turbine in the second orientation. Enabling refers to permitting, allowing, and/or facilitating. An aggregate level of electrical energy refers to a combined and/or accumulated level of voltage and/or current, e.g., generated by a plurality of fluid turbines. A greater aggregate level of electrical energy refers to more, additional and/or an augmented level of electrical energy. The third orientation enabling the first fluid turbine and the second fluid turbine to produce a greater aggregate level of electrical energy than would be produced with the first fluid turbine in the first orientation and the second fluid turbine in the second orientation refers to changing the first orientation of the first fluid turbine to the third orientation, or changing the second orientation of the second turbine to the third orientation, such that the combined power generated by the first and second fluid turbines is increased. For example, changing the orientation of the first fluid turbine or the second fluid turbine to the third orientation may remove an obstruction preventing a fluid flow (or a portion thereof) from reaching the second fluid turbine. This may increase the exposure of the second fluid turbine to the fluid flow, and enable the second fluid turbine to convert a greater portion of the fluid flow to electrical energy. Thus, for example, the first fluid turbine and second fluid turbine may be producing a first aggregate level of electrical energy when the first fluid turbine is in the first orientation and the second fluid turbine is in the second orientation. After moving one of the first fluid turbine or the second fluid turbine to the third orientation, the first fluid turbine and second fluid turbine may produce a second aggregate level of electrical energy that may be greater than the first aggregate level of electrical energy. In some embodiments, changing the orientation of the first or second fluid turbine may include physically moving the first or second fluid turbine to a different geographic position (e.g., by translating a vertical axis of blade rotation from a prior x-y location to an updated x-y location). For example, the first and/or second fluid turbines may be supported on one or more moveable bases permitting movement to a different x-y location. In some embodiments, the second fluid turbine may be moved to an elevated position (e.g., behind the first fluid turbine in a direction of fluid flow), such that the elevated position of the second fluid turbine may clear the position of the first fluid turbine. In some embodiments, changing the orientation of the first or second fluid turbine may include adjusting an incident angle (e.g., pitch and/or yaw) between the turbine blades and a fluid flow (e.g., by rotating the horizontal axis of blade rotation). Thus, changing the orientation may affect the fluid coupling between the first and second fluid turbines, which may alleviate the interference with downstream turbine operation.

In some embodiments, at least one processor may store in memory, a history of aggregate levels of energy produced by a cluster of fluid turbines, with the respective orientations of each fluid turbine, and a corresponding history of fluid flow conditions. In response to receiving one or more indications of interference with downstream turbine operation, the at least one processor may access the history in memory to determine one or more revised (e.g., third and/or additional) orientations for one or more fluid turbines in the cluster. In some embodiments, the at least one processor may apply one or more predictive models when determining an orientation for a fluid turbine, such as weather forecasts, artificial intelligence, deep learning, and/or machine learning. In some embodiments, the at least one processor may apply an MPPT protocol (e.g., described elsewhere herein) when determining one or more orientations, to ensure that the orientations of the fluid turbines in the cluster comply with an MPPT protocol (e.g., as applied to an entire cluster of fluid turbines).

By way of a non-limiting example, in FIG. 11B, based on the indication (e.g., that second fluid turbine 1108 generates less energy and/or spins slower than first fluid turbine 1102), at least one processor (e.g., processor 428 of FIG. 4 and/or processor 512 of FIG. 5) may determine a third orientation 1112 for one of first fluid turbine 1102 and second fluid turbine 1108. Third orientation 1112 may enable first fluid turbine 1102 and second fluid turbine 1108 to produce a greater aggregate level of electrical energy than would be produced with first fluid turbine 1102 in first orientation 1104 and second fluid turbine 1108 in second orientation 1110. For example, moving second fluid turbine 1108 from second orientation 1110 to third orientation 1112 may remove some interference imposed by first fluid turbine 1102 and expose second fluid turbine 1108 to a greater portion of fluid flow 1106. This may increase the rotational velocity of second fluid turbine 1108, and enable second fluid turbine 1108 to produce a greater level of electrical energy than was possible when second fluid turbine 1108 assumed second orientation 1110.

By way of another non-limiting example, in FIG. 11C, moving first fluid turbine 1102 from first orientation 1104 to another (e.g., different) third orientation 1114 may remove some interference imposed by first fluid turbine 1102 and expose second fluid turbine 1108 to a greater portion of fluid flow 1106. This may increase the rotational velocity of second fluid turbine 1108, and enable second fluid turbine 1108 to produce a greater level of electrical energy than was possible when first fluid turbine 1102 assumed first orientation 1104. In some embodiments, the at least one processor may access data stored in memory (e.g., memory 430 and/or memory 514) to determine orientation 1112 and/or 1114. Such data may include, for example, historical data associated with fluid flow patterns, power generation, and/or orientations used to generate power under specific fluid flow patterns, associated predictive models and/or forecasts, data associated with an MPPT protocol, and/or any other data that may be used to determine an orientation for one or more fluid turbines.

Some disclosed embodiments involve transmitting a signal for changing one of the first orientation of the first fluid turbine and the second orientation of the second fluid turbine to the third orientation, thereby mitigating the interference on the downstream operation of the second fluid turbine. Transmitting a signal refers to sending and/or otherwise communicating information (e.g., digitally encoded information), e.g., using a wired and/or wireless communications channel. Transmitting a signal for changing an orientation of a fluid turbine refers to transmitting a signal configured to cause an adjustment and/or modification to the orientation of the fluid turbine. For example, at least one processor may be associated with a transmitter for transmitting one or more signals to one or more receivers associated with the first and/or second fluid turbines. The signal may cause a force to be exerted on the first or second fluid turbine to change a respective orientation to the third orientation. For instance, the signal may cause a motor to move a vertical fluid turbine to a different geographic position, rotate a horizontal axis of a horizontal fluid turbine, and/or implement any other change in orientation for mitigating the interference on the downstream operation of the second fluid turbine. Moving the first or second fluid turbines (e.g., vertical fluid turbines) to a different geographic position and/or rotating a horizontal axis of the first or second fluid turbines (e.g., horizontal fluid turbines) to a different angle relative to the Earth's surface may change how the blades of a fluid turbine interact with a fluid flow. This may increase the amount of electrical energy that may be generated by the first and/or second fluid turbines. The at least one processor may transmit a signal for changing the orientation the first fluid turbine, or for changing the orientation of the second fluid turbines, or for changing the orientation of the first fluid turbine and the second fluid turbine. Mitigating the interference on the downstream operation of the second fluid turbine refers to reducing and/or alleviating the interference (e.g., described elsewhere herein). For example, mitigating the interference may involve moving the first or second fluid turbine to the third orientation, changing the relative orientation between the first and/or second fluid turbines, and/or changing the relative orientation of the first and/or second fluid turbines and the fluid flow. Such mitigating techniques may increase the exposure of the second fluid turbine to the fluid flow, e.g., by preventing the first fluid turbine (or another object) from obstructing the fluid flow from reaching the second fluid turbine.

By way of a non-limiting example, in FIGS. 11A-11C, at least one processor (e.g., processor 428 of FIG. 4 and/or processor 512 of FIG. 5) may transmit a signal for changing one of first orientation 1104 of first fluid turbine 1102 and second orientation 1110 of second fluid turbine 1108 to the third orientation (e.g., third orientation 1112 for second fluid turbine 1108 in FIG. 11B, and third orientation 1114 for first fluid turbine 1102 in FIG. 11C), thereby mitigating the interference on the downstream operation of second fluid turbine 1108. For example, first fluid turbine 1102 and second fluid turbine 1108 may be producing a first aggregate level of electrical energy when first fluid turbine 1102 is in first orientation 1104 and second fluid turbine 1108 is in second orientation 1110. After moving one of first fluid turbine 1102 to third orientation 1114 (e.g., FIG. 11C), or moving second fluid turbine 1108 to third orientation 1112 (e.g., FIG. 11B), first fluid turbine 1102 and second fluid turbine 1108 may produce a second aggregate level of electrical energy that may be greater than the first aggregate level of electrical energy.

In some disclosed embodiments, the first fluid turbine has a first vertical axis of blade rotation, and the second fluid turbine has a second vertical axis of blade rotation. A vertical axis of blade rotation refers to an upright and/or standing axle and/or shaft about which one or more turbine blades (as described earlier) may spin. A vertical axis may be perpendicular to the Earth's surface. Thus, the first and second fluid turbines may be vertical fluid turbines, such as Savonius, Darrieus, Helix, and/or H-type fluid turbines or any other type of vertical fluid turbine. In some disclosed embodiments, the signal is configured to translate at least one of the first vertical axis and the second vertical axis relative to another of the first vertical axis and the second vertical axis. To translate refers to move, roll, slide, or shift an object from a first location to a second location. To translate at least one of the first vertical axis and the second vertical axis relative to another of the first vertical axis and the second vertical axis refers to changing the geographic position of the first vertical axis relative to the geographic position of the second vertical axis, e.g., by moving the first vertical axis and/or the second vertical axis. For example, if the first fluid turbine was located directly in front of the second fluid turbine relative to a fluid flow, the signal may cause the first or second fluid turbines to shift horizontally (e.g., in a direction perpendicular to the fluid flow direction) such that the first fluid turbine is no longer directly in front of the second fluid turbine relative to the fluid flow. In some embodiments, a braking system of a fluid turbine may be engaged to halt blade rotation prior to moving a fluid turbine. A signal configured to translate a vertical axis refers to a signal including information that may be used to cause a translating motion, e.g., by a mechanical device, actuator, and/or motor. For example, an electromechanical device (e.g., a motor) may receive a signal causing the electromechanical device to exert a mechanical force to move a fluid turbine to a third orientation.

By way of a non-limiting example, in FIGS. 11A-11C, first fluid turbine 1102 has a first vertical axis 1116 of blade rotation, and second fluid turbine 1108 has a second vertical axis 1118 of blade rotation. The signal may be configured to cause an electromechanical device, such as a motor and/or actuator, to exert a mechanical force for translating at least one of the first vertical axis 1116 and second vertical axis 1118 relative to another of first vertical axis 1116 and second vertical axis 1118. For example, in FIG. 11B, at least one processor (e.g., processor 428 of FIG. 4 and/or processor 512 of FIG. 5) may transmit a signal to translate second vertical axis 1118 relative to first vertical axis 1116, by moving second vertical axis 1118 from second orientation 1110 to third orientation 1112. In a similar manner, in FIG. 11C, the at least one processor may transmit a signal to translate first vertical axis 1116 relative to fluid flow 1106, by moving first vertical axis 1116 from first orientation 1104 to the other third orientation 1114.

Some disclose embodiments involve a track associated with at least one of the first fluid turbine and the second fluid turbine. A track refers to a course, trajectory, and/or path. A track associated with at least one of the first fluid turbine and the second fluid turbine refers to a course, trajectory and/or path along which the first and/or second fluid turbines may be moved. In some exemplary embodiments, a track may include at least one groove and/or protrusion tracing a trajectory, and may be made of sturdy material, such as metal (e.g., steel). The at least one groove and/or protrusion may be configured to engage with one or more (e.g., rubber) wheels, runners, and/or treaded loops (e.g., similar to a tractor or military tank) connected to a fluid turbine, permitting the fluid turbine to move along the track. In some embodiments, the track may be lubricated (e.g., with oil) to facilitate motion therein. In some embodiments, a track may include at least two tracks for stability and balance. In some disclosed embodiments, translating includes moving at least one of the first vertical axis and the second vertical axis relative to the track. Moving at least one of the first vertical axis and the second vertical axis relative to the track refers to relocating and/or shifting the position of the first and/or second vertical axes in a manner guided by the track, e.g., by exerting a propelling, pushing and/or pulling force. In some embodiments, at least one processor may cause at least one of the first vertical axis and the second vertical axis to move along the track. For example, such a track may include one or more grooves for guiding the motion of a fluid turbine, such that pulling and/or pushing the fluid turbine causes the fluid turbine to relocate to a different position along the track.

In some disclosed embodiments, the track is arc shaped. Arc shaped refer to having a curved form. Some examples of an arc shaped track may include a C-shape track, an S-shaped track, and/or any other curvilinear track. In some embodiments, an arc-shaped track may be associated with one or more centers of curvature about which an arc-shaped trajectory may sweep, and may be associated with a circle, ellipse, parabola, and/or any other curved shape. For example, in some embodiments, the first fluid turbine may be positioned at center of curvature relative to an arc shaped track, and the second fluid turbine may be positioned somewhere along the arc shaped track, permitting motion of the second fluid turbine along a trajectory defined by the arc shaped track relative to the first fluid turbine, or the reverse. In some embodiments, the second fluid turbine may move along an arc-shaped track relative the first turbine located at a position other than a center of curvature relative to an arc-shaped track.

In some disclosed embodiments, an angular position of the vertical axis of one of the first fluid turbine and the second fluid turbine functions within the arc of the track. An angular position refers to a distance along a curved line, e.g., relative to an axis passing through a pivot point. Moving an object along a curved segment may change the angular position of the object relative to the axis. For example, an axis may be defined between a first fluid turbine assuming a first orientation and a second fluid turbine assuming a second orientation, such that an angular position of the second fluid turbine may be 0° relative to the axis. Moving the second fluid turbine along a quarter of a circle relative to the axis may cause the angular position of the second fluid turbine relative to the axis to be 90°. An angular position functions within the arc of the track refers to an angular position that may vary along a trajectory defined by the arc of the track relative to an axis. An arc shaped track may define a plurality of possible angular positions for a fluid turbine relative to an axis. Moving a fluid turbine along the arc shaped track may change the angular position of a vertical axis of the fluid turbine relative to the axis In some embodiments, the first fluid turbine may remain stationary (e.g., as a pivot point) and the second fluid turbine may move along an arc-shaped track relative to the first fluid turbine, or the reverse. Changing the angular position thus may mitigate the interference with the downstream turbine operation, e.g., by increasing the exposure of the second fluid turbine to the fluid flow.

Figure 12:
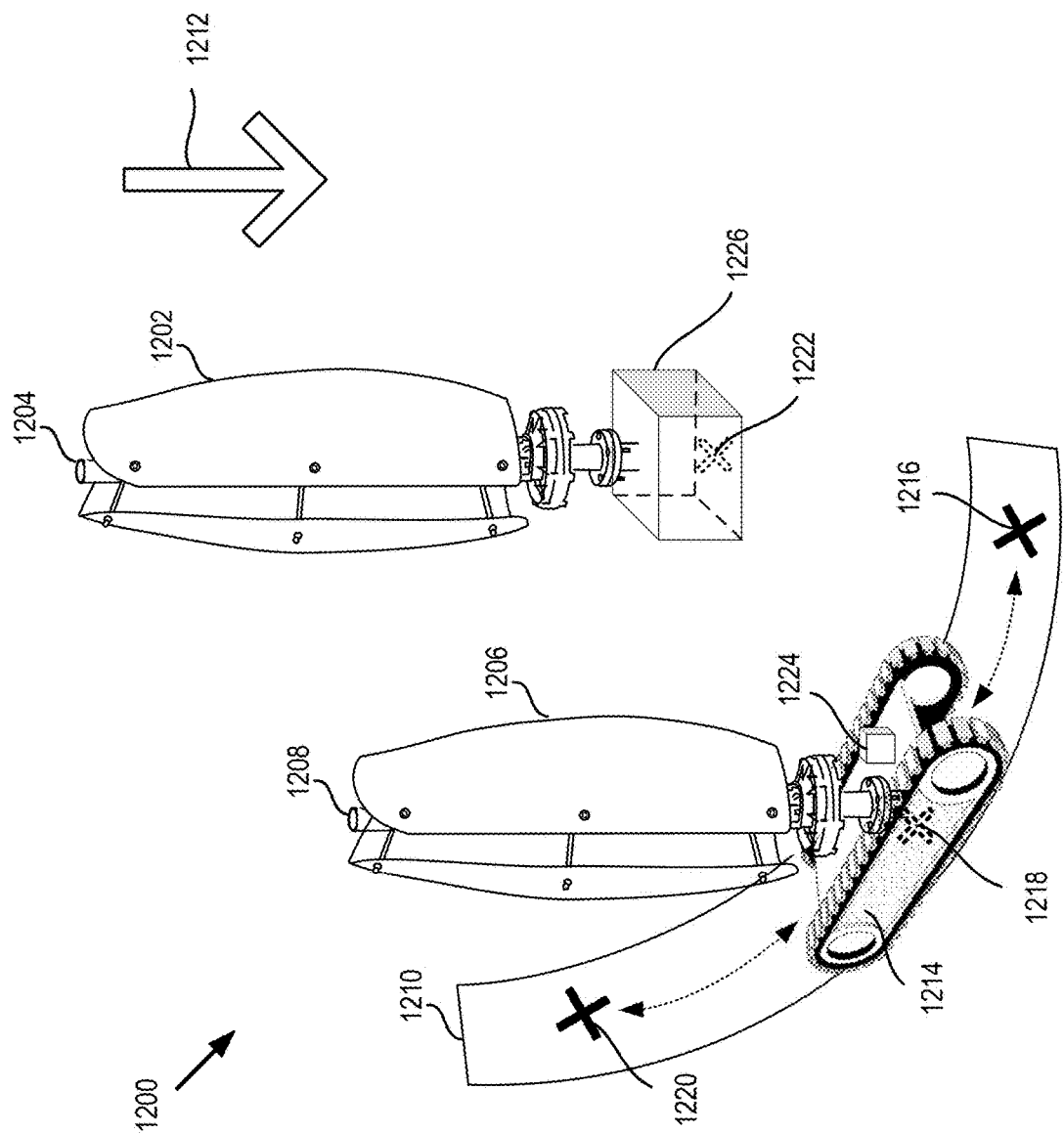
FIG. 12 is an exemplary schematic diagram of another system for altering orientation of fluid turbines within a cluster, consistent with some embodiments of the present disclosure.

By way of a non-limiting example, reference is made to FIG. 12 illustrating an exemplary system 1200 for altering orientation of fluid turbines within a cluster, consistent with some embodiments of the present disclosure. System 1200 includes a first fluid turbine 1202 including a first vertical axis 1204 and a second fluid turbine 1206 including a second vertical axis 1208 in proximity to first fluid turbine 1202. First and second fluid turbines 1202 and 1206 may correspond to fluid turbine 404. System 1200 additionally includes a track 1210 associated with at least one of first fluid turbine 1202 and second fluid turbine 1202. Translating at least one of first vertical axis 1204 and second vertical axis 1208 relative to another of first vertical axis 1204 and second vertical axis 1208 may include moving at least one of first vertical axis 1204 and second vertical axis 1208 relative to track 1210 (e.g., in either direction). In the example shown, at least one processor (e.g., processor 428 of FIG. 4 and/or processor 512 of FIG. 5) may cause second vertical axis 1208 of second fluid turbine 1206 to move along track 1210 relative to first vertical axis 1204 of first fluid turbine 1202, however this does not limit the disclosure. In some embodiments, track 1210 may be arc shaped. In some embodiments, the angular position of vertical axis 1204 or 1208 of one of first fluid turbine 1202 and second fluid turbine 1206 functions within the arc of track 1210. For example, moving second vertical axis 1208 of second fluid turbine 1206 along arc shaped track 1210 may maintain the same distance between first fluid turbine 1202 and second fluid turbine 1206, but may vary the relative orientation relative to fluid flow 1212, thereby increasing the exposure of second fluid turbine 1206 to a fluid flow 1212.

For example, at time T0, first fluid turbine may assume first orientation 1222 and second fluid turbine 1206 may assume second orientation 1216. At time T1, upon receiving an indication of interference with downstream turbine operation, the at least one processor may cause second fluid turbine 1206 to assume a third orientation 1218 (e.g., by transmitting a signal to operate an associated motor 1224). At time T2, upon receiving an updated indication of interference with downstream turbine operation, the at least one processor may cause second fluid turbine 1206 to assume a fourth orientation 1220. At time T3, upon receiving a further indication of interference with downstream turbine operation, the at least one processor may cause second fluid turbine to revert back to second orientation 1216. Times T0, T1, T2, T3 may be associated with measured changes in fluid flow patterns, and/or with scheduled times for changing the orientation based on one or more predictive models.

It is to be appreciated that the use of the terms first and second in this disclosure is intended for illustrative purposes only. Throughout this disclosure, first fluid turbine 1102 and second fluid turbine 1108 may be interchangeable, and first fluid turbine 1202 and second fluid turbine 1206 may be interchangeable.

In some disclosed embodiments, the track is linearly shaped. Linearly shaped refers to straight, e.g., lacking a curve and/or change in direction. Moving a first object along a linear track relative to a second (e.g., stationary) object may change the distance separating the objects, and/or change an alignment of the second object relative to an axis (e.g., corresponding to a fluid flow). For instance, a linear shaped track may run north-south, east-west, or any combination thereof. In some embodiments, the track may include one or more linearly shaped sections and one or more arc shaped sections.

Some disclosed embodiments involve a grid associated with at least one of the first fluid turbine and the second fluid turbine. A grid refers to a network, lattice, and/or matrix. A grid may include a plurality of intersecting tracks. In some embodiments, a grid may include one or more linearly shaped tracks and/or one or more arc shaped tracks. A grid may provide a plurality of possible (e.g., linearly and/or arc shaped) trajectories along which a fluid turbine may be moved. In some disclosed embodiments, translating at least one of the first vertical axis and the second vertical axis includes movement along at least one track of the grid. Movement along at least one track of a grid refers to changing a position along a trajectory defined by one or more tracks of the grid. For example, a vertical axis of a fluid turbine may be pushed and/or pulled along a track of a grid. The trajectory of a fluid turbine moving along at least one track of a grid may include one or more linear, L-shaped, and/or curved portions.

Figure 13:
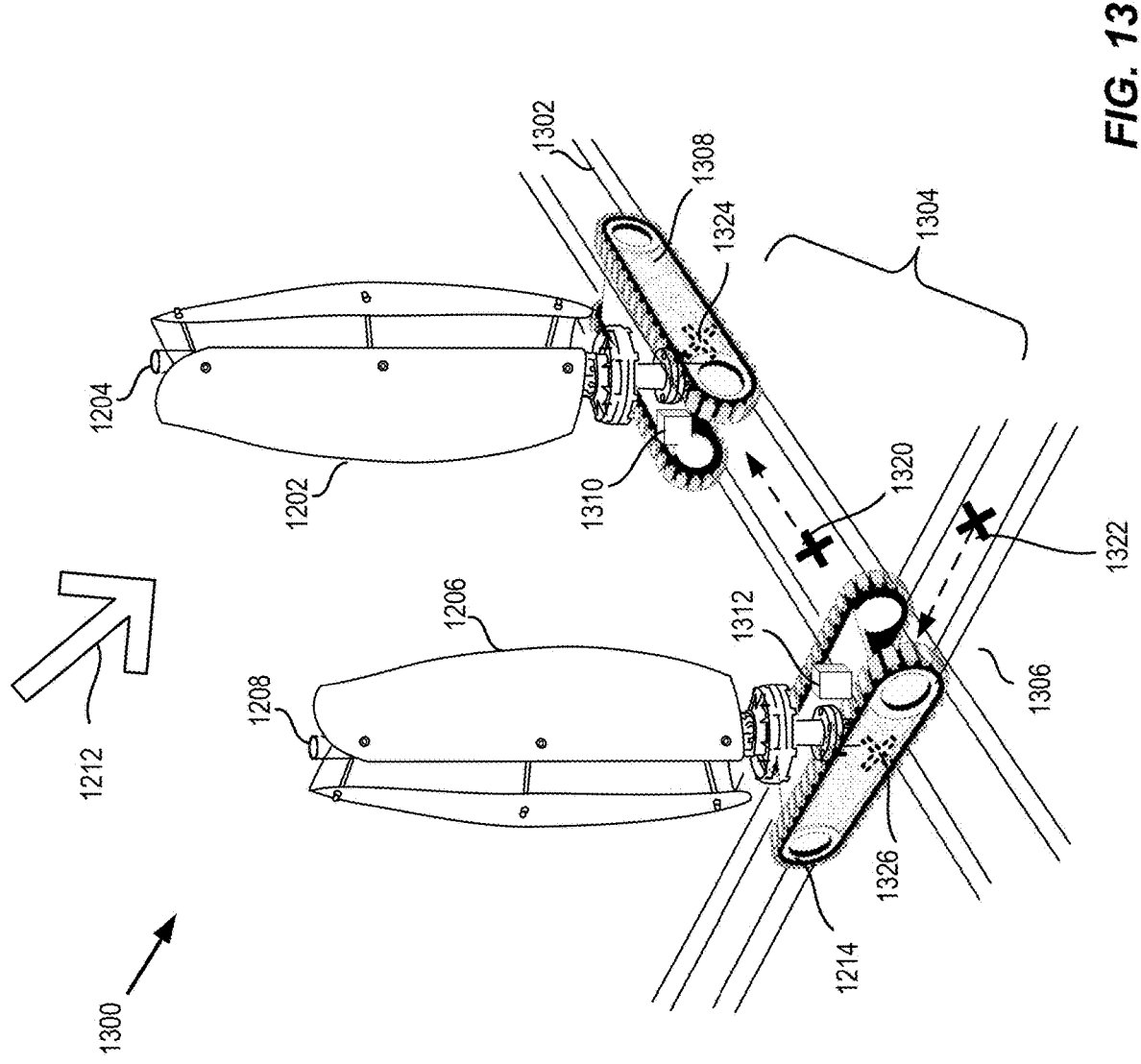
FIG. 13 illustrates a further exemplary system for altering orientation of fluid turbines within a cluster, consistent with some embodiments of the present disclosure.

By way of a non-limiting example, reference is made to FIG. 13 illustrating an exemplary system 1300 for altering orientation of fluid turbines within a cluster, consistent with some embodiments of the present disclosure. System 1300 includes first fluid turbine 1202 with first vertical axis 1204 and second fluid turbine 1206 with second vertical axis 1208 in proximity to first fluid turbine 1202. System 1300 additionally includes a first track 1302 associated with at least one of first fluid turbine 1202 and second fluid turbine 1206. In the example shown, first track 1302 is associated with first fluid turbine 1202, enabling translation of first vertical axis 1204 along first track 1302. In some embodiments, first track 1302 may be linearly shaped. In some embodiments, system 1300 includes a grid 1304 associated with at least one of first fluid turbine 1202 and second fluid turbine 1206. Grid 1304 may include a plurality of tracks, such as track 1302 associated with first fluid turbine 1202 and a second track 1306 associated with second fluid turbine 1206. Translating at least one of first vertical axis 1204 of first fluid turbine 1202 and second vertical axis 1208 of second fluid turbine 1206 may include movement along tracks 1302 and 1306 of grid 1304. For example, at least one processor (e.g., processor 428 of FIG. 4 and/or processor 512 of FIG. 5) may cause any of first fluid turbine 1202 and second fluid turbine 1206 to move along tracks 1302 and 1306 of grid 1304. This may permit increasing the exposure of first fluid turbine 1202 and/or second fluid turbine 1206 to fluid flow 1212, which may increase an aggregate level of electric energy produced by first fluid turbine 1202 and/or second fluid turbine 1206.

In some disclosed embodiments, at least one of the first vertical axis and the second vertical axis is mounted on a movable base, and wherein translating includes moving the base. A moveable base refers to an adjustable and/or portable foundation and/or pedestal. Moveable refers to a capability for changing a position in one or more directions. Moving a movable base may include rolling, sliding, gliding, pushing and/or pulling (e.g., using a motor and/or actuator). A vertical axis mounted on a movable base refers to a vertical axis of a fluid turbine supported by, affixed to, and/or attached to a moveable base. For example, a vertical fluid turbine may be bolted, welded, or connected in another manner to a moveable base having one or more runners, wheels, and/or treaded loops. In some embodiments, a moveable base may include a maglev vehicle, and/or a sprocket and chain. In some embodiments, a moveable base may engage with one or more tracks for guiding the motion, however this is not required. A track may permit moving the fluid turbine along a trajectory defined by the one or more tracks. In some embodiments, at least one of the first vertical axis and the second vertical axis is mounted on a stationary (e.g., non-moveable base).

By way of a non-limiting example, in FIG. 12, second fluid turbine 1206 and second vertical axis 1208 may be mounted on a movable base 1214, such that translating includes moving base 1214, thereby moving second fluid turbine 1206 and second vertical axis 1208 therewith. In the example show, first vertical axis 1204 may be mounted on a stationary base 1226. Moveable base 1214 may include one or more treaded loops, wheels, sliders, runners, and/or any other mechanism permitting an object to move.

By way of another non-limiting example, in FIG. 13, first fluid turbine 1202 and first vertical axis 1204 and second fluid turbine 1206 and second vertical axis 1208 may each be mounted on different movable bases 1214 and 1308, respectively. This may enable at least one processor (e.g., processor 428 of FIG. 4 and/or processor 512 of FIG. 5) to change the orientations of each of first fluid turbine 1202 (and first vertical axis 1204 associated therewith) and of second fluid turbine 1206 (and second vertical axis 1208 associated therewith), e.g., in response to receiving one or more indications.

In some disclosed embodiments, one of the first vertical axis and the second vertical axis is immovable relative to a ground position, and wherein translating includes moving the movable base relative to the immovable one of the first vertical axis and the second vertical axis. Immovable relative to a ground position refers to stationary and/or fixed compared to a location on a terrain, such as the Earth's surface. A vertical axis immovable relative to a ground position refers to a shaft of a vertical fluid turbine that may be fixed relative to the ground position. One of the first vertical axis and the second vertical axis being immovable relative to a ground position refers to one of the first or second fluid turbines lacking a capability to move and therefore remaining stationary, while the other of the first or second fluid turbines may be capable of moving relative to the stationary fluid turbine. For example, one of the fluid turbines may be affixed to a foundation, such as infrastructure made of solid material (e.g., concrete), causing the fluid turbine to be stationary, whereas the other fluid turbine may be positioned on a track, permitting the other fluid turbine to move relative to the ground.

By way of a non-limiting example, in FIG. 12, one of first vertical axis 1204 and second vertical axis 1208 may be immovable relative to a ground position. In the example shown, first vertical axis 1204 and first fluid turbine 1202 are affixed to stationary base 1226 and may be immovable. However this does not limit this disclosure and in some embodiments, second vertical axis 1208 and second fluid turbine 1206 may be affixed to a stationary base. In some embodiments, translating may include moving movable base 1214 relative to immovable first vertical axis 1204.

In some disclosed embodiments, the first fluid turbine has a first horizontal axis of blade rotation, and the second fluid turbine has a second horizontal axis of blade rotation. A horizontal axis of blade rotation refers to an axle, about which one or more turbine blades may spin, and that may be capable of assuming one or more directions relative to the Earth's surface, e.g., including a direction substantially parallel to the Earth's surface. Thus, both the first and second fluid turbines may be horizontal fluid turbines. In some disclosed embodiments, the signal is configured to rotate at least one of the first horizontal axis and the second horizontal axis. A signal configured to rotate a horizontal axis refers to a signal capable of changing the direction of a horizontal axis relative to the terrain upon which the fluid turbine is mounted. For example, such a signal may cause a motor and/or actuator to rotate the horizontal axis thereby causing an associated blade to face a different direction (e.g., tilted up or down) and/or from a non-parallel alignment relative to the Earth's surface to a substantially parallel alignment, and the reverse (e.g., by engaging an associated pitch and/or yaw control). Changing the alignment of the horizontal axis of the first or second fluid turbines may mitigate the interference with the downstream operation of the second fluid turbine, e.g., by increasing the exposure of the blades of the second fluid turbine to a fluid flow.

Figure 14B:
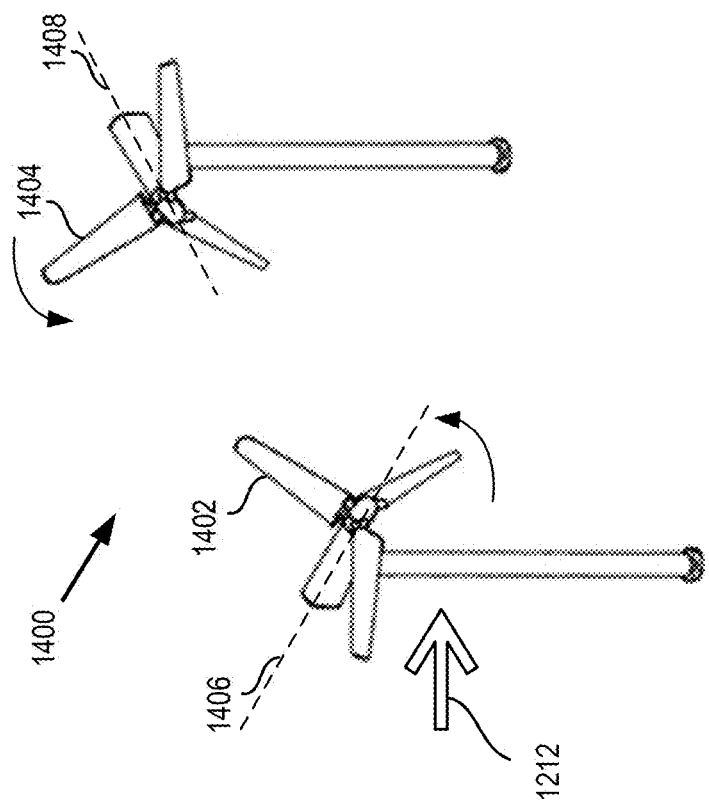
FIGS. 14A-14B illustrate another exemplary system for altering orientation of fluid turbines within a cluster, consistent with some embodiments of the present disclosure.
Figure 14A:
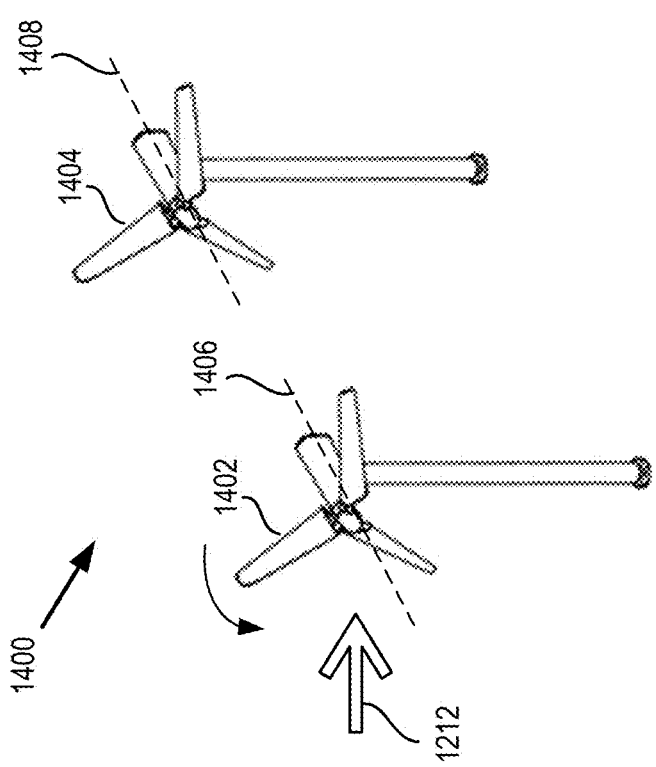

By way of a non-limiting example, reference is made to FIGS. 14A-14B illustrate another exemplary system 1400 for altering orientation of fluid turbines 1402 and 1404 within a cluster, consistent with some embodiments of the present disclosure. System 1400 includes first fluid turbine 1402 including a first horizontal axis 1406 of blade rotation, and second fluid turbine 1404 including a second horizontal axis 1408 of blade rotation. At least one processor (e.g., processor 428 of FIG. 4 and/or processor 512 of FIG. 5) may transmit a signal configured to cause a motor and/or actuator to rotate at least one of first horizontal axis 1406 and second horizontal axis 1408 (e.g., using yaw control 526 of FIG. 5). For example, the signal may cause a motor to rotate horizontal axis 1406, to thereby increase the exposure of second (e.g., downstream) fluid turbine 1404 to a fluid flow 1410 and permit second fluid turbine 1404 to generate greater electrical energy than prior to rotating first horizontal axis 1406 and/or second horizontal axis 1408.

Some disclosed embodiments involve at least one motor associated with at least one of the first fluid turbine and the second fluid turbine. A motor refers to a device configured to convert electrical energy into mechanical energy. A motor may include coils of wire (e.g., an armature) configured rotate with a fluctuating magnetic field in response to an application of an (e.g., alternating) electric current. The interaction between the electric current and the magnetic field may generate a force, causing the motor to turn and produce mechanical motion, e.g., in response to at least one signal. At least one motor associated with at least one of the first fluid turbine and the second fluid turbine refers to one or more motors connected to the first and/or second fluid turbines for moving the first and/or second fluid turbine. For example, a motor may be connected to a fluid turbine via one or more wheels, cables, chains, ropes, rods, and/or any other type of connector. In some embodiments, a motor may be connected only to one of the first or second fluid turbines, and the other one of the first or second fluid turbine may be stationary. In some embodiments, a first motor may be connected to the first fluid turbine and a second motor may be connected to the second fluid turbine, permitting to move the first and/or second fluid turbines in response to one or more signals.

In some disclosed embodiments, the at least one motor is configured to cause the changing in response to the signal. A motor configured to cause the changing in response to a signal refers to a motor configured to produce mechanical motion in response to receiving the signal, and transferring the mechanical motion to the first or second fluid turbines in a manner to change the first or second orientations to the third orientation. For example, the signal may cause the motor to turn one or more associated wheels for rolling the first or second fluid turbines, e.g., along one or more tracks. As another example, the signal may cause the motor to exert a push and/or pull motion using one or more associated rods and/or chains or cables for moving the first or second fluid turbines along one or more tracks. As a further example, the signal may cause the motor to rotate a horizontal axis of the first or second fluid turbine. In some embodiments, a motor may include one or more controllable gears for refining and/or adjusting a corresponding motion of a fluid turbine. In some embodiments, the at least one motor may draw electrical power from the first and/or second fluid turbines to cause the respective change in orientations.

By way of a non-limiting example, in FIG. 13, system 1300 may include at least a motor 1310 associated with first fluid turbine 1202 and a second motor 1312 associated with second fluid turbine 1206. At least one processor (e.g., processor 428 of FIG. 4 and/or processor 512 of FIG. 5) may transmit a signal causing motor 1310 to move moveable base 13098 and change the orientation of first fluid turbine 1202 from orientation 1320 to orientation 1324. Similarly, at least one processor may transmit a signal causing motor 1312 to move moveable base 1214 to change the orientation of second fluid turbine 1206 from orientation 1322 to orientation 1326. In some embodiments, motors 1310 and 1312 may draw electrical power from fluid turbines 1202 and 1206, respectively (e.g., from associated generators 406 of FIG. 6). In some embodiments, moveable bases 1214 and 1308 may operate independent of tracks 1306 and 1302, permitting at least one processor to move either of fluid turbines 1206 and 1202 in any number of directions and/or distances.

In some disclosed embodiments, the first fluid turbine and the second fluid turbine are wind turbines and the fluid flow includes airflow. An airflow refers to movement of air, e.g., wind. A wind turbine refers to a fluid turbine configured to rotate in response to an airflow. For instance, a wind turbine may convert wind (e.g., a flow of air) to rotational mechanical motion. A generator connected to the wind turbine may convert the rotational mechanical motion to electrical power.

In some disclosed embodiments, the first fluid turbine and the second fluid turbine are water turbines and the fluid flow includes water flow. A water flow refers to movement of water, e.g., a river or ocean current. A water turbine refers to a fluid turbine configured to convert an ocean or river current to rotational mechanical motion. A generator connected to the water turbine may convert the rotational mechanical motion to electrical power. In some embodiments, the fluid is steam. In some embodiments, the fluid is gas.

By way of a non-limiting example, in FIG. 11A, first fluid turbine 1102 and second fluid turbine 1108 may be wind turbines and fluid flow 1106 includes airflow. For example, first fluid turbine 1102 and second fluid turbine 1108 may correspond to any of fluid turbines 100, 102, 106, 108, 110, and/or 112 of FIG. 1. By way of another non-limiting example, in FIG. 11A, first fluid turbine 1102 and second fluid turbine 1108 may be water turbines and fluid flow 1106 includes water flow. For example, first fluid turbine 1102 and second fluid turbine 1108 may correspond to fluid turbines 104 of FIG. 1

In some disclosed embodiments, the at least one processor is further configured to transmit an additional signal for changing another of the first orientation of the first fluid turbine and the second orientation of the second fluid turbine to a fourth orientation. An additional signal refers to another signal, e.g., different than the prior signal. For example, in a first time period, at least one processor may receive an (e.g., first) indication of interference with downstream turbine operation. In response, the at least one processor may determine a third orientation for the first or second fluid turbine and transmit a signal associated therewith. In a second time period, the at least one processor may receive one or more additional (e.g., updated) indications of interference with downstream turbine operation, for instance, due to changed fluid flow conditions. In response, the at least one processor may determine a fourth orientation for the first or second fluid turbine and transmit an additional signal associated therewith. The additional signal may cause either the first or second fluid turbine to assume fourth orientation to mitigate the interference. In some disclosed embodiments, the third orientation and the fourth orientation enable the first fluid turbine and the second fluid turbine to produce a greater aggregate level of electrical energy than would be produced with the first fluid turbine in the first orientation and the second fluid turbine in the second orientation. For example, due to changing fluid flow conditions, the current orientations of the first and second fluid turbines may be sub-optimal, and changing the orientation of the first and/or second fluid turbine may increase the overall exposure of the first and second fluid turbines to the fluid flow. Consequently, causing the first and second fluid turbine to assume the third and fourth orientations may increase the aggregate level of electrical energy produced. In some instances, the at least one processor may change the orientations of both the first fluid turbine and the second fluid turbine in response to receiving one or more indications. In some instances, the at least one processor may change the orientation of only the first fluid turbine a plurality of times, or change the orientation of only the second fluid turbine a plurality of times in response to receiving one or more of indications. In some instances, the at least one processor may change the orientations of each of the first fluid turbine and the second fluid turbine a plurality of times in response to receiving one or more indications. For example, depending on the direction of fluid flow, during different times of the day, month, and/or year, certain orientations may enable the first and second fluid turbines to produce greater aggregate level of electric energy production than other orientations. The at least one processor may continually and/or regularly modify the orientation of the first and/or second fluid turbine to accommodate changing fluid flow conditions, and thereby mitigate the interference on the downstream operation of the second fluid turbine in a continual and/or regular fashion.

In some disclosed embodiments, the fourth orientation corresponds to the first orientation or the second orientation. For example, moving the first fluid turbine from the third orientation to the fourth orientation may revert the first fluid turbine back to the first orientation. Similarly, moving the second fluid turbine from the third orientation to the second orientation may revert the second fluid turbine back to the second orientation.

By way of a non-limiting example, in FIG. 13, initially, first fluid turbine 1202 may assume first orientation 1320 and second fluid turbine 1206 may assume second orientation 1322. Subsequently, at least one processor (e.g., processor 428 of FIG. 4 and/or processor 512 of FIG. 5) may receive an indication of interference with downstream turbine operation. For example, first fluid turbine 1202 assuming first orientation 1320 may obstruct fluid flow 1212 from reaching second fluid turbine 1206 assuming second orientation 1322, thereby causing second fluid turbine 1206 to generate less electrical energy. In response to the indication, the at least one processor may transmit a signal to move first fluid turbine 1202 to a third orientation 1324. In addition, the at least one processor may transmit an additional signal for changing the orientation of second fluid turbine to fourth orientation 1326. Third orientation 1324 and fourth orientation 1326 may enable first fluid turbine 1202 and second fluid turbine 1206 to produce a greater aggregate level of electrical energy than would be produced with first fluid turbine 1202 in first orientation 1320 and second fluid turbine 1206 in second orientation 1322. For example, while first fluid turbine 1202 assumes third orientation 1324 and second fluid turbine 1206 assumes fourth orientation 1326, each of first fluid turbine 1202 and second fluid turbine 1206 may receive fluid flow 1212, permitting each of first fluid turbine 1202 and second fluid turbine 1206 to covert fluid flow 1212 to electrical energy.

In some embodiments, the fourth orientation corresponds to the first orientation or the second orientation. For example, after moving first fluid turbine 1202 to third orientation 1324, the at least one processor may return first fluid turbine 1202 to first orientation 1320, and thus first orientation 1320 may correspond to the fourth orientation. Additionally or alternatively, after moving second fluid turbine 1206 to fourth orientation 1326, the at least one processor may return second fluid turbine 1206 to second orientation 1322. The at least one processor may continually update the orientations of first and second fluid turbines 1202 and 1206 in response to updated indications of interference with downstream turbine operation.

In some embodiments, the at least one processor may employ one or more artificial intelligence techniques to maneuver any of motors 1224 of FIG. 12, and/or motors 1312 and 1310 of FIG. 13. In some embodiments, one or more of motors 1224, motors 1312, and/or 1310 may be incorporated within a robotic mechanism, e.g., to enable automated maneuvering of any of fluid turbines 1202 and 1206. In some embodiments, the at least one processor may maneuver fluid turbine 1202 and/or 1206 absent a track, e.g., for free maneuvering. In some embodiments, the width of any of tracks 1210, 1302, and/or 1306 may be less than or equal to a turbine diameter (as described elsewhere herein) of turbines 1202 and/or 1206, e.g., to enable positioning fluid turbine 1202 and/or 1206 in a compact manner.

Some disclosed embodiments involve a plurality of additional fluid turbines, wherein some of the additional fluid turbines are adjustable to mitigate interference with downstream turbine operation. A plurality of additional fluid turbines refers to at least third and fourth fluid turbines, and/or any other number of fluid turbines. Some of the additional fluid turbines are adjustable to mitigate interference with downstream turbine operation refers to some of the additional fluid turbines being moveable (e.g., via translation for vertical fluid turbines, or by changing an orientation of a blade axis for horizontal fluid turbines) to mitigate the interference with the downstream operation of the second fluid turbine or any of the additional fluid turbines. For example, at least one processor may operate one or more additional motors to move one or more of the additional fluid turbines to increase the exposure of additional downstream fluid turbines to a fluid flow.

Figure 15:
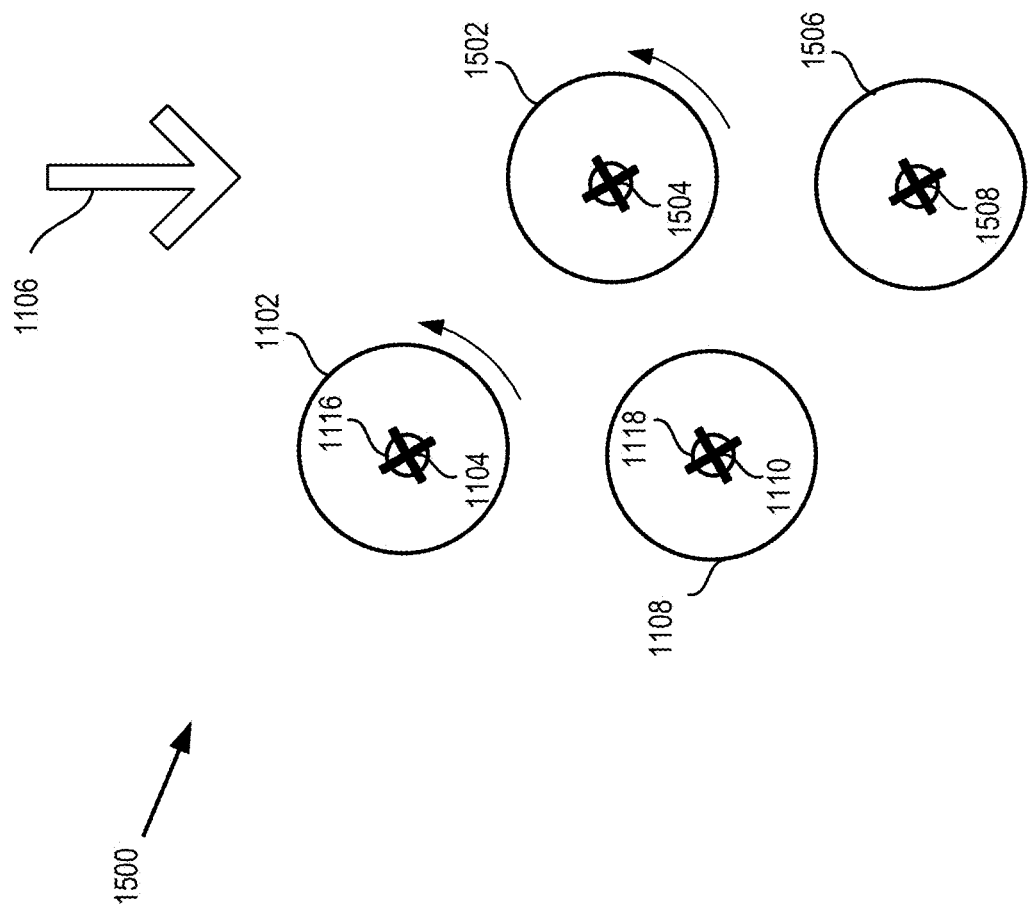
FIG. 15 illustrates a top view of a cluster of fluid turbines, consistent with some embodiments of the present disclosure.

By way of a non-limiting example, reference is made to FIG. 15 illustrating a top view of a cluster 1500 of fluid turbines, consistent with some embodiments of the present disclosure. FIG. 15 is substantially similar to FIG. 11A with the noted difference that cluster 1500 includes first fluid turbine 1102 assuming first orientation 1104 and second fluid turbine 1108 assuming second orientation 1110, and additionally includes a third fluid turbine 1502 assuming a fifth orientation 1504 and a fourth fluid turbine 1506 assuming a sixth orientation 1506. Third fluid turbine 1502 and/or fourth fluid turbine 1506 may be adjustable to mitigate interference with downstream turbine operation, as described elsewhere herein. For example, the at least one processor may cause third fluid turbine 1502 to move to the right relative to fourth fluid turbine 1506 and/or move fourth fluid turbine 1506 to move to the right relative to third fluid turbine 1502 to thereby improve the exposure of fourth fluid turbine 1506 to fluid flow 1106.

In some instances, an offshore cluster fluid turbines may be supported using one or more floating platforms to convert offshore wind to electrical energy. Disclosed embodiments may involve manipulating the orientations of one or more fluid turbines in an offshore cluster to mitigate interference with downstream turbine operation by changing the orientations of one or more of the associated floating platforms. For example, each of floating platform may be anchored to the seabed using one or more connections, such as one or more chains, cables, and/or anchors. One or more motors may be provided for manipulating the connections, e.g., by exerting a pulling force to shorten a connection and/or releasing force to lengthen a connection, causing the orientation of the floating platform to change. Upon receiving an indication of interference with downstream turbine operation of a particular fluid turbine in an offshore cluster, at least one processor may determine a different (e.g., third) orientation for the floating platform of the particular fluid turbine or of a neighboring fluid turbine to mitigate the interference. The at least one processor may transmit one or more signals to the one or more motors, causing the motors to manipulate the associated connections and the orientation of the targeted platform to the different (e.g., third) orientation. For example, the at least one processor may cause a floating platform to rotate, thereby changing the orientation of the fluid turbine relative to a direction of fluid flow. As another example, the at least one processor may cause the floating platform to shift to a new geographic location (e.g., new geographic coordinates).

Figure 16:
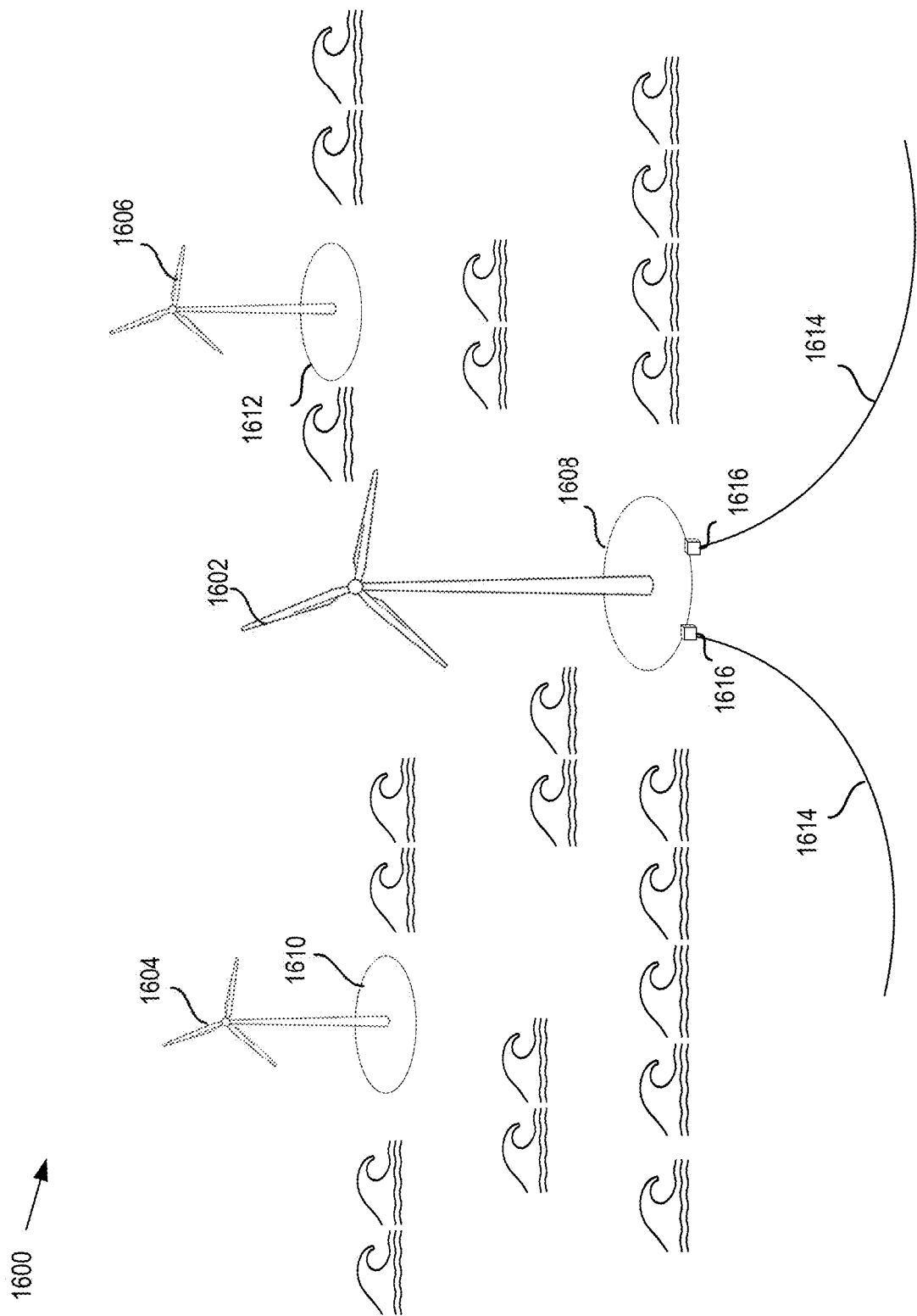
FIG. 16 illustrates an exemplary system for altering orientations of a cluster of offshore fluid turbines, consistent with some embodiments of the present disclosure.

By way of a non-limiting example, reference is made to FIG. 16, illustrating an exemplary system for altering orientations of a cluster 1600 of offshore fluid turbines, consistent with some embodiments of the present disclosure. Cluster 1600 includes three fluid turbines 1602, 1604, and 1606, each supported by a different floating platform 1608, 1610, and 1612, respectively. Each of floating platforms 1608, 1610, and 1612 may be anchored to the seabed via one or more connections, such as connections 1614 anchoring platform 1608 supporting fluid turbine 1602. At least one processor (e.g., processor 428 of FIG. 4 and/or processor 512 of FIG. 5) may transmit a signal to one or more motors 1616 to maneuver connections 1614 (e.g., by releasing and/or extending connections 1614) and thereby change the orientation of fluid turbine 1602 relative to fluid turbines 1604 and/or 1606.

Figure 17:
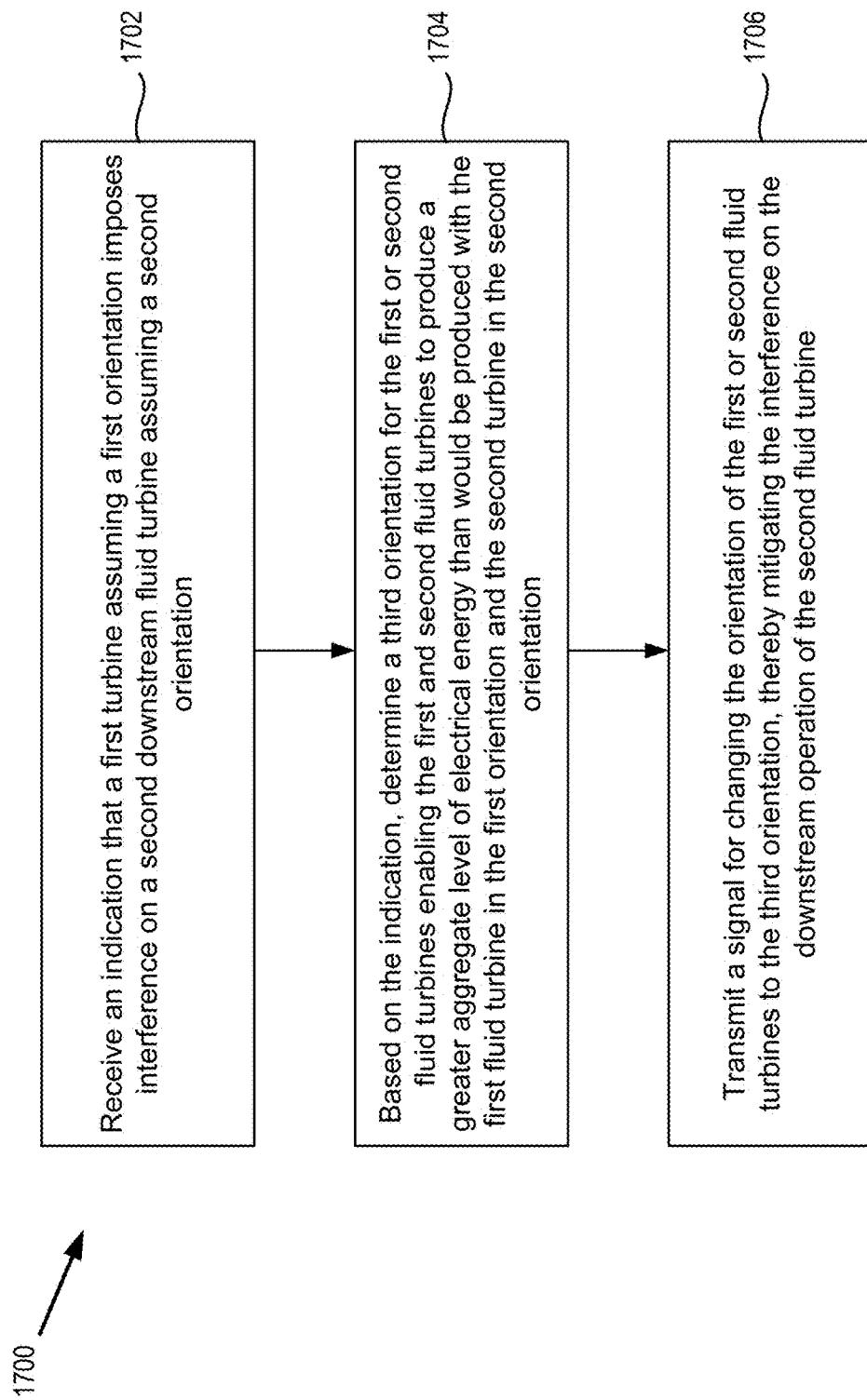
FIG. 17 is a flowchart of example process for altering orientation of fluid turbines within a cluster, consistent with embodiments of the present disclosure.

FIG. 17 is a flowchart of example process 1700 for altering orientation of fluid turbines within a cluster, consistent with embodiments of the present disclosure. In some embodiments, process 1700 may be performed by at least one processor (e.g., processor 512 shown in FIG. 5 and/or processor 428 shown in FIG. 4) to perform operations or functions described herein. In some embodiments, some aspects of process 1700 may be implemented as software (e.g., program codes or instructions) that are stored in a memory (e.g., memory 514 and/or 430) or a non-transitory computer readable medium. In some embodiments, some aspects of process 1700 may be implemented as hardware (e.g., a specific-purpose circuit). In some embodiments, process 1700 may be implemented as a combination of software and hardware.

Referring to FIG. 17, process 1700 may include a step 1702 of receiving an indication that a first fluid turbine imposes interference on a downstream operation of a second fluid turbine when the first fluid turbine assumes a first orientation relative to a direction of fluid flow and the second fluid turbine assumes a second orientation relative to the first orientation of the first fluid turbine. At least one of the first orientation of the first fluid turbine and the second orientation of the second fluid turbine may be selectively adjustable to mitigate interference with downstream turbine operation.

By way of a non-limiting example, in FIG. 11A, at least one processor (e.g., processor 428 of FIG. 4 and/or processor 512 of FIG. 5) may receive an indication that first fluid turbine 1102 imposes interference on a downstream operation of second fluid turbine 1108 when the first fluid turbine 1102 assumes first orientation 1104 relative to a direction of fluid flow 1106 and second fluid turbine 1108 assumes second orientation 1110 relative to first orientation 1104 of first fluid turbine 1102. At least one of first orientation 1104 of first fluid turbine 1102 and second orientation 1110 of second fluid turbine 1108 is selectively adjustable to mitigate interference with downstream turbine operation.

Process 1700 may include a step 1704 of determining, based on the indication, a third orientation for one of the first fluid turbine and the second fluid turbine, the third orientation enabling the first fluid turbine and the second fluid turbine to produce a greater aggregate level of electrical energy than would be produced with the first fluid turbine in the first orientation and the second turbine in the second orientation.

By way of a non-limiting example, in FIGS. 11B-11C, based on the indication, at least one processor (e.g., processor 428 of FIG. 4 and/or processor 512 of FIG. 5) may determine a third orientation (e.g., orientation 1114 in FIG. 11C and orientation 1112 in FIG. 11B) for first fluid turbine 1102 and/or second fluid turbine 1108, respectively. Orientation 1114 for first fluid turbine 1102 and/or orientation 1112 for second fluid turbine 1108 may enable first fluid turbine 1102 and second fluid turbine 1108 to produce a greater aggregate level of electrical energy than would be produced with first fluid turbine 1102 in first orientation 1104 and second turbine 1108 in second orientation 1110. Thus, for example, first fluid turbine 1102 and second fluid turbine 1108 may be producing a first aggregate level of electrical energy when first fluid turbine 1102 is in first orientation 1104 and second fluid turbine 1108 is in second orientation 1110. After moving one of first fluid turbine 1102 or second fluid turbine 1108 to the third orientation (e.g., orientation 1114 in FIG. 11C or orientation 1112 in FIG. 11B), first fluid turbine 1102 and second fluid turbine 1108 may produce a second aggregate level of electrical energy that may be greater than the first aggregate level of electrical energy.

Process 1700 may include a step 1706 of transmitting a signal for changing one of the first orientation of the first fluid turbine and the second orientation of the second fluid turbine to the third orientation, thereby mitigating the interference on the downstream operation of the second fluid turbine.

By way of a non-limiting example, in FIGS. 11B-11C, at least one processor (e.g., processor 428 of FIG. 4 and/or processor 512 of FIG. 5) may transmit a signal for changing first orientation 1104 of first fluid turbine 1102 to orientation 1114 (FIG. 11C) or for changing second orientation 1110 of second fluid turbine 1108 to orientation 1112, thereby mitigating the interference on the downstream operation of second fluid turbine 1108. For example, transmitting the signal may cause a mechanical device and/or actuator to move the first fluid turbine 1102 and/or the second fluid turbine 1108, which in turn may cause mitigation of the interference.

The blade motion of fluid turbines may generate different zones of higher and/or lower pressure. In some instances, overlapping such pressure zones of adjacent fluid turbines may facilitate blade rotation, thereby increasing total aggregate power output. However, in other instances, overlapping pressure zones of adjacent fluid turbines may hamper blade rotation, thereby decreasing total aggregate power output.

Embodiments are disclosed for coordinating the rotations of adjacent turbines in a manner to increase total aggregate power output.

The blade shape and motion may create zones of higher and lower pressure in their vicinity. These pressure differences may lead to corresponding zones of greater/lesser wind speed. When relatively low pressure zones associated with geographically adjacent turbines overlap, the pressure differential, and thus the fluid speed differential, between the front and back of a turbine blade of one or more adjacent turbines may increase more than for non-adjacent turbines (e.g., preventing overlap of associated low pressure zones) and/or absent coordination causing overlap of low pressure zones. As with fluids, power may be proportional to the velocity cubed. Thus, a burst of higher fluid speed (e.g., due to overlapping pressure zones) may carry more energy for converting to electrical energy than when absent an overlap of lower pressure zones.

Some disclosed embodiments involve a non-transitory computer readable medium containing instructions that when executed by at least one processor cause the at least one processor to perform operations for coordinating rotation of adjacent turbines. Coordinating rotation of adjacent turbines involves controlling, synchronizing, and/or adjusting one or more rotational cycles of at least two geographically associated fluid turbines. For example, at least one processor may slow and/or accelerate a rotational velocity of one or more adjacent fluid turbine (e.g., temporarily and/or continuously) to correlate the respective rotational cycles. The fluid turbines may be sufficiently close to permit fluid coupling therebetween, such that coordinating their respective rotations may affect characteristics of the fluid coupling. For example, coordinating rotation of adjacent turbines may involve coordinating and/or modifying the relative locations of one or more higher and/or lower pressure zones generated by each fluid turbine at specific times, e.g., to cause. some pressure zones to at least partially overlap, or separate from each other at specific points in time. In some situations, causing, two or more lower pressure zones to at least partially overlap at specific points in time may produce a lower-pressure zone capable of exerting a greater fluid pressure force for promoting blade rotation, thereby permitting greater aggregate power output that would be produced absent the coordination. Additionally or alternatively, coordinating rotation of two of more adjacent fluid turbines may prevent a relatively higher pressure zone associated with a first turbine from overlapping and/or otherwise interfering with a relatively lower pressure zone associated with a second, adjacent fluid turbine. In this case, the coordination may prevent an increase in fluid pressure in one or more relatively lower fluid pressure zones, to thereby prevent a reduction in a fluid pressure force promoting blade rotation, thereby preventing a loss in aggregate power output. In some embodiments, the coordination may involve applying one or more blade position and/or orientation parameters.

Figure 18:
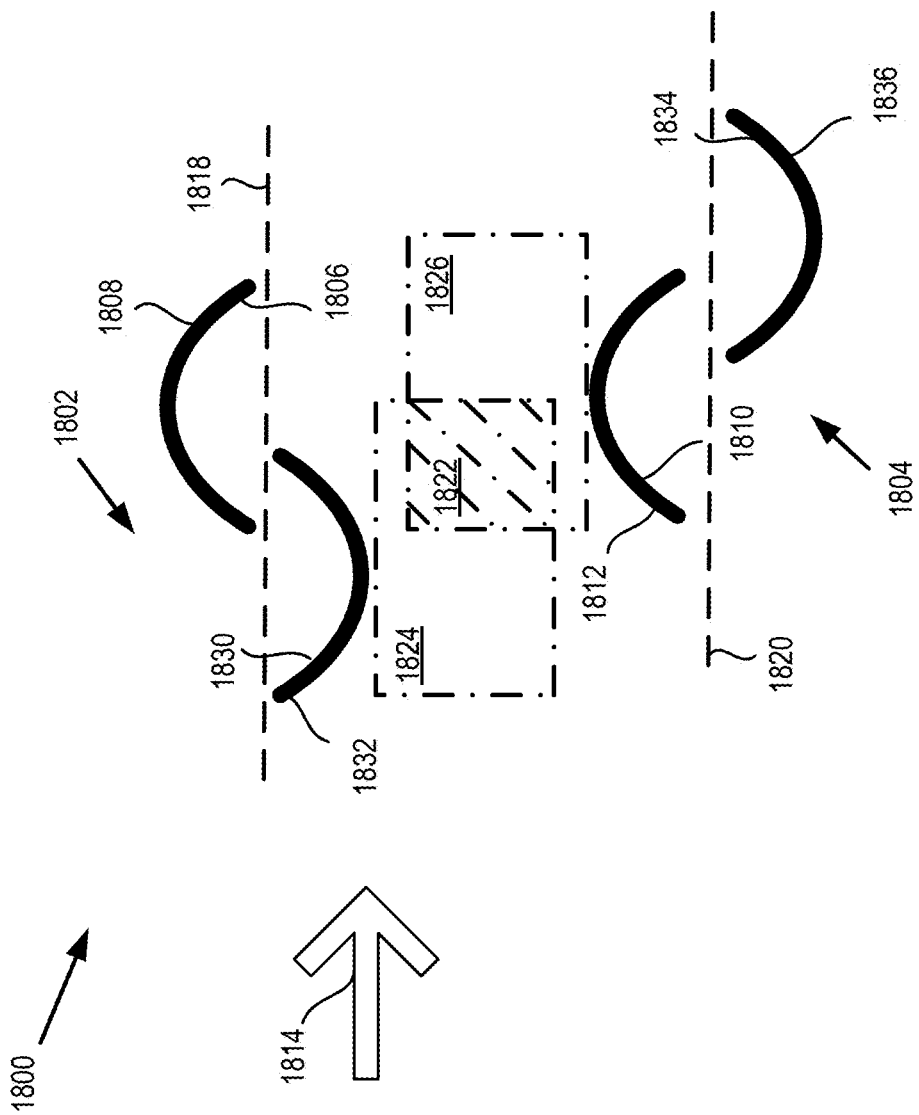
FIG. 18 illustrates an exemplary system for coordinating rotation of adjacent turbines, consistent with some embodiments of the present disclosure.

By way of a non-limiting example, reference is made to FIG. 18, illustrating an exemplary system 1800 for coordinating rotation of adjacent turbines, consistent with some embodiments of the present disclosure. System 1800 includes top views of a first fluid turbine 1802 and an adjacent second fluid turbine 1804. Fluid turbines 1802 and 1804 may correspond to any of fluid turbines 100 to 112 of FIG. 1 and/or fluid turbines 404A and 404B of FIG. 4. At least one processor (e.g., processor 428 of FIG. 4 and/or processor 512 of FIG. 5) may coordinate rotation of adjacent fluid turbines 1802 and 1804. In some embodiments, first fluid turbine 1802 and second fluid turbine 1804 may be associated with one or more sensors (e.g., at least one sensor 418 of FIG. 5) for providing rotational orientation information to the at least one processor. In addition, first fluid turbine 1802 and second fluid turbine 1804 may be associated with one or more charge controllers (e.g., charge controller 410) and/or braking systems (e.g., brake 432 of FIG. 4 and/or braking circuit 1000 of FIG. 10). The at least one processor may use the charge controller and/or braking system to adjust a rotational speed of first fluid turbine 1802 and/or second fluid turbine 1804 to coordinate the respective rotational cycles. The adjustment may correlate the rotational cycles of first fluid turbine 1802 and second fluid turbine 1804. In some embodiments, at least one processor may monitor power produced by each turbine over time and adjust a load associated with one or more turbines to coordinate blade rotation, thereby improving power output.

Some disclosed embodiments involve receiving first rotational orientation information from a first fluid turbine having a least one first open concave surface with at least one corresponding first convex surface. Receiving refers to obtaining, acquiring, and/or otherwise gaining access to, e.g., information. For example, at least one processor may receive rotational orientation information from one or more sensors associated with a fluid turbine via a wired and/or wireless communications channel. Rotational orientation information refers to characteristics and/or particulars relating to the turning, spinning motion, instantaneous blade orientation, acceleration, and/or speed of a fluid turbine. Some examples of rotational orientation information may include a rotational velocity, an angular acceleration, the (e.g., relative) angular location of one or more blades, a rotation direction (e.g., clockwise, or counterclockwise), a phase (e.g., relative to a direction of fluid flow and/or relative to a blade of another fluid turbine at one or more time instances), a state of a braking system and/or an associated load for adjusting rotational speed, and/or any other information associated with a spinning motion of a fluid turbine. A phase may refer to a relationship in time between the rotational cycles of two or more fluid turbines. If the rotational cycles of two or more fluid turbines are in alignment, e.g., the fluid turbines rotate at the same rotational velocity, and at any given point in time, the respective concave and convex blade surfaces of each fluid turbine face the same direction, the two fluid turbines may be rotating in phase. By contrast, if the respective concave and convex blade surfaces of each fluid turbine face different directions at a given point in time, the two of more fluid turbines may be out of phase. In some embodiments, rotational orientation information may include an average over a time frame, e.g., to account for fluctuations. An open concave surface refers to an exposed outer layer that is recessed, incurved, and/or bowl-shaped. A corresponding convex surface refers to a related and/or associated outer layer that is bulging, outcurved, and/or protruding. For example, a cup-shaped object may present an open concave surface on one side, and a corresponding convex surface on the opposite side. A fluid turbine having a least one open concave surface with at least one corresponding convex surface may include a turbine blade, such as an airfoil or hydrofoil. The turbine blade may include a cup-shaped surface. One side of a turbine blade may present an open concave surface (e.g., for receiving a fluid flow), and the opposite side of the turbine blade may present a corresponding convex surface (e.g., for deflecting a fluid flow). The concave and convex sides of the turbine blade may each interact differently with a fluid flow. For example, a concave surface may be associated with relatively higher fluid pressure, and a convex surface may be associated with relatively lower fluid pressure. Due to the tendency of fluid to flow from a higher pressure zone to a lower pressure zone, the pressure differential may exert a force causing the turbine blade to rotate about a shaft. Alternatively, a concave surface may be associated with a change in fluid flow direction, causing a change in momentum which may cause a turbine blade to rotate. Receiving rotational information from a fluid turbine refers to receiving information about how a turbine rotates and/or radial positions of turbine blades. For example, rotational information may be digitally encoded and received from a transceiver associated with a fluid turbine via a wired and/or wireless communications channel. One or more sensors associated with a fluid turbine may detect rotational orientation information and transmit the information to at least one processor, e.g., continually and/or periodically based on a schedule and/or on changing fluid flow conditions.

Some disclosed embodiments involve receiving second rotational orientation information from a second fluid turbine having a least one second open concave surface with at least one corresponding second convex surface. Receiving second rotational orientation information from a second fluid turbine having a least one second open concave surface with at least one corresponding second convex surface may be understood as described above, for an additional (e.g., second) fluid turbine geographically associated with the first fluid turbine. In some embodiments, the first and second fluid turbine may be sufficiently close to permit fluid coupling therebetween, e.g., as in a cluster of fluid turbines. Fluid coupling may cause the rotation of the first fluid turbine to influence the rotation of the second fluid turbine, and vice-versa. In such a case, the first rotational orientation information may be associated with the second rotational orientation information.

In some embodiments, at least one processor may receive rotational orientation information (e.g., periodically, or continually) from a plurality of sensors associate with the first and/or second fluid turbines. The plurality of sensors may include different types of sensors and/or similar sensors, each associated with different fluid turbines. Such sensors may include, for example, a shaft and/or blade rotation sensor, such as a tachometer, a magneto-resistive sensor, an inductive sensor, a Hall effect, an oscillatory sensor (e.g., measuring vibrations when the RPM exceeds a threshold), an optical sensor, an ultrasonic sensor, a digital positioning sensor (e.g., an accelerometer, magnetometer, and/or gyroscope), and/or a piezoelectric sensor. Such sensors may additionally include, for example, an AC voltage output sensor, where the frequency and/or phase of the AC signal may correspond to a frequency and/or phase of blade rotation (e.g., accounting for adjustments by one or more associated gears, loads, and/or braking systems). In some embodiments, the first and/or second rotational orientation information may be associated with an application of an MPPT protocol causing adjustments to the rotational speed of the first and/or second fluid turbine for a particular fluid speed to achieve a peak or near-peak power output, as described elsewhere herein.

By way of a non-limiting example, in FIG. 18, first fluid turbine 1802 may include a least one first open concave surface 1806 with at least one corresponding first convex surface 1808, and second fluid turbine 1804 may include a least one second open concave surface 1810 with at least one corresponding second convex surface 1812. At least one processor (e.g., processor 428 of FIG. 4 and/or processor 512 of FIG. 5) may receive first rotational orientation information from first fluid turbine 1802 and receive second rotational orientation information from second fluid turbine 1804. For example, the at least one processor may receive the first and/or second rotation orientation information as rotation data (e.g., including rotation speed and/or phase) from one or more rotation sensors (e.g., rotation sensor 502 of FIG. 5), as an AC power signal indicating rotation frequency and/or phase from one or more power output sensors (e.g., power output sensor 510), as image data from one or more image sensors (e.g., image sensor 524), and/or as information from any other sensor that may be used to determine rotational orientation information.

In some disclosed embodiments, the first rotational orientation information and the second rotational orientation information are respectively received from the first turbine and second turbine spaced between one and two turbine diameters apart. A turbine diameter refers to a cross-sectional size of a fluid turbine and may be measured in centimeters, meters, inches, feet, and/or any other unit for measuring distance. In some embodiments, a turbine diameter may correspond to two blade lengths (e.g., for a horizontal fluid turbine), and/or twice the maximal distance between a blade and a turbine shaft (e.g., for a vertical fluid turbine). A turbine diameter may determine how closely two or more fluid turbines may be installed in proximity to each other without interfering with the respective operation of an adjacent fluid turbine. A first fluid turbine and second fluid turbine spaced apart refers to two fluid turbines positioned in a manner that leaves a gap in between. The gap may be measured as a number of turbine diameters (e.g., at least 0.5, 1, 1.5, 2 and/or at least any other number of turbine diameters), centimeters, meters, inches, feet, and/or any other unit of distance. A first turbine and second turbine spaced between one and two turbine diameters apart refers to positioning the first and second fluid turbines such that the gap separating them is between one and two turbine diameters. Such a positioning may permit the first and second fluid turbines to spin freely without physically colliding with each other, while permitting fluid coupling therebetween. For example, spacing a first and second fluid turbine by between one and two turbine diameters may permit differing pressure zones generated by each spinning turbine to at least partially overlap and/or disassociate from each other. In some embodiments, the first and second turbines may be spaced apart by less than a turbine diameter, such as between 0.1 to 0.2 turbine diameters, between 0.1 to 0.3 turbine diameters, between 0.1 to 0.5 turbine diameters, between 0.1 to 0.7 turbine diameters, or between 0.1 and 1 turbine diameters, any by other fraction of a turbine diameter.

Figure 19:
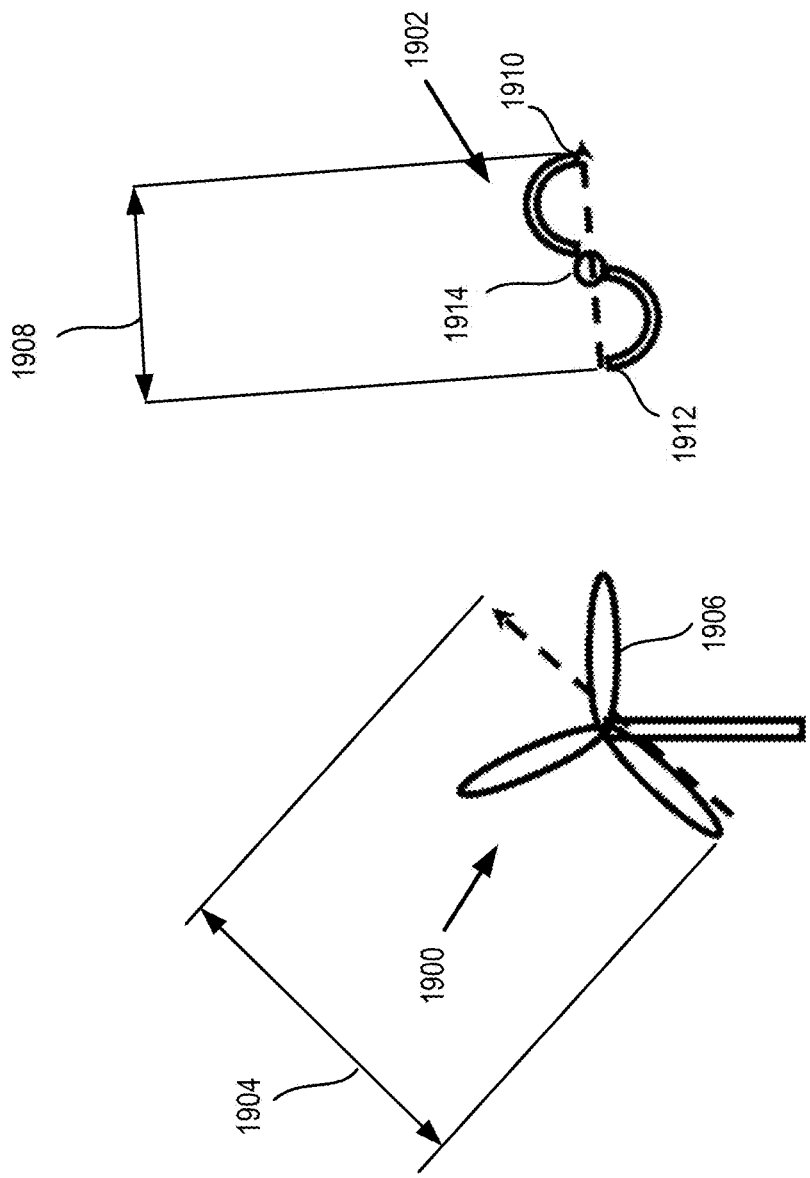
FIG. 19 illustrates exemplary turbine diameters associated with a horizontal fluid turbine and a vertical fluid turbine, consistent with some embodiments of the present disclosure.

By way of a non-limiting example, reference is made to FIG. 19 illustrating exemplary turbine diameters associated with a horizontal fluid turbine 1900 and a vertical fluid turbine 1902, consistent with some embodiments of the present disclosure. Horizontal fluid turbine 1900 may be associated with a turbine diameter 1904, where half the length of turbine diameter 1904 may correspond to a length of blade 1906. Vertical fluid turbine 1902 may be associated with a turbine diameter 1908, which may extend from an end of a first blade 1910 to an end of a second blade 1912 (e.g., twice the maximal distance between any of blades 1910 and 1912 and a central turbine shaft 1914). Turbine diameters 1904 and/or 1908 may be measured in centimeters, meters, inches, feet, or any other unit for measuring distance.

By way of another non-limiting example, in FIG. 18, at least one processor (e.g., processor 428 of FIG. 4 and/or processor 512 of FIG. 5) may receive the first rotational orientation information and the second rotational orientation information from first turbine 1802 and second turbine 1804 spaced between one and two turbine diameters apart, (e.g., between one and two turbine diameters 1904 or between one and two turbine diameters 1908).

Some disclosed embodiments involve receiving fluid flow direction information indicating a direction of fluid flow relative to the first fluid turbine and the second fluid turbine. Fluid flow direction information refers to characteristics, details, and/or particulars relating to a bearing, trajectory and/or course of a fluid flow (as described elsewhere herein). Fluid flow direction information may be expressed using the points of a compass (e.g., north, south, east, and/or west) degrees (e.g., 0 degrees for north, and 90 degrees for east), and/or any other unit for measuring direction. In some embodiments, fluid flow direction information may include an average fluid flow direction over a time frame, e.g., to account for fluctuations. A direction of fluid flow relative to a fluid turbine refers to a bearing of a fluid flow compared to a bearing and/or orientation of a fluid turbine and/or one or more associated turbine blades. For example, a fluid flow may be transverse or parallel to a turbine blade, or may have any other orientation compared to a turbine blade. A direction of fluid flow relative to a fluid turbine may indicate when and/or if an open concave surface and corresponding convex surface of the fluid turbine are orientated to at least partially receive and/or deflect the fluid flow. In some embodiments, a direction of fluid flow relative to a fluid turbine may be used to determine information associated with one or more high and/or low fluid pressure zones generated from an interaction between a fluid flow and one or more turbine blades (e.g., including an open concave surface and corresponding convex surface). Such information may include a size and/or location of one or more higher/lower pressure zones at different times and/or stages of a rotational cycle of a fluid turbine. At least one processor may use a direction of fluid flow relative to each of the first and second fluid turbines to determine fluid flow interactions there between, such as the generation of differing fluid pressure zones affecting the first and/or second fluid turbines. For example, the at least one processor may determine a size and/or location of one or more higher and/or lower pressure zones, a time, a phase in a rotation cycle, and/or duration that such higher and/or lower pressure zones may persist, and/or any other characteristics of a fluid flow interacting with two adjacent fluid turbines.

In some disclosed embodiments, the fluid flow is wind. Wind refers to a flow of air from a higher pressure zone to a lower pressure zone. When a fluid flow is wind, the first and second fluid turbines may be wind turbines. The wind turbines may be horizontal or vertical wind turbines.

In some disclosed embodiments, the fluid flow is water. A water fluid flow water may include flow in an ocean, stream, waterfall, dam release and/or river. When a fluid flow is water, the first and second fluid turbines may be water turbines. In some embodiments, the fluid flow is gas or steam and the first and second fluid turbines are gas turbines or steam turbines, respectively.

By way of a non-limiting example, in FIG. 18, at least one processor (e.g., processor 428 of FIG. 4 and/or processor 512 of FIG. 5) may receive fluid flow direction information indicating a direction of a fluid flow 1814 relative to first fluid turbine 1802 and second fluid turbine 1804. For example, the at least one processor may receive fluid flow information from a fluid speed sensor (e.g., fluid speed sensor 504) associated with first fluid turbine 1802 and/or second fluid turbine 1804. In some embodiments, fluid flow 1814 may be wind. For example, first and second fluid turbines 1802 and 1804 may be wind turbines (e.g., any of turbines 100, 102, 106, 108, 110, and/or 112 of FIG. 1). In some embodiments, fluid flow 1814 may be water. For example, first and second fluid turbines 1802 and 1804 may be water turbines (e.g., water turbine 104 of FIG. 1). In some embodiments, the fluid flow may be gas and first and second fluid turbines 1802 and 1804 are gas turbines. In some embodiments, the fluid flow may be steam and first and second fluid turbines 1802 and 1804 are steam turbines.

Some disclosed embodiments involve calculating at least one rotational speed adjustment for at least one of the first fluid turbine and the second fluid turbine. A rotational speed (e.g., of a fluid turbine) refers to the spinning rate of the turbine's blades about an axis and/or shaft. A rotational speed may be measured as revolutions per second (Hz), revolutions per minute (RPM), meters per second (mps), and/or any other units for measuring rotational motion. Calculating a rotational speed adjustment refers to determining and/or computing a change, modification, and/or alteration to the rotational speed. A rotational speed adjustment may refer to a correction and/or modification to a rotational speed of one or more fluid turbines. A rotational speed adjustment may include information indicating by how much to slow or speed up a rotation of a fluid turbine, at what time and/or at which phase of blade rotation (e.g., a start time, a duration, and/or a stop time). In some embodiments, a rotational speed adjustment may additionally include, for example, a selection of a braking system and/or charge controller for slowing and/or increasing a rotational speed, a level and/or timing for engaging and/or releasing a braking system, and/or a level and/or timing for diverting electrical energy to a load via a charge controller. At least one processor may apply a rotational speed adjustment to a fluid turbine by at least partially engaging and/or releasing a braking system and/or by increasing and/or decreasing an associated load to cause a corresponding slowing and/or acceleration in rotational speed at the selected time for the selected duration. In some embodiments, at least one processor may adjust a rotational speed of one or more fluid turbines in an iterative manner, e.g., based on feedback information received from one or more sensors associated with the first and/or second fluid turbines. In such a case, the at least one processor may calculate a plurality of rotational speed adjustments.

For example, a rotational speed adjustment may cause the blades of two or more fluid turbines to spin in tandem relative to a fluid flow, such that the open concave surfaces and corresponding convex surfaces of different turbines may be (e.g., substantially) simultaneously synchronized to face the same direction relative to a fluid flow. Depending on turbine and system design, the rotational speed adjustment may coordinate blade rotation in some other manner, including manners that are out of sync but that nevertheless accomplish a goal of increased energy output or increased aggregate energy output. In some embodiments, at least one processor may determine a rotational speed adjustment for a limited time period and/or for an undefined time period, e.g., to adjust a phase of blade rotation and to continually synchronize the blade rotation with one or more other fluid turbines. In some embodiments, calculating a rotational speed adjustment includes applying an MPPT protocol to one or more fluid turbines. In some embodiments, calculating a rotational speed adjustment may involve applying one or more of a predictive model and/or history of fluid flows, a predictive model and/or history of high and/or low pressure zone distributions, machine learning, deep learning, and/or artificial intelligence.

Some disclosed embodiments involve causing, at instantaneous times, the first open concave surface, the first convex surface, the second open concave surface, and the second convex surface to be simultaneously transverse to the direction of fluid flow. To cause refers to bring about, and/or to effect. Instantaneous times refers to very brief and/or short periods of time (e.g., less than one second, less than half a second, or less than any other fraction of a second). An instantaneous time may correspond to the amount of time a spinning blade of a fluid turbine is positioned at a specific orientation relative to a fluid flow. For example, an open concave surface of a spinning turbine blade may face directly into a fluid flow or transverse to a fluid flow at an instantaneous time corresponding to a fraction of a second. Simultaneously refers to substantially and/or approximately concurrently and/or at the same time, e.g., within a tolerance window. For example, the open concave surfaces and/or corresponding convex surfaces of two or more different fluid turbines may face a particular direction relative to a fluid flow at substantially the same time for a fraction of a second. If the fluid turbines are designed similarly, this may cause similar patterns of high and/or low pressure zones associated with each fluid turbine to be generated substantially simultaneously for a fraction of a second as well. Transverse to a direction of fluid flow refers to a non-parallel orientation ranging between crossing at an acute angle to perpendicular. Thus, transverse to a direction of fluid flow may include crossing, and/or intersecting a direction of fluid flow. A perpendicular crossing refers to substantially and/or approximately 90 degrees relative to a direction of fluid flow (within a tolerance level of +/−1°, +/−5°, +/−10°, +/−15°, or within another acceptable tolerance level that is substantially perpendicular). In some embodiments, coordinating blade rotation may produce a lower pressure zone oriented approximately 45 to an axis parallel or perpendicular to a fluid flow direction. An open concave surface and an (e.g., corresponding) convex surface transverse to a direction of fluid flow may refer to an exposed cup-shaped surface for receiving a fluid flow and a corresponding bulged surface for deflecting a fluid flow facing in a direction substantially perpendicular to the fluid flow. For example, when the open concave surface and convex surface of a turbine blade are transverse to a fluid flow, an axis drawn between two external blade tips of a turbine with two opposite facing blades may be approximately parallel to the direction of fluid flow. Blades of a fluid turbine may present different faces to a fluid flow at different phases of rotation. Some phases within a blade rotation may be associated with a higher level electrical energy production than other phases of a blade rotation. For example, a phase of rotation whereby a concave surface of a blade may be aligned substantially transverse to a fluid flow may be associated with a higher level of electrical energy production than a phase of rotation where the concave surface may be aligned other than transverse to the fluid flow (e.g., parallel to the fluid flow). The higher level of electrical energy production may be due to one or more lower pressure zones generated when the concave and corresponding convex surfaces of a turbine blade are substantially transverse to a fluid flow. Such lower pressure zones may exert a greater force for promoting blade rotation than other, non-transverse alignments between the concave and corresponding convex surfaces of a turbine blade and a fluid flow. For example, overlapping lower pressure zones associated with concave blade surfaces of adjacent fluid turbines may produce a greater fluid velocity for promoting blade rotation than non-overlapping lower pressure zones. Thus, coordinating blade rotation to promote and/or maintain one or more low pressure zones associated with adjacent fluid turbines, for example, by introducing an additional overlapping low pressure zone and/or by preventing the introduction of a higher pressure zone into the one or more lower pressure zones, may result in production of a higher level of aggregate electrical energy than would be produced absent the coordination.

To cause, at instantaneous times, the first open concave surface, the first convex surface, the second open concave surface, and the second convex surface to be simultaneously transverse to the direction of fluid flow refers to causing the curved blade surfaces of two fluid turbines to be oriented in a direction transverse to a fluid flow at substantially the same point in time. Thus, at least one processor may synchronize the rotations of the first and second fluid turbines (e.g., by applying one or more rotational speed adjustments) such that their respective blade surfaces are aligned approximately transverse to the direction of fluid flow substantially concurrently for a fraction of a second. The at least one processor may cause the concave and convex surfaces of the first and second fluid turbines to be simultaneously transverse to the direction of fluid flow, for example, by controlling the rotation of the first and/or second fluid turbines. For instance, the at least one processor may at least partially engage and/or release one or more braking systems and/or control how much electrical energy to divert to an associated load to thereby controllably slow and/or increase the rotational speed of the first and/or second fluid turbine, at a specific time and/or for a specific time duration. Controllably slowing and/or increasing a rotational speed of the first and/or second fluid turbine may permit the at least one processor to adjust a phase and/or rotational speed of the first and/or second fluid turbines, e.g., until the first and second fluid turbines rotate in tandem. Rotating in tandem may cause the concave surfaces and corresponding convex surfaces of the first and second fluid turbine to face the same direction at any given point in time. During at least one such instantaneous point in time, the concave surfaces, and corresponding convex surfaces of the first and second fluid turbine may face in a direction substantially transverse to the direction of a fluid flow. Such an alignment may permit overlapping of relatively low pressure zones associated with the first and second fluid turbines, and/or may prevent introduction of one or more associated higher pressure zones.

In some disclosed embodiments, each of the instantaneous times occur at least once per revolution of the first fluid turbine and the second fluid turbine. Once per revolution refers to one time per cycle, e.g., one time for each completion of a 360° rotation. Thus, for each complete revolution of the turbine blades of the first and second fluid turbines, the concave and corresponding convex blade surfaces of each fluid turbine may be oriented transverse to the direction of fluid flow at substantially the same time for a fraction of a second. Since each convex blade surface may be associated with a low pressure zone when oriented transverse to a fluid flow, positioning the first and second fluid turbines sufficiently close together may cause the low pressure zones associated with the first and second fluid turbines to at least partially overlap at least once per revolution, e.g., for a fraction of a second.

By way of a non-limiting example, in FIG. 18, at least one processor (e.g., processor 428 of FIG. 4 and/or processor 512 of FIG. 5) may calculate at least one rotational speed adjustment for at least one of first turbine 1802 and second turbine 1804, to cause, at instantaneous times, first open concave surface 1806, first convex surface 1808, second open concave surface 1810, and second convex surface 1812 to be simultaneously transverse to direction 1814 of fluid flow 1816. For example, the at least one processor may at least partially engage and/or release a brake (e.g., brake 432 of FIG. 4) at a specific time and/or for a specific duration to slow and/or increase a rotational speed of first turbine 1802 and/or second turbine 1804. Additionally or alternatively, the at least one processor may increase and/or decrease an amount of electrical energy diverted to a load (e.g., dump load 532 of FIG. 5) to slow and/or increase a rotational speed of first turbine 1802 and/or second turbine 1804 at a specific time and/or for a specific duration. Slowing and/or increasing a rotational speed for first turbine 1802 and/or second turbine 1804 may permit synchronizing the phase and/or rotational speed of first turbine 1802 and/or second turbine 1804 to cause first fluid turbine 1802 and second fluid turbine 1804 to rotate in tandem. Rotating in tandem may cause concave surfaces 1806 and 1810, and corresponding convex surfaces 1808 and 1812 of first fluid turbine 1802 and second fluid turbine 1804, respectively, to face the same direction at any given point in time. During at least one such point in time, concave surfaces 1806 and 1810, and corresponding convex surfaces 1808 and 1812 of first and second fluid turbines 1802 and 1804, respectively, may face in a direction transverse to direction of fluid flow 1814. For example, an axis 1818 extending between the tips of convex surfaces 1832 and 1808 of fluid turbine 1802 may be substantially parallel to direction of fluid flow 1814, indicating that first concave surface 1806 and corresponding first convex surface 1808 are transverse to direction of fluid flow 1814 at a particular instant in time. Similarly, an axis 1820 extending between the tips of convex surfaces 1812 and 1836 of fluid turbine 1804 may be substantially parallel to direction of fluid flow 1814, indicating that second concave surface 1810 and corresponding second convex surface 1812 are transverse to direction of fluid flow 1814 at the same particular instant in time.

In some embodiments, each of the instantaneous times occur at least once per revolution of first fluid turbine 1802 and second fluid turbine 1804. For example, as first fluid turbine 1802 and second fluid turbine 1804 spin, first concave surface 1806 and corresponding first convex surface 1808, and second concave surface 1810 and corresponding first convex surface 1812 may be oriented transverse to direction of fluid flow 1814 one time per revolution for an instant in time. In addition, after first fluid turbine 1802 and second fluid turbine 1804 rotate by 180°, first concave surface 1806 and corresponding first convex surface 1808, and second concave surface 1810 and corresponding first convex surface 1812 may again be oriented transverse to direction 1814 fluid flow 1814 one time per revolution for another instant in time. Thus, in some cases, the instantaneous times may occur at least twice per revolution of first fluid turbine 1802 and second fluid turbine 1804.

In some embodiments, a first and second fluid turbine may include more than two blades, e.g., at least three blades, at least four blades, or any other number of blades, and the number of instantaneous time that a curved surface and corresponding convex surfaces of two or more such fluid turbines are simultaneous transverse to a direction of a fluid flow may occur three or four, or any other number of times per revolution.

In some disclosed embodiments, the calculating is configured to cause at the instantaneous times a lower-pressure zone between the first fluid turbine and the second fluid turbine than would exist absent coordinated rotation by the at least one control signal. In the context an airfoil or hydrofoil, a lower-pressure zone may refer to a region and/or volume associated with (e.g., relatively) faster fluid velocity than other regions and/or areas. In some situations, causing two relatively low pressure zones to overlap may generate an even lower low-pressure zone or a more extensive low pressure zone or both. In such a case, fluid velocity in the lower or combined low-pressure zone, formed by combining and/or superimposing two relatively low pressure zones, may be faster than the fluid velocity in either of the two relatively low pressure zones, individually. In some situations, coordinating rotation of two of more adjacent turbines may prevent a relatively higher pressure zone associated with one turbine from overlapping and/or otherwise interfering with a relatively lower pressure zone associated with another, adjacent turbine. Such coordination may prevent fluid velocity from slowing in the relatively lower fluid pressure zone to thereby produce a reduced low-pressure zone having lower fluid pressure than would exist absent coordinated rotation. The phrase calculating is configured to cause at the instantaneous times a lower-pressure zone refers to determining (e.g., a rotational speed adjustment) to induce and/or promote the creation of a lower-pressure zone for an instant in time. For example, a convex surface of a turbine blade aligned transverse to a direction of fluid flow for a time instant may produce a relatively low pressure zone. Calculating a rotational speed adjustment to coordinate the rotations of first and second adjacent fluid turbines such that their respective open concave surfaces and corresponding convex surfaces are simultaneously transverse to a fluid flow direction may permit aligning the relatively low pressure zones generated by each of the fluid turbines to at least partially overlap for a time instant. The coordinating may reduce fluid pressure in a lower-pressure zone associated with the overlap as compared to the fluid pressure in each relatively low pressure zone produced by each fluid turbine individually. The phrase, than would exist absent coordinated rotation by the at least one control signal, refers to a situation where the rotations of the first and second fluid turbines are not coordinated using a control signal. For example, adjacent fluid turbines may rotate freely in response to a fluid flow, and/or may be subject to a load and/or braking system based on considerations other than to coordinate their respective rotations. In such a case, the fluid pressure in proximity to the first and second fluid turbines may be higher than what may be achievable using one or more control signals to coordinate the respective rotations.

Due to the tendency of fluid to move from a relatively high pressure zone to a relatively low pressure zone, a lower-pressure zone (e.g., produced by overlapping two relatively low pressure zones) may apply a greater force (e.g., as a suction and/or relative vacuum) for moving one or more turbine blades than may be applied by each individual relatively low pressure zones. Thus, generating a lower-pressure zone by adjusting the rotational speeds of the first and second fluid turbines to coordinate their respective rotations may permit producing a higher aggregate level of electrical energy than would be produced absent the adjustment. Thus, for example, the first fluid turbine and second fluid turbine may be producing a first aggregate level of electrical energy prior to adjustment of the rotational speed of the first and/or second fluid turbine. After adjustment of the rotational speed of the first and/or second fluid turbine to cause respective concave and convex surfaces to align transversely to a fluid flow, the first fluid turbine and second fluid turbine may produce a second aggregate level of electrical energy that may be greater than the first aggregate level of electrical energy.

By way of a non-limiting example, in FIG. 18, the calculating is configured to cause at the instantaneous times a lower-pressure zone 1822 between first fluid turbine 1802 and second fluid turbine 1804 than would exist absent coordinated rotation by the at least one control signal. For example, when oriented transverse to direction of fluid flow 1814 for a time instant, convex surface 1832 of first fluid turbine 1802 may produce a first low pressure zone 1824, and convex surface 1812 of second fluid turbine 1804 may produce a second low pressure zone 1826. First low pressure zone 1824 and second low pressure zone 1826 may correspond to low pressure zones produced by first fluid turbine 1802 and second fluid turbine 1804 absent coordinating the rotations of first and second fluid turbines 1802 and 1804. However, due to the proximity of first and second fluid turbines 1802 and 1804, first fluid turbine 1802 may be fluidly coupled to second fluid turbine 1804. The fluid coupling, in conjunction with coordinating the rotations of adjacent fluid turbines 1802 and 1804 may permit first low pressure zone 1824 to at least partially overlap with second low pressure zone 1826, to thereby produce a lower-pressure zone 1822 between first fluid turbine 1802 and second fluid turbine 1804. The fluid pressure in lower-pressure zone 1822 may be lower than the fluid pressure in either of first low pressure zone 1824 or second low pressure zone 1826. Lower-pressure zone 1822 may exert a greater force for causing first and second fluid turbines 1802 and 1804 to spin than a force exerted by first low pressure zone 1824 or a force exerted by second low pressure zone 1826, e.g., absent the coordinated rotation by the at least one control signal. Consequently, the coordinated rotation by the at least one control signal may permit first fluid turbine 1802 and second fluid turbine 1804 to produce a greater aggregated power output than would be produced absent the coordinated rotation by the at least one control signal.

Some disclosed embodiments involve outputting at least one control signal embodying the rotational speed adjustment to thereby regulate rotation of at least one of the first fluid turbine and the second fluid turbine. Outputting refers to communicating and/or transmitting via a wired and/or wireless communications channel. For example, at least one processor may output a control signal by transmitting the control signal to an associated charge controller and/or braking system. A control signal embodying a rotational speed adjustment refers to data encoded for transmission that includes information that may be used to cause a rotational speed adjustment. For example, a charge controller may use information embedded in a control signal to adjust a load imposed on one or more fluid turbines to increase and/or decrease the respective rotational speeds by a specified amount, at a specified time, and/or for a specified duration. Similarly, a braking system associated with one or more fluid turbines may use information embedded in a control signal to engage and/or release a brake for slowing and/or increasing the respective rotational speeds by a specified amount, at a specified time, and/or for a specified duration. Regulating rotation of at least one of the first fluid turbine and the second fluid turbine refers to managing, coordinating, and/or synchronizing the rotation of the first and/or second fluid turbines. For example, a control signal embodying a rotational speed adjustment may cause, at a specific time, and/or for a specific time duration, a braking system to engage and/or release an associated brake by a specific level, and/or a charge controller to increase and/or decrease an associated load by a specific level, causing a rotation of a fluid turbine to slow and/or accelerate in a manner coordinated with the rotation of an adjacent fluid turbine. In some embodiments, the control signal may cause the first and second fluid turbines to rotate in tandem. In some embodiments, the control signal may regulate the rotation of only the first fluid turbine or only the second fluid turbine, to coordinate the respective rotation with the rotation of the other fluid turbine. In some embodiments, the control signal may regulate the rotations of both the first and second fluid turbines to coordinate the respective rotations with each other. In some embodiments, regulating the rotation of at least the first fluid turbine and the second fluid turbine may include transmitting a plurality of control signals to adjust a rotational speed of the first fluid turbine and/or second fluid turbine in an iterative manner.

In some disclosed embodiments, the at least one control signal is configured to cause the first fluid turbine and the second fluid turbine to rotate in opposite directions. To rotate in opposite directions refers to spinning in contrary directions. For example, the first fluid turbine may rotate clockwise relative to a reference axis, such as an axis of rotation of the first fluid turbine, and the second fluid turbine may rotate counter-clockwise to that reference axis, or vice-versa. Thus, at least one processor may coordinate the rotations of the first and second fluid turbines to spin in contrary directions, in tandem, such that respective concave and convex surfaces of the first and second fluid turbines are simultaneously transverse to a direction of fluid flow at instantaneous times.

In some disclosed embodiments, the at least one control signal is configured to cause the first fluid turbine and the second fluid turbine to rotate in a same direction. To rotate in a same direction refers to spinning in a like, and/or uniform direction. For example, the first and second fluid turbines may both rotate clockwise relative to a reference axis, such as an axis of rotation of the first fluid turbine, or may both rotate counter-clockwise. Thus, at least one processor may coordinate the rotations of the first and second fluid turbines to spin in the same direction, in tandem, such that respective concave and convex surfaces of the first and second fluid turbines are simultaneously transverse to a direction of fluid flow at instantaneous times. In some embodiments, at least one processor may cause some fluid turbines in a cluster to rotate in opposite directions, and some fluid turbines in the cluster to rotate in the same direction, such that respective concave and convex surfaces of each fluid turbine in the cluster are simultaneously transverse to a direction of fluid flow at instantaneous times.

By way of a non-limiting example, in FIG. 18, at least one processor (e.g., processor 428 of FIG. 4 and/or processor 512 of FIG. 5) may cause first fluid turbine 1802 to rotate in a clockwise direction and cause second fluid turbine 1804 to rotate in a counter-clockwise direction, or the opposite (e.g., using rotation control 534 of FIG. 5). Alternatively, the at least one processor may cause first fluid turbine 1802 and second fluid turbine 1804 to both rotate in a clockwise direction, or to both rotate in a counter-clockwise direction (e.g., using rotation control 534 of FIG. 5).

In some disclosed embodiments, at the instantaneous times, the first open concave surface, the first convex surface, the second open concave surface, and the second convex surface are transverse to the direction of fluid flow. At the instantaneous times refers to during very brief time periods, as described earlier. At the instantaneous times, the first open concave surface, the first convex surface, the second open concave surface, and the second convex surface are transverse to the direction of fluid refers to the open concave surfaces and corresponding convex surfaces of the first and second fluid turbines facing a direction crossing the direction of fluid flow for a very brief time period, substantially concurrently. For instance, the rotational speed adjustment may cause at least one concave blade surface of the first fluid turbine and at least one concave blade surface of the second fluid turbine to, for a brief time instant, be oriented substantially perpendicular to a fluid flow direction at the same time, such that the fluid flow primarily impacts the external sides of the curved blade surfaces, and avoids directly impacting the concave inner bottom and/or inner vertex of the blade surfaces. For example, causing the concave and convex blade surfaces to be simultaneously transvers to a direction of fluid flow may produce a lower pressure zone associated with a change such as higher velocity or in fluid flow direction. The change (e.g., increase) in velocity and/or change in fluid flow direction may cause a change in momentum promoting blade rotation for producing a greater level of electrical energy than would be produced absent coordination via the control signal.

By way of a non-limiting example, in FIG. 18, at least one processor (e.g., processor 428 of FIG. 4 and/or processor 512 of FIG. 5) may output at least one control signal embodying the rotational speed adjustment to thereby regulate rotation of at least one of first fluid turbine 1802 and second fluid turbine 1804 such that at the instantaneous times, first open concave surface 1806, first convex surface 1808, second open concave surface 1810, and second convex surface 1812 may be transverse to direction of fluid flow 1814. Thus, the coordination may cause fluid flow 1814 to directly impact outer convex surfaces 1832 and 1812, and avoid directly impacting concave surfaces 1830 and 1810 of fluid turbines 1802 and 1804, respectively. For example, the at least one processor may output a control signal to at least partially engage and/or release a brake (e.g., brake 432 in FIG. 4) and/or a braking system (e.g., braking circuit 1000 in FIG. 10) to slow and/or increase a rotational speed of first fluid turbine 1802 and/or second fluid turbine 1804 at least temporarily. Additionally or alternatively, the at least one processor may output a control signal to cause a charge controller (e.g., charge controller 410 of FIG. 5) to adjust a load (e.g., dump load 532) imposed on first fluid turbine 1802 and/or second fluid turbine 1804 to slow and/or increase a rotational speed of first fluid turbine 1802 and/or second fluid turbine 1804 at least temporarily. Slowing and/or increasing a rotational speed of first fluid turbine 1802 and/or second fluid turbine 1804 at least temporarily may enable the at least one processor to adjust a phase and or rotational frequency of first fluid turbine 1802 and/or second fluid turbine 1804, for example, until first fluid turbine 1802 and/or second fluid turbine 1804 rotate in tandem. In some embodiments, the at least one processor may continually slow and/or increase the rotational speed of first fluid turbine 1802 and/or second fluid turbine 1804 to maintain the respective rotations in tandem over time.

In some disclosed embodiments, the at least one first open concave surface includes at least two open concave surfaces each associated with a corresponding convex surface, wherein the at least one second open concave surface includes at least two open concave surfaces each associated with a corresponding convex surface, and wherein the control signal is configured to cause all concave and convex surfaces to be simultaneously transverse to the fluid flow direction at the instantaneous times. An open concave surface including at least two open concave surfaces may refer to a fluid turbine including at least two blades (e.g., two airfoils or two hydrofoils), each of which may have an open concave surface and a corresponding convex surface. For instance, each of the first and second fluid turbines may include at least two cup-shaped blades. In some embodiments, at least two blades of the first or second fluid turbine may face each other, e.g., to form a circular-type shape with gaps separating the turbine blades. In some embodiments, at least two blades of the first or second fluid turbine may face away from each other, e.g., to form an S-shape. In some embodiments, at least two blades of the first or second fluid turbine may face away from each other and may be offset, e.g., in an interlocking manner. The control signal configured to cause all concave and convex surfaces to be simultaneously transverse to the fluid flow direction at the instantaneous time refers to a control signal for adjusting a rotational speed of the first and/or second fluid turbines in a manner that causes both (e.g., cup-shaped) blades of the first fluid turbine and both (e.g., cup-shaped) blades of the second fluid turbine to be non-parallel to the direction of wind flow (e.g., substantially perpendicular to the direction of fluid flow) at the same time. For example, this may occur when both of the first and second fluid turbines include two cup-shaped blades arranged symmetrically opposite to each other (e.g., rotated by 180° relative to each other), or four blades arranged symmetrically opposite to each other (e.g., rotated by 90° relative to each other such that each opposing pair of blades are rotated by 180° relative to each other), and/or any other configuration permitting two blades of the first fluid turbine and two blades of the second fluid turbine to be oriented transverse to a fluid flow at substantially the same time.

By way of a non-limiting example, in FIG. 18, first fluid turbine 1802 may include at least two open concave surfaces 1806 and 1830 (e.g., corresponding to two turbine blades). Each of each open concave surfaces 1806 and 1830 may be associated with corresponding convex surfaces 1808 and 1832, respectively. Similarly, second fluid turbine 1804 may include at least two open concave surfaces 1810 and 1834 (e.g., corresponding to two turbine blades). Each of each open concave surfaces 1810 and 1834 may be associated with corresponding convex surfaces 1812 and 1836, respectively. The at least one processor may transmit one or more control signals to cause all concave and convex surfaces 1806, 1810, 1830, 1834, 1808, 1812, 1832, and 1836, respectively, to be simultaneously transverse to direction of fluid flow 1814 at the instantaneous times. For example, the at least one processor may engage and/or release a brake (e.g., brake 432 in FIG. 4) and/or use a charge controller (e.g., charge controller 410) to increase and/or decrease a load (e.g., dump load 532 in FIG. 5) to slow and/or increase the rotational speed of first fluid turbine 1802 and/or second fluid turbine 1804. Slowing and/or increasing the rotational speed of first fluid turbine 1802 and/or second fluid turbine 1804 in a controllable manner may permit the at least one processor to synchronize the rotations of first fluid turbine 1802 and second fluid turbine 1804 to rotate in tandem. Rotating in tandem may cause all concave and convex surfaces 1806, 1810, 1830, 1834, 1808, 1812, 1832, and 1836, respectively, to be simultaneously transverse to direction of fluid flow 1814 at the instantaneous times.

In some disclosed embodiments, the at least one control signal is configured to cause at the instantaneous times, an upstream open end of the first turbine to face in a same direction as an upstream open end of the second turbine. Upstream refers to closer to a fluid flow source relative to a direction of fluid flow from the fluid source. For example, an object located upstream may encounter a fluid flow before an object located downstream. An open end refers to an exposed concave surface. An upstream open end of a fluid turbine refers to a concave (e.g., blade) surface of a fluid turbine positioned to encounter a fluid flow earlier than a downstream surface. A same direction refers to a substantially similar orientation. At least one control signal configured to cause at the instantaneous times, an upstream open end of the first turbine to face in a same direction as an upstream open end of the second turbine refers to a control signal causing the upstream concave blade surfaces of the first and second fluid turbines to be oriented in substantially the same direction relative to a fluid flow during the instantaneous times.

Figure 20:
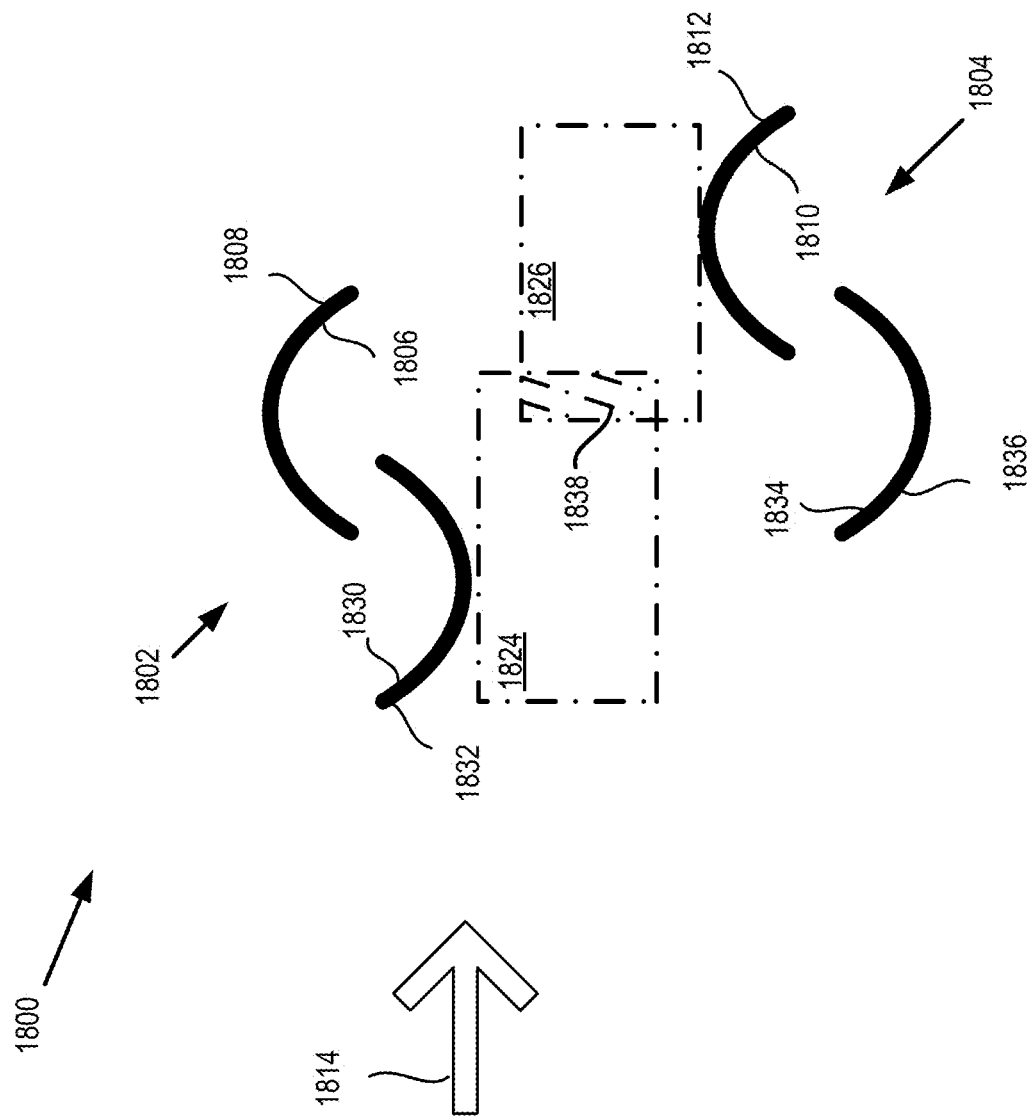
FIG. 20 illustrates another arrangement for exemplary system for coordinating rotation of adjacent turbines, consistent with some embodiments of the present disclosure.

By way of a non-limiting example, reference is made to FIG. 20, which illustrates another arrangement for exemplary system 1800 for coordinating rotation of adjacent turbines, consistent with some embodiments of the present disclosure. FIG. 20 may be substantially similar to FIG. 18 with the noted difference that second fluid turbine 1804 may be shifted over from first fluid turbine 1802, e.g., by half a turbine diameter. Open concave surface 1830 may be upstream to open concave surface 1806 of first fluid turbine 1802, and open concave surface 1834 may be upstream to open concave surface 1810 of second fluid turbine 1804. At least one processor (e.g., processor 428 of FIG. 4 and/or processor 512 of FIG. 5) may transmit at least one control signal to cause at the instantaneous times, upstream open end (e.g., open concave surface 1830) of first turbine 1802 to face in a same direction as upstream open end (e.g., open concave surface 1834) of second turbine 1804. For example, if direction of fluid flow 1814 is from west to east, concave surface 1830 and concave surface 1834 may both simultaneously face north. Such an arrangement may produce a lower-pressure zone 1838 between first fluid turbine 1802 and second fluid turbine 1804.

In some disclosed embodiments, the at least one control signal is configured to cause at the instantaneous times, an upstream open end of the first turbine to face in an opposite direction from an upstream open end of the second turbine. An opposite direction refers to a substantially contrary direction, e.g., rotated by 180°. At least one control signal configured to cause at the instantaneous times, an upstream open end of the first turbine to face to face in an opposite direction from an upstream open end of the second turbine refers to a control signal causing an upstream concave surface of the first fluid turbine to be oriented in substantially the opposite direction as an upstream concave surface of the second fluid turbine relative to a fluid flow direction during the instantaneous times. For example, if a fluid flow direction is east-west, at instantaneous times, an upstream concave surface of the first fluid turbine may be exposed substantially north (e.g., transverse to the fluid flow direction) while an upstream concave surface of the first fluid turbine may be exposed substantially south (e.g., transverse to the fluid flow direction, but opposite to the concave surface of the first fluid turbine), or vice-versa.

By way of a non-limiting example, in FIG. 18, open concave surface 1830 may be upstream to open concave surface 1806 of first fluid turbine 1802, and open concave surface 1810 may be upstream to open concave surface 1834 of second fluid turbine 1804. At least one processor (e.g., processor 428 of FIG. 4 and/or processor 512 of FIG. 5) may transmit at least one control signal to cause at the instantaneous times, upstream open end 1830 of first turbine 1802 to face in an opposite direction as upstream open end 1834 of second turbine 1804. Such an arrangement may produce lower-pressure zone 1822 between first fluid turbine 1802 and second fluid turbine 1804. For example, if direction of fluid flow 1814 is from west to east, concave surface 1830 may be exposed north, and concave surface 1810 may be simultaneously exposed south. Such an arrangement may produce a lower-pressure zone 1822 between first fluid turbine 1802 and second fluid turbine 1804.

Some disclosed embodiments involve receiving third rotational orientation information from a third fluid turbine having a least one third open concave surface with at least one corresponding third convex surface, wherein calculating the at least one rotational speed adjustment is configured to cause, at the instantaneous times, the first open concave surface, the first convex surface, the second open concave surface, the second convex surface, the third open concave surface and the third convex surface to be simultaneously transverse to the direction of fluid flow. Receiving third rotational orientation information from a third fluid turbine may be understood as described earlier for the first and second fluid turbines. Similarly, calculating a rotational speed adjustment to cause, at the instantaneous times, the first, second, and third open concave surfaces and corresponding convex surfaces to be simultaneously transverse to the direction of fluid flow may be understood as described earlier for calculating a rotational speed adjustment for the first and second fluid turbines. Thus, at least one processor may coordinate the rotations of any number of adjacent fluid turbines (e.g., at least three, at least four, or any other number of fluid turbines) to cause respective concave surfaces of each of the adjacent fluid turbines to be simultaneously transverse to a direction of fluid flow at the same time. In some embodiments, at least one processor may receive rotational orientation information from each fluid turbine in a cluster of geographically associated fluid turbines, and calculate one or more rotational speed adjustments to cause a concave surface of each fluid turbine in the cluster to be simultaneously transverse to a direction of fluid flow at the same time. Calculating the at least one rotational speed adjustment refers to determining a modification and/or change to the rotational speed for one or more fluid turbines, as described earlier. For instance, at least one processor may calculate an adjustment to any of the first, second, and/or third fluid turbines. The rotational speed adjustment may include information indicating when and for how long to engage and/or release a brake, and/or to increase and/or decrease a load associated with any of the first, second, and/or third fluid turbines. To cause, at the instantaneous times, the first open concave surface, the first convex surface, the second open concave surface, the second convex surface, the third open concave surface and the third convex surface to be simultaneously transverse to the direction of fluid may be understood as described earlier with respect to the first and second open concave surfaces, and the first and second convex surfaces.

Figure 21:
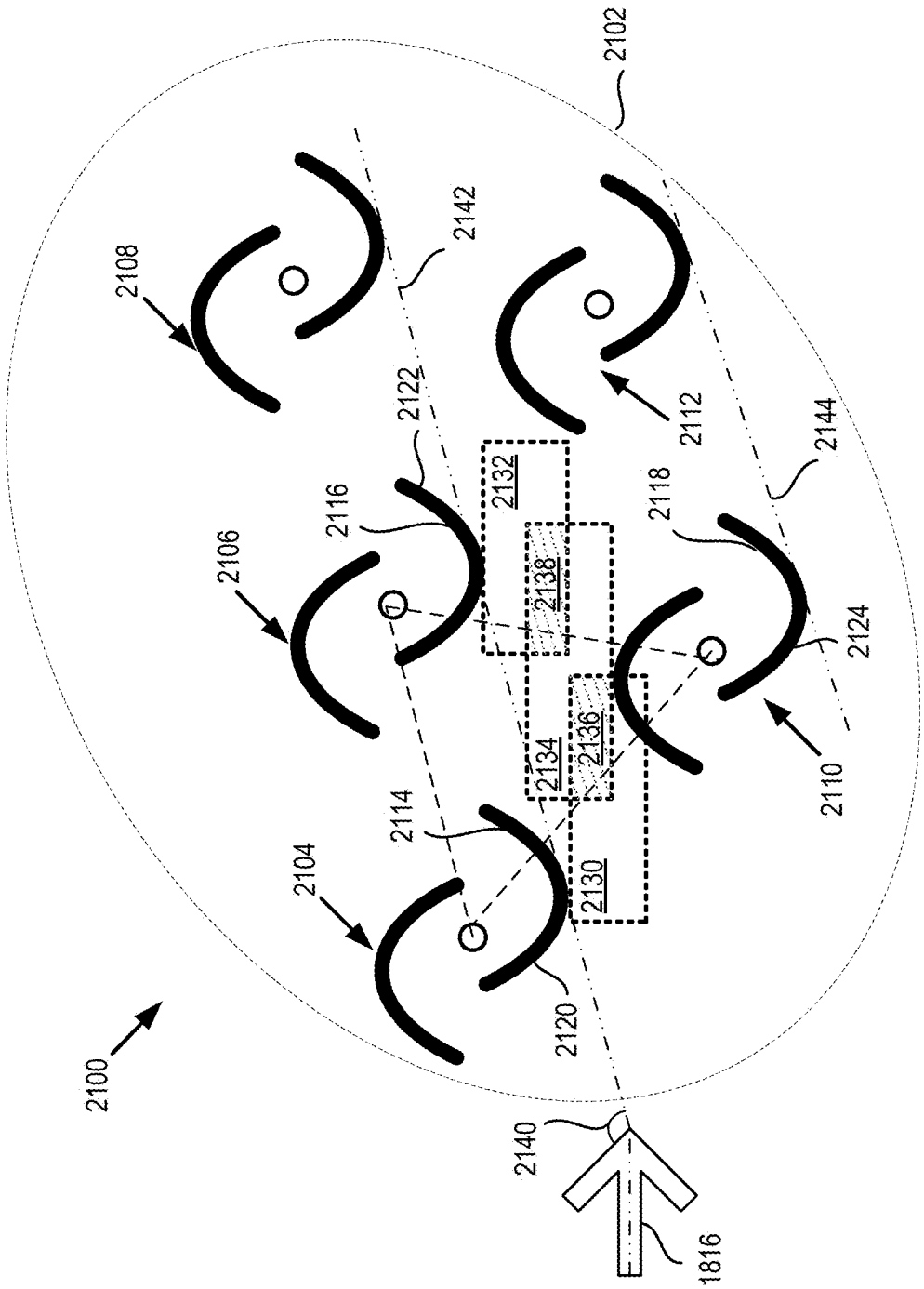
FIG. 21 illustrates an exemplary system for coordination rotation for a cluster of adjacent fluid turbines, consistent with embodiments of the present disclosure.

By way of a non-limiting example, reference is made to FIG. 21 illustrating an exemplary system 2100 for coordinating rotation for a cluster of adjacent fluid turbines, consistent with embodiments of the present disclosure. System 2100 is substantially similar to system 1800 of FIGS. 18 and 20 with the noted exception that system 2100 includes a cluster 2102 of fluid turbines 2104, 2106, 2108, 2110, and 2112. Fluid turbines 2104, 2106, 2108, 2110, and 2112 may correspond to any of the fluid turbines in FIG. 1, and/or fluid turbines 404, 1802, and/or 1804, and may be spaced apart sufficiently close to permit fluid coupling therebetween. In some embodiments, fluid turbines 2104, 2106, 2108, 2110, and 2112 may be spaced apart by between one and two turbine diameters. Each of fluid turbines 2104, 2106, 2108, 2110, and 2112 may include at least one open concave surface with at least one corresponding convex surface, such as open concave surfaces 2114, 2116, and 2118, and corresponding convex surfaces 2120, 2122, and 2124 of fluid turbines 2104, 2106, and 2110, respectively. For the purpose of this discussion, fluid turbines 2104, 2106, and 2110 may be referred to as first, second, and third fluid turbines, respectively, however this is not intended to be limiting, and the first, second, and third fluid turbines described herein may be interchanged with other fluid turbines in cluster 2100. At least one processor (e.g., processor 428 of FIG. 4 and/or processor 512 of FIG. 5) may receive first rotational orientation information from first fluid turbine 2104 having at least one first open concave surface 2114 with at least one corresponding first convex surface 2120, and second rotational orientation information from second fluid turbine 2106 having at least one second open concave surface 2116 with at least one corresponding second convex surface 2122. In addition, the at least one processor may receive rotational third rotational orientation information from third fluid turbine 2110 having a least one third open concave surface 2118 with at least one corresponding third convex surface 2124. The at least one processor may calculate the at least one rotational speed adjustment to cause, at the instantaneous times, first open concave surface 2114, first convex surface 2120, second open concave surface 2116, second convex surface 2122, third open concave surface 2118, and third convex surface 2124 to be simultaneously transverse to direction 1814 of fluid flow 1816. For example, the rotational speed adjustment may include information slowing and/or increasing the rotational speeds of one or more of first, second, and third fluid turbines, 2104, 2106, and 2110, respectively, until first, second, and third fluid turbines, 2104, 2106, and 2110 rotate in tandem. In some embodiments, the at least one processor may determine a plurality of rotational speed adjustments in response to feedback from one or more of first, second, and third fluid turbines, 2104, 2106, and 2110.

In some disclosed embodiments, the first fluid turbine, the second fluid turbine, and the third fluid turbine are equidistantly spaced from each other. Equidistant refers to a substantially equivalent length, spacing, and/or extent. A first fluid turbine, a second fluid turbine, and a third fluid turbine are equidistantly spaced from each other refers to an arrangement for the first, second, and third fluid turbines causing the spaces and/or gaps separating each fluid turbine from the other fluid turbines to be substantially equal. Equidistantly spacing a first, second, and third fluid turbine may locate each fluid turbine at a different apex of a substantially equilateral triangle. In some embodiments, spacing two, or three, or more fluid turbines in equidistant manner may allow replicating patterns of relatively higher and/or lower pressure zones associated with each of the equidistantly spaced fluid turbines. For example, coordination of the rotations of equidistantly spaced fluid turbines may allow creation of a plurality of lower-pressure zones, each lower-pressure zone configured to promote blade rotation of one or more of the equidistantly spaced fluid turbines, thereby generating a greater level of electrical energy than would be generated absent the coordination.

By way of a non-limiting example, in FIG. 21, first fluid turbine 2104, second fluid turbine 2106, and third fluid turbine 2110 may be substantially equidistantly spaced from each other (e.g., to form a substantially equilateral triangle 2146). For example, first concave surface 2114 and corresponding convex surface 2120 may be associated with a first relatively low pressure zone 2130, second concave surface 2116 and corresponding convex surface 2122 may be associated with a second relatively low pressure zone 2132, and third concave surface 2118 and corresponding convex surface 2124 may be associated with a third relatively low pressure zone 2134. By coordinating the blade rotations of substantially equidistantly spaced first, second, and third fluid turbines 2104, 2106, and 2110, respectively, at least one processor (e.g., processor 428 of FIG. 4 and/or processor 512 of FIG. 5) may permit creation of a first lower-pressure zone 2136 (e.g., associated with first fluid turbine 2104 and third fluid turbine 2110) and a second lower-pressure zone 2138 (e.g., associated with second fluid turbine 2106 and third fluid turbine 2110). For example, first lower-pressure zone 2136 may be produced by an overlap of relatively low pressure zone 2130 of first fluid turbine 2104 and relatively low pressure zones 2134 of third fluid turbine 2110, and second lower-pressure zone 2138 may be produced by an overlap of relatively low pressure zone 2132 of second fluid turbine 2106 and relatively low pressure zones 2134 of third fluid turbine 2110. In some instances, first lower-pressure zone 2136 and second lower-pressure zone 2138 may promote blade rotation of any of substantially equidistantly spaced first fluid turbine 2104, second fluid turbine 2106, and third fluid turbine 2110 to thereby produce a greater level of electrical energy than would be produced absent the coordination.

In some embodiments, cluster of fluid turbines 2102 may be oriented at an angle 2140 relative to a direction of fluid flow 1816. For example, orienting cluster of fluid turbines 2102 thus may increase an exposure of one or more fluid turbines within cluster 2102 to fluid flow 1816 and/or prevent one or more fluid turbines within cluster 2102 from obstructing another one of the fluid turbines within cluster 2102 from fluid flow 1816. In some embodiments, at least one processor may adjust the orientation of one or more of fluid turbines within cluster 2102 relative to direction of fluid flow 1816 and/or adjust the orientation of cluster 2102 in its entirety relative to direction of fluid flow 1816, dynamically, as described elsewhere in this disclosure. For example, the at least one processor may adjust the orientation of each fluid turbine in cluster 2102 to be oriented at angle 2140 relative to direction of fluid flow 1816, e.g., by adjusting one or more associated moveable bases, as described elsewhere herein.

Some disclosed embodiments involve receiving additional rotational orientation information from a plurality of additional fluid turbines arranged in a plurality rows, and wherein the at least one control signal is configured to cause fluid turbines in each of the plurality of rows to alternately rotate in opposite directions. Fluid turbines arranged in a plurality rows refers to positioning a plurality of fluid turbines along a plurality of lines, e.g., in a grid formation. For example, fluid turbines in a cluster may be arranged along two rows, three rows, or any other number of rows. Receiving additional rotational orientation information from a plurality of additional fluid turbines arranged in a plurality rows refers to receiving rotational orientation information from each fluid turbine in a cluster of turbines organized along a plurality of lines. The phrase, at least one control signal is configured to cause fluid turbines in each of the plurality of rows to alternately rotate in opposite directions, refers to one or more control signals causing fluid turbines in adjacent rows to rotate in opposite directions. For example, a first control signal may cause fluid turbines arranged in a first row in a cluster to rotate clockwise, a second control signal may cause fluid turbines arranged in a second row of the cluster to rotate counter-clockwise, and a third control signal may cause fluid turbines arranged in a third row in the cluster to rotate clockwise. In some embodiments, the same control signal may cause a first row of fluid turbines in a cluster to rotate clockwise, a second row of fluid turbines in the cluster to rotate counter-clockwise, and a third row of fluid turbines in the cluster to rotate clockwise.

By way of a non-limiting example, in FIG. 21, plurality of fluid turbines 2104, 2106, 2108, 2110, and 2112 may arranged in a plurality rows. For example, fluid turbines 2104, 2106, and 2108 may be arranged in a first row 2142, and fluid turbines 2110 and 2112 may be arranged in a second row 2144. At least one processor (e.g., processor 428 of FIG. 4 and/or processor 512 of FIG. 5) may receive additional rotational orientation information from a plurality of additional fluid turbines (e.g., fluid turbines 2108 and 2112) arranged in a plurality rows (e.g., rows 2142 and 2144). The at least one control signal may cause fluid turbines in each of plurality of rows 2142 and 2144 to alternately rotate in opposite directions. For example, at least one processor may cause fluid turbines 2104, 2106, and 2108 in row 2142 to rotate in a clockwise direction (e.g., using rotation control 534 of FIG. 5), and cause fluid turbines 2110 and 2112 to rotate in a counter-clockwise rotation (e.g., using rotation control 534 of FIG. 5), or the opposite.

In some disclosed embodiments, the plurality of rows are offset from each other such that a fluid turbine in a succeeding row aligns with a gap between fluid turbines in a preceding row. Offset refers to shifted, staggered, and/or displaced. For example, offsetting a first row of fluid turbines from a second row of fluid turbines may shift and/or displace the fluid turbines in the second row relative to the fluid turbines in the first row. A succeeding row refers to a next and/or following row. A preceding row refers to a prior and/or earlier row. Two adjacent rows of fluid turbines may include a succeeding row and a preceding row. For example, a succeeding row may be downstream relative to a preceding row. A gap between fluid turbines in a row refers to a space separating adjacent fluid turbines arranged along a line. A fluid turbine in a succeeding row aligns with a gap between fluid turbines in a preceding row refers to each fluid turbine in one row arranged to be adjacent to a gap separating two fluid turbines in a neighboring row. For example, a cluster of fluid turbines may include a plurality of staggered rows, such that each fluid turbine in the cluster may be adjacent to a gap separating two fluid turbines in one or more neighboring rows. This may permit clustering a plurality of fluid turbines to conserve space while preventing any one fluid turbine from obstructing a fluid flow from reaching another fluid turbine in the cluster.

By way of a non-limiting example, in FIG. 21, plurality of rows 2142 and 2144 may be offset from each other such that fluid turbine 2110 in a succeeding row (e.g., row 2144) may align with a gap (e.g., indicated by triangle 2146) between fluid turbines 2104 and 2106 in preceding row (e.g., row 2142). For example, such an offset may permit fluid coupling between fluid turbines 2104, 2106, and 2110 while preventing obstruction of fluid flow 1816 from any one of fluid turbines 2104, 2106, and 2110.

Figure 22:
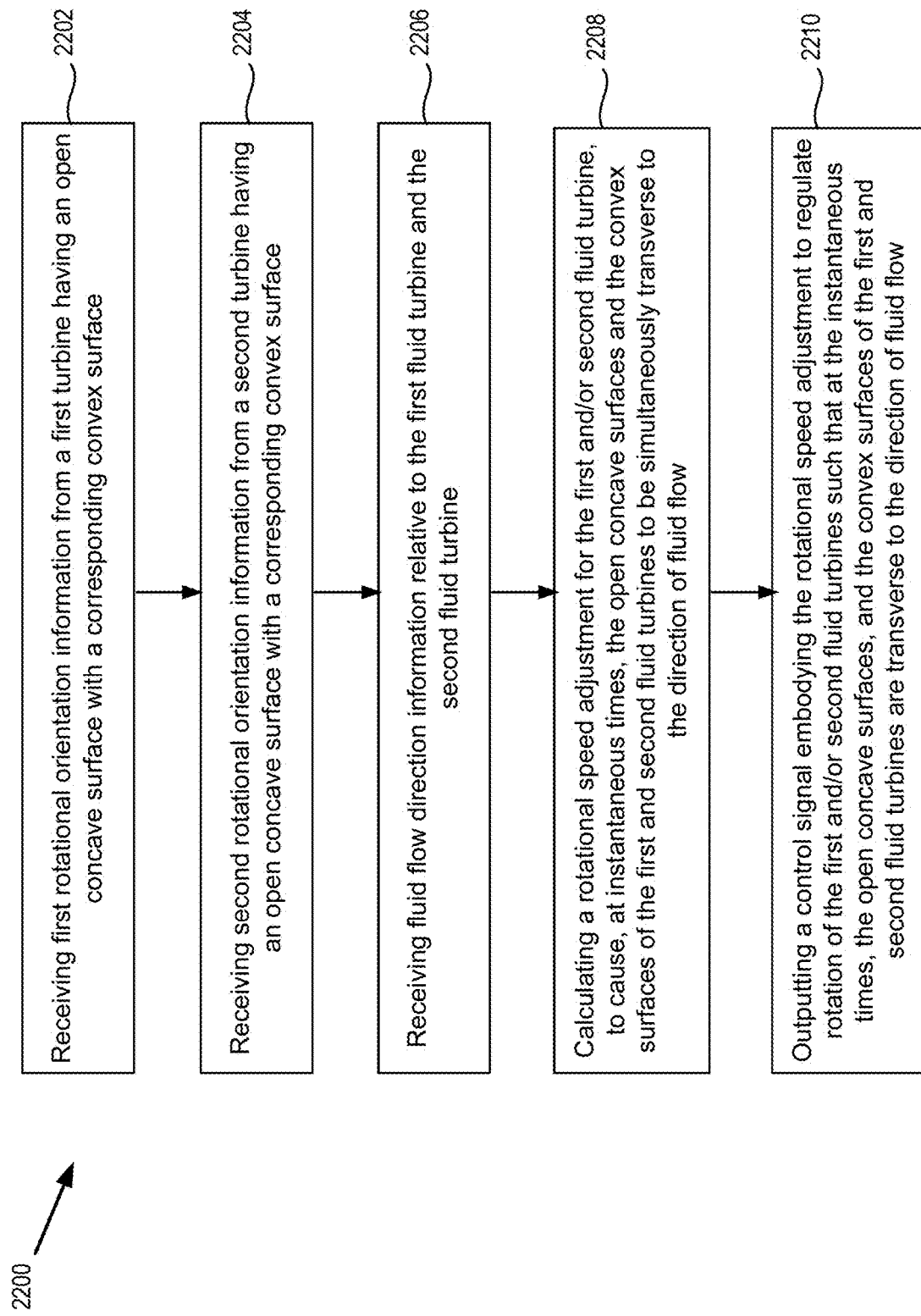
FIG. 22 is a flowchart of example process for coordinating rotation of adjacent turbines, consistent with embodiments of the present disclosure.

FIG. 22 is a flowchart of example process 2200 for coordinating rotation of adjacent turbines, consistent with embodiments of the present disclosure. In some embodiments, process 2200 may be performed by at least one processor (e.g., processor 512 shown in FIG. 5 and/or processor 428 shown in FIG. 4) to perform operations or functions described herein. In some embodiments, some aspects of process 2200 may be implemented as software (e.g., program codes or instructions) that are stored in a memory (e.g., memory 514 and/or 430) or a non-transitory computer readable medium. In some embodiments, some aspects of process 2200 may be implemented as hardware (e.g., a specific-purpose circuit). In some embodiments, process 2200 may be implemented as a combination of software and hardware.

Referring to FIG. 22, process 2200 may include a step 2202 of receiving first rotational orientation information from a first fluid turbine having a least one first open concave surface with at least one corresponding first convex surface. By way of a non-limiting example, in FIG. 18, first fluid turbine 1802 may include at least first open concave surface 1806 and at least first convex surface 1808. At least one processor (e.g., processor 428 of FIG. 4 and/or processor 512 of FIG. 5) may receive first rotational orientation information from first fluid turbine 1802. The rotational orientation information may include, for example, a rotational direction, rotational speed and/or acceleration, a phase relative to fluid flow direction 1814 and/or a blade position of fluid turbine 1804 at a given point in time, and/or any other type of rotational orientation information. In some embodiments, the at least one processor may receive the rotational orientation information from at least one sensor (e.g., sensors 418 in FIG. 5).

Process 2200 may include a step 2204 of receiving second rotational orientation information from a second fluid turbine having a least one second open concave surface with at least one corresponding second convex surface. By way of a non-limiting example, in FIG. 18, second fluid turbine 1804 may include at least second open concave surface 1810 and at least second convex surface 1812. At least one processor (e.g., processor 428 of FIG. 4 and/or processor 512 of FIG. 5) may receive second rotational orientation information from second fluid turbine 1804, e.g., similar to the rotational orientation information received from first fluid turbine 1802.

Process 2200 may include a step 2206 of receiving fluid flow direction information indicating a direction of fluid flow relative to the first fluid turbine and the second fluid turbine. By way of a non-limiting example, in FIG. 18, at least one processor (e.g., processor 428 of FIG. 4 and/or processor 512 of FIG. 5) may receive fluid flow direction information indicating a direction of a fluid flow 1814 relative to first fluid turbine 1802 and second fluid turbine 1804, for example from a fluid speed sensor (e.g., fluid speed sensor 504 in FIG. 5).

Process 2200 may include a step 2208 of calculating at least one rotational speed adjustment for at least one of the first fluid turbine and the second fluid turbine, to cause, at instantaneous times, the first open concave surface, the first convex surface, the second open concave surface, and the second convex surface to be simultaneously transverse to the direction of fluid flow. By way of a non-limiting example, in FIG. 18, at least one processor ( ) may calculate at least one rotational speed adjustment for at least one of first fluid turbine 1802 and second fluid turbine 1804. The rotational speed adjustment may cause, at instantaneous times, first open concave surface 1806, first convex surface 1808, second open concave surface 1810, and second convex surface 1812 to be simultaneously transverse to the direction of fluid flow 1814. In some embodiments, the rotational speed adjustment may additionally cause, at instantaneous times, another open concave surface 1830 and convex surface 1832 of first fluid turbine 1802, and another open concave surface 1834 and convex surface 1836 of second fluid t to be simultaneously transverse to the direction of fluid flow 1814.

Process 2200 may include a step 2210 of outputting at least one control signal embodying the rotational speed adjustment to thereby regulate rotation of at least one of the first fluid turbine and the second fluid turbine such that at the instantaneous times, the first open concave surface, the first convex surface, the second open concave surface, and the second convex surface are transverse to the direction of fluid flow. By way of a non-limiting example, in FIG. 18, at least one processor ( ) may output at least one control signal embodying the rotational speed adjustment to thereby regulate rotation of at least one of first fluid turbine 1802 and second fluid turbine 1804. The at least one control signal may cause, at the instantaneous times, first open concave surface 1806, first convex surface 1808, second open concave surface 1810, and second convex surface 1812 to be transverse to the direction of fluid flow 1814. In some embodiments, the at least one control signal may additionally cause, at the instantaneous times, another open concave surface 1830 and convex surface 1832 of first fluid turbine 1802, and another open concave surface 1834 and convex surface 1836 of second fluid to be simultaneously transverse to the direction of fluid flow 1814.

Although some examples in this disclosure relate to vertical fluid turbines having two blades, these are for exemplary purposes only and are not intended to be limiting. The techniques disclosed herein may be used to coordinate blade rotation for any number of vertical and/or horizontal fluid turbines having any number of blades (e.g., a single blade, three blades, four blades, or any other number of blades) to thereby produce associated lower pressure zones promoting blade rotation.

Due to their bulk, transporting a wind turbine may incur significant costs. Embodiments are disclosed for a flat-packable modular wind turbine, allowing for transportation of wind turbines in an efficient and compact manner for subsequent assembly at an installation site.

Some disclosed embodiments involve a flat-packable wind turbine assembly kit. Flat-packable refers to being capable of assuming a compact form with significantly smaller dimensions than an assembled form. Thus a flat packable form is one that saves space. For example, when components are formed of sheet material that are flexed or bent upon assembly, flat-packable may refer to planar sheets stacked atop one another. For example, objects that are flat-packable may be arranged close to each other to occupy less space than an arrangement of non-flat-packable objects. Multiple flat-packable objects may be stacked horizontally (e.g., like a stack of pancakes), vertically (e.g., side-by-side like slices of bread), and/or diagonally (e.g., leaning against a support in a "V" and/or chevron pattern). Packable refers to an ability of components to be packaged, grouped, banded together with, and/or otherwise organized together with each other. In some embodiments, flat-packable may mean that some turbine components (e.g., one or more turbine blades) may be flat-packable, and other components may be non-flat-packable.

In some embodiments, a flat-packable object may be collapsible to assume a flat or compressed form characterized by less air between components than exists after the components are assembled. Such flat packing conserves space for storage and/or transportation. When in-use, a flat-packable object may be expanded, assembled, and/or unfolded to assume a non-flat functional form. In some embodiments, a flat-packable object may remain flat upon deployment. Thus, the word "flat" as used herein does not necessarily require a two-dimensional planar surface. Rather, it refers to flattening, that occurs when at least some space between components is obviated as a result of the packing. A turbine assembly kit refers to a set of parts or materials, from which a turbine may be assembled in whole or in part. For example, while a complete turbine may include an electrical generator, a shaft, and a set of blades (e.g., airfoils and/or hydrofoils), a turbine assembly kit need not encompass all components. For example, the kit may just include blade materials. The kit may additionally include blade supports, the shaft, fasteners, and/or any other turbine components. Examples of other components that may or may not be included in a turbine assembly kit include supporting rods, a generator, one or more sensors, wires, circuitry, at least one processor, and/or any other fluid turbine components.

Some disclosed embodiments involve at least one flat-packed bendable airfoil having an upper edge and a lower edge. Bendable refers to flexible, pliable, and/or capable of being deformed. Some examples of bendable materials may include metal such as sheet metal (e.g., made of or including aluminum, stainless steel), certain plastics (e.g., polycarbonate and/or polyethylene), fiberglass, carbon fiber, rubberized materials, bamboo, wood, and/or any other pliable and resilient material. An airfoil refers to an object configured to generate motion when exposed to an airflow (e.g., wind). In some embodiments, an airfoil may include a hydrofoil, e.g., for a water turbine. In some embodiments, an airfoil refers to object configured to generate motion when exposed to other fluid flows (e.g., a gas flow and/or steam flow). An airfoil may have a curved shape, such as a convex portion and a concave portion. The different shaped sides of an airfoil may cause a fluid flow to exert a force causing the airfoil to move. When an airfoil is connected to a turbine shaft, the fluid flow may cause the airfoil to turn the shaft. The rotational motion of the shaft may be transferred to a generator to produce electrical energy. A flat-packable bendable airfoil refers to an object made of a flexible and/or pliable material that may be capable of assuming a flattened shape (e.g., for storage and/or transport), and an airfoil shape (e.g., for generating electrical energy from wind). For example, a flat-packable bendable airfoil may assume a flat shape for transporting to a wind farm site in a manner that conserves space, and a curved shape upon installation and/or deployment as a blade of a wind turbine. An edge refers to an outermost boundary and/or border. An upper edge refers to the outermost boundary and/or edge configured to be oriented above and/or higher than a base and/or bottom portion of an object. A lower edge refers to an outermost boundary or border configured to be oriented below and/or under a top portion of an object. Thus, a flat-packable bendable airfoil may include an edge configured to face upwards, and another edge configured to face downwards when deployed as a blade of a wind turbine. In some embodiments, the upper edge and the lower edge of a flat-packable bendable airfoil may be symmetric and interchangeable.

In some disclosed embodiments, the at least one flat-packed bendable airfoil is configured to assume a predefined curvature upon assembly. Configured to assume refers to and ability to undergo a shape change upon or prior to assembly. For instance, a turbine blade may be initially packed flat, but upon assembly, adopt an airfoil shape or take the shape of an airfoil for generating an air pressure differential. Upon assembly refers to following an installation and/or deployment process. For example, during transport, a turbine blade may assume a flattened shape, and upon assembly, the turbine blade may assume an airfoil shape for generating electrical energy from wind. A predefined curvature refers to a bent shape that may be determined and/or designed in advance. For example, a flat-packed bendable airfoil may be constructed to assume at least concavity and opposing convexity. During packaging, storage and/or transport, the flat-packed bendable airfoil may assume a flattened shape, and upon deployment, the flat-packed bendable airfoil may assume a predefined curvature configured to cause a wind turbine to spin.

Figure 23:
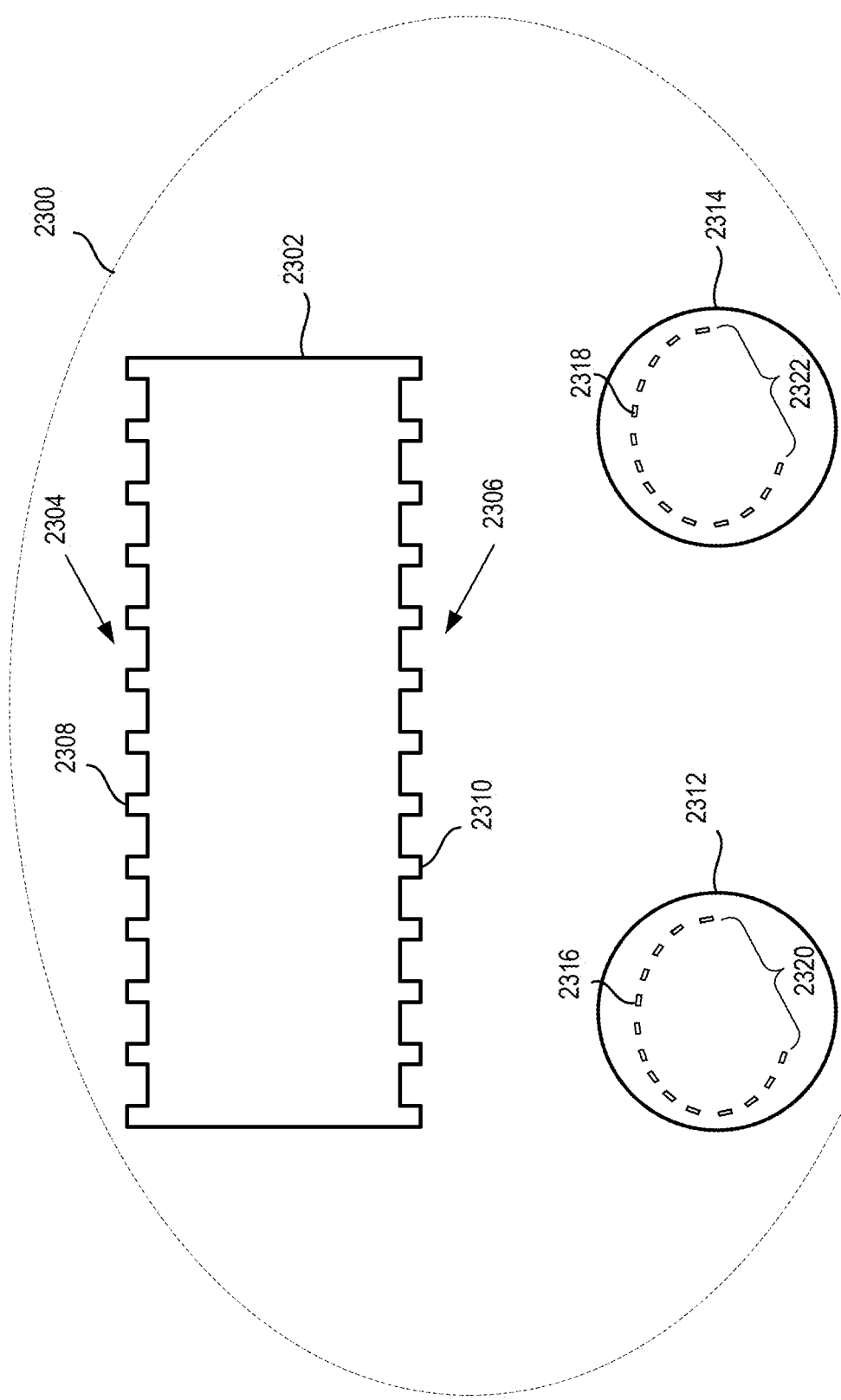
FIG. 23 illustrates an exemplary flat-packable wind turbine assembly kit, consistent with embodiments of the present disclosure.

By way of a non-limiting example, reference is made to FIG. 23 illustrating a flat-packable wind turbine assembly kit 2300, consistent with embodiments of the present disclosure. Flat-packable wind turbine assembly kit 2300 may include at least one flat-packed bendable airfoil 2302 having an upper edge 2304 and a lower edge 2306. In some embodiments, upper edge 2304 and a lower edge 2306 may be symmetric and interchangeable.

Figure 24:
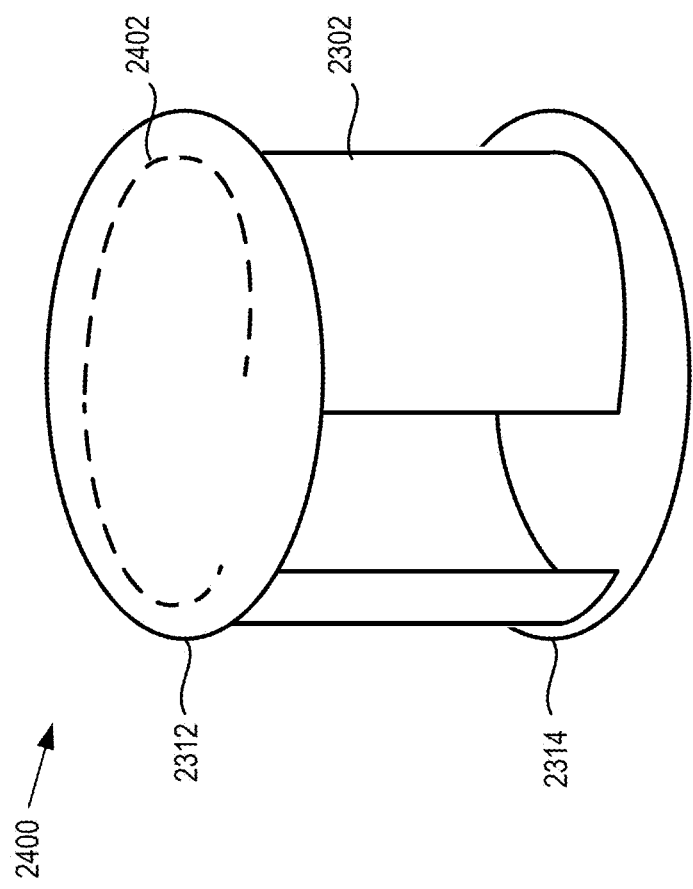
FIG. 24 illustrates an exemplary assembled wind turbine, assembled from components included in a flat-packable wind turbine assembly kit, consistent with embodiments of the present disclosure.

By way of another non-limiting example, reference is made to FIG. 24 illustrating an assembled wind turbine 2400 assembled from elements included in flat-packable wind turbine assembly kit 2300, consistent with embodiments of the present disclosure. Assembled wind turbine 2400 may include flat-packed bendable airfoil 2302 sandwiched between upper plate 2312 and lower plate 2314. Flat-packed bendable airfoil 2302 may assume a predefined curvature 2402 upon assembly. For example, flat-packed bendable airfoil 2302 may be made of a flexible material such as aluminum, plastic, fiberglass, or any other flexible material, allowing flat-packed bendable airfoil 2302 to assume a flat form (e.g., for storage and/or transport as shown in FIG. 23) and a curved form (e.g., when assembled within wind turbine 2400).

In some disclosed embodiments, the at least one flat-packed airfoil includes a single airfoil configured to assume an S-shape contour. An S-shaped contour refers to a sinuous shape and may include two opposite facing curves. For example, an S-shaped airfoil (e.g., a Savonius-type airfoil) may include two cup-shaped surfaces such than when one of the cup-shaped surface faces a first direction, the other cup-shaped surface may face a second direction that is opposite to the first direction. A flat-packable airfoil configured to assume an S-shape contour may be sized to accommodate two opposite facing concave and corresponding convex forms, and may be delivered to a wind farm site in a flat form, and transformed to assume an S-shaped contour during installation. In some embodiments, a flat-packable airfoil may include one or more grooves, scores, and/or markers for guiding one or more folding and/or bending operations to facilitate transforming the flat-packable airfoil from a flat shape to an S-shaped contour.

In some disclosed embodiment, the at least one flat-packed airfoil includes two airfoils, each configured to assume a C-shape contour. A C-shaped contour refers to a bulged and/or rounded shape including a single concave form (e.g., approximating a shape of the letter "C"). Two airfoils each configured to assume a C-shaped contour refers to a pair of airfoils, each presenting a concave surface and corresponding convex surface. In some embodiments, two airfoils, each configured to assume a C-shaped contour may be configured to be installed as opposite facing C-shaped airfoils rotated at 180° from each other, such that when one C-shaped airfoil faces a first direction the other C-shaped airfoil may face a second direction that is opposite to the first direction. In some embodiments, two C-shaped airfoils may be configured to be installed in a manner to partially overlap. Overlap may refer to a space and/or region shared by two different elements. For example, two C-shaped airfoils may partially overlap when the C-shaped airfoils are oriented in opposite directions and one end of each airfoil is partially inserted into the concave opening of the other airfoil. A flat-packable airfoil configured to assume a C-shape contour may be delivered to a wind farm site in a flattened form, and transformed to assume a C-shaped contour during installation. In some embodiments, a flat-packable airfoil may include one or more grooves, scores, and/or markers for guiding one or more folding and/or bending operations to facilitate transforming the flat-packable airfoil from a flat shape to a C-shaped contour.

In some embodiments, the at least one flat-packed airfoil includes three, or four, or any other number of airfoils, each configured to assume a C-shape contour. For example, three airfoils may be spaced 120° apart about a shaft of a wind turbine, and four airfoils may be spaced 90° apart about a shaft of a wind turbine.

By way of a non-limiting example, in FIG. 23, flat-packed bendable airfoil 2302 of may assume an S-shaped contour, similar to the contour of fluid turbine 1902 in FIG. 19. In some embodiments, flat-packed wind turbine assembly kit 2300 may include a plurality of flat-packed bendable airfoils 2302, at least some of which may be configured for assuming an S-shaped contour.

Figure 25:
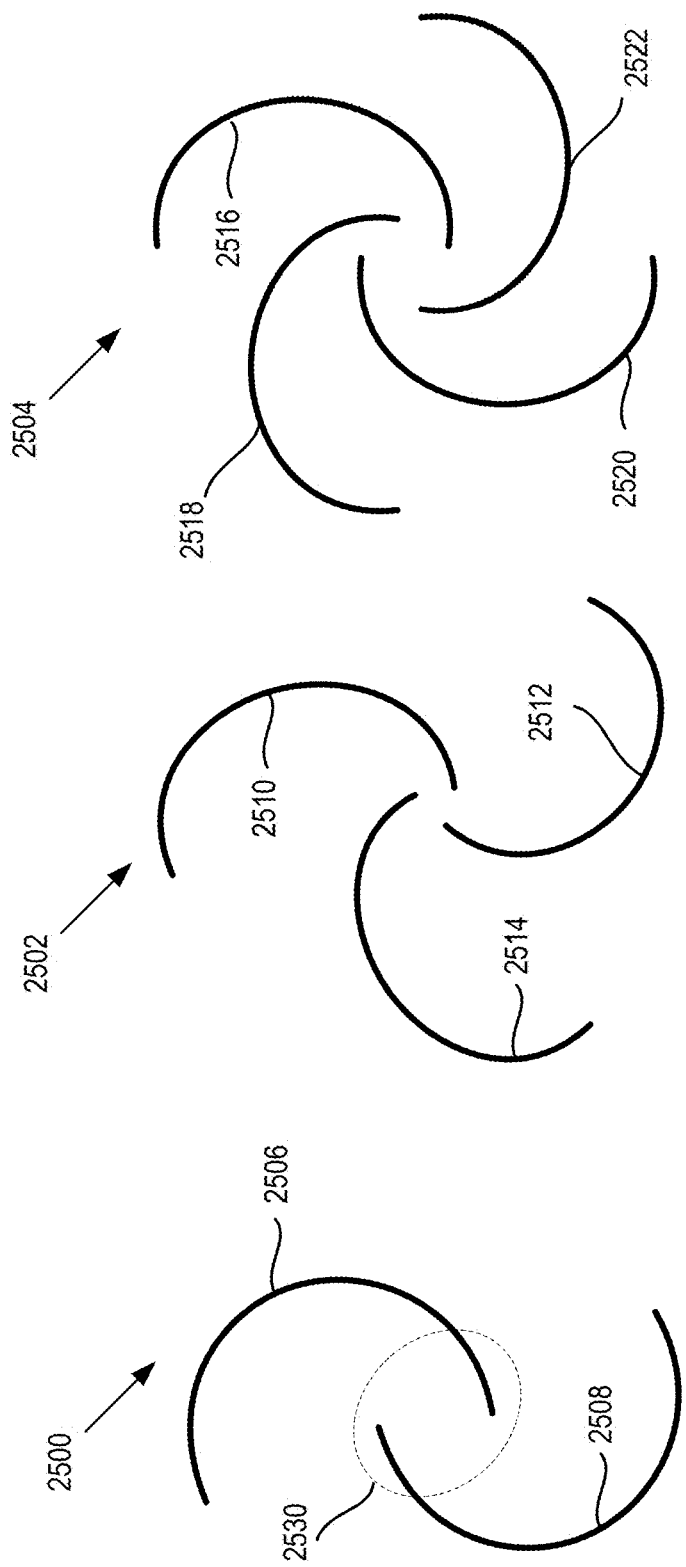
FIG. 25 illustrates top views for a first wind turbine, a second wind turbine, and a third wind turbine, consistent with embodiments of the present disclosure.

By way of another non-limiting example, reference is made to FIG. 25 illustrating top views for a first wind turbine 2500, a second wind turbine 2502, and a third wind turbine 2504, consistent with embodiments of the present disclosure. Each of wind turbines 2500, 2502, and 2504 may include a plurality of flat-packed bendable airfoils 2302 assuming a C-shaped contour. For example, flat-packable wind turbine assembly kit 2300 may include a plurality of flat-packed bendable airfoils 2302, at least some of which may be configured for assuming a C-shaped contour. First wind turbine 2500 may include two C-shaped flat-packed bendable airfoils 2506 and 2508 rotated from each other by 180°. C-shaped flat-packed bendable airfoils 2506 and 2508 may partially overlap in region 2530, where an end of airfoil 2506 may partially enter a concave opening of airfoil 2508, and an end of airfoil 2508 may partially enter an opening of airfoil 2506. Second wind turbine 2502 may include three C-shaped flat-packed bendable airfoils 2510, 2512, and 2514 rotated from each other by 120°. Third wind turbine 2504 may include four C-shaped flat-packed bendable airfoils 2516, 2518, 2520, and 2422 rotated from each other by 90°. In some embodiments, flat-packable wind turbine assembly kit 2300 may include one or more airfoils configured to assume an S-shape contour and one or more airfoils configured to assume a C-shaped contour.

Some disclosed embodiments involve a plurality of upper connecting elements distributed along the upper edge of the at least one flat-packed bendable airfoil. Connecting elements refers to structures for joining and/or fastening two objects. Some examples of connecting elements may include one or more tabs or associated slots, brackets, or associated fasteners, hooks, or associated loops (e.g., eyes), screws or associated bores, pins and/or teeth or associated orifices, bolts or associated nuts, dovetail shapes, and/or any other type of fastener. Distributed refers to spread out evenly or unevenly and/or arranged to have spaces separating in between. A plurality of upper connecting elements distributed along an upper edge of at least one flat-packable bendable airfoil refers to multiple connecting elements arranged across a topmost edge of a panel configured to assume a curved shape. For example, the at least one flat-packed bendable airfoil may include multiple features for connecting an upper edge of the airfoil to additional components for assembling a wind turbine.

Some disclosed embodiments involve a plurality of lower connecting elements distributed along the lower edge of the at least one flat-packed bendable airfoil. A plurality of lower connecting elements distributed along the lower edge of the at least one flat-packable bendable airfoil may be understood as described above for the upper connecting elements, with the understanding that a different type of connecting element may be employed above. For example, the at least one flat-packed bendable airfoil may include multiple features for connecting a lower edge of the airfoil to additional components for assembling a wind turbine. Thus, an airfoil of a wind turbine may be connected at an upper edge and a lower edge thereof using a plurality of connecting elements distributed across each edge. Such an arrangement may permit transporting a flat-packed bendable airfoil in a flattened form and transforming the airfoil to a curved form at the upper and lower edges thereof. In some embodiments, the plurality of upper connecting elements and the plurality of lower connecting elements may be substantially similar in shape, such that upper and lower edges may be interchangeable.

By way of a non-limiting example, in FIG. 23, at least one flat packed bendable airfoil 2302 may include a plurality of upper connecting elements 2308 distributed along upper edge 2304 thereof, and a plurality of lower connecting elements 2310 distributed along lower edge 2306 thereof. In some embodiments, upper connecting elements 2308 distributed along upper edge 2304 and lower connecting elements 2310 distributed along lower edge 2306 may be substantially similar and/or symmetric. In such a case, upper edge 2304 and lower edge 2306 may be interchangeable, such upper edge 2304 may be used as a lower edge and lower edge 2306 may be used as an upper edge.

Some disclosed embodiments involve a flat-packed upper plate including an upper plurality of mating orifices distributed in a contour corresponding to the predefined curvature. A flat-packed plate refers to a panel and/or planar shaped object configured for stacking with or arranged adjacent other flat-packed objects. For example, a flat-packed plate may be stacked in a compact fashion against a flat-packed bendable airfoil or against another flat-packed plate for storage and/or transport. In some embodiments, a flat-packed plate may be made of a sturdy material configured to minimize warping, cracking, rusting, and/or bending. Some non-limiting examples of sturdy materials for a flat-packed plate may include metal (e.g., aluminum, steel, and/or any other type of durable metal), fiberglass, carbon fiber, ceramic, composites (e.g., including carbon, glass, and/or aramid-fiber composites), reinforced plastic (fiber-reinforced polymers), and/or high-density polyethylene (HDPE). Similarly, the flat-packed plate may include integrated or added beams or ribs to resist bending. A flat-packed upper plate refers to a flat-packed plate, as described earlier, configured for connecting to an upper edge of an airfoil. A contour refers to a curved line or shape. A contour corresponding to a predefined curvature refers to a curved line or shape following a path that is substantially similar to a curved shape defined in advance. For example, a contour may function as a guide for bending a flat sheet into a curved airfoil. A plurality of mating orifices refers to multiple holes, apertures, slots, and/or openings configured to engage with associated connecting elements. An upper plurality of mating orifices refers to a plurality of mating orifices configured for engaging with a plurality of upper connecting elements distributed along an upper edge of an airfoil. Mating orifices distributed in a contour corresponding to a predefined curvature refers to openings and/or holes arranged to trace and/or follow a curved line tracing a predefined curvature. For example, such mating orifices may be spaced apart in a manner to align with a plurality of connecting elements distributed on an edge of a flat-packed bendable airfoil. For instance, if a predefined curvature is an S-shaped, a plurality of mating orifices on a flat-packed plate may trace an S-shaped path, and if a predefined contour is a C-shape, a plurality of mating orifices on a flat-packed plate may trace a C-shaped path.

Some disclosed embodiments involve a flat-packed lower plate including a lower plurality of mating orifices distributed in the contour corresponding to the predefined curvature. A flat-packed lower plate including a lower plurality of mating orifices distributed in the contour corresponding to the predefined curvature may be understood as described above for a flat-packed upper plate with the noted difference that the flat-packed lower plate may be configured for connecting to a lower edge of an airfoil, and the lower plurality of mating orifices may be configured for engaging with a plurality of lower connecting elements distributed along the lower edge of the airfoil. Thus, a flat-packable wind turbine assembly kit may include at least one flat-packable airfoil configured to be sandwiched between two flat-packable plates. In some embodiments, the flat-packed upper plate may be substantially similar to, and/or interchangeable with the flat-packed lower plate, however this is not required.

In some embodiments, a flat-packed upper plate and/or a flat-packed lower plate may include additional and/or alternative connecting mechanisms, for attaching to one or more airfoils. For example, a flat-packed upper plate and/or a flat-packed lower plate may include tabs for engaging with grooves or slots on one or more airfoils, and/or notches for connecting via one or more brackets, and/or any other type of connection. For example, a flat-packed upper and lower plate may each include a plurality of scores and/or cuts permitting to push out one or more tabs, such that when the flat-packed upper and lower plates are oriented horizontally, the tabs may be oriented vertically, e.g., to align with a vertically aligned flat-packed airfoil. In such a case, a flat-packed airfoil may include a plurality of orifices distributed along upper and lower edges thereof for connecting with the vertically aligned tabs of the upper and lower plates, using one or more screws, bolts, and/or brackets. Additionally or alternatively, orifices distributed along the upper and lower edges of a flat-packed airfoil may be slot-shaped for receiving tabs pushed out from an upper and/or lower flat-packed plate. For instance, a tab pushed downwards from an upper plate may be bent for insertion into a slot on an upper edge of a flat-packed airfoil (e.g., like a hook or anchor). Similarly, a tab pushed upwards from a lower plate may be bent for insertion into a slot on a lower edge of a flat-packed airfoil, e.g., like a hook.

In some embodiments, a plurality of mating orifices may be distributed in a plurality of contours corresponding to a plurality of predefined curvatures. For example, a flat-packed plate may be configured to connect to two or more (e.g., C-shaped) airfoils. In such a case, the flat-packed plate may include two or more pluralities of mating orifices, each plurality of mating orifices tracing a different curved (e.g., C-shaped) path for engaging with a different plurality of connecting elements of a different (e.g., C-shaped) airfoil. For example, the plurality of mating orifices may include a first set of orifices tracing a first curved (e.g., C-shaped) path and a second set of orifices tracing a second curved (e.g., C-shaped path), oriented differently (e.g., 180°) from the first curved (e.g., C-shaped path). As another example, the plurality of mating orifices may include first, second, and third sets of orifices, each tracing a different curved (e.g., C-shaped path), each oriented differently (e.g., 120°) from each other curved (e.g., C-shaped path). As a further example, the plurality of mating orifices may include first, second, third, and fourth sets of orifices, each tracing a different curved (e.g., C-shaped path) oriented differently (e.g., 90°) from each adjacent curved (e.g., C-shaped) path.

By way of a non-limiting example, in FIG. 23, flat-packable wind turbine assembly kit 2300 may include a flat-packed upper plate 2312 and a flat-packed lower plate 2314. Flat-packed upper plate 2312 may include an upper plurality of mating orifices 2316 distributed in a contour 2320 corresponding to a predefined curvature (e.g., curvature 2402 in FIG. 24). Similarly, flat-packed lower plate 2314 may include a lower plurality of mating orifices 2318 distributed in a contour 2322 corresponding to a predefined curvature (e.g., curvature 2402). In some embodiments, flat-packed upper plate 2312 and flat-packed lower plate 2314 may be substantially similar, and interchangeable. Thus, to assemble a wind turbine from flat-packable wind turbine assembly kit 2300, upper plurality of mating orifices 2316 of flat-packed upper plate 2312 may be coupled with upper connecting elements 2308 distributed along upper edge 2304 of flat packed bendable airfoil 2302, and lower plurality of mating orifices 2318 of flat-packed lower plate 2314 may be coupled with lower connecting elements 2310 distributed along lower edge 2306 of flat packed bendable airfoil 2302. In some embodiments, upper edge 2304 and lower edge 2306 may be interchangeable (e.g., airfoil 2302 may be flipped 180°), and/or flat-packed upper plate 2312 and flat-packed lower plate 2314 may interchangeable.

In some disclosed embodiments, at least one of the upper plate and the lower plate are formed of two plies configured to be fastened together. A ply refers to a layer and/or sheet. For example, a panel may include multiple plies (e.g., each including differently oriented fibers) to provide strength and/or stability, mitigate warping, and/or to facilitate connections on either side thereof. A flat-packed plate formed of two plies refers to a planar shaped object including two layers. Each ply of a flat-packed plate may be made of a sturdy material, as described above. Two plies configured to be fastened together refers to two layers or panels configured to be connected and/or attached to each other. A pair of plies may be fastened together, for example, using an adhesive, a plurality of screws and/or bolts, hooks, and loops, and/or any other type of connector. In some embodiments, a first ply of the two plies may include a first plurality of mating orifices for connecting to a first plurality of connecting elements distributed along an edge of a first flat packed bendable airfoil, and the second ply may include a second plurality of mating orifices for connecting to a plurality of second connecting elements distributed along an edge of a second flat packed bendable airfoil. For instance, a flat-packable plate may be sandwiched between two airfoils, where an upper airfoil may connect to an upper ply of the two plies and a lower airfoil may connect to a lower ply of the two plies. In some embodiments, a flat-packed plate may include more than two plies. In some embodiments, flat-packable wind turbine assembly kit may include a flat-packed plate having two plies fastened together (e.g., in advance). In some embodiments, flat-packable wind turbine assembly kit may include two separate plies for fastening together to form a plate during turbine assembly.

In some disclosed embodiments, the two plies include rigidity-enhancing bends. A bend refers to a warp, kink, and/or a curved portion. For example, a substantially flat panel may include one or more localized upwards and corresponding downwards bends, together forming one or more pits, indentations, grooves, and/or hollows. Rigidity-enhancing bends refer to bends that may provide stability, offset stresses and/or strains, and/or minimize deformations in a plate. For example, a shape of the rigidity-enhancing bends may offset stresses, and/or strains that may otherwise deform and/or damage a plate connected to one or more airfoils of a wind turbine. In some embodiments, the rigidity-enhancing bends may provide locations for screws and/or bolts to connect the two plies together. For example, an upper ply may include downwards facing indentations formed from rigidity-enhancing bends, and a lower ply may include matching upwards facing indentations formed from rigidity-enhancing bends. Placing the upper ply flush against the lower ply may cause the upper and lower plies to touch at the matching locations of the indentations. The upper and lower plies may be connected where the plies touch using screws and/or bolts.

In some embodiments, an upper edge and/or a lower edge of a flat-packed airfoil may connect to an upper flat-packed plate and/or lower flat-packed plate, respectively, at the locations of the rigidity enhancing bends.

Figure 26:
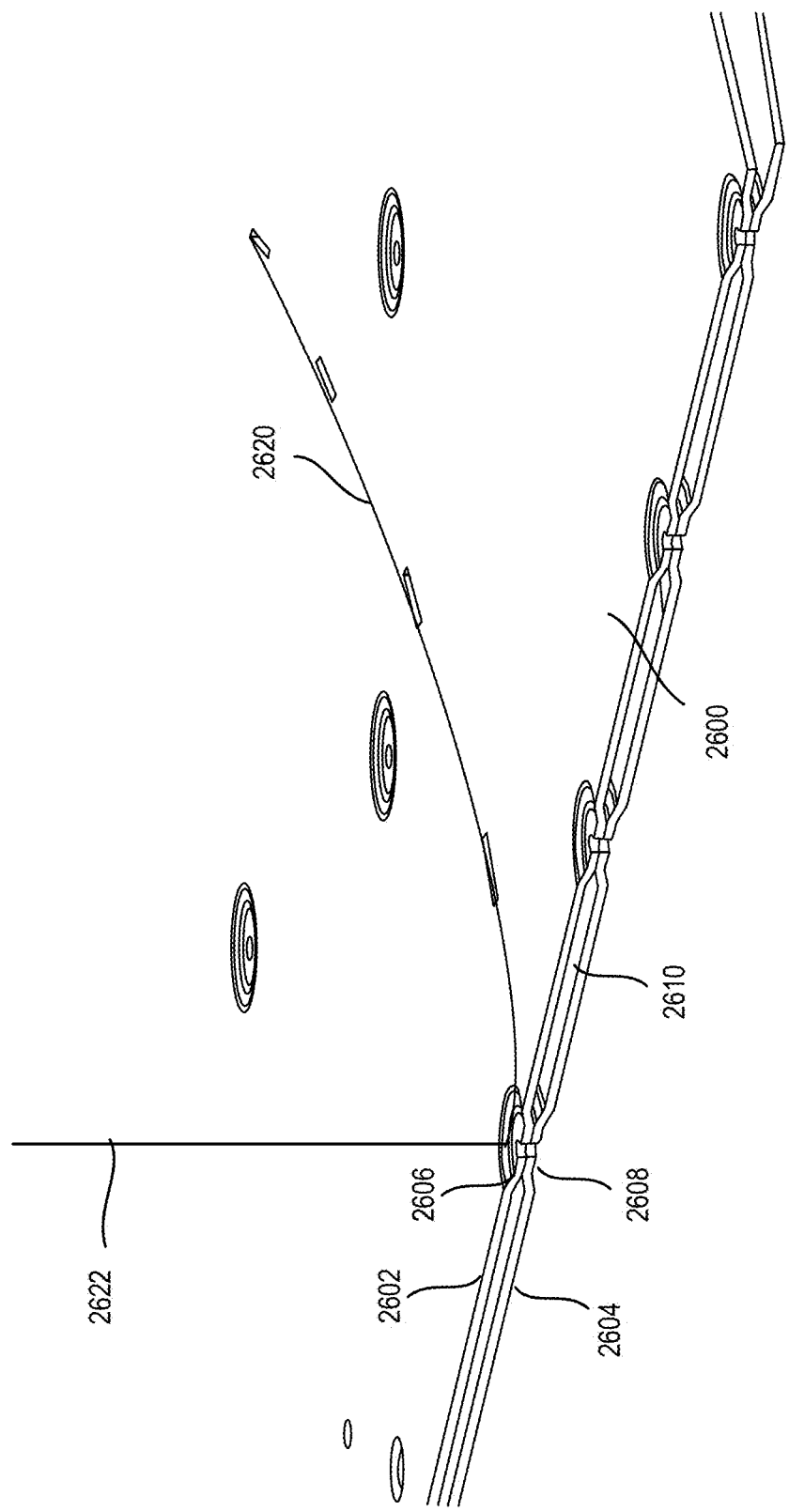
FIG. 26 illustrates a perspective view of a section of a flat-packable plate, consistent with embodiments of the present disclosure.

By way of a non-limiting example, reference is made to FIG. 26 illustrating a perspective view of a section of a flat-packable plate 2600, consistent with embodiments of the present disclosure. In some embodiments, at least one of flat-packed upper plate 2312 and flat-packed lower plate 2314 may correspond to flat-packable plate 2600. Flat-packable plate 2600 may be formed of two plies 2602 and 2604 configured to be fastened together. Plies 2602 and 2604 may include rigidity-enhancing bends 2606 and 2608. Bends 2606 and 2608 may distribute, offset, and/or absorb at least some stresses and/or strains that flat-packable plate 2600 may be subjected to during turbine operation.

Bends 2606 and 2608 may be located such that when plies 2602 and 2604 are placed flush against each other, bends 2606 and 2608 may align. Bends 2606 and 2608 may be oriented opposite to each other, such that when plies 2602 and 2604 are placed flush against each other, ply 2602 come in contact with ply 2604 at the locations of bends 2606 and 2608, whereas a gap 2610 may form between plies 2602 and 2604 at locations other than bends 2606 and 2608. One or more screws or bolts may be used to secure plies 2602 and 2604 together at the locations of bends 2606 and 2608. In some embodiments, bends 2606 and 2608 may form disk-shaped depressions, e.g., for receiving a screw or bolt.

In some embodiments, a lower edge 2620 of a flat-packed airfoil 2622 may connect to (e.g., lower) flat-packed plate 2600 at the location of bends 2606 and 2608, e.g., to distribute and/or offset stresses and/or strains imposed by flat-packed airfoil 2622 on flat-packed plate 2600 during turbine operation. In a similar manner, an upper edge of a flat-packed airfoil may connect to an upper flat-packed plate at the locations of similar bends.

In some disclosed embodiments, the upper connecting elements and the lower connecting elements include integrally formed bendable tabs respectively extending from the upper edge and the lower edge. Integrally formed components refer to multiple components created as a single, unified structure, e.g., as opposed to being assembled from separately manufactured parts. A tab refers to a protruding element, such as a tooth, a tongue, and/or handle. A tab may be triangular, square, rectangular, and/or have any other shape. Extending from an edge refers to projecting and/or protruding from a boundary. In some embodiments, integrally formed bendable tabs on an airfoil may be symmetric on either edge, e.g., to permit cutting a plurality of airfoils from a single sheet of material. For instance, cutting an edge of a flat-packable airfoil having bendable tabs extending outwards in one direction from a sheet of material may expose another edge of an adjacent flat-packable airfoil having bendable tabs extending outwards in an opposite direction. Cutting multiple airfoils in this manner may reduce waste. A bendable tab refers to a tab that may be flexible and/or capable of being deformed, e.g., upon application of pressure. Thus, the connecting elements of the at least one airfoil may include integrally formed tabs (e.g., teeth) extending from the upper edge and lower edge. In some embodiments, connecting elements of a flat-packed airfoil may be aligned flat with the flat-packable airfoil prior to turbine assembly (e.g., for stacking with other flat-packed components), and may be bent on-site during turbine installation.

In some disclosed embodiments, the upper plurality of mating orifices and the lower plurality of mating orifices include slots for receiving the bendable tabs. A slot refers to a slit, gap, and/or groove. In some embodiments, a slot may be shaped to accommodate a tab. Receiving bendable tabs refers to engaging and/or coupling with the bendable tabs. For example, during turbine assembly, each vertically aligned bendable tab on an edge of a vertically aligned airfoil may be inserted through a different slot of a horizontally aligned plate, or vice versa. In some instances, one or more exposed portions of the vertically-oriented bendable tabs may be pressed down horizontally against the horizontally aligned plate, e.g., to prevent the tabs from slipping out of orifices, thereby securing the airfoil to the plate. In some embodiments, an airfoil may be connected to one or more plates only using a plurality of integrally formed bendable tabs inserted through corresponding mating orifices. In some embodiments, exposed portions of one or more bendable tabs pressed down horizontally against a horizontally aligned plate may additionally be secured using one or more screws and/or bolts.

By way of a non-limiting example, in FIG. 23, upper connecting elements 2308 and lower connecting elements 2310 may include integrally formed bendable tabs 2308, e.g., cut from a single sheet of metal. The bendable tabs may extend from upper edge 2304 and lower edge 2306. Upper plurality of mating orifices 2316 and lower plurality of mating orifices 2318 may include slots for receiving the bendable tabs 2308 and 2310.

Figure 27:
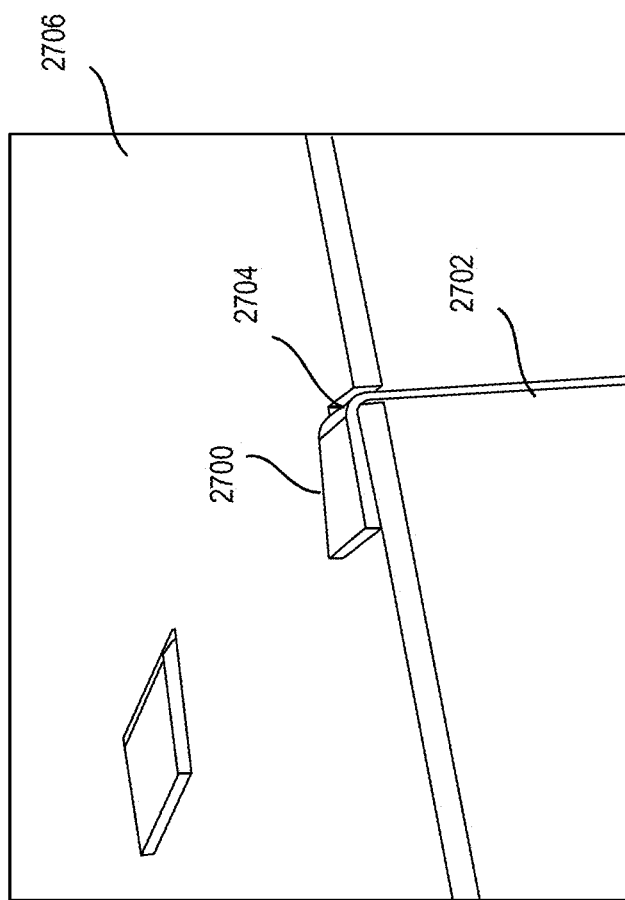
FIG. 27 illustrates a bendable tab of a flat-packable airfoil inserted through a mating orifice of a flat-packable plate, consistent with embodiments of the present disclosure.

By way of another non-limiting example, reference is made to FIG. 27 illustrating a bendable tab 2700 of a vertically aligned flat-packable airfoil 2702 inserted through a mating orifice 2704 of a horizontally aligned flat-packable plate 2706, consistent with embodiments of the present disclosure. Flat-packable airfoil 2702 may correspond to flat-packable airfoil 2302 of FIG. 23, and flat-packable plate 2706 may correspond to flat-packable plate 2312 or flat-packable plate 2314. Bendable tab 2700 may pass through mating orifice 2704 in a vertical orientation, corresponding to a vertical orientation of flat-packable airfoil 2702. An exposed portion 2708 of bendable tab 2700 (e.g., extending past the surface of flat-packable plate 2706) may be pressed down to lie flush against horizontally aligned flat-packable plate 2706, thereby fastening flat-packable airfoil 2702 to flat-packable plate 2706 absent screws and/or bolts.

In some disclosed embodiments, the upper plate and the lower plate are circular. Circular refers to having a symmetrically round shape. For example, circular shaped upper and lower plates may accommodate a substantially symmetrically curved airfoil. In some disclosed embodiments, the upper plate and the lower plate are oval-shaped. Oval-shaped refers to having an elongated, and/or elliptical curved shape. For example, oval-shaped upper and lower plates may accommodate an asymmetrically curved airfoil. In some embodiments, an oval-shaped plate may require less material than a non-oval shape, and may save costs. In some embodiments, a fluid turbine may incudes a plurality of tiers, where a first tier may include a first oval-shaped plate supporting one or more first airfoils in a first orientation, and a second tier may include a second oval-shaped plate supporting one or more second airfoils in a second orientation. For example, the first orientation and second orientation may be angularly offset by 30°, 60°, 90°, and/or any other angular offset. Such an offset may permit a stackable fluid turbine to include multiple airfoils oriented in different directions, concurrently. In some embodiments, the upper plate and/or lower plate may be square shaped, rectangular shaped, or may have any other shape.

By way of a non-limiting example, in FIG. 23, upper plate 2312 and lower plate 2314 of flat-packable wind turbine assembly kit 2300 may be circular.

Figure 28:
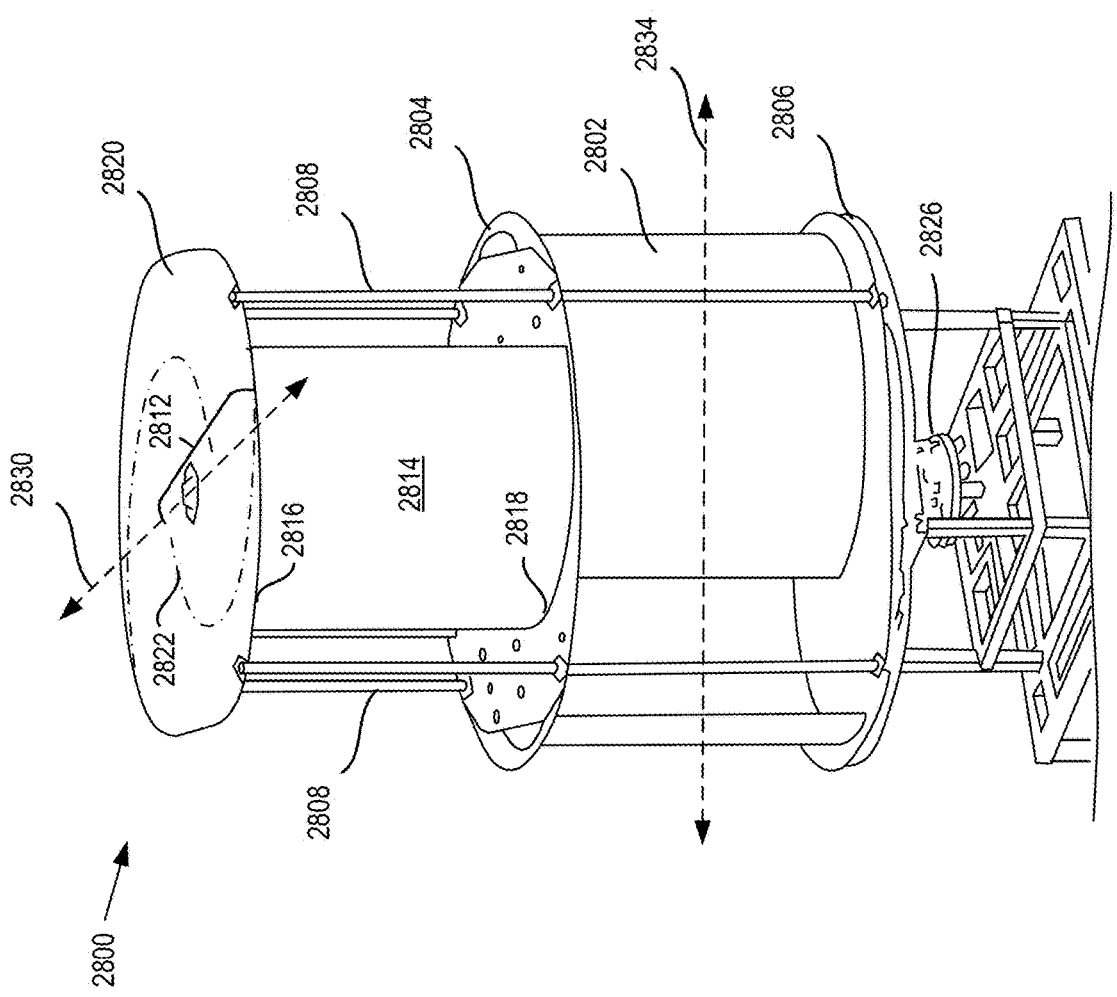
FIG. 28 illustrates a wind turbine assembled from a flat-packable wind turbine assembly kit, consistent with embodiments of the present disclosure.

By way of another non-limiting example, reference is made to FIG. 28 illustrating a wind turbine 2800 assembled from a flat-packable wind turbine assembly kit, consistent with embodiments of the present disclosure. Wind turbine 2800 may include at least one flat-packed bendable airfoil 2802 sandwiched between a flat-packed upper plate 2804 and a flat packed lower plate 2806. In some embodiments, flat-packed bendable airfoil 2802 may correspond to flat-packed bendable airfoil 2302 of FIG. 23, and flat-packed upper plate 2804 and flat packed lower plate 2806 may each include a plurality of mating orifices corresponding to mating orifices 2316 and 2318. Flat-packed upper plate 2804 and flat packed lower plate 2806 may be oval-shaped.

In some disclosed embodiments, upon assembly when the plurality of upper connecting elements are connected to the upper plurality of mating orifices and when the plurality of lower connecting elements are connected to the lower plurality of mating orifices, the at least one flat-packed bendable airfoil assumes the predefined curvature. Upon assembly refers to after installation and/or construction. A flat-packed bendable airfoil assuming a predefined curvature refers to a pliable airfoil taking on a curved shape defined in advance. For example, a flat-packed bendable airfoil, a flat-packed upper plate, and a flat-packed lower plate may be delivered to a wind farm site as flattened, stacked components transported in a compact fashion. At the wind farm site, the flat-packed bendable airfoil, flat-packed upper plate, and flat-packed lower plate may be assembled into a non-flat (e.g., three-dimensional and/or operational) wind turbine including at least one curved airfoil. The assembly may include connecting at least some of the upper connecting elements of the upper edge of the flat-packed bendable airfoil to a different upper mating orifice distributed in a contour corresponding to a predefined curvature on the upper plate. Connecting the upper edge thus may cause the bendable airfoil to bend in a manner corresponding to the predefined curvature. In a similar manner, at least some of the lower connecting elements on the lower edge of the flat-packed bendable airfoil may be connected to a different lower mating orifice distributed in a contour corresponding to the predefined curvature on the lower plate. Thus, the lower edge of the flat-packed bendable airfoil may similarly bend to correspond to the predefined curvature. In this manner, the upper edge and the lower edge of the flat-packed bendable airfoil may assume the predefined curvature. Bending the airfoil in this manner may permit the airfoil to spin in response to an airflow. The spinning motion may be transferred to a generator for generating electrical energy via a turbine shaft.

By way of a non-limiting example, in FIGS. 23 and 24, upon assembly, when plurality of upper connecting elements 2308 are connected to upper plurality of mating orifices 2316, and when plurality of lower connecting elements 2310 are connected to lower plurality of mating orifices 2318, at least one flat-packed bendable airfoil 2302 may assume predefined curvature 2402. For example, predefined curvature 2402 may correspond to contours 2320 and 2322.

In some disclosed embodiments, the flat-packed bendable airfoil, the flat-packed upper plate, and the flat-packed lower plate are flat-packed together. Flat-packed together refers to stacked side-by-side or atop one another, e.g., for shipping and/or storing as a group of flat-packed elements for assembling a wind turbine. For example, the flat-packed bendable airfoil, the flat-packed upper plate, and the flat-packed lower plate may be stacked together for transporting in a compact manner to a wind farm site.

Figure 32:
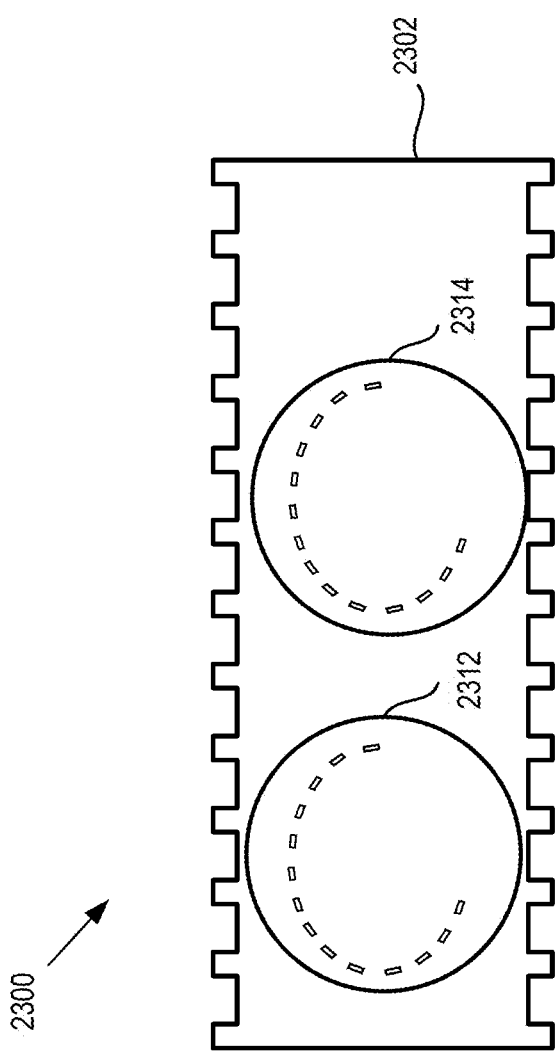
FIG. 32 illustrates a flat-packable wind turbine assembly kit flat-packed together, consistent with embodiments of the present disclosure.

By way of a non-limiting example, reference is made to FIG. 32, illustrating kit 2300 flat packed together, consistent with embodiments of the present disclosure. Flat-packed upper plate 2312 and flat-packed lower plate 2314 may be stacked on top of flat-packed bendable airfoil 2302 in a compact manner, e.g., for storage and/or transport.

Some disclosed embodiments involve a plurality of support beams configured to extend between the upper plate and the lower plate for providing rigidity to the assembled wind turbine. A support beam refers to a column and/or post for connecting, holding, or propping up adjacently located components. In some embodiments, the support beam may also help to absorb stress, strain, torque, and/or twisting motion caused by a spinning turbine. To extend between an upper plate and a lower plate refers to covering a distance separating the upper plate from the lower plate. For example, a length of a support beam may be at least as long as a height of a vertically-aligned airfoil sandwiched between an upper plate and a lower plate. Providing rigidity to an assembled wind turbine refers to furnishing and/or supplying support and/or stiffness to an installed and/or operational wind turbine. For example, the spinning motion of a wind turbine may generate twisting and/or buckling forces that may compromise the structure of a wind turbine. A plurality of support beams may absorb and/or offset at least some of the twisting and/or buckling forces to stabilize the wind turbine during operation.

In some disclosed embodiments, the plurality of support beams are rods. A rod refers to a pole, bar, and/or column of a material. For example, multiple rods may extend between the upper and lower plate to lend support to a spinning wind turbine. In some embodiments, a plurality of rods may be packaged together with a flat-packed bendable airfoil, a flat-packed upper plate, a the flat-packed lower plate for storage and/or transport in a compact manner. In some embodiments, one or more rods may connect directly to the upper and/or lower plates e.g., using a plurality of connecting elements. For example, one or more flat-packed plates may include orifices for connecting to one or more support rods, e.g., on the edges of the plates. The rods may be fastened to a plate using one or more screws, nuts, washers, and/or bolts. In some embodiments, one or more rods may pass through one or more openings in the upper and/or lower plates for connection to one or more additional plates. For example, a multi-storied stackable wind turbine may include a plurality of tiers, each including an airfoil sandwiched between two plates. One or more rods may pass through multiple plates and extend the height of the multi-storied stackable wind turbine.

By way of a non-limiting example, in FIG. 28, a flat-packable wind turbine assembly kit (e.g., flat-packable wind turbine assembly kit 2300 of FIG. 23) may include a plurality of support beams 2808. Support beams 2808 may extend between upper plate 2804 and lower plate 2806 for providing rigidity to assembled wind turbine 2400. In some embodiments, support beams 2808 may be rods. For example, support beams 2808 may be made of a rigid material such as metal (e.g., steel) capable of withstanding stresses and/or strains. In some embodiments, one or more support beams may extend from plate 2806 located at the bottom of multi-story turbine 2800 to plate 2820 located at the top of multi-story turbine 2800.

In some disclosed embodiments, the upper connecting elements and the lower connecting elements include apertures respectively located along the upper edge and the lower edge, and wherein locations of the apertures correspond to location of the upper orifices and the lower orifices for enabling interconnection via a plurality of brackets. An aperture and an orifice both refer to a hole and/or opening. A bracket refers to a component that extends between two components to aid in interconnecting them. A bracket may have a bent shape for connecting two differently oriented elements, such as for connecting a vertically oriented airfoil with a horizontally oriented plate. Some exemplary shapes for a bracket may include an L-shaped bracket or a U-shaped bracket, although the bracket may have any other suitable shape. In one example, the bracket may be an L-shaped bracket that may be used to connect blades to upper and lower plates when fasteners interconnect the bracket with the apertures in the blades and the orifices in the plates. These fasteners may include rivets, nuts/bolts, screws, or another other joining member. connecting element including an aperture The locations of the apertures corresponding to locations of the orifices refers to an alignment between the positions of the holes in the connecting elements and the positions of the orifices. For instance, such an alignment may permit connecting an airfoil to a plate when the airfoil is transitioned from its flat-packed form to its assembled form. Interconnection refers to a coupling, joining, and/or attachment of multiple different elements. To further elaborate, a bracket may include any structural component for supporting and/or interconnecting two or more elements.

In some disclosed embodiments, the plurality of brackets include L-brackets. An L-bracket refers to a bracket bent at substantially 90°. For example, an L-shaped bracket may include a first opening on a horizontally oriented section for connecting via a first screw to a horizontally oriented plate, and a second opening on a vertically oriented section for connecting via a second screw to a vertically oriented airfoil. Interconnection via a plurality of brackets refers to using a plurality of brackets to attach an upper edge of an airfoil to an upper plate, and attach a lower edge of an airfoil to a lower plate. For example, one or more pierced upper connecting elements on the upper edge of the airfoil may each correspond to a different upper mating orifice of the upper plate, and one or more pierced lower connecting elements on the lower edge of the airfoil may each correspond to a different lower mating orifice of the lower plate. An upper bracket may be positioned with each upper connecting element and corresponding one of the upper orifices, permitting interconnection of each upper connecting element and corresponding upper orifice using an upper bracket, thereby connecting the upper edge of the airfoil to the upper plate. Similarly, a lower bracket may be positioned with each lower connecting element and corresponding one of the lower orifices, permitting interconnection of each lower connecting element and corresponding lower orifice using a lower bracket, thereby connecting the lower edge of the airfoil to the lower plate.

Figure 29:
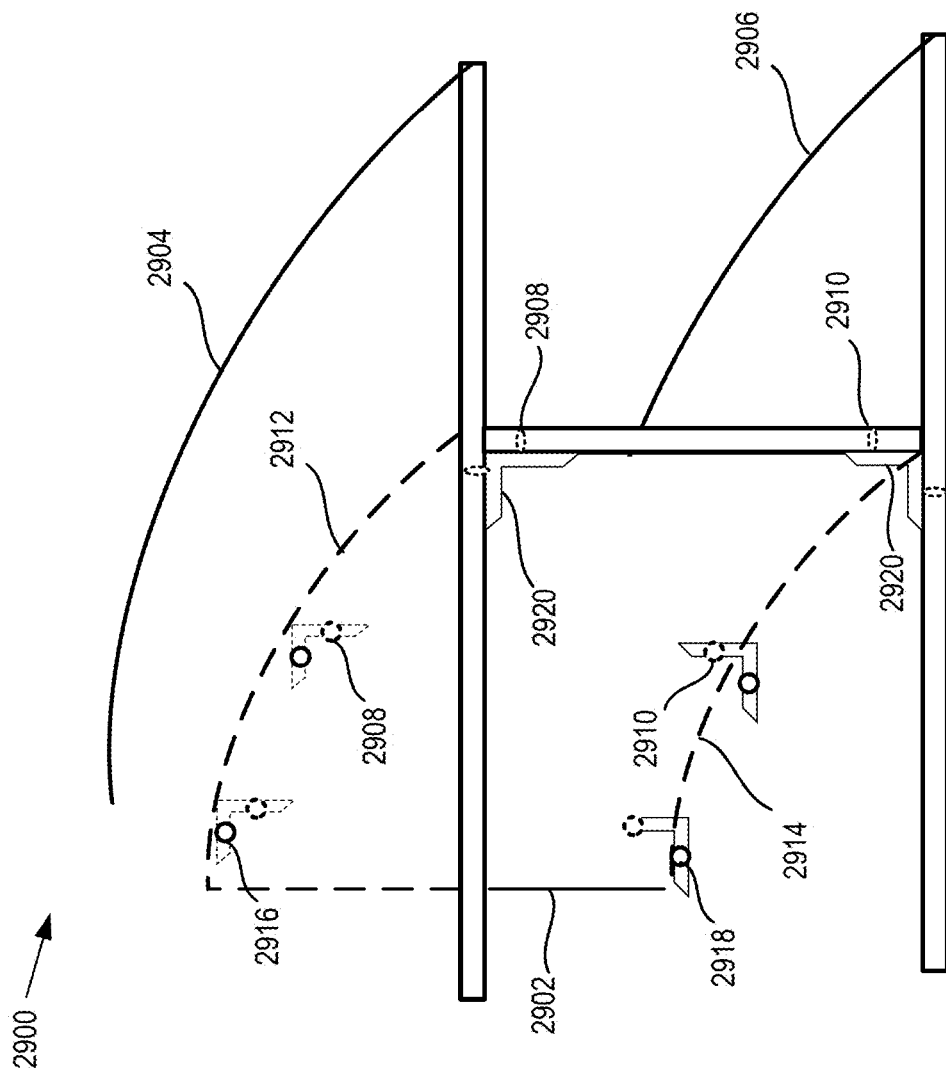
FIG. 29 illustrates a cross-section of a wind turbine assembled from a flat-packable wind turbine assembly kit, consistent with embodiments of the disclosure.

By way of a non-limiting example, reference is made to FIG. 29, which illustrates a cross-section of a wind turbine 2900 assembled from a flat-packable wind turbine assembly kit, consistent with embodiments of the disclosure. Wind turbine 2900 may include at least one flat-packed bendable airfoil 2902 connected to a flat-packed upper plate 2904 and a flat-packed lower plate 2906. Wind turbine 2900 may be substantially similar to wind turbine 2400 of FIG. 24 with the noted difference that the upper connecting elements may include apertures 2908 located along an upper edge 2912 of flat-packed bendable airfoil 2902 and the lower connecting elements may include apertures 2910 located along a lower edge 2914 of flat-packed bendable airfoil 2902. The locations of apertures 2908 and 2910 may correspond to location of upper orifices 2916 on upper plate 2904 and lower orifices 2918 on lower plate 2906, respectively, for enabling interconnection via a plurality of brackets 2920. In some embodiments, plurality of brackets 2920 include L-brackets.

In some disclosed embodiments, the upper plate includes a second-story lower plurality of mating orifices distributed in a second-story contour corresponding to a second-story predefined curvature. A second story refers to a second tier and/or a second layer. For example, flat-packable wind turbine assembly kit including at least one airfoil, a single upper plate, and a single lower plate (e.g., as described earlier) may constitute a first story, or base tier for a vertically stacked multi-story turbine. Additional stories may be assembled atop the first story to construct a multi-storied turbine including multiple airfoils. Each story of a stackable multi-story wind turbine may include at least one airfoil sandwiched between two plates (e.g., a plate for securing the airfoil from above and another plate for securing the airfoil from below). Thus, an upper plate of a first story or base tier of a multi-story wind turbine may also function as a bottom plate for a second story of the multi-story wind turbine. A flat-packed wind turbine assembly kit may thus include any number of flat-packed airfoils and flat-packed plates to assemble any number of wind turbines, each including any number of stores. Consequently, at least one plate (e.g., an intermediate plate) in a multi-story wind turbine may be configured for connection to at least one airfoil from below (e.g., at least one lower airfoil) and to at least one airfoil from above (e.g., at least one upper airfoil). Such an intermediate plate may include a first plurality of mating orifices for connecting to the a least one lower airfoil and a second plurality of mating orifices for connecting to the at least one upper airfoil. A lower airfoil may be configured to assume a first predefined curvature. Thus, an intervening plate may include a first plurality of mating orifices distributed along a contour corresponding to the first predefined curvature for connecting an upper edge of a lower airfoil to an underside of the intervening plate. An upper airfoil may be configured to assume a second predefined curvature. Thus, the intervening plate may include a second plurality of mating orifices distributed along a contour corresponding to the second predefined curvature for connecting a lower edge of an upper airfoil to an upper side of the intervening plate A second-story predefined curvature refers to a predefined curvature for an airfoil (as described earlier) positioned on a second story of a multi-story wind turbine. A second-story contour refers to another contour corresponding to a second predefined curvature of an additional airfoil configured for positioning on a second story of a multi-story wind turbine. A second-story lower plurality of mating orifices distributed in a second-story contour refers to a plurality of mating orifices arranged to follow contour, such that connecting a lower edge of an airfoil positioned on a second story of a multi-story wind turbine causes the lower edge of the airfoil to assume the second predefine curvature. An upper plate including a second-story lower plurality of mating orifices distributed in a second-story contour corresponding to a second-story predefined curvature refers to a plate including two pluralities of mating orifices distributed along two contours. A first plurality of mating orifices may follow a first contour corresponding to an (e.g., first story) predefined curvature of an airfoil configured for positioning in a first story of a multi-story wind turbine (e.g., a first-story airfoil). Connecting an upper edge of the first-story airfoil to the first plurality of mating orifices may cause the upper edge of the first-story airfoil to assume the first story predefined curvature. A second plurality of mating orifices may follow a second contour corresponding to an (e.g., second-story) predefined curvature of another airfoil configured for positioning on a second-story of a multi-story wind turbine (e.g., a second-story airfoil). Connecting a lower edge of the second-story airfoil to the second plurality of mating orifices may cause the lower edge of the second-story airfoil to assume the second-story predefined curvature.

In some embodiments, a flat-packed multi-story wind turbine may additionally include one or more support plates between each story. In some embodiments, a flat-packed multi-story wind turbine may additionally include a topmost support plate (e.g., above the uppermost story), and a bottom support plate (e.g., beneath the lowest story).

Figure 30:
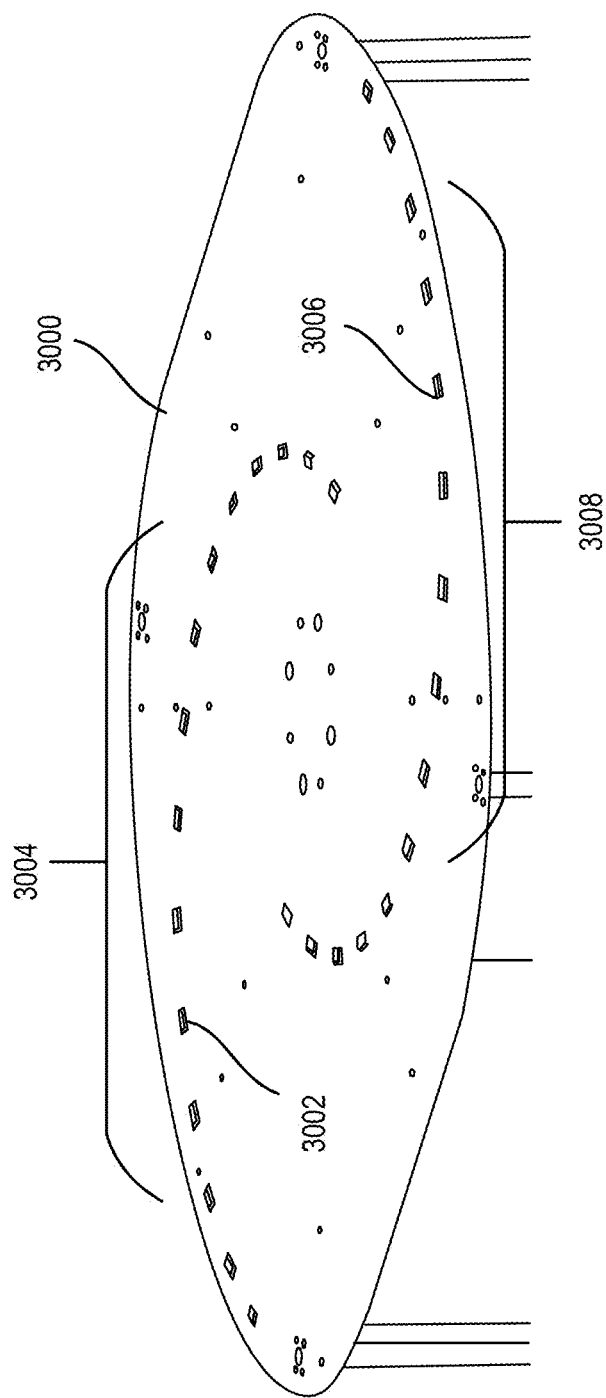
FIG. 30 illustrates a top view of an upper plate, consistent with embodiments of the disclosure.

By way of a non-limiting example, reference is made to FIG. 30, illustrating a top view of an upper plate 3000, consistent with embodiments of the disclosure. Upper plate 3000 may correspond to any of plates 2312, 2600, 2804, or 2904 of FIGS. 23, 26, 28, and 29, respectively. Upper plate 3000 may include an upper plurality of mating orifices 3002 distributed in an upper contour 3004 (e.g., corresponding to upper plurality of mating orifices 2316 distributed in contour 2320). Upper plurality of mating orifices 3002 may be used to connect to an upper edge of a first story airfoil, causing the upper edge of the first story airfoil to bend according to upper contour 3004. Upper plate 3000 may additionally include a second-story lower plurality of mating orifices 3006 distributed in a second-story contour 3008 corresponding to a second-story predefined curvature. Second-story lower plurality of mating orifices 3006 may be used to connect to a lower edge of a second-story airfoil, causing the lower edge of the second-story airfoil to bend according to second-story contour 3008.

Some disclosed embodiments involve a second-story flat-packed bendable airfoil having a second-story upper edge and a second-story lower edge, and being configured to assume the second-story predefined curvature upon assembly. A second-story flat-packed bendable airfoil having a second-story upper edge and a second-story lower edge, and being configured to assume the second-story predefined curvature upon assembly refers to an additional flat-packed bendable airfoil for installing on a second tier of a multi-story wind turbine. The additional flat-packed bendable airfoil may be configured to assume a predefined curvature (e.g., a second-story predefined curvature) upon connection to a plate at an upper edge thereof and another plate at a lower edge thereof, as described earlier. The second-story predefined curvature may be similar to, or may differ from the predefined curvature of the (e.g., first story) flat-packed bendable airfoil.

Some disclosed embodiments involve a second-story flat-packed plate including a second-story upper plurality of mating orifices distributed in the second-story contour corresponding to the second-story predefined curvature. A second-story flat-packed plate refers to an additional plate associated with a second-story of a multi-story wind turbine. For example, the additional plate may be configured to connect to an upper edge of the second-story flat-packed bendable airfoil. The second-story flat-packed bendable airfoil may thus be sandwiched between the upper flat-packed plate connected to a lower edge thereof, and the second-story flat-packed plate connected to an upper edge thereof. A second-story upper plurality of mating orifices distributed in the second-story contour corresponding to the second-story predefined curvature refers to a plurality of mating orifices arranged along a contour corresponding to the predefined curvature for a second-story flat-packed bendable airfoil. Connecting the lower edge of the second-story flat-packed bendable airfoil to the second-story lower plurality of mating orifices of the upper flat-packed plate, and connecting the upper edge of the second-story flat-packed bendable airfoil to the second-story upper plurality of mating orifices of the second-story flat-packed plate may cause the second-story flat-packed bendable airfoil to assume the second-story predefined curvature.

Some disclosed embodiments involve a plurality of second-story upper connecting elements distributed along the upper edge of the second-story flat-packed bendable airfoil. A plurality of second-story upper connecting elements distributed along the upper edge of the second-story flat-packed bendable airfoil may be understood as described earlier regarding a plurality of upper connecting elements distributed along the upper edge of at least one flat packed bendable airfoil. For example, the at least one flat packed bendable airfoil and the second-story flat-packed bendable airfoil may be substantially similar in size and may be capable of assuming similar shapes.

Some disclosed embodiments involve a plurality of second-story lower connecting elements distributed along the lower edge of the second-story flat-packed bendable airfoil. A plurality of second-story lower connecting elements distributed along the lower edge of the second-story flat-packed bendable airfoil may be understood as described earlier regarding a plurality of lower connecting elements distributed along the upper edge of at least one flat packed bendable airfoil, with the noted difference that the connecting elements may be distributed along a lower edge thereof. Thus, the second-story flat-packed bendable airfoil may include a plurality of connecting elements distributed along an upper edge thereof and a plurality of connecting elements distributed along an upper edge thereof. The pluralities of connecting elements on the upper and lower edges may permit connecting the upper edge of the second-story flat-packed bendable airfoil to the second-story upper plurality of mating orifices of the second-story flat-packed plate, and connecting the lower edge of the second-story flat-packed bendable airfoil to the second-story lower plurality of mating orifices of the upper plate.

In some disclosed embodiments, upon assembly when the plurality of second-story upper connecting elements are connected to the second-story upper plurality of mating orifices and when the second-story lower plurality of connecting elements are connected to the second-story lower mating orifices, the flat-packed bendable airfoil assumes the second-story predefined curvature. This refers to a manner of construction of the second-story of a multi-storied stackable wind turbine by engaging the plurality of connecting elements distributed along the upper edge of the second-story airfoil with the mating orifices of the second-story flat-packed plate, and engaging the plurality of connecting elements distributed along the lower edge of the second-story airfoil with the mating orifices of the upper flat-packed plate. The flat-packed bendable airfoil assuming the second-story predefined curvature refers to the second-story flat-packed bendable airfoil bending to form the second-story predefined curvature. For example, connecting the upper edge of the second-story flat-packed bendable airfoil to a plurality of orifices tracing the second-story predefined curvature and connecting the lower edge of the second-story flat-packed bendable airfoil to another plurality of orifices tracing the second-story predefined curvature may bend the second-story flat-packed bendable airfoil to follow the second-story predefined curvature.

By way of a non-limiting example, in FIG. 28, wind turbine 2800 (e.g., assembled from a flat-packable wind turbine assembly kit) may be a multi-story turbine and may include a second-story flat-packed bendable airfoil 2814 having a second-story upper edge 2816 and a second-story lower edge 2818. In some embodiments, second-story flat-packed bendable airfoil 2814 may correspond to flat-packed bendable airfoil 2302 of FIG. 23, or to flat-packed bendable airfoil 2902 of FIG. 29. Second-story flat-packed bendable airfoil 2814 may be sandwiched between flat-packed upper plate 2804 and a second-story flat-packed plate 2820. In some embodiments, flat-packed upper plate 2804 and a second-story flat-packed plate 2820 may correspond to plate 3000 of FIG. 3000. Thus, each of flat-packed upper plate 2804 and second-story flat-packed plate 2820 may include two pluralities of mating orifices distributed along two curvatures, for connecting to an airfoil from above and from below to permit assembly of a multi-story wind turbine. Second-story flat-packed bendable airfoil 2814 may assume second-story predefined curvature upon assembly corresponding to contour 2812.

Wind turbine 2800 may include second-story flat-packed plate 2820 having a second-story upper plurality of mating orifices 2822 distributed in the second-story contour 2812 corresponding to the second-story predefined curvature. Wind turbine 2800 may include a plurality of second-story upper connecting elements (not shown) distributed along upper edge 2816 of second-story flat-packed bendable airfoil 2814. For example, the second-story upper connecting elements may be similar to upper connecting elements 2308 of FIG. 23 or to upper connecting elements 2908 of FIG. 29.

Wind turbine 2800 may include a plurality of second-story lower connecting elements (not shown) distributed along lower edge 2818 of second-story flat-packed bendable airfoil 2814. For example, the second-story lower connecting elements may be similar to lower connecting elements 2310 of FIG. 23 or to lower connecting elements 2910 of FIG. 29. Upon assembly when the plurality of second-story upper connecting elements are connected to second-story upper plurality of mating orifices 2822 and when the second-story lower plurality of connecting elements are connected to the second-story lower mating orifices (e.g., corresponding to second-story lower plurality of mating orifices 3006 in FIG. 3), flat-packed bendable airfoil 2814 may assume the second-story predefined curvature 2812.

In some disclosed embodiments, the relative orientations of the upper plurality of mating orifices, the lower plurality of mating orifices, the second-story upper plurality of mating orifices and the second-story lower plurality of mating orifices are arranged such that differing associated airfoils face in differing directions upon assembly. An orientation refers to a direction, alignment, and/or bearing. A relative orientation refers to an orientation compared to a reference and/or baseline that may itself refer to an orientation. Relative orientations of mating orifices refers to a relative alignment of mating orifices. Arranged refers to positioned and/or situated. Differing associated airfoils refers to a plurality of airfoils that may be installed in different stories of a multi-story wind turbine. Face in differing directions refers to being exposed to different bearings and/or geographic locations. For instance, attaching the connecting elements on an edge of an airfoil to the mating orifices of a plate may cause the edge of the airfoil to bend along a contour traced by the mating orifices. Thus, the path traced by the mating orifices may define the curvature assumed by the airfoil. Since a plate may connect to two different airfoils on either side thereof, the plate may include two sets of mating orifices. One set of orifices may be associated with a top side of the plate for attaching to an upper story airfoil and another set of orifices may be associated with a bottom side of the plate for attaching to a lower story airfoil. Each set of orifices may be oriented to cause an airfoil to bend in a different direction. Thus, attaching a lower-story airfoil to a set of orifices associated with the bottom side of a plate may cause the lower-story airfoil to bend in a first direction, and attaching an upper-story airfoil to another set of orifices associated with the top side of the plate may cause the upper-story airfoil to bend in a second direction. The phrase the relative orientations of the upper plurality of mating orifices, the lower plurality of mating orifices, the second-story upper plurality of mating orifices and the second-story lower plurality of mating orifices are arranged such that differing associated airfoils face in differing directions upon assembly refers to the flat-packed lower plate, the flat-packed upper plate, and the second-story flat-packed plate each including two pluralities of mating orifices. Each plurality of mating orifices on each flat-packed plate may be distributed along a different contour corresponding to a different curvature. Consequently, attaching a first airfoil between the lower flat-packed plate and the upper flat-packed plate (e.g., on a first story of a multi-story turbine) causes the first airfoil to bend according to a first curvature and face a first direction, and attaching a second airfoil between the upper flat-packed plate and the second-story flat-packed plate (e.g., on a second-story of the multi-story turbine) causes the second airfoil to bend according to a second curvature and face a second direction that may be different from the first direction.

In some embodiments, an intervening flat-packed plate may include two or more pluralities of upper mating orifices for connecting two or more upper airfoils to an upper side thereof, and two or more pluralities of lower mating orifices for connecting to two or more lower airfoils to a lower side thereof. Each plurality of mating orifices may follow a different (e.g., C-shaped) contour. Connecting each flat-packed airfoil thus may cause each flat-packed airfoil to assume a different curvature, each corresponding to a curved path traced by a different plurality of mating orifices.

Figure 33:
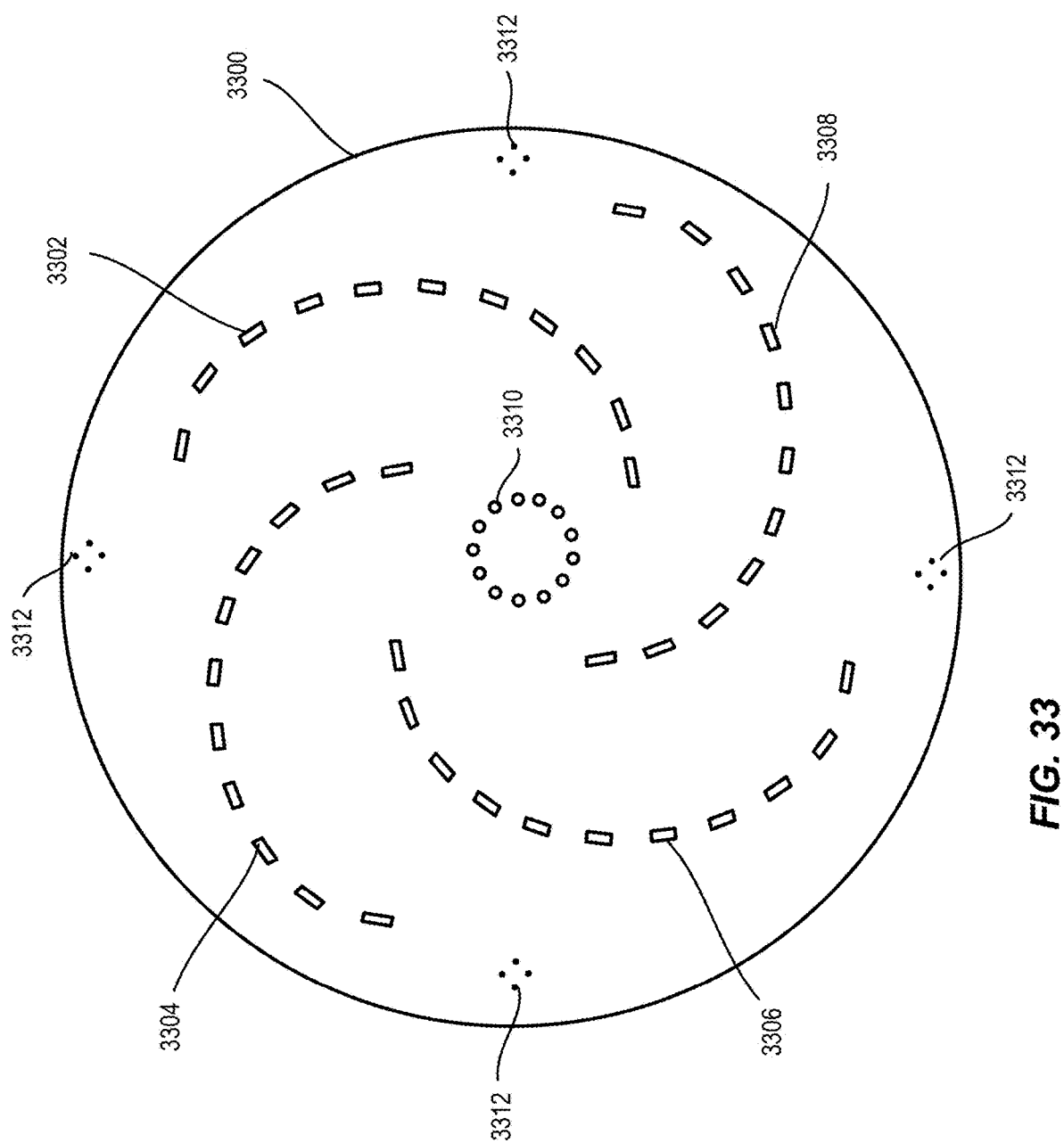
FIG. 33 illustrates an exemplary flat-packed plate for connecting to a plurality of flat-packed airfoils, consistent with disclosed embodiments.

By way of a non-limiting example, reference is made to FIG. 33 illustrating an exemplary flat-packed plate 3300 for connecting to a plurality of flat-packed airfoils, consistent with disclosed embodiments. In some embodiments, a flat-packable wind turbine assembly kit may include at least two flat-packed plates corresponding to flat-packed plate 3300, (e.g., an upper flat-packed plate 3300 and a lower flat-packed plate 3300). Each flat-packed plate 3300 may include four pluralities of mating orifices, 3302, 3304, 3306, and 3308, each distributed in a contour corresponding to a predefined curvature. Each of pluralities of mating orifices, 3302, 3304, 3306, and 3308 may be oriented differently from each other (e.g., each rotated by approximately 90° from each adjacent plurality of mating orifices). Each flat-packed plate 3300 may permit connecting two flat-packed airfoils (e.g., each corresponding to flat-packed airfoil 2302 of FIG. 23) to an upper side thereof, and two flat-packed lower airfoils to a lower side thereof at different orientations. For example, on an upper side of flat-packed plate 3300, a lower edge of a first flat-packed upper airfoil may connect to plurality of mating orifices 3302, and a lower edge of a second upper flat-packed airfoil may connect to plurality of mating orifices 3306, causing the lower edges of the first and second upper flat-packed airfoils to each bend according to the predefined curvatures traced by plurality of mating orifices 3302 and 3306, respectively. Similarly, on a lower side of flat-packed plate 3300, an upper edge of a first flat-packed lower airfoil may connect to plurality of mating orifices 3304, and an upper edge of a second lower flat-packed airfoil may connect to plurality of mating orifices 3308, causing the upper edges of the first and second lower flat-packed airfoils to each bend according to the predefined curvatures traced by plurality of mating orifices 3304 and 3308, respectively. In a similar manner, additional ones of flat-packed plate 3300 may connect to the upper edges of the first and second flat-packed upper airfoils, and to the lower edges of the first and second flat-packed lower airfoils, causing each of the upper flat-packed airfoils and each of the lower flat-packed airfoils to assume the predefined curvatures. Such an arrangement may produce a two-story stackable wind turbine, each story corresponding to wind turbine 2500 of FIG. 25. In some embodiments, the upper flat-packed airfoils and the lower flat-packed airfoils may partially overlap. Additional flat-packed plates may similarly include six pluralities of mating orifices to assemble multiple stories of wind turbine 2502 and eight pluralities of mating orifices to assemble multiple stories of wind turbine 2504.

In some embodiments, flat-packed plate 3300 may be oval-shaped. Alternating ones of flat-packed plate 3300 assembled in a multi-story wind turbine may be rotated relative to each other (e.g., by approximately 90°), as described elsewhere herein.

Figure 31:
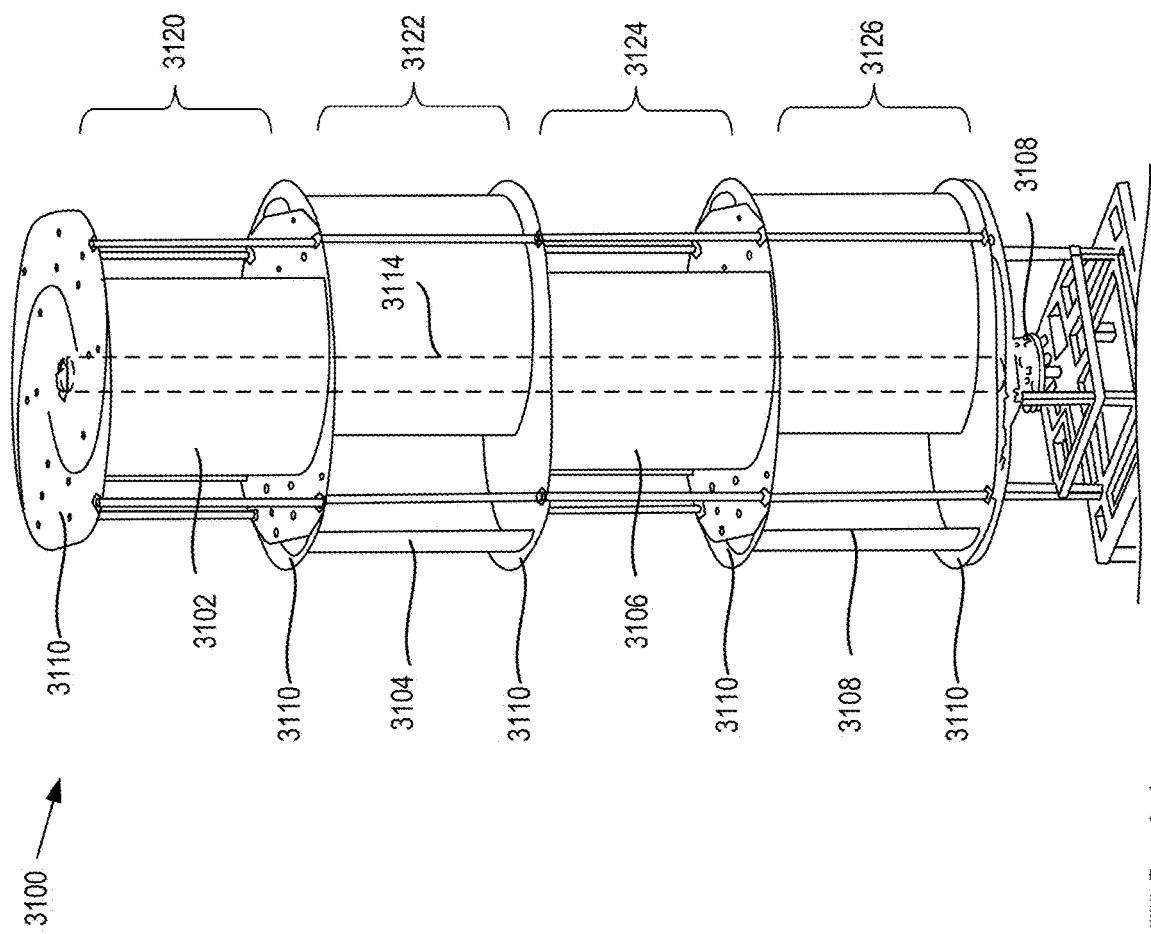
FIG. 31 illustrates a multi-story stackable wind turbine assembled from a flat-packable wind turbine assembly kit, consistent with embodiments of the disclosure.

In some embodiments, a flat-packed plate (e.g., flat-packed plate 2312, 2314, and/or flat-packed plate 3300) may additionally include a plurality of central orifices (e.g., orifices 3310) for securing to a central turbine shaft, e.g., using one or more brackets, screws, bolts, rivets, and/or washers (e.g., see shaft 3114 of FIG. 31). In some embodiments, a flat-packed plate (e.g., flat-packed plate 2302 and/or flat-packed plate 3300) may additionally include multiple sets of peripheral orifices (e.g., peripheral orifices 3312) for securing to one or more support beams (e.g., support beams 2808), e.g., using one or more screws, bolts, rivets, and/or washers.

In some disclosed embodiments, the directions differ by 90 degrees. Differ by 90 degrees refers to rotated by a quarter of a circle. For example, if an airfoil on a first story of a multi-story turbine faces a particular direction at a point in time, an airfoil on a second-story of the multi-story turbine may face a direction that may be at right angles to that direction at that point in time. In some disclosed embodiments, the directions differ by 30 degrees, or 60 degrees, or 45 degrees, or any other number of degrees.

By way of a non-limiting example, in FIGS. 28 and 30, flat-packed upper plate 2804 and second-story flat-packed plate 2820 may correspond to plate 3000. Thus, each of flat-packed upper plate 2804 and second-story flat-packed plate 2820 may include two pluralities of mating orifices corresponding to mating orifices 3002 distributed along contour 3004, and mating orifices 3006 distributed along contour 3008. One plurality of mating orifices may connect to an airfoil from above, and the other plurality of mating orifices may connect to an airfoil from below. The relative orientations of the upper plurality of mating orifices (e.g., orifices 3002) and the lower plurality of mating orifices (e.g., orifices 3006) of flat-packed upper plate 2804, the second-story upper plurality of mating orifices (e.g., orifices 3002) and the second-story lower plurality of mating orifices (e.g., orifices 3002) may be arranged such that differing associated airfoils 2802 and 2814 may face in differing directions 2830 and 2834 upon assembly.

In some disclosed embodiments, the at least one airfoil and the at least one second-story airfoil are configurable to turn a common generator. A common generator refers to a shared generator (as described elsewhere herein). The at least one airfoil and the at least one second-story airfoil are configurable to turn a common generator refers to connection of both airfoils of a two-story wind turbine to the same generator to enable transferring rotational motion of each flat-packed bendable airfoil to a rotor of the generator. Consequently, a single, shared generator may convert the rotational energy of multiple flat-packed bendable airfoils located on multiple stories of a multi-story stackable wind turbine to electrical energy. In some embodiments, a common shaft may connect to each flat-packed bendable airfoil of a multi-story wind turbine for transferring rotational motion of each flat-packed bendable airfoil a common generator. For example, a height of the common shaft may correspond to the height of the multi-story wind turbine.

By way of a non-limiting example, in FIG. 28, airfoil 2802 and second-story airfoil 2814 may turn a common generator 2826.

Some disclosed embodiments involve additional stories of airfoils atop a second story. Additional stories refers to three, four, or more stories of a multi-story wind turbine. A second story refers to a tier or layer on top of a first and/or base tier or layer, as described earlier. Each additional story may include a flat-packed bendable airfoil sandwiched between two flat-packed plates.

By way of a non-limiting example, reference is made to FIG. 31 illustrating a multi-story stackable wind turbine 3100 assembled from a flat-packable wind turbine assembly kit, consistent with embodiments of the disclosure. Multi-story stackable wind turbine 3100 may be substantially similar to multi-story wind turbine 2800 in FIG. 28 with the noted difference that multi-story stackable wind turbine 3100 includes at least four flat-packed bendable airfoils 3102, 3104, 3106, and 3108 stacked in four stories, 3120, 3122, 3124, and 3126, respectively. In some embodiments, one or more stories of multi-story wind turbine 3100 may include a plurality of flat-packed bendable airfoils, such as shown in FIG. 25. Each of airfoils 3102, 3104, 3106, and 3108 may be included in a turbine segment corresponding to wind turbine 2400 of FIG. 24 or wind turbine 2900 of FIG. 29. Each airfoil 3102, 3104, 3106, and 3108 may be sandwiched between two different plates 3110. Plates 3110 may correspond to any of plates 2312, 2314 of FIG. 23, 2904, or 2906 of FIG. 29. At least some of plates 3110 may connect on an upper side thereof to one of airfoils 3102, 3104, 3106 and on a bottom side thereof to one of airfoils 3104, 3106, and 3108. In some embodiments, multi-story stackable wind turbine 3100 may include a common shaft 3114 extending from the lowermost airfoil 3108 to the uppermost airfoil 3102. Common shaft 3114 may connect to a common generator 3116 for producing electrical energy from the combined rotational motions of airfoils 3102, 3104, 3106, and 3108.

Although this disclosure relates to a flat-packed stackable wind turbine, the systems and methods described may be applied for a flat-packed (e.g., stackable) water turbine, flat-packed (e.g., stackable) gas turbine, flat-packed (e.g., stackable) steam turbine, or any other type of flat-packed (e.g., stackable) fluid turbine.

Examples of inventive concepts are contained in the following clauses which are an integral part of this disclosure.

Clause 1. A system for altering orientation of fluid turbines within a cluster, the system comprising:
  a first fluid turbine for assuming a first orientation relative to a direction of fluid flow;
  a second fluid turbine in proximity to the first fluid turbine, the second fluid turbine for assuming a second orientation relative to the first orientation of the first fluid turbine, wherein at least one of the first orientation of the first fluid turbine and the second orientation of the second fluid turbine is selectively adjustable to mitigate interference with downstream turbine operation;
  at least one processor configured to:
    receive an indication that the first fluid turbine imposes the interference on the downstream operation of the second fluid turbine;
    based on the indication, determine a third orientation for one of the first fluid turbine and the second fluid turbine, the third orientation enabling the first fluid turbine and the second fluid turbine to produce a greater aggregate level of electrical energy than would be produced with the first fluid turbine in the first orientation and the second fluid turbine in the second orientation; and
    transmit a signal for changing one of the first orientation of the first fluid turbine and the second orientation of the second fluid turbine to the third orientation, thereby mitigating the interference on the downstream operation of the second fluid turbine.

Clause 2. The system of clause 1, wherein the first fluid turbine has a first vertical axis of blade rotation, and the second fluid turbine has a second vertical axis of blade rotation, and wherein the signal is configured to translate at least one of the first vertical axis and the second vertical axis relative to another of the first vertical axis and the second vertical axis.

Clause 3. The system of any of clauses 1 and 2, further comprising a track associated with at least one of the first fluid turbine and the second fluid turbine, wherein translating includes moving at least one of the first vertical axis and the second vertical axis relative to the track.

Clause 4. The system of any of clauses 1 to 3, wherein the track is arc shaped.

Clause 5. The system of any of clauses 1 to 4, The system of claim 4, wherein an angular position of the vertical axis of one of the first fluid turbine and the second fluid turbine functions within the arc of the track.

Clause 6. The system of any of clauses 1 to 5, The system of claim 3, wherein the track is linearly shaped.

Clause 7. The system of any of clauses 1 to 6, further comprising a grid associated with at least one of the first fluid turbine and the second fluid turbine, and wherein translating at least one of the first vertical axis and the second vertical axis includes movement along at least one track of the grid.

Clause 8. The system of any of clauses 1 to 7, wherein at least one of the first vertical axis and the second vertical axis is mounted on a movable base, and wherein translating includes moving the base.

Clause 9. The system of any of clauses 1 to 8, wherein one of the first vertical axis and the second vertical axis is immovable relative to a ground position, and wherein translating includes moving the movable base relative to the immovable one of the first vertical axis and the second vertical axis.

Clause 10. The system of any of clauses 1 to 9, wherein the first fluid turbine has a first horizontal axis of blade rotation, and the second fluid turbine has a second horizontal axis of blade rotation, and wherein the signal is configured to rotate at least one of the first horizontal axis and the second horizontal axis.

Clause 11. The system of any of clauses 1 to 10, further comprising at least one motor associated with at least one of the first fluid turbine and the second fluid turbine, the at least one motor being configured to cause the changing in response to the signal.

Clause 12. The system of any of clauses 1 to 11, wherein the first fluid turbine and the second fluid turbine are wind turbines and the fluid flow includes airflow.

Clause 13. The system of any of clauses 1 to 12, wherein the first fluid turbine and the second fluid turbine are water turbines and the fluid flow includes water flow.

Clause 14. The system of any of clauses 1 to 13, wherein the at least one processor is further configured to transmit an additional signal for changing another of the first orientation of the first fluid turbine and the second orientation of the second fluid turbine to a fourth orientation, the third orientation and the fourth orientation enabling the first fluid turbine and the second fluid turbine to produce a greater aggregate level of electrical energy than would be produced with the first fluid turbine in the first orientation and the second fluid turbine in the second orientation.

Clause 15. The system of any of clauses 1 to 14, wherein the fourth orientation corresponds to the first orientation or the second orientation.

Clause 16. The system of any of clauses 1 to 15, wherein the indication reflects a lesser amount of power output from one of the first fluid turbine and the second fluid turbine than another of the first fluid turbine and the second fluid turbine.

Clause 17. The system of any of clauses 1 to 16, further comprising at least one sensor, the at least one sensor including at least one of a blade rotation sensor, a fluid flow sensor, or an electrical energy output sensor.

Clause 18. The system of any of clauses 1 to 17, further comprising a plurality of additional fluid turbines, wherein some of the additional fluid turbines are adjustable to mitigate interference with downstream turbine operation.

Clause 19. A non-transitory computer readable medium containing instructions that when executed by at least one processor cause the at least one processor to perform operations for altering orientation of fluid turbines within a cluster of this clause and any of the preceding clauses, the operations comprising:
  receiving an indication that a first fluid turbine imposes interference on a downstream operation of a second fluid turbine when the first fluid turbine assumes a first orientation relative to a direction of fluid flow and the second fluid turbine assumes a second orientation relative to the first orientation of the first fluid turbine, and wherein at least one of the first orientation of the first fluid turbine and the second orientation of the second fluid turbine is selectively adjustable to mitigate interference with downstream turbine operation;
  based on the indication, determining a third orientation for one of the first fluid turbine and the second fluid turbine, the third orientation enabling the first fluid turbine and the second fluid turbine to produce a greater aggregate level of electrical energy than would be produced with the first fluid turbine in the first orientation and the second turbine in the second orientation; and
  transmitting a signal for changing one of the first orientation of the first fluid turbine and the second orientation of the second fluid turbine to the third orientation, thereby mitigating the interference on the downstream operation of the second fluid turbine.

Clause 20. A method for altering orientation of fluid turbines within a cluster of this clause and any of the preceding clauses, the method comprising:
  receiving an indication that a first fluid turbine imposes interference on a downstream operation of a second fluid turbine when the first fluid turbine assumes a first orientation relative to a direction of fluid flow and the second fluid turbine assumes a second orientation relative to the first orientation of the first fluid turbine, and wherein at least one of the first orientation of the first fluid turbine and the second orientation of the second fluid turbine is selectively adjustable to mitigate interference with downstream turbine operation;
  based on the indication, determining a third orientation for one of the first fluid turbine and the second fluid turbine, the third orientation enabling the first fluid turbine and the second fluid turbine to produce a greater aggregate level of electrical energy than would be produced with the first fluid turbine in the first orientation and the second turbine in the second orientation; and
  transmitting a signal for changing one of the first orientation of the first fluid turbine and the second orientation of the second fluid turbine to the third orientation, thereby mitigating the interference on the downstream operation of the second fluid turbine.

Clause 21. A non-transitory computer readable medium containing instructions that when executed by at least one processor cause the at least one processor to perform operations for coordinating rotation of adjacent turbines of this clause and any of the preceding clauses, the operations comprising:
  receiving first rotational orientation information from a first fluid turbine having a least one first open concave surface with at least one corresponding first convex surface;
  receiving second rotational orientation information from a second fluid turbine having a least one second open concave surface with at least one corresponding second convex surface;

receiving fluid flow direction information indicating a direction of fluid flow relative to the first fluid turbine and the second fluid turbine;

calculating at least one rotational speed adjustment for at least one of the first fluid turbine and the second fluid turbine, to cause, at instantaneous times, the first open concave surface, the first convex surface, the second open concave surface, and the second convex surface to be simultaneously transverse to the direction of fluid flow;

outputting at least one control signal embodying the rotational speed adjustment to thereby regulate rotation of at least one of the first fluid turbine and the second fluid turbine such that at the instantaneous times, the first open concave surface, the first convex surface, the second open concave surface, and the second convex surface are transverse to the direction of fluid flow.

Clause 22. The non-transitory computer readable medium of any of clauses 1 to 21, wherein each of the instantaneous times occur at least once per revolution of the first fluid turbine and the second fluid turbine.

Clause 23. The non-transitory computer readable medium of any of clauses 1 to 22, wherein the fluid flow is wind.

Clause 24. The non-transitory computer readable medium of any of clauses 1 to 23, wherein the fluid flow is water.

Clause 25. The non-transitory computer readable medium of any of clauses 1 to 24, wherein the calculating is configured to cause at the instantaneous times a lower-pressure zone between the first fluid turbine and the second fluid turbine than would exist absent coordinated rotation by the at least one control signal.

Clause 26. The non-transitory computer readable medium of any of clauses 1 to 25, wherein the first rotational orientation information and the second rotational orientation information are respectively received from the first turbine and second turbine spaced between one and two turbine diameters apart.

Clause 27. The non-transitory computer readable medium of any of clauses 1 to 26, wherein the at least one first open concave surface includes at least two open concave surfaces each associated with a corresponding convex surface, wherein the at least one second open concave surface includes at least two open concave surfaces each associated with a corresponding convex surface, and wherein the control signal is configured to cause all concave and convex surfaces to be simultaneously transverse to the fluid flow direction at the instantaneous times.

Clause 28. The non-transitory computer readable medium of any of clauses 1 to 27, wherein the at least one control signal is configured to cause at the instantaneous times, an upstream open end of the first turbine to face in a same direction as an upstream open end of the second turbine.

Clause 29. The non-transitory computer readable medium of any of clauses 1 to 28, wherein the at least one control signal is configured to cause at the instantaneous times, an upstream open end of the first turbine to face in an opposite direction from an upstream open end of the second turbine.

Clause 30. The non-transitory computer readable medium of any of clauses 1 to 29, wherein the operations further include receiving third rotational orientation information from a third fluid turbine having a least one third open concave surface with at least one corresponding third convex surface, wherein calculating the at least one rotational speed adjustment is configured to cause, at the instantaneous times, the first open concave surface, the first convex surface, the second open concave surface, the second convex surface, the third open concave surface and the third convex surface to be simultaneously transverse to the direction of fluid flow.

Clause 31. The non-transitory computer readable medium of any of clauses 1 to 30, wherein the first fluid turbine, the second fluid turbine, and the third fluid turbine are equidistantly spaced from each other.

Clause 32. The non-transitory computer readable medium of any of clauses 1 to 31, wherein the at least one control signal is configured to cause the first fluid turbine and the second fluid turbine to rotate in opposite directions.

Clause 33. The non-transitory computer readable medium of any of clauses 1 to 32, wherein the at least one control signal is configured to cause the first fluid turbine and the second fluid turbine to rotate in a same direction.

Clause 34. The non-transitory computer readable medium of any of clauses 1 to 33, wherein the operations further include receiving additional rotational orientation information from a plurality of additional fluid turbines arranged in a plurality rows, and wherein the at least one control signal is configured to cause fluid turbines in each of the plurality of rows to alternately rotate in opposite directions.

Clause 35. The non-transitory computer readable medium of any of clauses 1 to 34, wherein the plurality of rows are offset from each other such that a fluid turbine in a succeeding row aligns with a gap between fluid turbines in a preceding row.

Clause 36. A system for coordinating rotation of adjacent turbines of this clause and any of the preceding clauses, the system comprising:

at least one processor configured to:
receive first rotational orientation information from a first fluid turbine having a least one first open concave surface with at least one corresponding first convex surface;
receive second rotational orientation information from a second fluid turbine having a least one second open concave surface with at least one corresponding second convex surface;
receive fluid flow direction information indicating a direction of fluid flow relative to the first fluid turbine and the second fluid turbine;
calculate at least one rotational speed adjustment for at least one of the first fluid turbine and the second fluid turbine, to cause, at instantaneous times, the first open concave surface, the first convex surface, the second open concave surface, and the second convex surface to be simultaneously transverse to the direction of fluid flow;
output at least one control signal embodying the rotational speed adjustment to thereby regulate rotation of at least one of the first fluid turbine and the second fluid turbine such that at the instantaneous times, the first open concave surface, the first convex surface, the second open concave surface, and the second convex surface are transverse to the direction of fluid flow.

Clause 37. The system of any of clauses 1 to 36, wherein each of the instantaneous times occur at least once per revolution of the first fluid turbine and the second fluid turbine.

Clause 38. The system of any of clauses 1 to 37, wherein the a least one first open concave surface includes at least two open concave surfaces each associated with a corresponding convex surface, wherein the a least one second open concave surface includes at least two open concave surfaces each associated with a corresponding convex surface, and wherein the control signal is configured to cause all concave and convex surfaces to be simultaneously transverse to the fluid flow direction at the instantaneous times.

Clause 39. The system of any of clauses 1 to 38, wherein the at least one control signal is configured to cause at the instantaneous times, an upstream open end of the first turbine to face in an opposite direction from an upstream open end of the second turbine.

Clause 40. The non-transitory computer readable medium of any of clauses 1 to 39, wherein the at least one processor is further configured to receive third rotational orientation information from a third fluid turbine having a least one third open concave surface with at least one corresponding third convex surface, and to calculate the at least one rotational speed adjustment to cause, at the instantaneous times, the first open concave surface, the first convex surface, the second open concave surface, the second convex surface, the third open concave surface and the third convex surface to be simultaneously transverse to the direction of fluid flow.

Clause 41. A method for coordinating rotation of adjacent turbines of this clause and any of the preceding clauses, the method comprising:
receiving first rotational orientation information from a first fluid turbine having a least one first open concave surface with at least one corresponding first convex surface;
receiving second rotational orientation information from a second fluid turbine having a least one second open concave surface with at least one corresponding second convex surface;
receiving fluid flow direction information indicating a direction of fluid flow relative to the first fluid turbine and the second fluid turbine;
calculating at least one rotational speed adjustment for at least one of the first fluid turbine and the second fluid turbine, to cause, at instantaneous times, the first open concave surface, the first convex surface, the second open concave surface, and the second convex surface to be simultaneously transverse to the direction of fluid flow;
outputting at least one control signal embodying the rotational speed adjustment to thereby regulate rotation of at least one of the first fluid turbine and the second fluid turbine such that at the instantaneous times, the first open concave surface, the first convex surface, the second open concave surface, and the second convex surface are transverse to the direction of fluid flow.

Clause 42. A flat-packable wind turbine assembly kit of this clause and any of the preceding clauses, comprising:
at least one flat-packed bendable airfoil having an upper edge and a lower edge, and being configured to assume a predefined curvature upon assembly;
a plurality of upper connecting elements distributed along the upper edge of the at least one flat packed bendable airfoil;
a plurality of lower connecting elements distributed along the lower edge of the at least one flat-packed bendable airfoil;
a flat-packed upper plate including an upper plurality of mating orifices distributed in a contour corresponding to the predefined curvature; and
a flat-packed lower plate including a lower plurality of mating orifices distributed in the contour corresponding to the predefined curvature, such that upon assembly when the plurality of upper connecting elements are connected to the upper plurality of mating orifices and when the plurality of lower connecting elements are connected to the lower plurality of mating orifices, the at least one flat-packed bendable airfoil assumes the predefined curvature.

Clause 43. The flat-packable wind turbine assembly kit of any of clauses 1 to 42, wherein the flat-packed bendable airfoil, the flat-packed upper plate, and the flat-packed lower plate are flat-packed together.

Clause 44. The flat-packable wind turbine assembly kit of any of clauses 1 to 43, further comprising a plurality of support beams configured to extend between the upper plate and the lower plate for providing rigidity to the assembled wind turbine.

Clause 45. The flat-packable wind turbine assembly kit of any of clauses 1 to 44, wherein the plurality of support beams are rods.

Clause 46. The flat-packable wind turbine assembly kit of any of clauses 1 to 45, wherein at least one of the upper plate and the lower plate are formed of two plies configured to be fastened together.

Clause 47. The flat-packable wind turbine assembly kit of any of clauses 1 to 46, wherein the two plies include rigidity-enhancing bends.

Clause 48. The flat-packable wind turbine assembly kit of any of clauses 1 to 47, wherein the upper connecting elements and the lower connecting elements include integrally formed bendable tabs respectively extending from the upper edge and the lower edge, and wherein the upper plurality of mating orifices and the lower plurality of mating orifices include slots for receiving the bendable tabs.

Clause 49. The flat-packable wind turbine assembly kit of any of clauses 1 to 48, wherein the upper connecting elements and the lower connecting elements include apertures respectively located along the upper edge and the lower edge, and wherein locations of the apertures correspond to location of the upper orifices and the lower orifices for enabling interconnection via a plurality of brackets.

Clause 50. The flat-packable wind turbine assembly kit of any of clauses 1 to 49, wherein the plurality of brackets include L-brackets.

Clause 51. The flat-packable wind turbine assembly kit of any of clauses 1 to 50, wherein the at least one flat-packed airfoil includes a single airfoil configured to assume an S-shape contour.

Clause 52. The flat-packable wind turbine assembly kit of any of clauses 1 to 51, wherein the at least one flat-packed airfoil includes two airfoils, each configured to assume a C-shape contour.

Clause 53. The flat-packable wind turbine assembly kit of any of clauses 1 to 52, wherein the upper plate and the lower plate are circular.

Clause 54. The flat-packable wind turbine assembly kit of any of clauses 1 to 53, wherein the upper plate and the lower plate are oval-shaped.

Clause 55. The flat-packable wind turbine assembly kit of any of clauses 1 to 54, wherein the upper plate includes a second-story lower plurality of mating orifices distributed in a second-story contour corresponding to a second-story predefined curvature.

Clause 56. The flat-packable wind turbine assembly kit of any of clauses 1 to 55, further comprising:
- a second-story flat-packed bendable airfoil having a second-story upper edge and a second-story lower edge, and being configured to assume the second-story predefined curvature upon assembly;
- a second-story flat-packed plate including a second-story upper plurality of mating orifices distributed in the second-story contour corresponding to the second-story predefined curvature;
- a plurality of second-story upper connecting elements distributed along the upper edge of the second-story flat-packed bendable airfoil;
- a plurality of second-story lower connecting elements distributed along the lower edge of the second-story flat-packed bendable airfoil, such that upon assembly when the plurality of second-story upper connecting elements are connected to the second-story upper plurality of mating orifices and when the second-story lower plurality of connecting elements are connected to the second-story lower mating orifices, the flat-packed bendable airfoil assumes the second-story predefined curvature.

Clause 57. The flat-packable wind turbine assembly kit of any of clauses 1 to 56, wherein the relative orientations of the upper plurality of mating orifices, the lower plurality of mating orifices, the second-story upper plurality of mating orifices and the second-story lower plurality of mating orifices are arranged such that differing associated airfoils face in differing directions upon assembly.

Clause 58. The flat-packable wind turbine assembly kit of any of clauses 1 to 57, wherein the directions differ by 90 degrees.

Clause 59. The flat-packable wind turbine assembly kit of any of clauses 1 to 58, wherein the at least one airfoil and the at least one second-story airfoil are configurable to turn a common generator.

Clause 60. The flat-packable wind turbine assembly kit of any of clauses 1 to 59, further comprising additional stories of airfoils atop the second story.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.
- a first fluid turbine for assuming a first orientation relative to a direction of fluid flow;
- a second fluid turbine in proximity to a first fluid turbine;
- a second fluid turbine for assuming a second orientation relative to a first orientation of the first fluid turbine;
- at least one of a first orientation of a first fluid turbine and a second orientation of a second fluid turbine is selectively adjustable to mitigate interference with downstream turbine operation;
- at least one processor;
- receiving an indication that a first fluid turbine imposes interference on a downstream operation of a second fluid turbine;
- based on an indication, determine a third orientation for one of a first fluid turbine and a second fluid turbine;
- a third orientation enabling a first fluid turbine and a second fluid turbine to produce a greater aggregate level of electrical energy than would be produced with a first fluid turbine in a first orientation and a second fluid turbine in a second orientation;
- transmitting a signal for changing one of a first orientation of a first fluid turbine and a second orientation of a second fluid turbine to a third orientation, thereby mitigating interference on a downstream operation of a second fluid turbine.
- a first fluid turbine having a first vertical axis of blade rotation;
- a second fluid turbine having a second vertical axis of blade rotation;
- a signal configured to translate at least one of a first vertical axis and a second vertical axis relative to another of the first vertical axis and the second vertical axis;
- a track associated with at least one of a first fluid turbine and a second fluid turbine;
- translating including moving at least one of a first vertical axis and a second vertical axis relative to a track;
- an arc shaped track;
- an angular position of a vertical axis of one of a first fluid turbine and a second fluid turbine functioning within the arc of a track;
- a linearly shaped track;
- a grid associated with at least one of a first fluid turbine and a second fluid turbine;
- translating at least one of a first vertical axis and a second vertical axis including movement along at least one track of a grid;
- at least one of a first vertical axis and a second vertical axis being mounted on a movable base;
- translating including moving a base;
- one of a first vertical axis and a second vertical axis being immovable relative to a ground position;
- translating including moving a movable base relative to an immovable one of a first vertical axis and a second vertical axis;
- a first fluid turbine having a first horizontal axis of blade rotation;
- a second fluid turbine having a second horizontal axis of blade rotation;
- a signal configured to rotate at least one of a first horizontal axis and a second horizontal axis;
- at least one motor associated with at least one of a first fluid turbine and a second fluid turbine;
- at least one motor being configured to cause changing an orientation in response to a signal;
- a first fluid turbine and a second fluid turbine being wind turbines;
- a fluid flow including airflow;
- a first fluid turbine and a second fluid turbine being water turbines;
- a fluid flow including water flow;

transmitting an additional signal for changing another of a first orientation of a first fluid turbine and a second orientation of a second fluid turbine to a fourth orientation;

a third orientation and a fourth orientation enabling a first fluid turbine and a second fluid turbine to produce a greater aggregate level of electrical energy than would be produced with the first fluid turbine in a first orientation and the second fluid turbine in a second orientation;

a fourth orientation corresponding to a first orientation or a second orientation;

an indication reflecting a lesser amount of power output from one of a first fluid turbine and a second fluid turbine than another of the first fluid turbine and the second fluid turbine;

at least one sensor including at least one of a blade rotation sensor, a fluid flow sensor, or an electrical energy output sensor;

a plurality of additional fluid turbines;

some additional fluid turbines being adjustable to mitigate interference with downstream turbine operation;

altering orientation of fluid turbines within a cluster;

receiving an indication that a first fluid turbine imposes interference on a downstream operation of a second fluid turbine when the first fluid turbine assumes a first orientation relative to a direction of fluid flow and the second fluid turbine assumes a second orientation relative to the first orientation of the first fluid turbine;

at least one of a first orientation of a first fluid turbine and a second orientation of a second fluid turbine being selectively adjustable to mitigate interference with downstream turbine operation;

based on an indication, determining a third orientation for one of a first fluid turbine and a second fluid turbine;

a third orientation enabling a first fluid turbine and a second fluid turbine to produce a greater aggregate level of electrical energy than would be produced with the first fluid turbine in the first orientation and the second turbine in the second orientation;

transmitting a signal for changing one of a first orientation of a first fluid turbine and a second orientation of a second fluid turbine to a third orientation;

mitigating interference on a downstream operation of a second fluid turbine.

altering orientation of fluid turbines within a cluster;

receiving an indication that a first fluid turbine imposes interference on a downstream operation of a second fluid turbine when the first fluid turbine assumes a first orientation relative to a direction of fluid flow and the second fluid turbine assumes a second orientation relative to the first orientation of the first fluid turbine;

at least one of the a orientation of a first fluid turbine and a second orientation of a second fluid turbine being selectively adjustable to mitigate interference with downstream turbine operation;

based on an indication, determining a third orientation for one of a first fluid turbine and a second fluid turbine;

a third orientation enabling a first fluid turbine and a second fluid turbine to produce a greater aggregate level of electrical energy than would be produced with the first fluid turbine in the first orientation and the second turbine in the second orientation;

transmitting a signal for changing one of a first orientation of a first fluid turbine and a second orientation of a second fluid turbine to a third orientation;

mitigating interference on a downstream operation of a second fluid turbine;

coordinating rotation of adjacent turbines;

receiving first rotational orientation information from a first fluid turbine having a least one first open concave surface with at least one corresponding first convex surface;

receiving second rotational orientation information from a second fluid turbine having a least one second open concave surface with at least one corresponding second convex surface;

receiving fluid flow direction information indicating a direction of fluid flow relative to a first fluid turbine and a second fluid turbine;

calculating at least one rotational speed adjustment for at least one of a first fluid turbine and a second fluid turbine, to cause, at instantaneous times, a first open concave surface, a first convex surface, a second open concave surface, and a second convex surface to be simultaneously transverse to a direction of fluid flow;

outputting at least one control signal embodying a rotational speed adjustment to thereby regulate rotation of at least one of a first fluid turbine and a second fluid turbine such that at the instantaneous times, a first open concave surface, a first convex surface, a second open concave surface, and a second convex surface are transverse to a direction of fluid flow;

each instantaneous time occurring at least once per revolution of a first fluid turbine and a second fluid turbine;

a fluid flow is wind;

a fluid flow is water;

calculating to cause at instantaneous times a lower-pressure zone between a first fluid turbine and a second fluid turbine than would exist absent coordinated rotation by a at least one control signal;

first rotational orientation information and second rotational orientation information being respectively received from a first turbine and a second turbine spaced between one and two turbine diameters apart;

at least one first open concave surface including at least two open concave surfaces each associated with a corresponding convex surface;

at least one second open concave surface including at least two open concave surfaces each associated with a corresponding convex surface;

a control signal causing all concave and convex surfaces to be simultaneously transverse to a fluid flow direction at instantaneous times;

at least one control signal causing at instantaneous times, an upstream open end of a first turbine to face in a same direction as an upstream open end of a second turbine;

at least one control signal causing at instantaneous times, an upstream open end of a first turbine to face in an opposite direction from an upstream open end of a second turbine;

receiving third rotational orientation information from a third fluid turbine having a least one third open concave surface with at least one corresponding third convex surface;

calculating at least one rotational speed adjustment to cause, at instantaneous times, a first open concave surface, a first convex surface, a second open concave surface, a second convex surface, a third open concave surface and a third convex surface to be simultaneously transverse to a direction of fluid flow;

a first fluid turbine, a second fluid turbine, and a third fluid turbine being equidistantly spaced from each other;

at least one control signal is configured causing a first fluid turbine and a second fluid turbine to rotate in opposite directions;

at least one control signal causing a first fluid turbine and a second fluid turbine to rotate in a same direction;

additional rotational orientation information from a plurality of additional fluid turbines arranged in a plurality rows;

at least one control signal causing fluid turbines in each of a plurality of rows to alternately rotate in opposite directions;

a plurality of rows that are offset from each other such that a fluid turbine in a succeeding row aligns with a gap between fluid turbines in a preceding row;

receiving first rotational orientation information from a first fluid turbine having a least one first open concave surface with at least one corresponding first convex surface;

receiving second rotational orientation information from a second fluid turbine having a least one second open concave surface with at least one corresponding second convex surface;

receiving fluid flow direction information indicating a direction of fluid flow relative to a first fluid turbine and a second fluid turbine;

calculating at least one rotational speed adjustment for at least one of a first fluid turbine and a second fluid turbine;

causing, at instantaneous times, a first open concave surface, a first convex surface, a second open concave surface, and a second convex surface to be simultaneously transverse to a direction of fluid flow;

outputting at least one control signal embodying a rotational speed adjustment to thereby regulate rotation of at least one of a first fluid turbine and a second fluid turbine such that at instantaneous times, a first open concave surface, a first convex surface, a second open concave surface, and a second convex surface are transverse to a direction of fluid flow;

each instantaneous time occurring at least once per revolution of a first fluid turbine and a second fluid turbine;

at least one first open concave surface including at least two open concave surfaces each associated with a corresponding convex surface;

at least one second open concave surface including at least two open concave surfaces each associated with a corresponding convex surface;

a control signal causing all concave and convex surfaces to be simultaneously transverse to a fluid flow direction at instantaneous times;

at least one control signal causing at instantaneous times, an upstream open end of a first turbine to face in an opposite direction from an upstream open end of a second turbine;

receiving third rotational orientation information from a third fluid turbine having a least one third open concave surface with at least one corresponding third convex surface;

calculating at least one rotational speed adjustment to cause, at instantaneous times, a first open concave surface, a first convex surface, a second open concave surface, a second convex surface, a third open concave surface and a third convex surface to be simultaneously transverse to a direction of fluid flow;

coordinating rotation of adjacent turbines;

receiving first rotational orientation information from a first fluid turbine having a least one first open concave surface with at least one corresponding first convex surface;

receiving second rotational orientation information from a second fluid turbine having a least one second open concave surface with at least one corresponding second convex surface;

receiving fluid flow direction information indicating a direction of fluid flow relative to a first fluid turbine and a second fluid turbine;

calculating at least one rotational speed adjustment for at least one of a first fluid turbine and a second fluid turbine, to cause, at instantaneous times, a first open concave surface, a first convex surface, a second open concave surface, and a second convex surface to be simultaneously transverse to a direction of fluid flow;

outputting at least one control signal embodying a rotational speed adjustment to thereby regulate rotation of at least one of a first fluid turbine and a second fluid turbine such that at the instantaneous times, a first open concave surface, a first convex surface, a second open concave surface, and a second convex surface are transverse to a direction of fluid flow;

a flat-packable wind turbine assembly kit;

at least one flat-packed bendable airfoil having an upper edge and a lower edge, and being configured to assume a predefined curvature upon assembly;

a plurality of upper connecting elements distributed along an upper edge of at least one flat packed bendable airfoil;

a plurality of lower connecting elements distributed along a lower edge of at least one flat-packed bendable airfoil;

a flat-packed upper plate including an upper plurality of mating orifices distributed in a contour corresponding to a predefined curvature;

a flat-packed lower plate including a lower plurality of mating orifices distributed in a contour corresponding to a predefined curvature;

upon assembly when a plurality of upper connecting elements are connected to a upper plurality of mating orifices and when a plurality of lower connecting elements are connected to a lower plurality of mating orifices, at least one flat-packed bendable airfoil assumes a predefined curvature;

a flat-packed bendable airfoil, a flat-packed upper plate, and a flat-packed lower plate that are flat-packed together;

a plurality of support beams configured to extend between an upper plate and a lower plate for providing rigidity to an assembled wind turbine;

a plurality of support beams being rods;

at least one of an upper plate and a lower plate being formed of two plies configured to be fastened together;

two plies including rigidity-enhancing bends;

upper connecting elements and lower connecting elements including integrally formed bendable tabs respectively extending from an upper edge and a lower edge;

an upper plurality of mating orifices and a lower plurality of mating orifices including slots for receiving bendable tabs;

upper connecting elements and lower connecting elements including apertures respectively located along an upper edge and a lower edge;

locations of apertures corresponding to location of upper orifices and lower orifices for enabling interconnection via a plurality of brackets;
a plurality of brackets including L-brackets;
at least one flat-packed airfoil including a single airfoil configured to assume an S-shape contour;
at least one flat-packed airfoil including two airfoils, each configured to assume a C-shape contour;
a circular upper plate and lower plate;
an oval-shaped upper plate and lower plate;
an upper plate including a second-story lower plurality of mating orifices distributed in a second-story contour corresponding to a second-story predefined curvature;
a second-story flat-packed bendable airfoil having a second-story upper edge and a second-story lower edge, and being configured to assume a second-story predefined curvature upon assembly;
a second-story flat-packed plate including a second-story upper plurality of mating orifices distributed in a second-story contour corresponding to a second-story predefined curvature;
a plurality of second-story upper connecting elements distributed along an upper edge of a second-story flat-packed bendable airfoil;
a plurality of second-story lower connecting elements distributed along a lower edge of a second-story flat-packed bendable airfoil, such that upon assembly when a plurality of second-story upper connecting elements are connected to a second-story upper plurality of mating orifices and when a second-story lower plurality of connecting elements are connected to a second-story lower mating orifices, a flat-packed bendable airfoil assumes a second-story predefined curvature;
relative orientations of an upper plurality of mating orifices, a lower plurality of mating orifices, a second-story upper plurality of mating orifices and a second-story lower plurality of mating orifices arranged such that differing associated airfoils face in differing directions upon assembly;
directions differing by 90 degrees;
at least one airfoil and at least one second-story airfoil are configurable to turn a common generator;
additional stories of airfoils atop a second story.

What is claimed is:
1. A flat-packable wind turbine assembly kit, comprising:
at least one flat-packed bendable airfoil having an upper edge and a lower edge, and being configured to assume a predefined curvature upon assembly;
a plurality of upper connecting elements distributed along the upper edge of the at least one flat packed bendable airfoil;
a plurality of lower connecting elements distributed along the lower edge of the at least one flat-packed bendable airfoil;
a flat-packed upper plate including an upper plurality of mating orifices distributed in a contour corresponding to the predefined curvature; and
a flat-packed lower plate including a lower plurality of mating orifices distributed in the contour corresponding to the predefined curvature, such that upon assembly when the plurality of upper connecting elements are connected to the upper plurality of mating orifices and when the plurality of lower connecting elements are connected to the lower plurality of mating orifices, the at least one flat-packed bendable airfoil assumes the predefined curvature,
wherein the upper connecting elements and the lower connecting elements include integrally formed bendable tabs respectively extending from the upper edge and the lower edge, and wherein the upper plurality of mating orifices and the lower plurality of mating orifices include slots for receiving the bendable tabs.

2. The flat-packable wind turbine assembly kit of claim 1, wherein the flat-packed bendable airfoil, the flat-packed upper plate, and the flat-packed lower plate are flat-packed together.

3. The flat-packable wind turbine assembly kit of claim 1, further comprising a plurality of support beams configured to extend between the upper plate and the lower plate for providing rigidity to the assembled wind turbine.

4. The flat-packable wind turbine assembly kit of claim 3, wherein the plurality of support beams are rods.

5. The flat-packable wind turbine assembly kit of claim 1, wherein at least one of the upper plate and the lower plate are formed of two plies configured to be fastened together.

6. The flat-packable wind turbine assembly kit of claim 5, wherein the two plies include rigidity-enhancing bends.

7. The flat-packable wind turbine assembly kit of claim 1, wherein the upper connecting elements and the lower connecting elements include apertures respectively located along the upper edge and the lower edge, and wherein locations of the apertures correspond to location of the upper orifices and the lower orifices for enabling interconnection via a plurality of brackets.

8. The flat-packable wind turbine assembly kit of claim 7, wherein the plurality of brackets include L-brackets.

9. The flat-packable wind turbine assembly kit of claim 1, wherein the at least one flat-packed airfoil includes a single airfoil configured to assume an S-shape contour.

10. The flat-packable wind turbine assembly kit of claim 1, wherein the at least one flat-packed airfoil includes two airfoils, each configured to assume a C-shape contour.

11. The flat-packable wind turbine assembly kit of claim 1, wherein the upper plate and the lower plate are circular.

12. The flat-packable wind turbine assembly kit of claim 1, wherein the upper plate and the lower plate are oval-shaped.

13. The flat-packable wind turbine assembly kit of claim 1, wherein the upper plate includes a second-story lower plurality of mating orifices distributed in a second-story contour corresponding to a second-story predefined curvature.

14. The flat-packable wind turbine assembly kit of claim 13, further comprising:
a second-story flat-packed bendable airfoil having a second-story upper edge and a second-story lower edge, and being configured to assume the second-story predefined curvature upon assembly;
a second-story flat-packed plate including a second-story upper plurality of mating orifices distributed in the second-story contour corresponding to the second-story predefined curvature;
a plurality of second-story upper connecting elements distributed along the upper edge of the second-story flat-packed bendable airfoil;
a plurality of second-story lower connecting elements distributed along the lower edge of the second-story flat-packed bendable airfoil, such that upon assembly when the plurality of second-story upper connecting elements are connected to the second-story upper plurality of mating orifices and when the second-story lower plurality of connecting elements are connected to the second-story lower mating orifices, the flat-packed bendable airfoil assumes the second-story predefined curvature.

15. The flat-packable wind turbine assembly kit of claim 14, further comprising additional stories of airfoils atop the second story.

16. The flat-packable wind turbine assembly kit of claim 14, wherein the relative orientations of the upper plurality of mating orifices, the lower plurality of mating orifices, the second-story upper plurality of mating orifices and the second-story lower plurality of mating orifices are arranged such that differing associated airfoils face in differing directions upon assembly.

17. The flat-packable wind turbine assembly kit of claim 16, wherein the directions differ by 90 degrees.

18. The flat-packable wind turbine assembly kit of claim 1, wherein the at least one airfoil and the at least one second-story airfoil are configurable to turn a common generator.

\* \* \* \* \*